US010724569B2

(12) United States Patent
Windfeldt et al.

(10) Patent No.: US 10,724,569 B2
(45) Date of Patent: Jul. 28, 2020

(54) UNIVERSAL INTERFACE SYSTEM, FASTENER APPARATUS AND ACCESSORY RAIL SYSTEM

(71) Applicant: Maxim Defense Industries, LLC, St. Cloud, MN (US)

(72) Inventors: Michael G. Windfeldt, St. Augusta, MN (US); Joel N. McDonald, Alexandria, MN (US)

(73) Assignee: Maxim Defense Industries, LLC, St. Cloud, MN (US)

( * ) Notice: Subject to any disclaimer, the term of this patent is extended or adjusted under 35 U.S.C. 154(b) by 0 days.

(21) Appl. No.: 16/383,558

(22) Filed: Apr. 12, 2019

(65) Prior Publication Data

US 2019/0323542 A1 Oct. 24, 2019

Related U.S. Application Data

(63) Continuation of application No. 16/162,339, filed on Oct. 16, 2018.

(Continued)

(51) Int. Cl.

*F16B 21/02* (2006.01)
*F16B 33/02* (2006.01)
*F41G 11/00* (2006.01)

(52) U.S. Cl.

CPC ............ *F16B 33/02* (2013.01); *F41G 11/003* (2013.01)

(58) Field of Classification Search

CPC ....... F16B 21/02; F16B 37/045; F16B 37/046

(Continued)

(56) References Cited

U.S. PATENT DOCUMENTS

| | | | | |
|---|---|---|---|---|
| 526,588 A | | 9/1894 | Strandwold | |
| 1,820,667 A | * | 8/1931 | Leyes .................. | F16B 37/045 269/93 |

(Continued)

FOREIGN PATENT DOCUMENTS

| | | |
|---|---|---|
| CN | 103471460 A | 12/2013 |
| CN | 106659917 A | 5/2017 |

(Continued)

OTHER PUBLICATIONS

Dimensioning of Accessory Mounting Rail for Small Arms Weapons, MIL-STD-1913, Feb. 3, 1995, pp. 11, US Army ARDEC Standardization Office, Picatinny Arsenal, NJ 07806-5000.

(Continued)

*Primary Examiner* — Flemming Saether

(74) *Attorney, Agent, or Firm* — Law Office of Arthur M. Antonelli, PLLC

(57) ABSTRACT

A fastener apparatus (200) for a universal interface system (10) is disclosed. The fastener apparatus may include a body (160), an interior fastener (206), an exterior fastener (202), and a spring (204). The fastener apparatus may form part of an accessory for a universal interface system. The universal interface system may include an object (14) and an accessory (16). The object may include a mounting surface (124), a locking surface (126), and an elongated slot (22) extending from the mounting surface to the locking surface. The accessory may be fixed to the mounting surface. The universal interface system may include a ready configuration (258), a rotated configuration (262), and a locked configuration (266). The universal interface system further may include a released configuration (260), and a deployed configuration (264). The universal interface system may be used to secure accessories to a weapon.

27 Claims, 77 Drawing Sheets

Related U.S. Application Data

(60) Provisional application No. 62/735,845, filed on Sep. 24, 2018, provisional application No. 62/703,868, filed on Jul. 26, 2018, provisional application No. 62/701,827, filed on Jul. 22, 2018, provisional application No. 62/660,984, filed on Apr. 21, 2018.

(58) Field of Classification Search
USPC .............................. 411/349, 549–553, 84–85
See application file for complete search history.

(56) References Cited

U.S. PATENT DOCUMENTS 1,856,549 A 5/1932 Griffen et al.
2,073,210 A 3/1937 Hosrud
2,193,094 A 3/1940 Gilbert
2,641,057 A 6/1953 Moore
2,691,540 A 10/1954 Knott
2,810,963 A 10/1957 Harper
2,854,748 A 10/1958 Williams
3,121,273 A 2/1964 Duffy et al.
3,220,077 A 11/1965 Newcomer, Jr. et al.
3,276,127 A 10/1966 Abrahamson
3,480,311 A * 11/1969 Lanham, Jr. ............ F16B 21/02 403/408.1
3,496,613 A 2/1970 Duffy
3,554,075 A 1/1971 Johnson
D223,532 S 5/1972 Shinjo
3,709,086 A 1/1973 Johnson
3,744,101 A 7/1973 Gley
3,787,024 A 1/1974 Dzuz, Jr.
3,852,703 A 12/1974 Carney et al.
3,855,895 A 12/1974 Francis, Jr.
3,877,166 A 4/1975 Ward
3,880,389 A 4/1975 Burris
3,908,330 A 9/1975 Frach et al.
4,007,516 A 2/1977 Coules
4,047,266 A 9/1977 Bisbing
4,085,511 A 4/1978 Kovac
4,128,923 A 12/1978 Bisbing
4,192,478 A 3/1980 Coules
4,194,429 A 3/1980 Wright
4,205,473 A 6/1980 Wilson
4,212,560 A 7/1980 Pufpaff et al.
4,262,394 A 4/1981 Wright
RE30,801 E 11/1981 Gley
4,331,413 A 5/1982 Hoen
RE31,106 E 12/1982 Pufpaff et al.
4,377,360 A * 3/1983 Kennedy ............... F16B 37/046 411/116
4,391,461 A 7/1983 Deibele
4,420,859 A 12/1983 Hammerle
4,441,843 A 4/1984 Wright et al.
4,467,987 A 8/1984 Small
4,575,295 A 3/1986 Rebentisch
4,596,345 A 6/1986 Beckers
4,599,768 A 7/1986 Doyle et al.
4,653,970 A 3/1987 Ballantyne
4,657,462 A 4/1987 Hoen
4,661,030 A 4/1987 Delmastro
4,705,442 A 11/1987 Fucci
4,770,586 A 9/1988 Osterland
4,830,531 A 5/1989 Condit et al.
4,840,525 A 6/1989 Rebentisch
4,893,978 A 1/1990 Frano
4,940,355 A 6/1990 Buchanan
5,011,356 A 4/1991 Fernandez
5,076,748 A 12/1991 Waterfield et al.
5,167,440 A 12/1992 FitzGerald
5,199,836 A 4/1993 Gogarty
5,215,177 A 6/1993 Johnson et al.
5,368,427 A 11/1994 Pfaffinger
5,370,488 A * 12/1994 Sykes ..................... F16B 21/02 411/551
5,375,361 A 12/1994 Rustick
5,460,351 A 10/1995 Holloway
5,770,797 A 6/1998 Lapohn
5,833,417 A * 11/1998 Sargent ................ F16B 37/046 411/85
5,941,539 A 8/1999 Pratt
6,575,682 B1 6/2003 Dohm et al.
6,733,221 B2 5/2004 Linger
D502,244 S 2/2005 Oz
D512,302 S 12/2005 Velten
7,021,814 B2 4/2006 Berardi
D577,094 S 9/2008 Wallace
D590,473 S 4/2009 Fitzpatrick et al.
D604,793 S 11/2009 Fitzpatrick et al.
D633,163 S 2/2011 Fitzpatrick et al.
D636,453 S 4/2011 Fitzpatrick et al.
7,976,256 B2 7/2011 Womack et al.
D665,043 S 8/2012 Fitzpatrick et al.
8,296,991 B1 10/2012 Chung
D683,417 S 5/2013 Daniel et al.
8,550,757 B2 10/2013 Anderson et al.
8,584,916 B1 11/2013 Chen
D698,235 S 1/2014 Oetlinger
D701,934 S 4/2014 Castaneda
D708,693 S 7/2014 Faxon
D712,000 S 8/2014 Behling
8,839,776 B2 9/2014 Kingsbury et al.
D717,907 S 11/2014 Montes
D718,405 S 11/2014 Fitzpatrick et al.
D721,571 S 1/2015 Roberts et al.
8,925,236 B1 1/2015 Mayberry et al.
D723,130 S 2/2015 Barrett
D724,171 S 3/2015 Trusty
9,010,009 B2 4/2015 Buxton
D728,723 S 5/2015 Peterson et al.
D729,338 S 5/2015 Mayberry et al.
D733,246 S 6/2015 Wells et al.
D734,828 S 7/2015 Geissele
9,125,502 B2 9/2015 Gwag
9,127,906 B2 9/2015 Wells et al.
9,194,635 B1 11/2015 Gibbens et al.
D745,628 S 12/2015 Barfoot et al.
D745,629 S 12/2015 Barfoot et al.
D746,404 S 12/2015 Chow et al.
9,222,749 B1 12/2015 Nakayama et al.
9,239,209 B2 1/2016 Mayberry et al.
9,239,210 B2 1/2016 Mayberry et al.
9,243,866 B2 1/2016 Roberts et al.
D748,753 S 2/2016 Chow et al.
D750,188 S 2/2016 Fitzpatrick et al.
D751,661 S 3/2016 Gibbens et al.
9,321,417 B1 4/2016 Lepper
D755,332 S 5/2016 Klielsmeier et al.
D755,334 S 5/2016 Klielsmeier et al.
D757,023 S 5/2016 Chow et al.
D757,024 S 5/2016 Chow et al.
D757,878 S 5/2016 Barfoot et al.
D757,879 S 5/2016 Barfoot
D759,185 S 6/2016 Klielsmeier et al.
D763,394 S 8/2016 Mayberry et al.
9,429,388 B2 8/2016 Mayberry et al.
9,435,600 B2 9/2016 Oliver
9,476,672 B2 10/2016 Wells et al.
9,482,487 B2 11/2016 Roberts et al.
9,523,554 B2 12/2016 Mayberry et al.
9,581,412 B2 2/2017 Cheng et al.
9,696,112 B2 7/2017 Gottzmann et al.
9,702,655 B2 7/2017 Nakayama et al.
D795,380 S 8/2017 Gibbens et al.
D797,232 S 9/2017 Gibbens et al.
9,777,985 B2 10/2017 Roberts et al.
9,921,029 B2 3/2018 Roberts et al.
9,929,203 B1 3/2018 Sung et al.
9,964,380 B1 5/2018 Oglesby
9,976,832 B2 5/2018 Mayberry et al.
10,094,639 B2 10/2018 Sessions et al.
10,101,118 B2 10/2018 Roberts et al.
10,161,706 B2 12/2018 Roberts et al.
10,166,658 B2 1/2019 Bennett et al.
10,168,119 B2 1/2019 Roberts et al.

(56) References Cited

U.S. PATENT DOCUMENTS

| | | | |
|---|---|---|---|
| 10,239,466 B2 | 3/2019 | Campbell | |
| 2001/0032727 A1 | 10/2001 | Maynard et al. | |
| 2002/0176766 A1 | 11/2002 | LeVey et al. | |
| 2003/0059255 A1 | 3/2003 | Kirchen | |
| 2003/0185653 A1 | 10/2003 | Csik et al. | |
| 2004/0190931 A1 | 9/2004 | Schuller | |
| 2004/0195776 A1 | 10/2004 | Warnecke et al. | |
| 2006/0065261 A1 | 3/2006 | Files | |
| 2008/0047890 A1 | 2/2008 | Klein | |
| 2010/0037505 A1 | 2/2010 | Romer | |
| 2011/0123296 A1 | 5/2011 | Csik et al. | |
| 2013/0039697 A1 | 2/2013 | Plankl et al. | |
| 2013/0340211 A1 | 12/2013 | Benedetti et al. | |
| 2014/0216850 A1 | 8/2014 | Markley | |
| 2015/0089778 A1 | 4/2015 | Tisol, Jr. | |
| 2016/0010946 A1 | 1/2016 | Gibbens et al. | |
| 2016/0079909 A1 | 3/2016 | Franklin et al. | |
| 2016/0316612 A1 | 11/2016 | Lammerant et al. | |
| 2016/0349011 A1 | 12/2016 | Jen | |
| 2017/0010065 A1 | 1/2017 | Kielsmeier et al. | |
| 2017/0136936 A1* | 5/2017 | Lamoureux ............. | F16B 21/02 |
| 2018/0003460 A1 | 1/2018 | Roberts et al. | |
| 2018/0180374 A1 | 6/2018 | Roberts et al. | |
| 2018/0202761 A1 | 7/2018 | Roberts et al. | |
| 2018/0328693 A1 | 11/2018 | Mayberry et al. | |
| 2018/0345873 A1 | 12/2018 | Cambell | |
| 2019/0143526 A1 | 5/2019 | Everard et al. | |

FOREIGN PATENT DOCUMENTS

| | | |
|---|---|---|
| CN | 106999959 A | 8/2017 |
| DE | 10305228 A1 | 8/2004 |
| EP | 2 369 186 A1 | 9/2011 |
| NZ | 586538 A | 2/2012 |

OTHER PUBLICATIONS

Finishing of Metal and Wood Surfaces, MIL-STD-171F, May 31, 2011, pp. 65, US Army ARDEC Standardization Office, Picatinny Arsenal, NJ 07806-5000.

Keymod vs. M-Lok Modular Rail System Comparison, May 4, 2017, pp. 43 Naval Special Warfare Center, Crane Division, Crane, IN 47422.

SOPMOd Program Overview, Apr. 17, 2006, pp. 82, Naval Special Warfare Center, Crane Division, Crane, IN 47422.

Anschutz, Small Bore Rifles 2010, Feb. 2010, pp. 60, J.G. Anschutz GmbH & Co. KG Jagd-und Sportwaffenfabrik, Daimlerstrasse 12, 89079 Ulm, Germany.

Anschutz, Hunting, Sporting and Custom Grade Rifles, Feb. 2010, pp. 41, J.G. Anschutz GmbH & Co. KG Jagd-und Sportwaffenfabrik, Daimlerstrasse 12, 89079 Ulm, Germany.

Anschutz, User Manual 1903 64 Series Model, Jun. 2011, pp. 26, J.G. Anschutz GmbH & Co. KG Jagd-und Sportwaffenfabrik, Daimlerstrasse 12, 89079 Ulm, Germany.

Anschutz, Match-Air Rifle, pp. 19, Ulm, West Germany.

http://jga.anschuetz-sport.com, Hand stop 6225 (001466), retrieved Jul. 25, 2018, J.G. Anschutz GmbH & Co. KG Jagd-und Sportwaffenfabrik, Daimlerstrasse 12, 89079 Ulm, Germany.

http://jga.anschuetz-sport.com, Hand stop 6226 (001466), retrieved Jul. 25, 2018, J.G. Anschutz GmbH & Co. KG Jagd-und Sportwaffenfabrik, Daimlerstrasse 12, 89079 Ulm, Germany.

http://jga.anschuetz-sport.com, Aluminum grooved rail (003297), retrieved Jul. 25, 2018, J.G. Anschutz GmbH & Co. KG Jagd-und Sportwaffenfabrik, Daimlerstrasse 12, 89079 Ulm, Germany.

Anschutz, List of Component parts, Apr. 2004, pp. 96.

*Magpul Industries Corp.* v. *Gibbens Engineering Group, LLC,* Answer to Second Amended Complaint and Counterclaims (Document 17), May 27, 2016, pp. 30, 1:16 cv 00270-SS, US District Court for Western District of Texas.

*Magpul Industries Corp.* v. *Gibbens Engineering Group, LLC,* Answer to Second Amended Complaint and Counterclaims, Exh. A (Document 17-1), May 27, 2016, pp. 11, 1:16 cv 00270-SS, US District Court for Western District of Texas.

*Magpul Industries Corp.* v. *Gibbens Engineering Group, LLC,* Answer to Second Amended Complaint and Counterclaims, Exh. B (Document 17-2), May 27, 2016, pp. 4, 1:16 cv 00270-SS, US District Court for Western District of Texas.

*Magpul Industries Corp.* v. *Gibbens Engineering Group, LLC,* Answer to Second Amended Complaint and Counterclaims, Exh. C (Document 17-3), May 27, 2016, p. 1, 1:16 cv 00270-SS, US District Court for Western District of Texas.

*Magpul Industries Corp.* v. *Gibbens Engineering Group, LLC,* Magpul Industries, Corp's Concise Statement of Alleged Infringement by Gibbens Engineering Group, LLC, (Document 32), Jul. 25, 2016, pp. 8, 1:16 cv 00270-SS, US District Court for Western District of Texas.

*Magpul Industries Corp.* v. *Gibbens Engineering Group, LLC,* Magpul Industries, Corp's Concise Statement of Alleged Infringement by Gibbens Engineering Group, LLC, Exh. A (Document 32-1), Jul. 25, 2016, pp. 8, 1:16 cv 00270-SS, US District Court for Western District of Texas.

CNIPA Search Report, Hong Kong Short-Term Patent Application No. 19122236.3 on "Universal interface system, fastener apparatus and accessory rail system" in name of Maxim Defense Industries, LLC, pp. 5, Jun. 14, 2019.

European Search Report, EP Application No. 19168842.3 for "Universal interface system, fastener apparatus and accessory rail system" in name of Maxim Defense Industries, LLC, pp. 15, Nov. 25, 2019.

* cited by examiner

FIG. 165
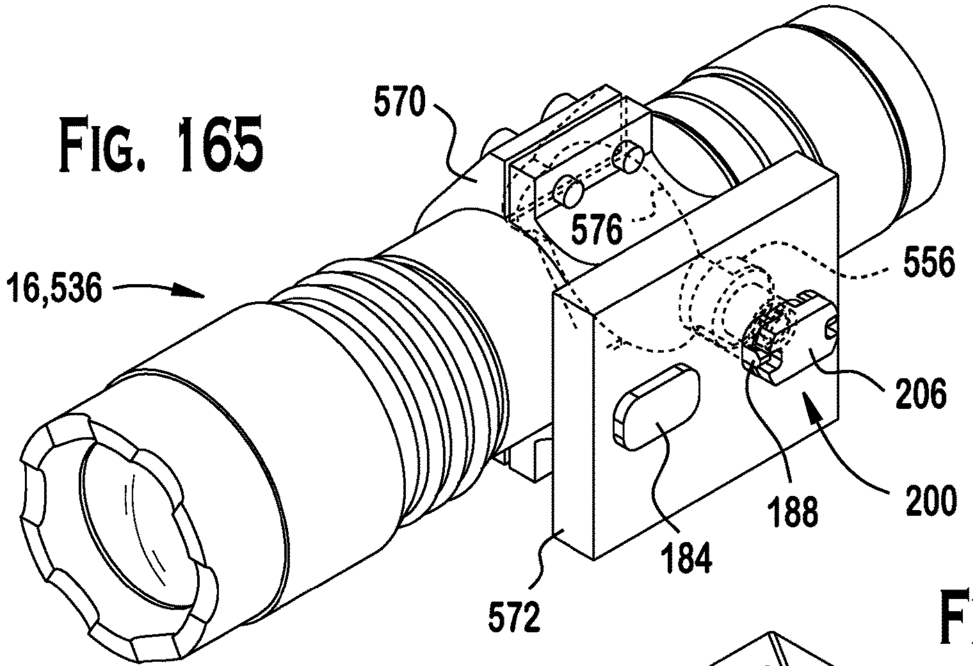
FIG. 166
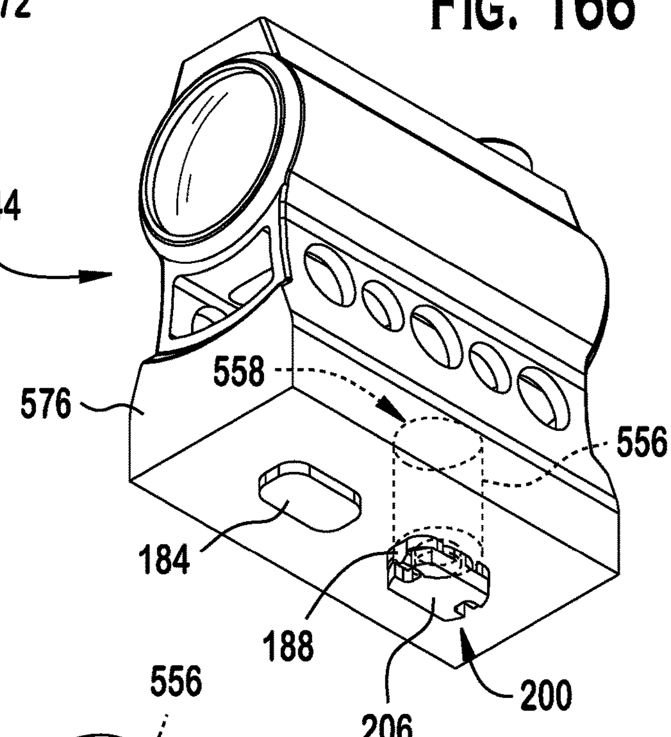
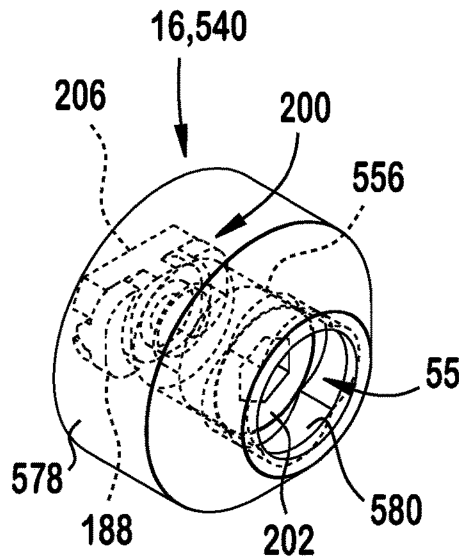
FIG. 167
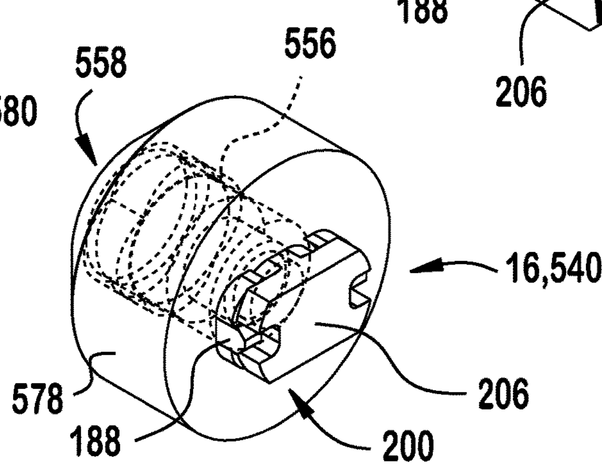
FIG. 168

UNIVERSAL INTERFACE SYSTEM, FASTENER APPARATUS AND ACCESSORY RAIL SYSTEM

CROSS REFERENCE TO RELATED APPLICATIONS

This application is a continuation of U.S. patent application Ser. No. 16/162,339 filed on Oct. 16, 2018 (the '339 application). The '339 application claims the benefit of U.S. Provisional Application No. 62/660,984 filed on Apr. 21, 2018. The '339 application claims the benefit of U.S. Provisional Application No. 62/701,827 filed on Jul. 22, 2018. The '339 application claims the benefit of U.S. Provisional Application No. 62/703,868 filed on Jul. 26, 2018. The '339 application claims the benefit of U.S. Provisional Application No. 62/735,845 filed on Sep. 24, 2018. The disclosure of each of these applications is incorporated by reference herein in their entirety.

FIELD OF THE INVENTION

The present invention generally relates to components for a fastener apparatus. More particularly, this invention relates to a system for attaching accessories to small arms weapons or other equipment.

BACKGROUND

Fasteners and fastener systems may be used with tactical accessories to configure small arms weapons to individual preferences and mission requirements. Versatile weapons accessories may increase operator survivability and lethality by enhanced weapon performance. Accordingly, a need exists for improvements in mounting tactical accessories to small arms weapons.

SUMMARY

Hence, the present invention is directed toward a universal interface system, as well as a fastener apparatus for securing an accessory (e.g., an accessory mounting rail, foregrip, tactical light, sling mount or other accessories) to an elongated slot on an object (e.g., a firearm handguard). The present invention is further directed toward an accessory rail system. For instance, a fastener apparatus for a universal interface system is disclosed. In one example, the fastener apparatus may include a body, an interior fastener, an exterior fastener, and a spring. The body may include a first surface, a second surface spaced from the first surface; a first bore in the first surface, and a second bore in the second surface. The first bore may include an end wall spaced from the first surface, and a side wall which extends from the first surface to the end wall. The second bore in the second surface may extend from the second surface to the end wall, the first bore and the second bore forming a first counterbore in the body. The interior fastener may include a distal end. The distal end of the interior fastener may be positioned near the second surface. The exterior fastener may include a proximal end. The proximal end of the exterior fastener being mated to the interior fastener. Also, the proximal end of the exterior fastener may be positioned in the first bore. The spring may be housed in the first bore between the proximal end of the exterior fastener and the end wall.

The fastener apparatus may include a first operational configuration in which the proximal end of the exterior fastener is spaced a first distance from the distal end of the interior fastener, and the interior fastener is biased toward the second surface by the spring. Additionally, the fastener apparatus may include a second operational configuration in which the exterior fastener compresses the spring and positions the interior fastener away from the second surface. The fastener apparatus may include a third operational configuration in which the proximal end of the exterior fastener is spaced a second distance from the distal end of the interior fastener, the second distance being less than the first distance.

The interior fastener may include an elongated base having a first longitudinal axis. The elongated base may include a lower surface, a first side proximate to the lower surface, a second side proximate to the first side, and a third side proximate to the first side and the lower surface, as well as a shoulder next to the elongated base. The shoulder may have a second longitudinal axis. The shoulder may include a first sidewall-segment proximate to the first side of the elongated base, and an end surface spaced from the second side of the elongated base along the second longitudinal axis. The interior fastener may further include a screw thread proximate to the end surface for receiving a mating fastener. The third side of the elongated base may include a notch. The notch may include a first interior sidewall, the first interior sidewall extending from the third side to the lower surface of the elongated base. The interior fastener further may include a shaft extending from the end surface. The shaft may be in parallel alignment with the second longitudinal axis. The shaft may be externally threaded with the screw thread.

The shoulder may include a first cross-sectional profile normal to the second longitudinal axis. Time first cross-sectional profile may have a non-circular shape. The first cross-sectional profile may include a first straight wall segment proximate the first side surface; and a second straight wall segment spaced from the first straight wall segment. The first cross-sectional profile further may include a first curved wall segment between the first straight side wall segment and the second straight wall segment, as well as a second curved wall segment between the first straight side wall segment and the second straight wall segment. The first curved wall segment may possess a first radius of curvature, and the second curved wall segment may possess a second radius of curvature. The first radius of curvature may be substantially equal to the second radius of curvature.

Further, the first cross-sectional profile may include a third curved wall segment abutting the first straight wall segment, and a fourth curved wall segment spaced from the first wall segment. The third curved wall segment may possess a third radius of curvature, and the fourth curved wall segment may possess a fourth radius of curvature. The third radius of curvature may be substantially equal to the fourth radius of curvature. Moreover, the first radius of curvature may be substantially equal to the third radius of curvature. The first cross-sectional profile further may include a third straight wall segment between the first curved wall segment and the second curved wall segment, and a fourth straight wall segment between the third curved wall segment and the fourth curved wall segment. The first cross-sectional profile may have a first plane of symmetry and a second plane of symmetry. The first cross-sectional profile may have a rounded square shape.

Further, a method of fixing an accessory rail to a slotted object is disclosed. For instance, the slotted object may include a mounting surface, a locking surface, and an elongated slot extending from the mounting surface to the locking surface. The method may include providing an accessory rail with a fastener apparatus. The fastener apparatus may include an interior fastener, an exterior fastener, and a spring. The interior fastener may include an elongated base. The method may further include positioning the accessory rail on the mounting surface, moving the elongated base through the elongated slot and past the locking surface of the slotted object. Additionally, the method may include rotating the elongated base until the elongated base is oriented transverse to the elongated slot, and the spring biasing the shoulder into the elongated slot. The method further may include positioning the elongated base against the locking surface, and rotating the exterior fastener with respect to the shoulder to clamp the slotted object and the accessory rail between the elongated base and the mating fastener.

Also, a universal interface system is disclosed. For example, the universal interface system may include an object and an accessory. The object may include a mounting surface, a locking surface, and art elongated slot extending from the mounting surface to the locking surface. The accessory may include a fastener apparatus and the accessory may be fixed to the mounting surface. The universal interface system may include a ready configuration, a rotated configuration, and a locked configuration. Additionally, the universal interface system may include a released configuration, and a deployed configuration.

DESCRIPTION OF THE DRAWINGS

In the accompanying drawings, which form a part of the specification and are to be read in conjunction therewith, and in which like reference numerals (or designations) are used to indicate like parts in the various views:

FIG. 118 is another view of the accessory interface system of FIG. 117 in a locked configuration.

FIG. 119 is a cross-sectional view of FIG. 111 along line 119-119;

FIG. 120 is a cross-sectional view of another exemplary fastener of FIG. 111 along line 119-119;

FIG. 121 is a cross-sectional view of another exemplary fastener of FIG. 111 along line 119-119;

FIG. 122 is a cross-sectional view of another exemplary fastener of FIG. 111 along line 119-119;

FIG. 123 is a cross-sectional view of yet another exemplary fastener of FIG. 111 along line 119-119;

FIG. 124 is a top perspective view of another exemplary locking bolt of FIG. 89;

FIG. 125 is a top view of the locking bolt of FIG. 121;

FIG. 126 is a side view of the locking nut of FIG. 121;

FIG. 127 is a front view of the locking nut of FIG. 121;

FIG. 128 is a bottom view of the locking nut of FIG. 121;

FIG. 129 is a bottom perspective view of the locking nut of FIG. 121;

Figure 63:
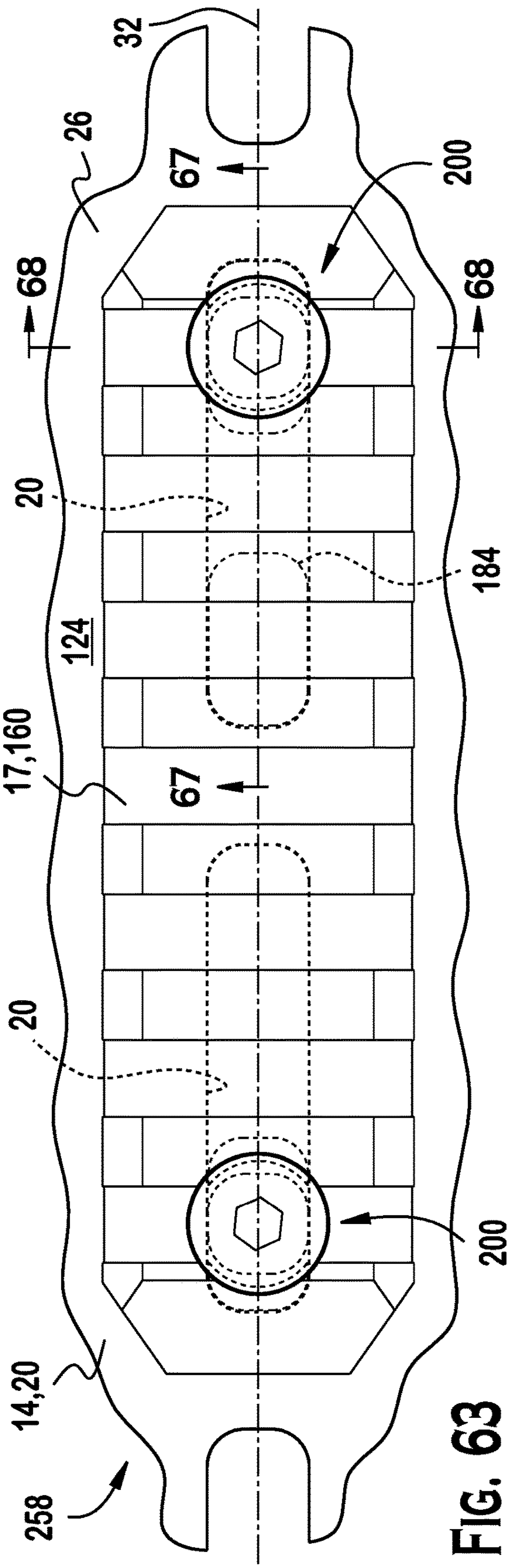
FIG. 63 is a partial view of another exemplary embodiment of accessory interface system in a ready configuration from the mounting surface side of the accessory interface system.
Figure 130:
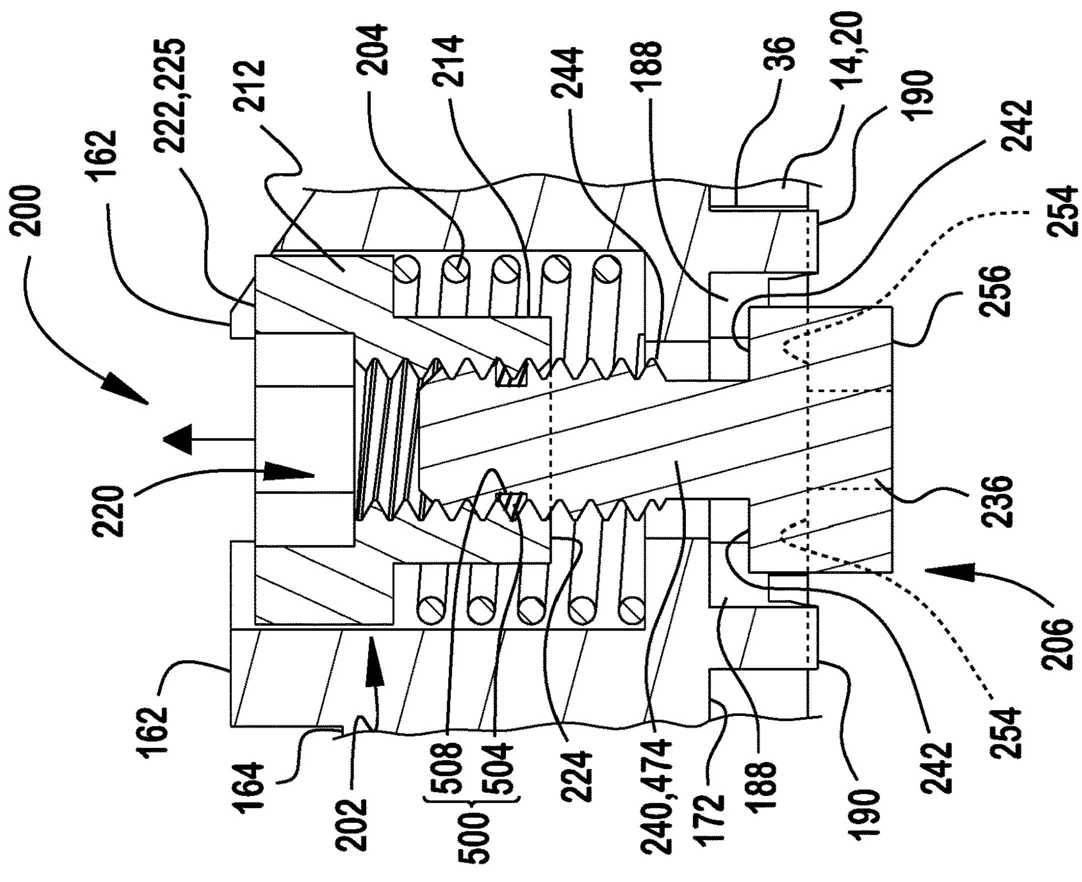

FIG. 130 is cross-sectional view of another embodiment of the accessory interface system of FIG. 63 in a latched configuration.

Figure 131:
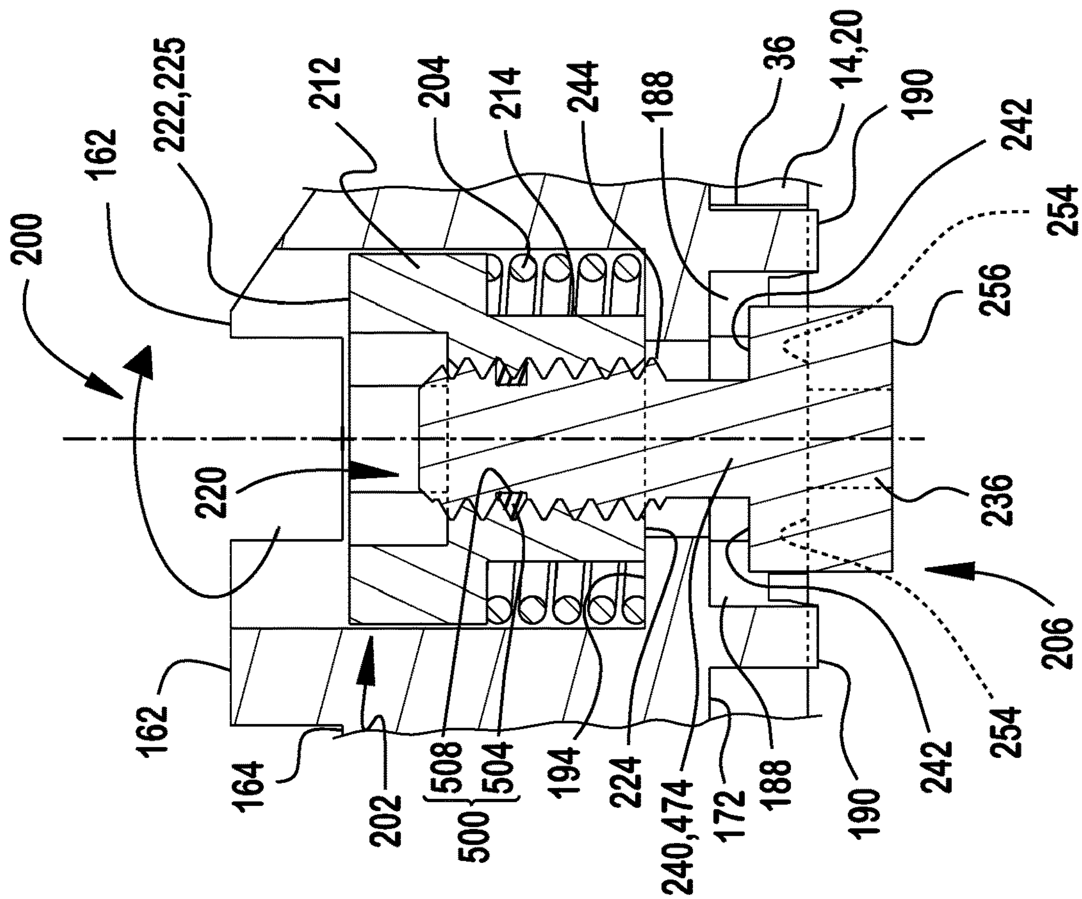

FIG. 131 is another view of the accessory interface system of FIG. 130 in a locked configuration.

Figure 43:
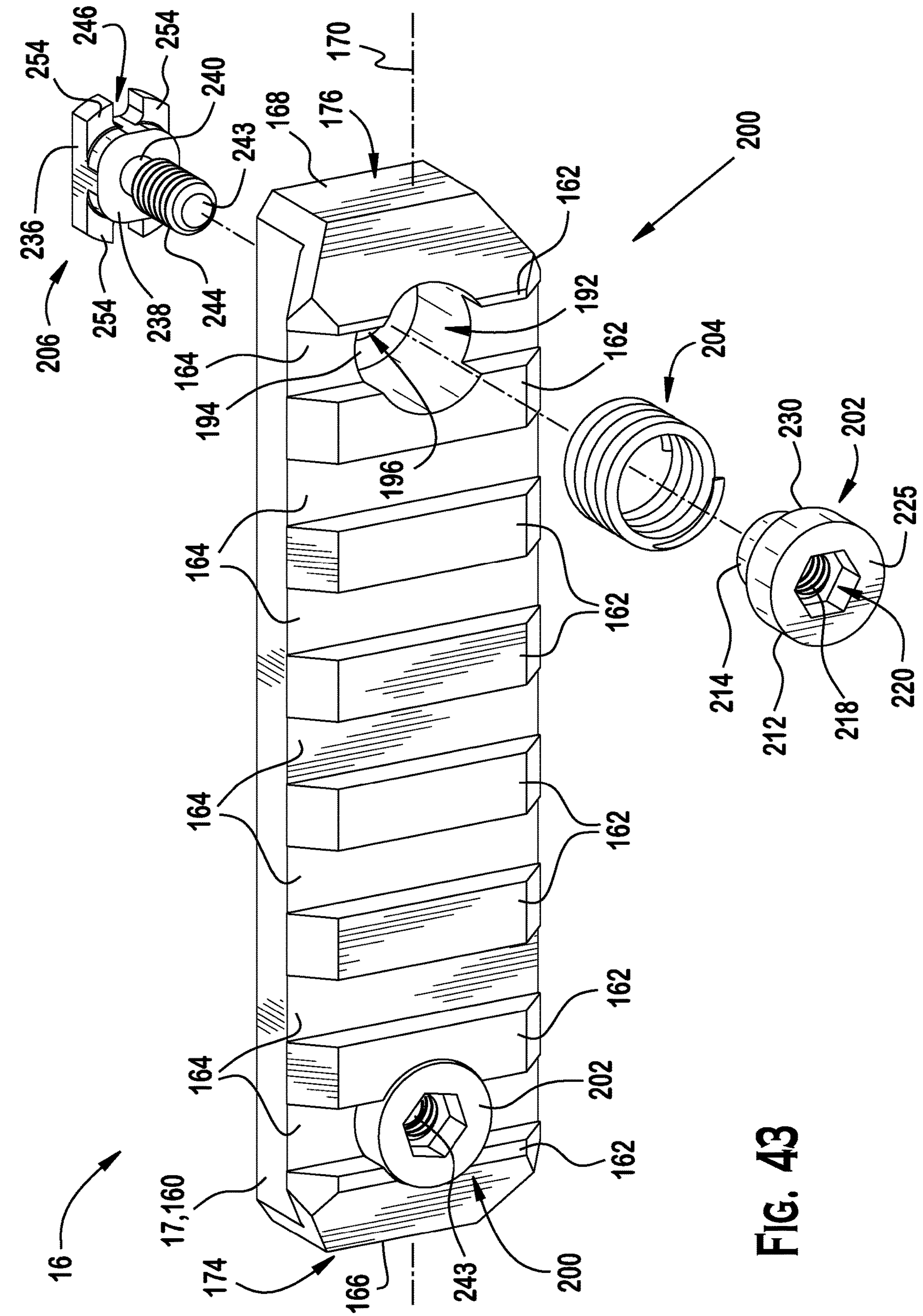
FIG. 43 is a top partial exploded view of another embodiment of an accessory rail and fastener apparatus in accordance with the present invention.
Figure 132:
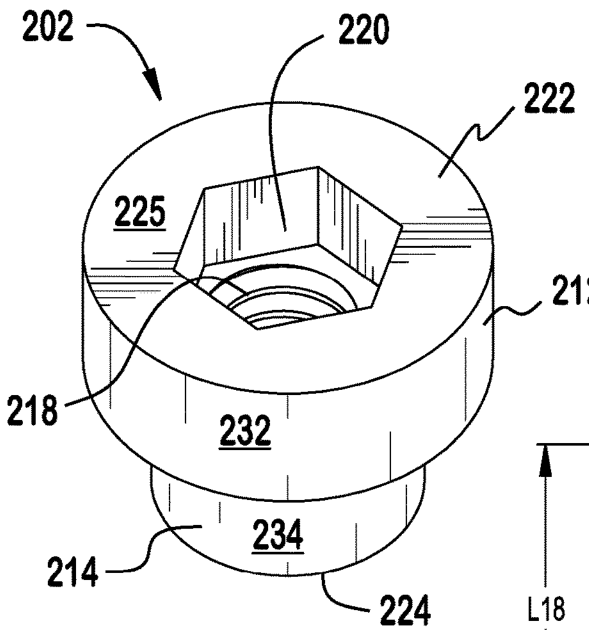
Figure 133:
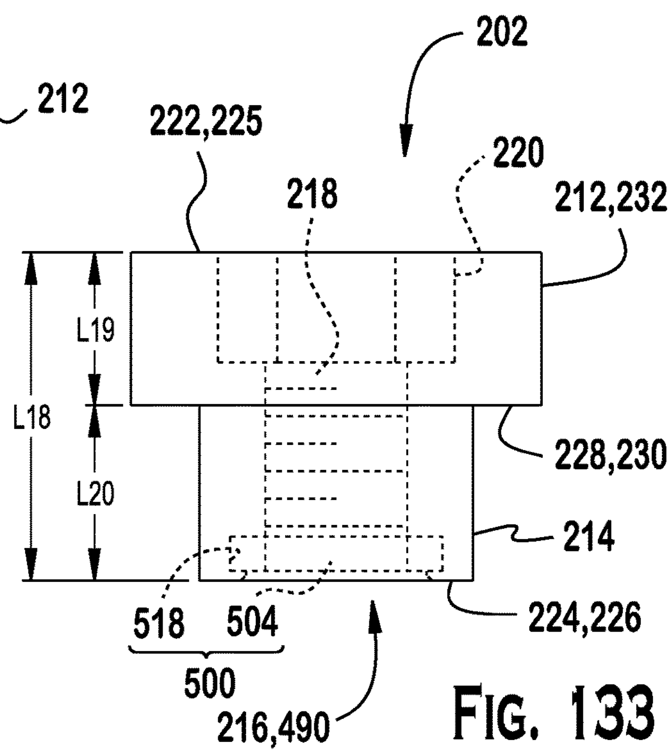
Figure 134:
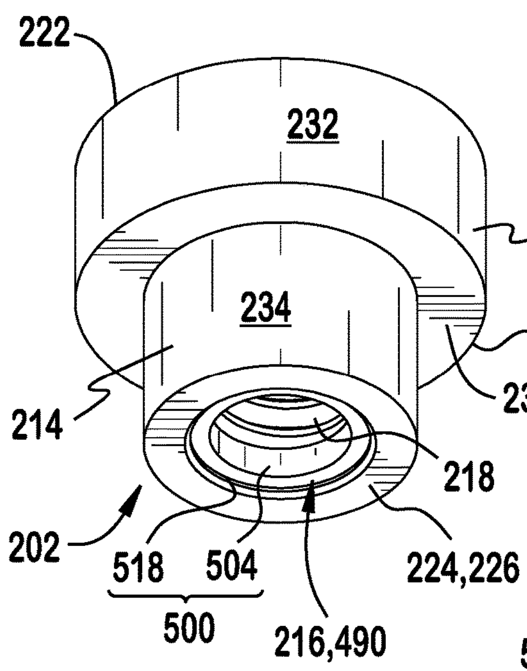
Figure 135:
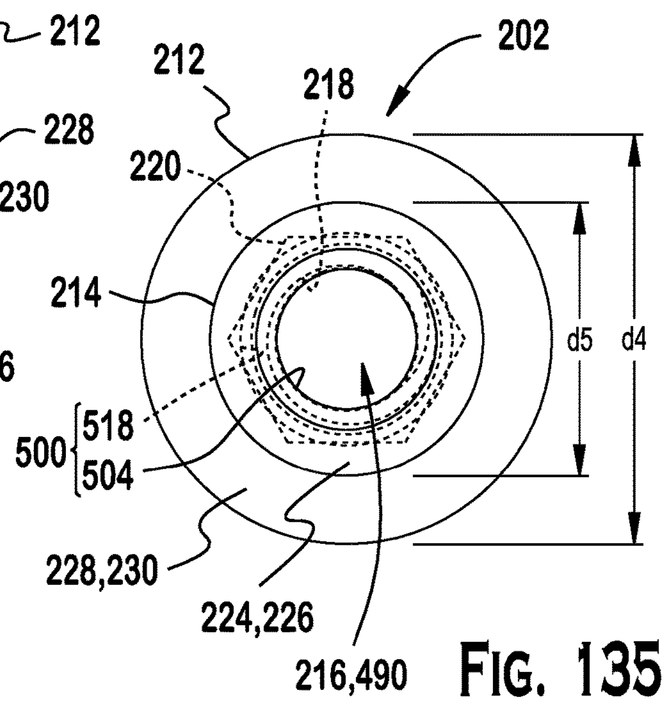
Figure 136:
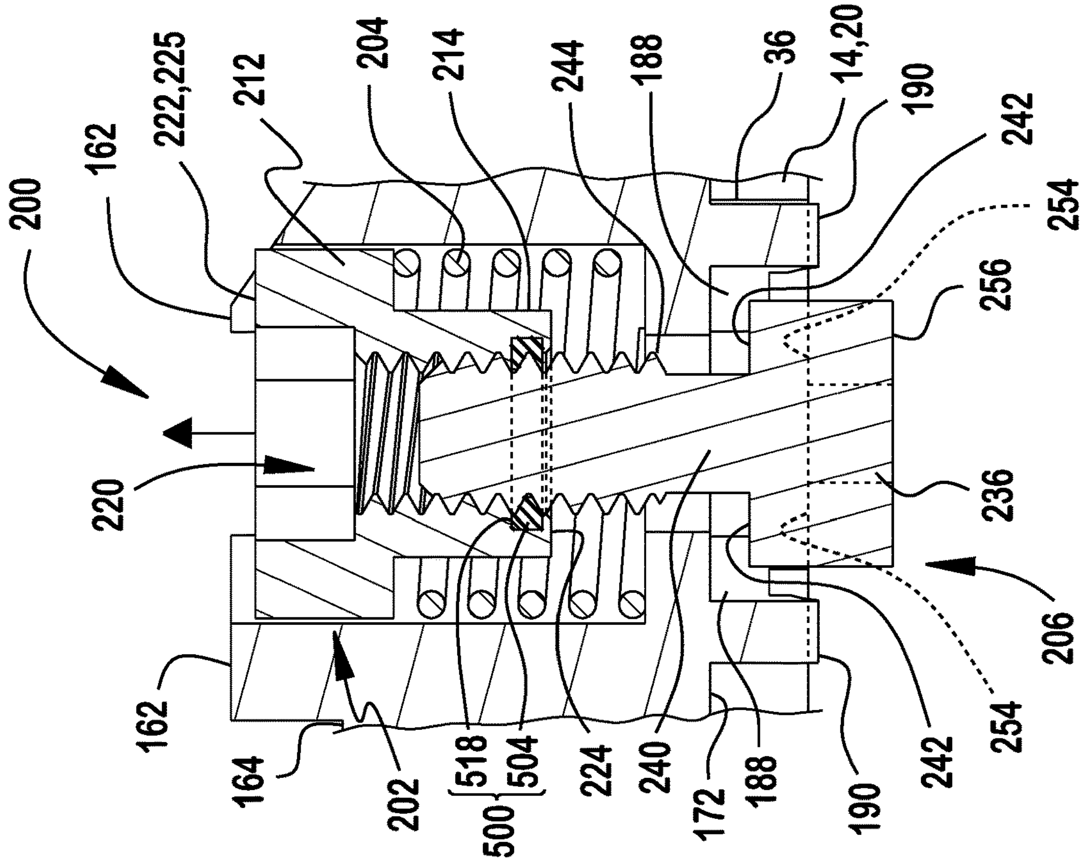

FIG. 132 is a top perspective view of another exemplary fastener of the fastener apparatus of FIG. 43;

FIG. 133 is a side view of the fastener of FIG. 132;

FIG. 134 is a bottom perspective view of the fastener of FIG. 132;

FIG. 135 is a top view of the fastener of FIG. 132;

FIG. 136 is cross-sectional view of another embodiment of the accessory interface system of FIG. 63 in a latched configuration.

Figure 137:
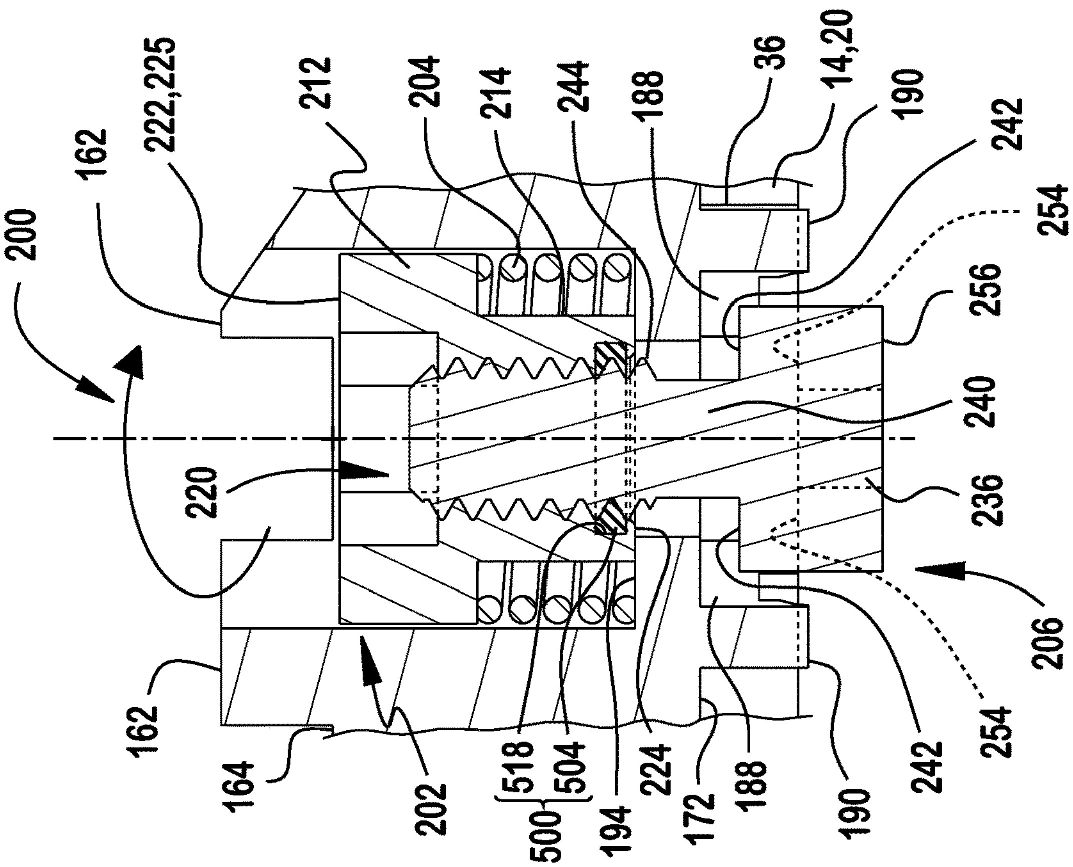

FIG. 137 is another view of the accessory interface system of FIG. 136 in a locked configuration.

Figure 89:
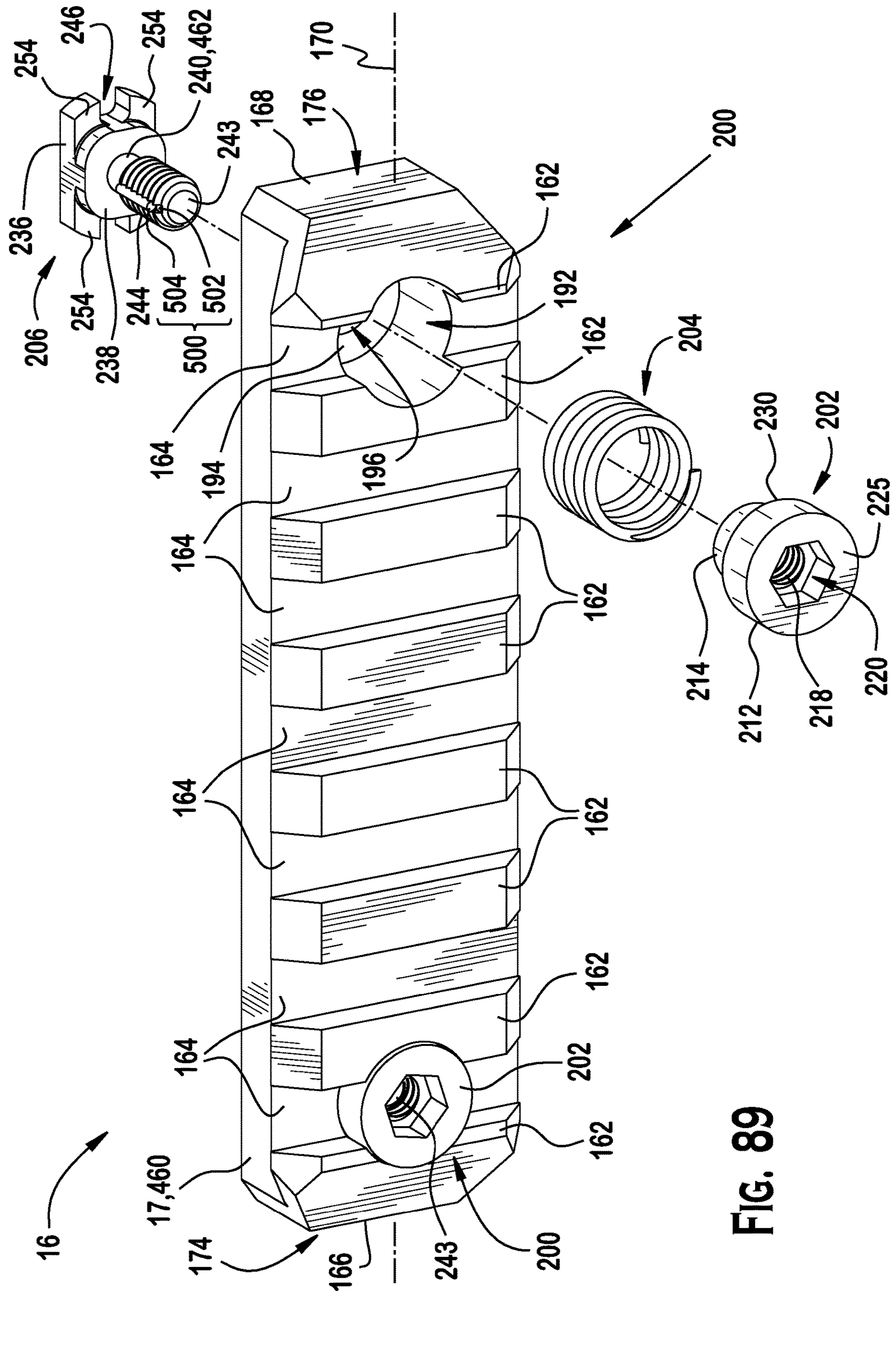
FIG. 89 is a top partial exploded view of another embodiment of an accessory rail and fastener apparatus in accordance with the present invention.
Figure 138:
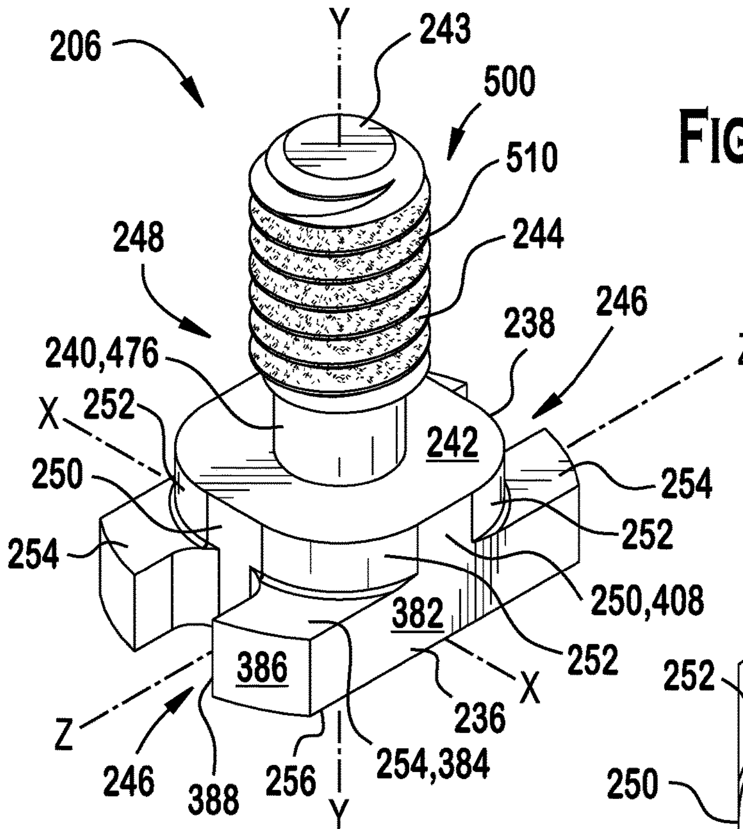
Figure 139:
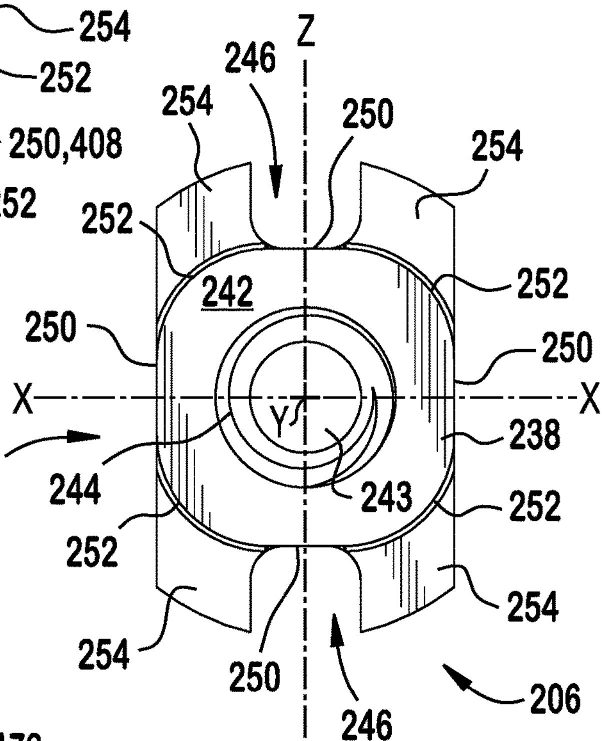
Figure 140:
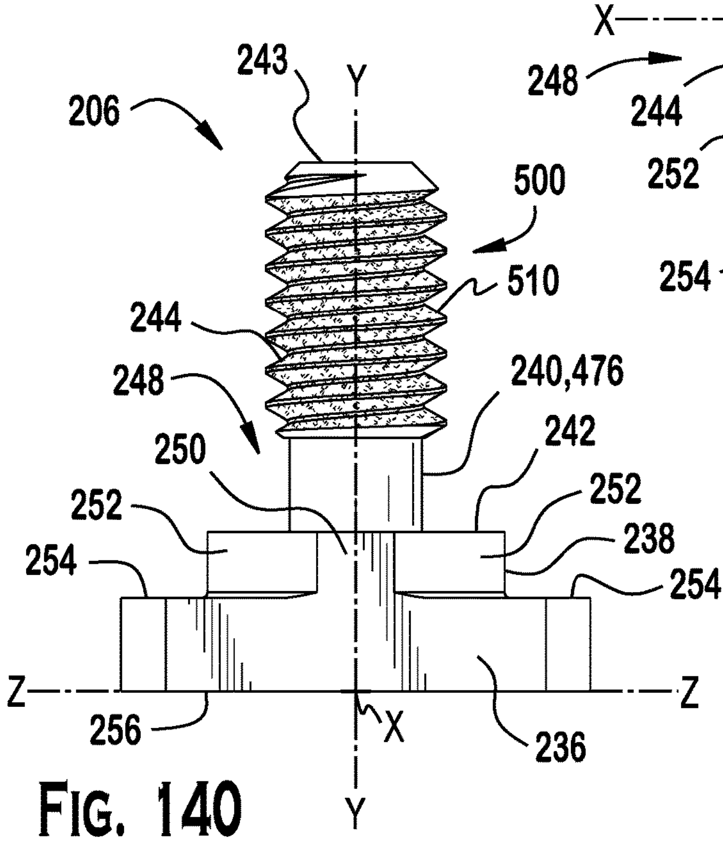
Figure 141:
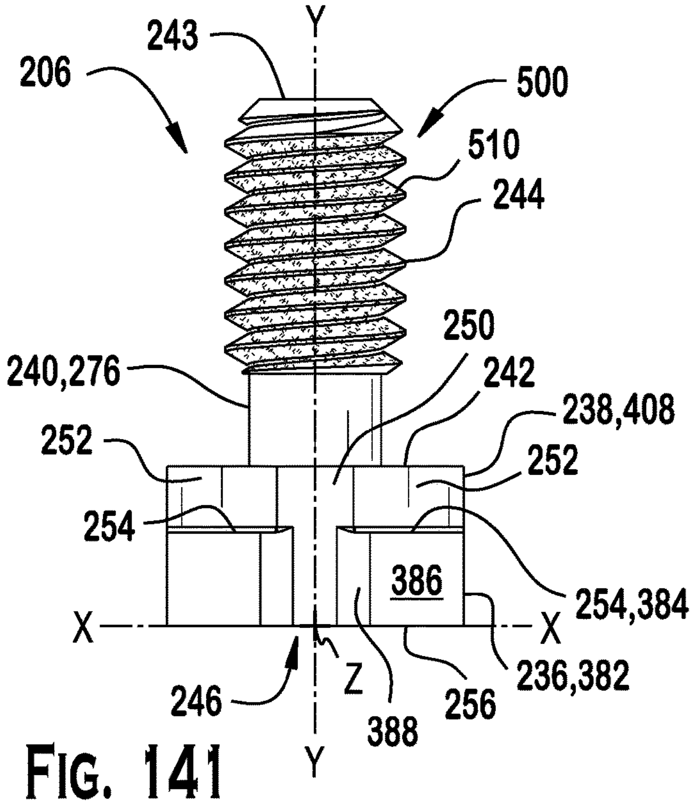
Figure 142:
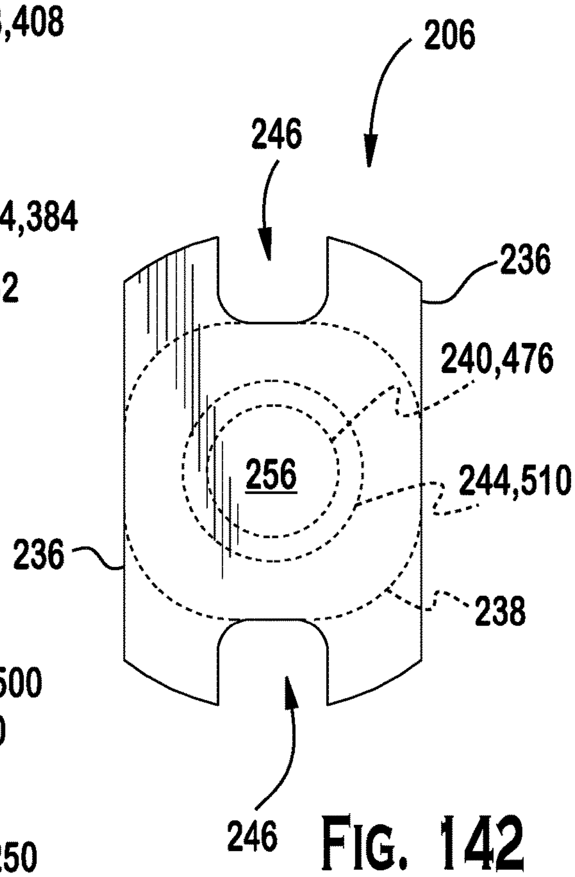
Figure 143:
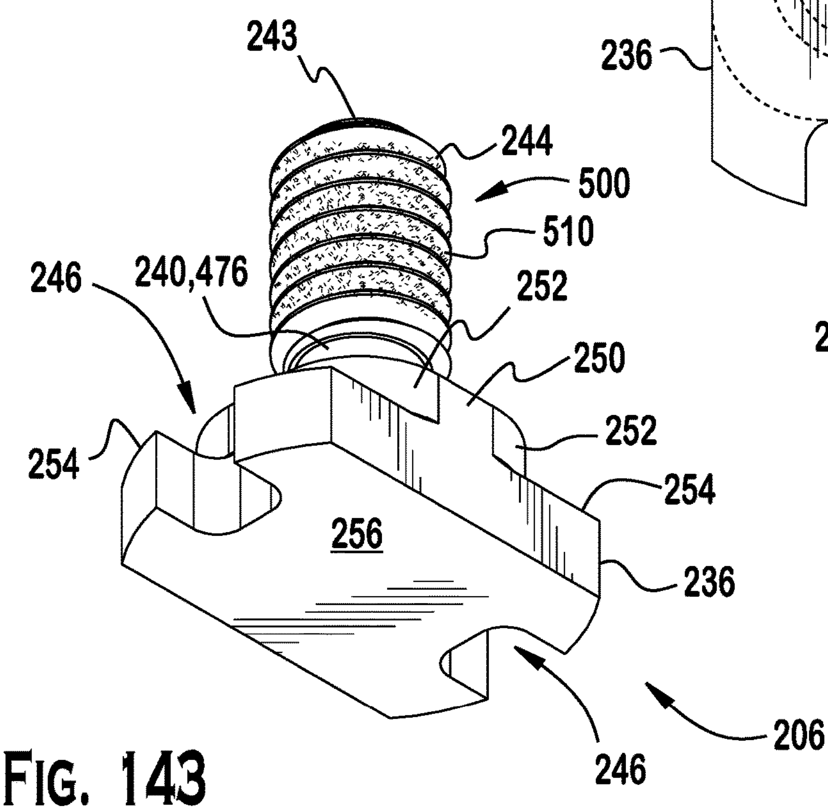
Figure 144:
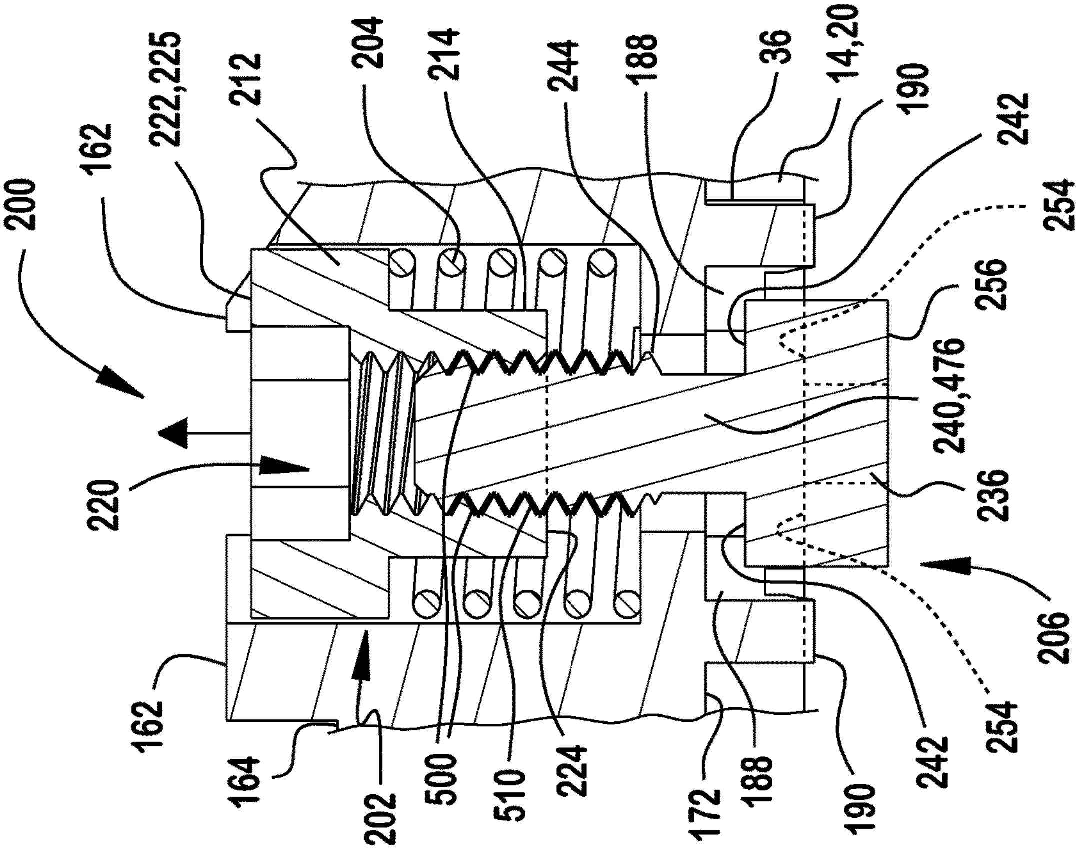

FIG. 138 is a top perspective view of another exemplary locking bolt of FIG. 89;

FIG. 139 is a top view of the locking bolt of FIG. 138;

FIG. 140 is a side view of the locking nut of FIG. 138;

FIG. 141 is a front view of the locking nut of FIG. 138;

FIG. 142 is a bottom view of the locking nut of FIG. 138;

FIG. 143 is a bottom perspective view of the locking nut of FIG. 138;

FIG. 144 is cross-sectional view of another embodiment of the accessory interface system of FIG. 63 in a latched configuration.

Figure 145:
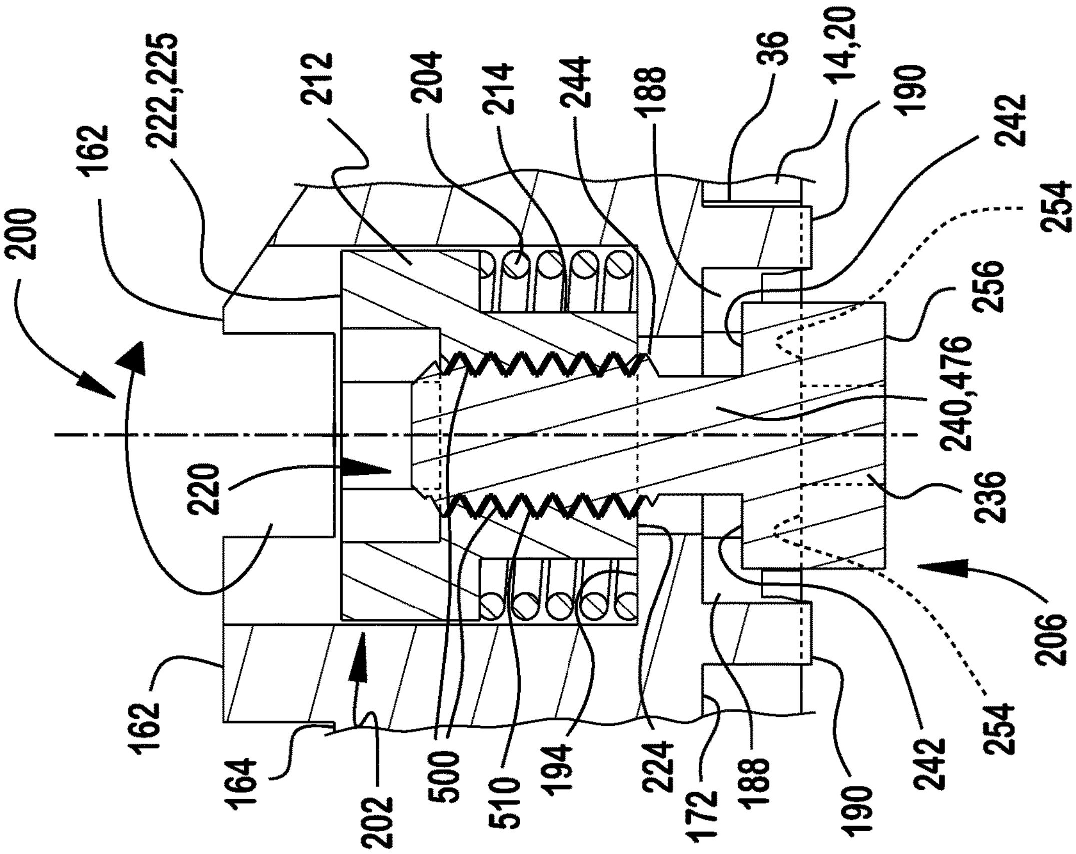

FIG. 145 is another view of the accessory interface system of FIG. 144 in a locked configuration.

Figure 146:
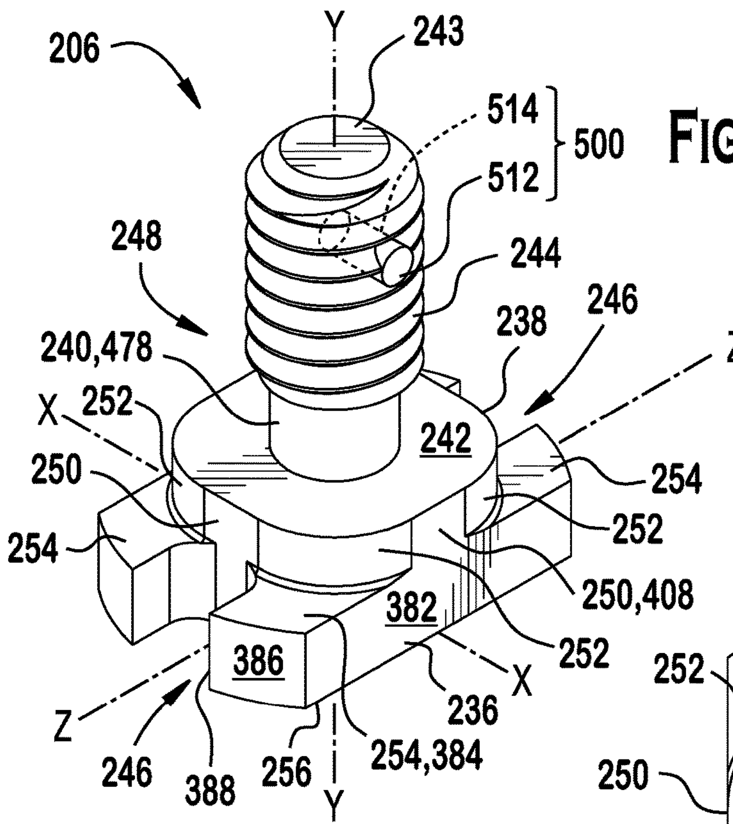
Figure 147:
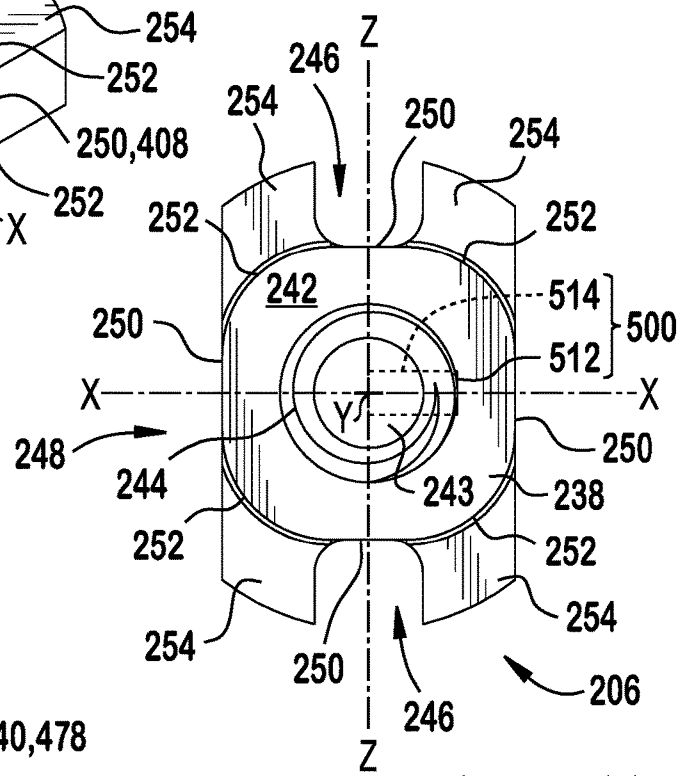
Figure 148:
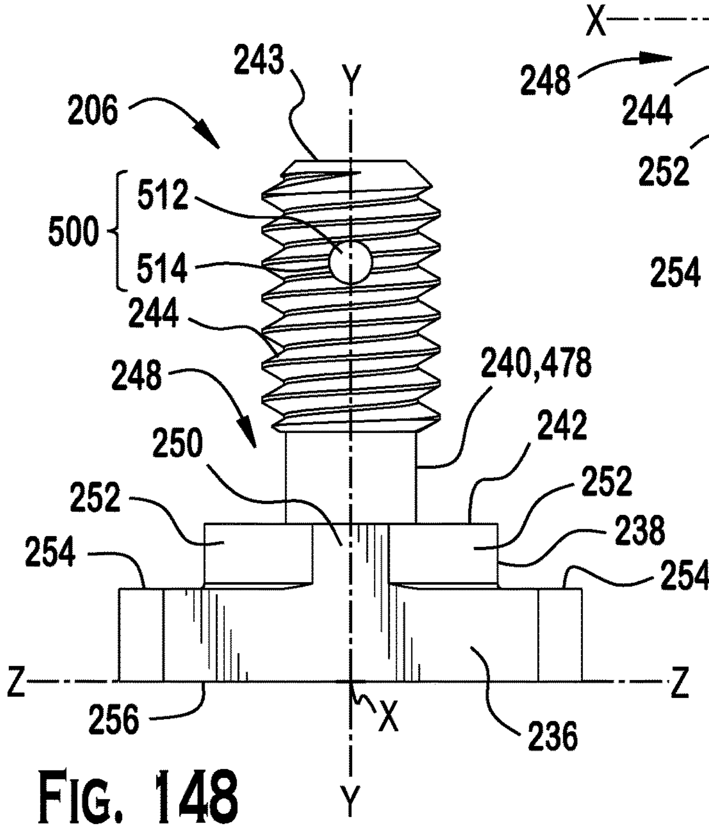
Figure 149:
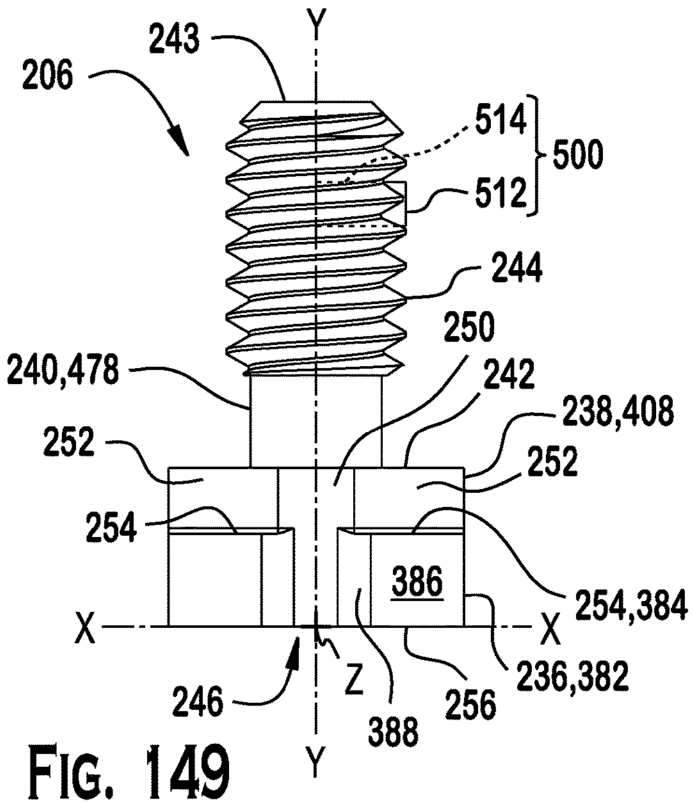
Figure 150:
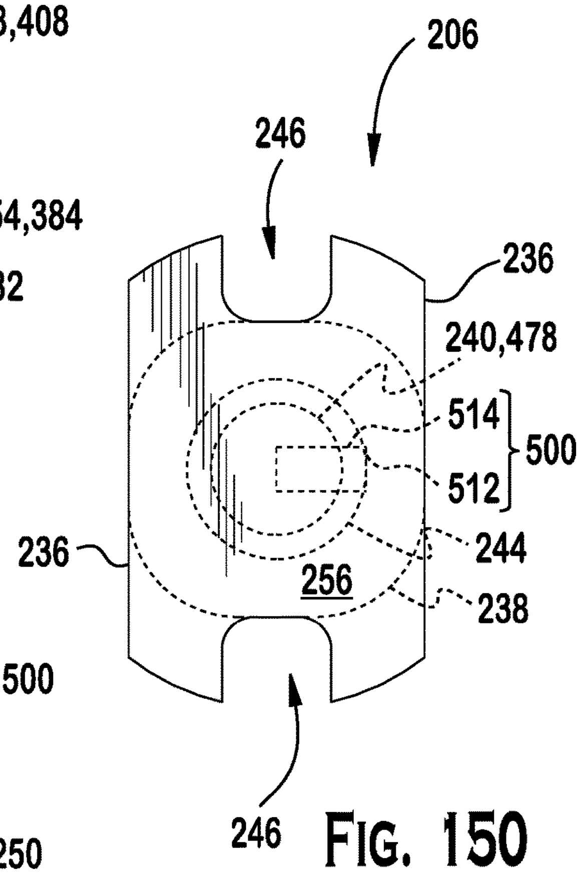
Figure 151:
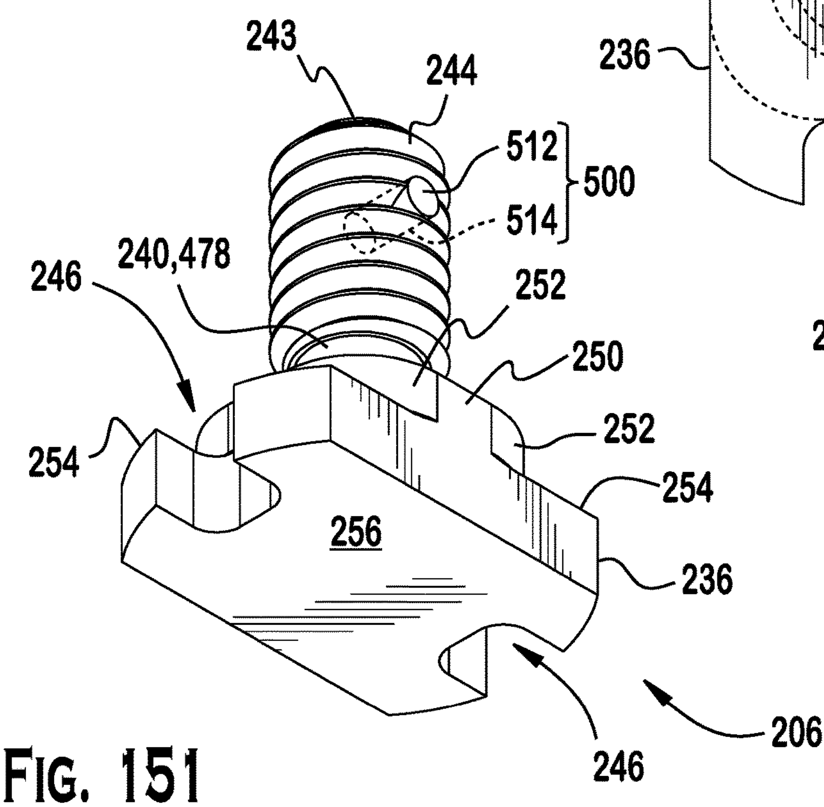
Figure 152:
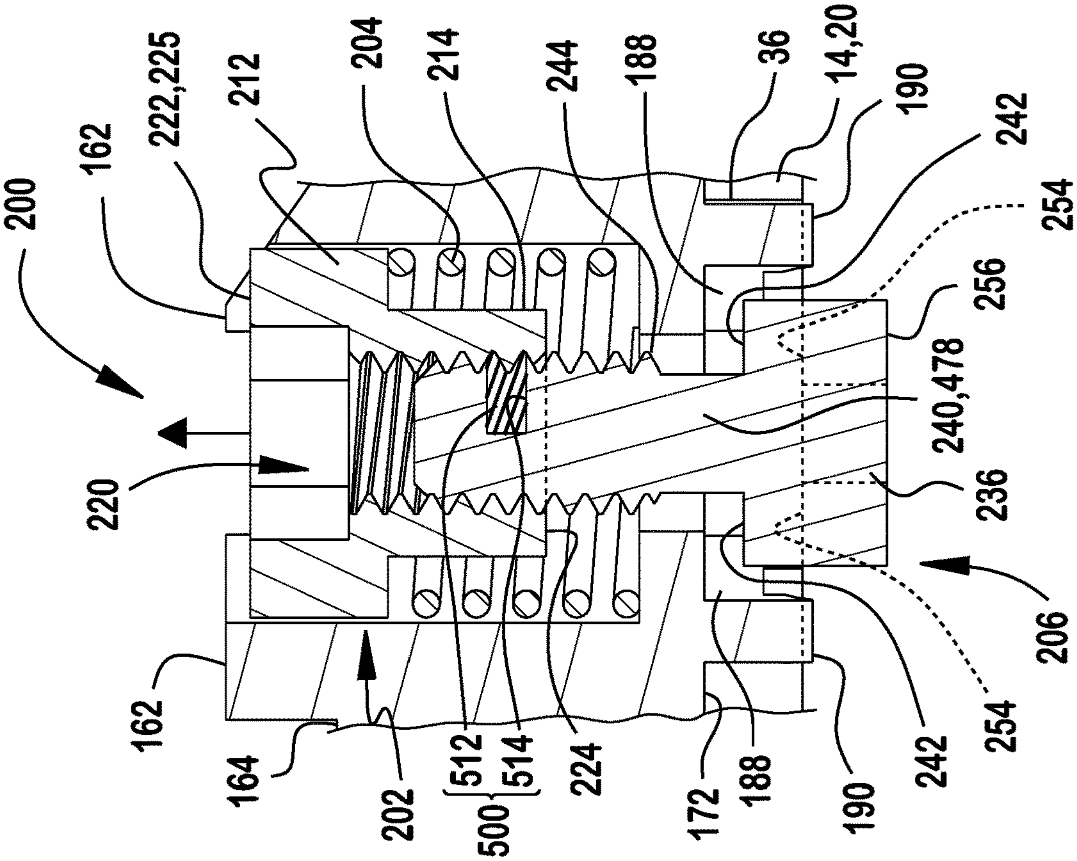

FIG. 146 is a top perspective view of another exemplary locking bolt of FIG. 89;

FIG. 147 is a top view of the locking bolt of FIG. 146;

FIG. 148 is a side view of the locking nut of FIG. 146;

FIG. 149 is a front view of the locking nut of FIG. 146;

FIG. 150 is a bottom view of the locking nut of FIG. 146;

FIG. 151 is a bottom perspective view of the locking nut of FIG. 146;

FIG. 152 is cross-sectional view of another embodiment of the accessory interface system of FIG. 63 in a latched configuration.

Figure 153:
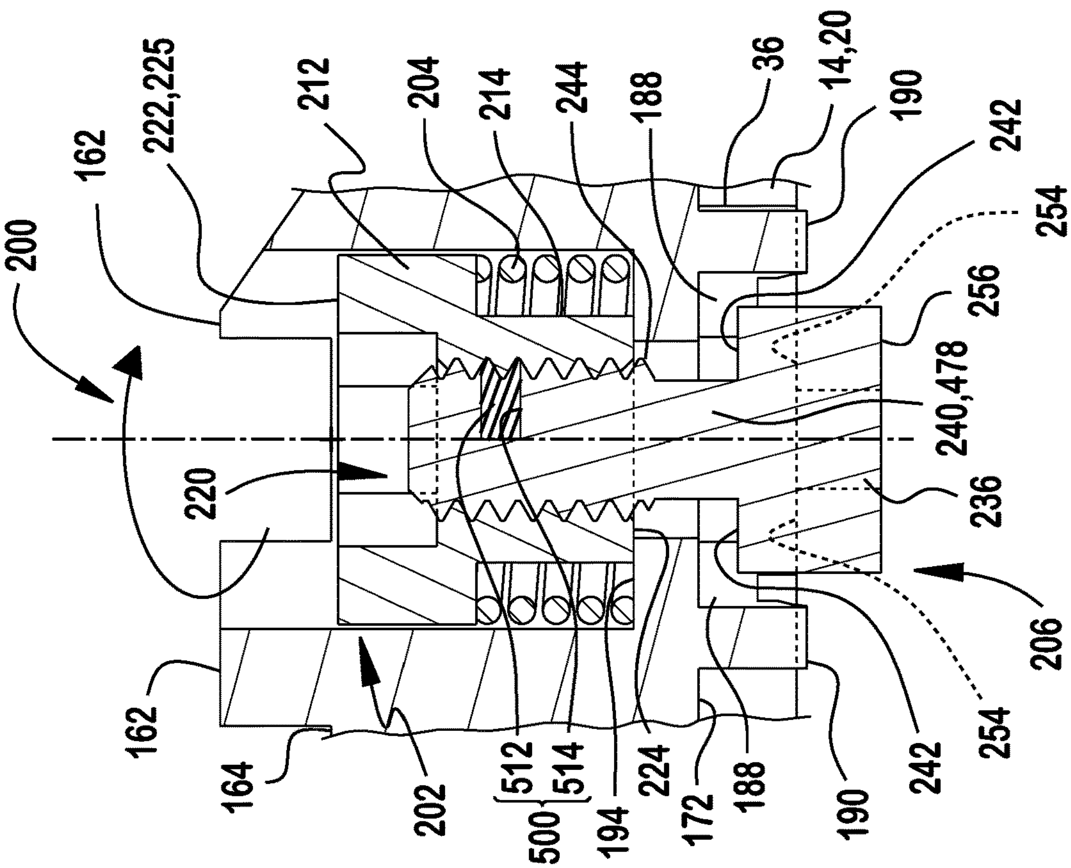

FIG. 153 is another view of the accessory interface system of FIG. 15244 in a locked configuration.

Figure 154:
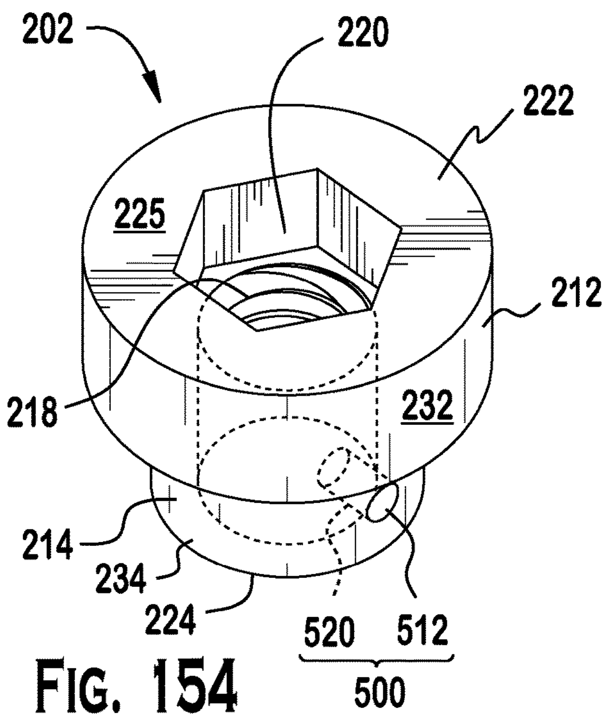
Figure 155:
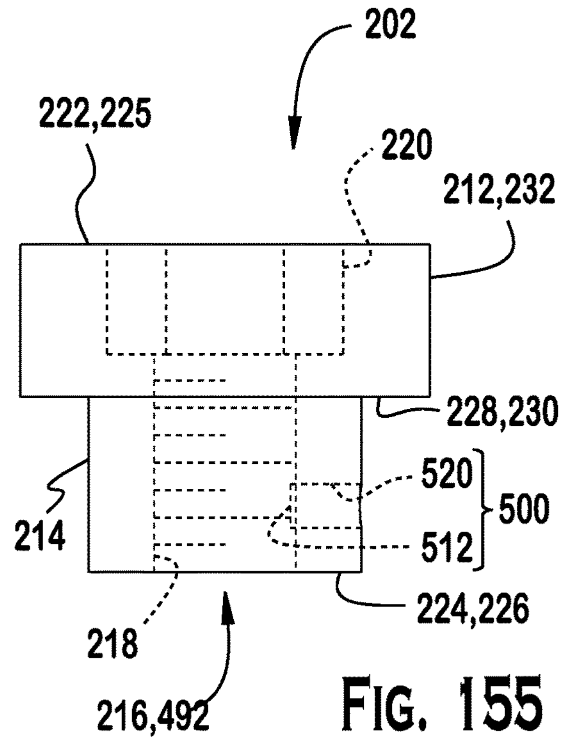
Figure 156:
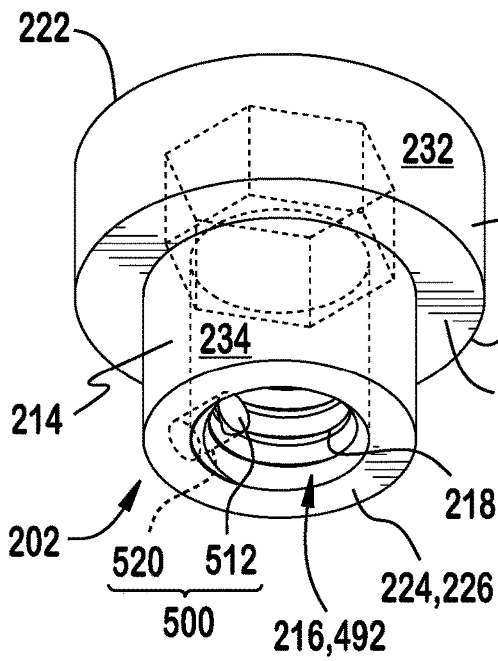
Figure 157:
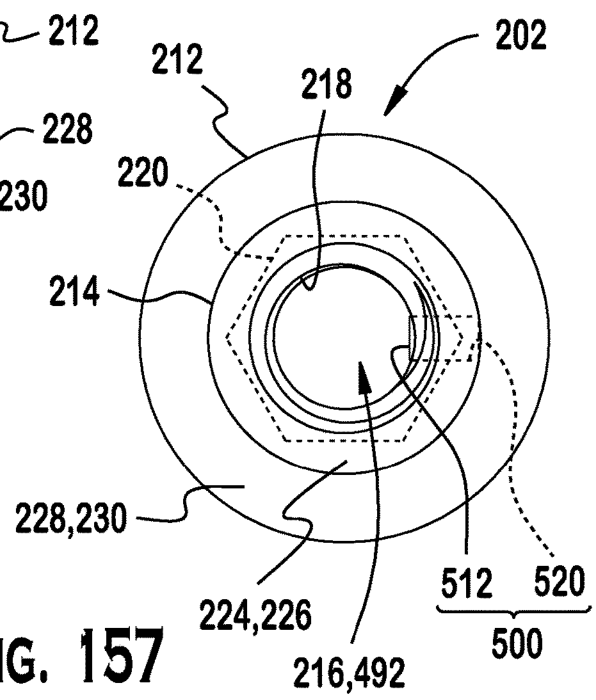
Figure 158:
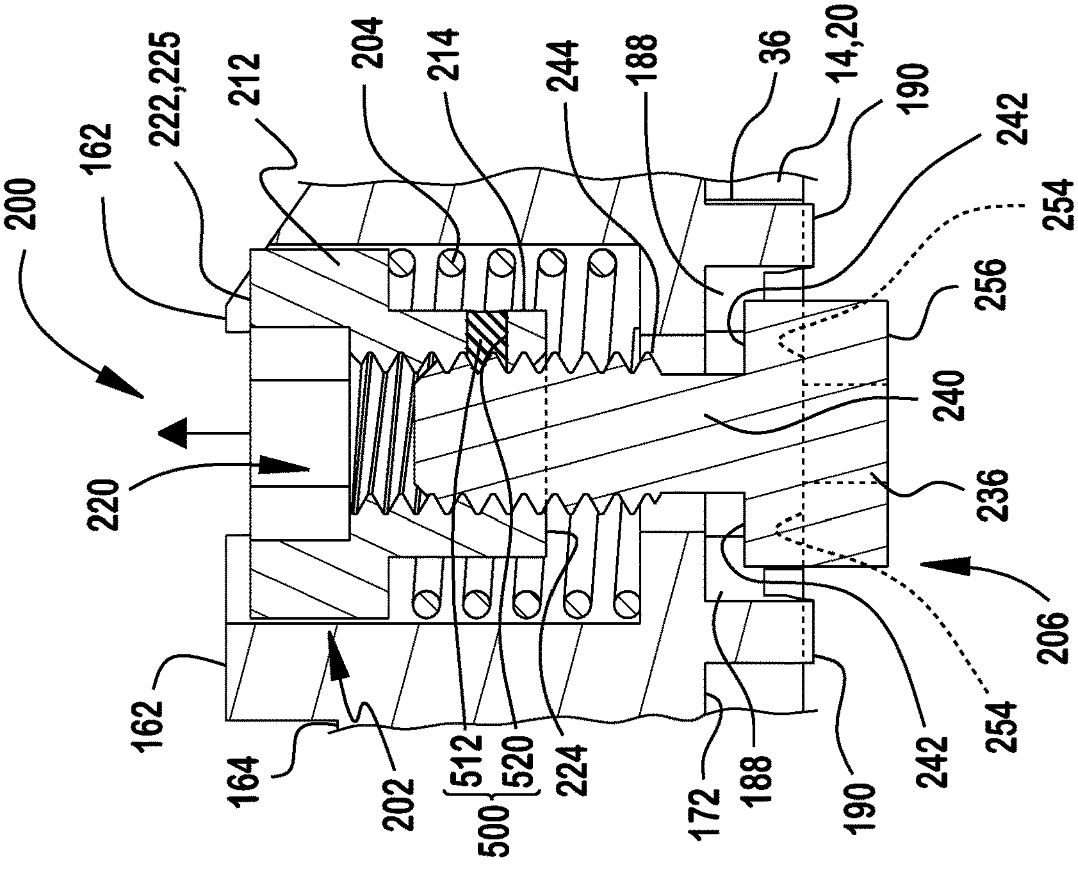

FIG. 154 is a top perspective view of another exemplary fastener of the fastener apparatus of FIG. 43;

FIG. 155 is a side view of the fastener of FIG. 154;

FIG. 156 is a bottom perspective view of the fastener of FIG. 154;

FIG. 157 is a top view of the fastener of FIG. 154;

FIG. 158 is cross-sectional view of another embodiment of the accessory interface system of FIG. 63 in a latched configuration.

Figure 159:
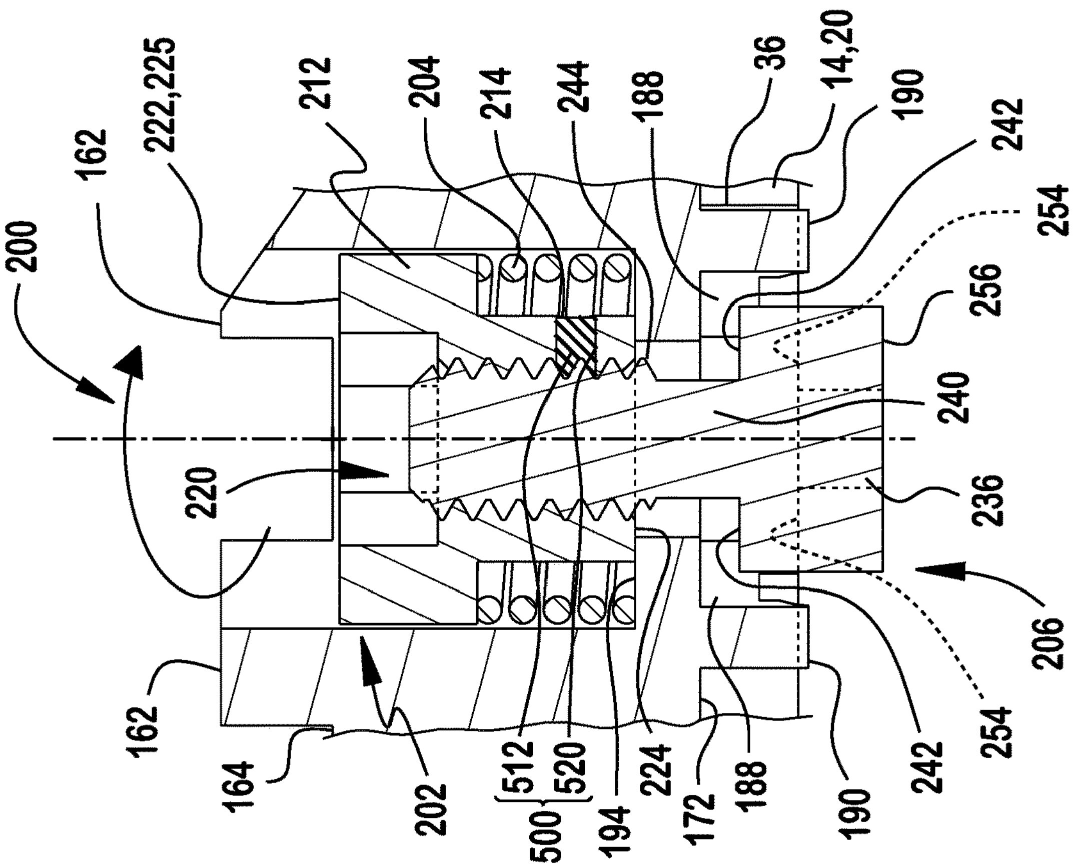

FIG. 159 is another view of the accessory interface system of FIG. 158 in a locked configuration.

Figure 60:
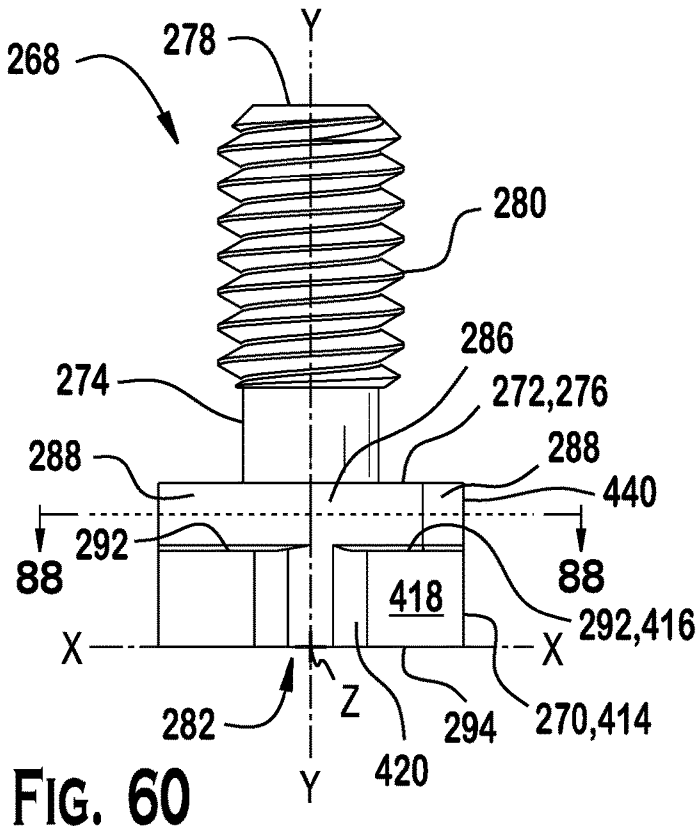
FIG. 60 is a front view of the T-bolt of FIG. 57.
Figure 61:
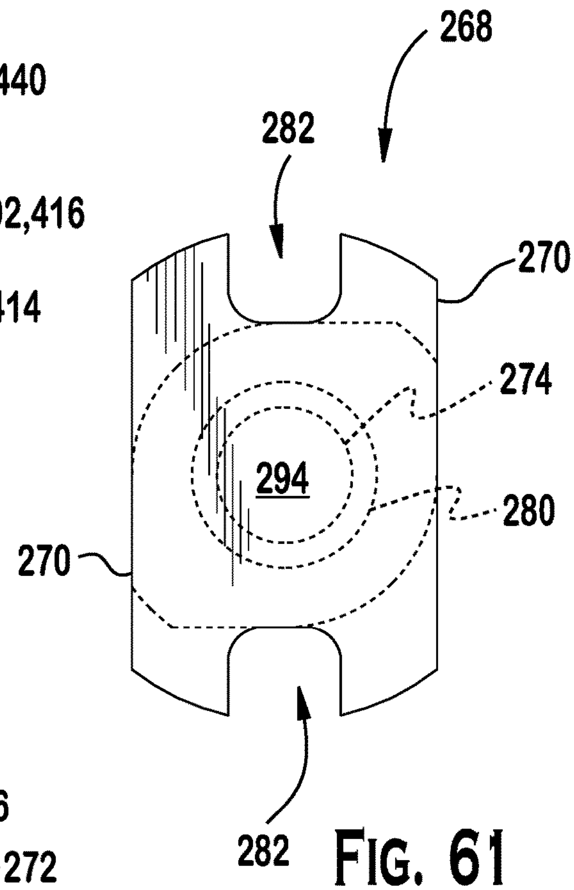
FIG. 61 is a bottom view of the T-bolt of FIG. 57.
Figure 62:
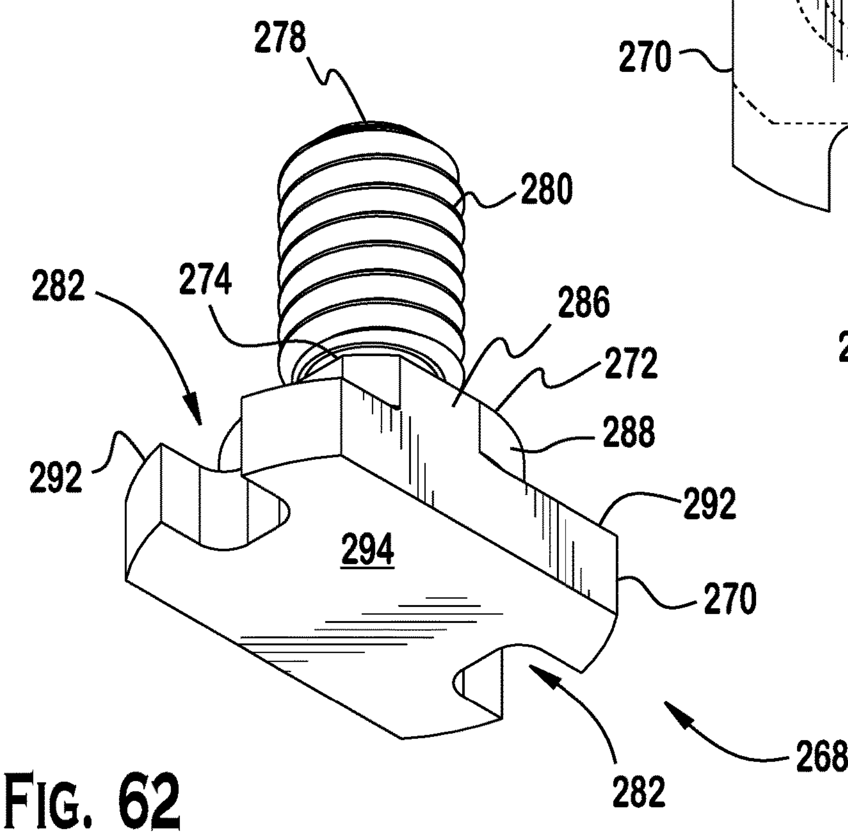
FIG. 62 is a bottom perspective view of the T-bolt of FIG. 57.
Figure 160:
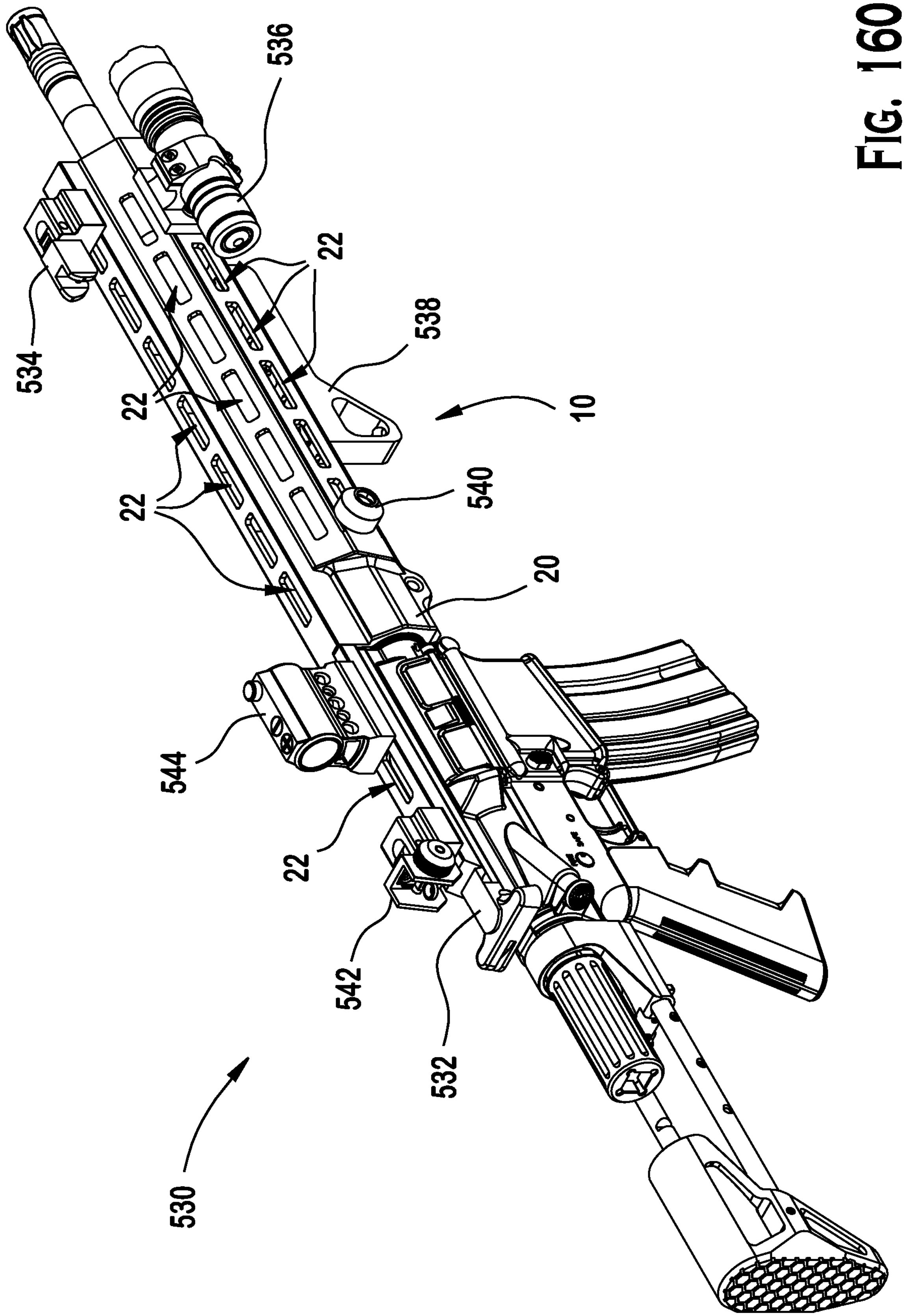
Figure 161:
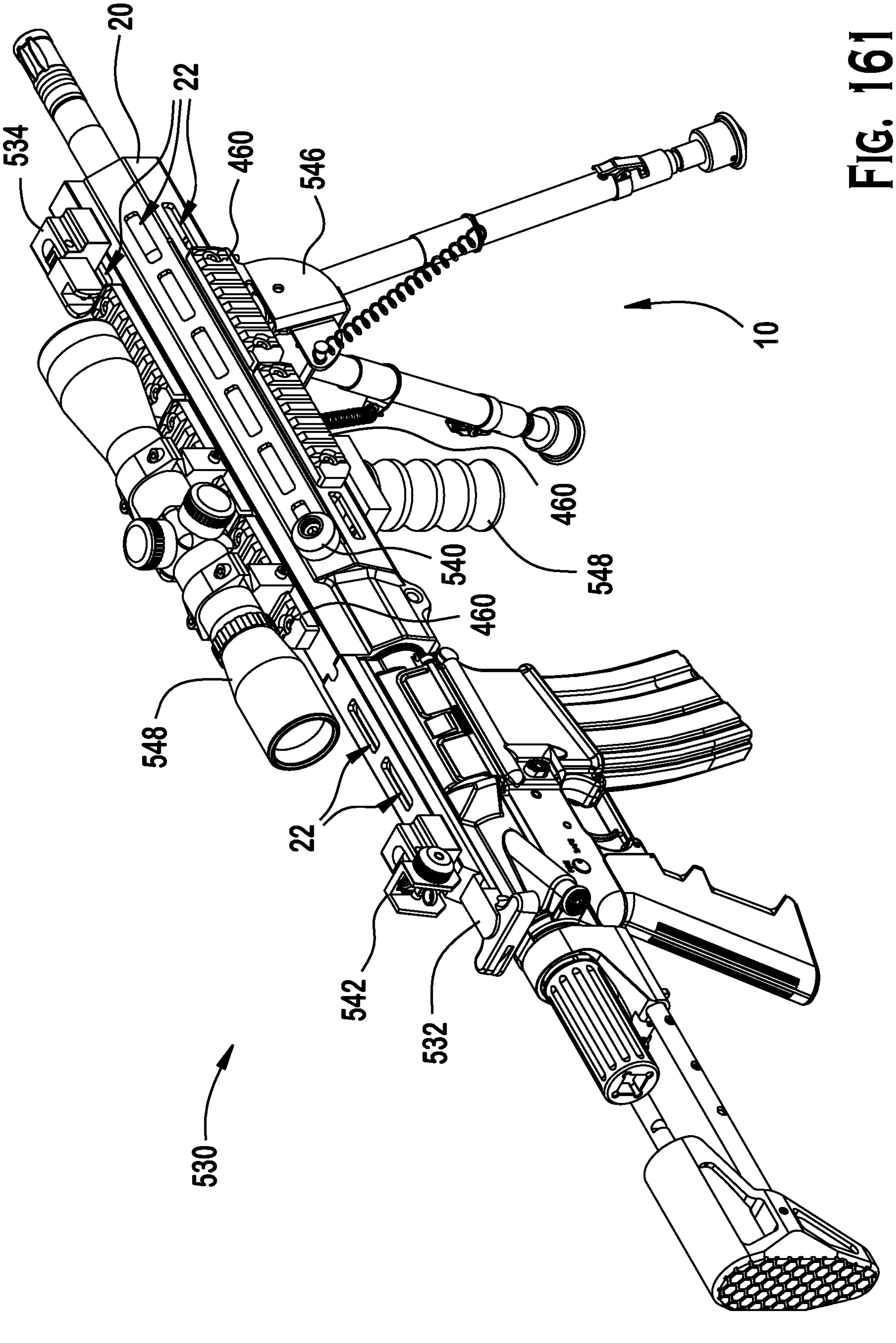
Figure 162:
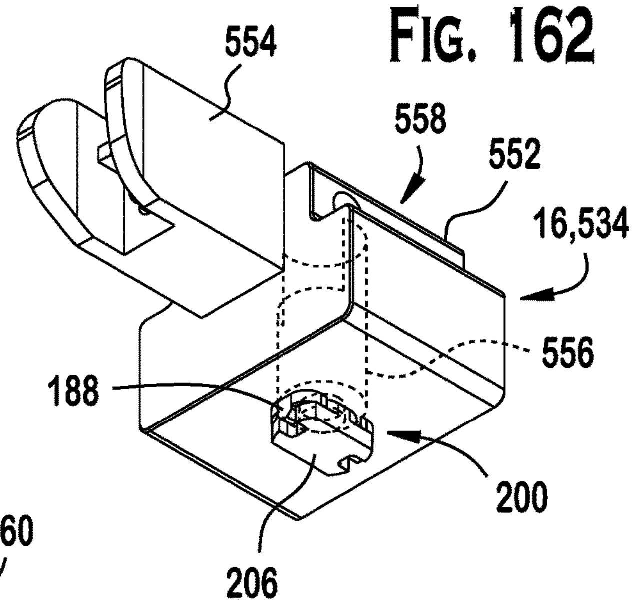
Figure 163:
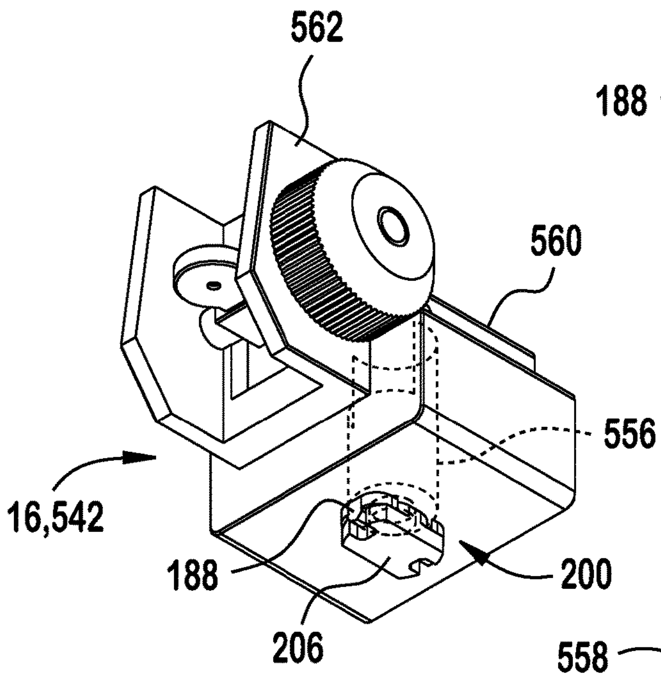
Figure 164:
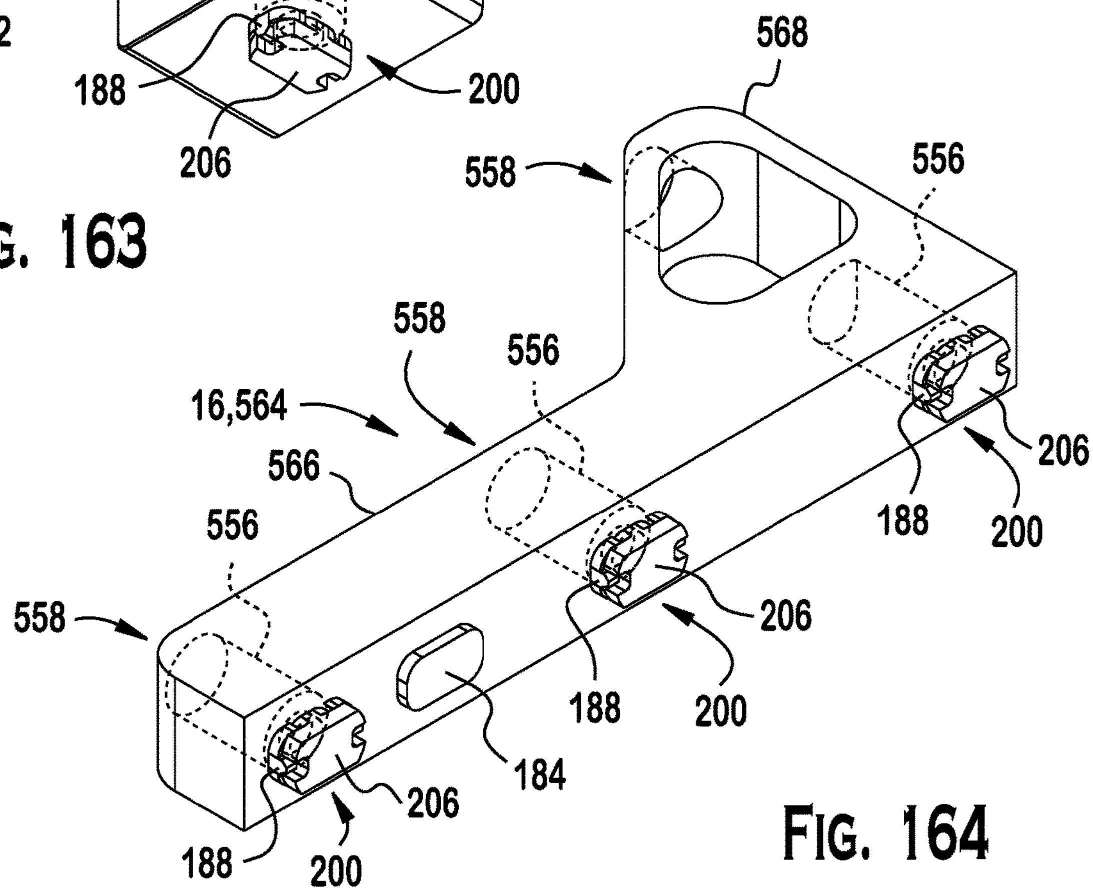
Figure 169:
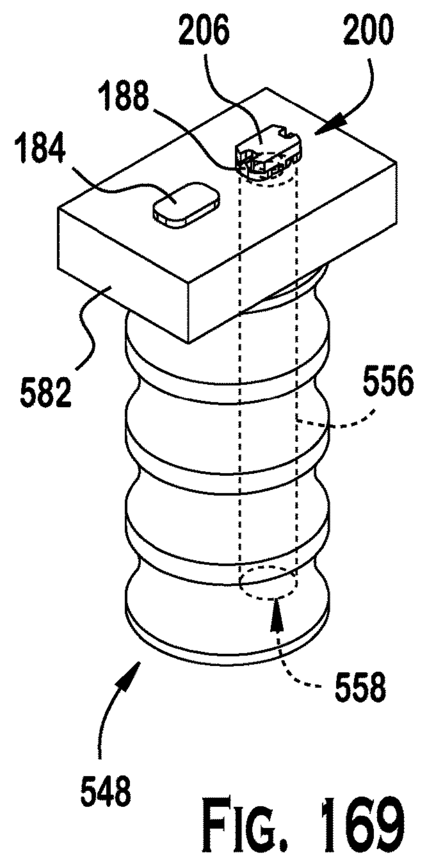
Figure 170:
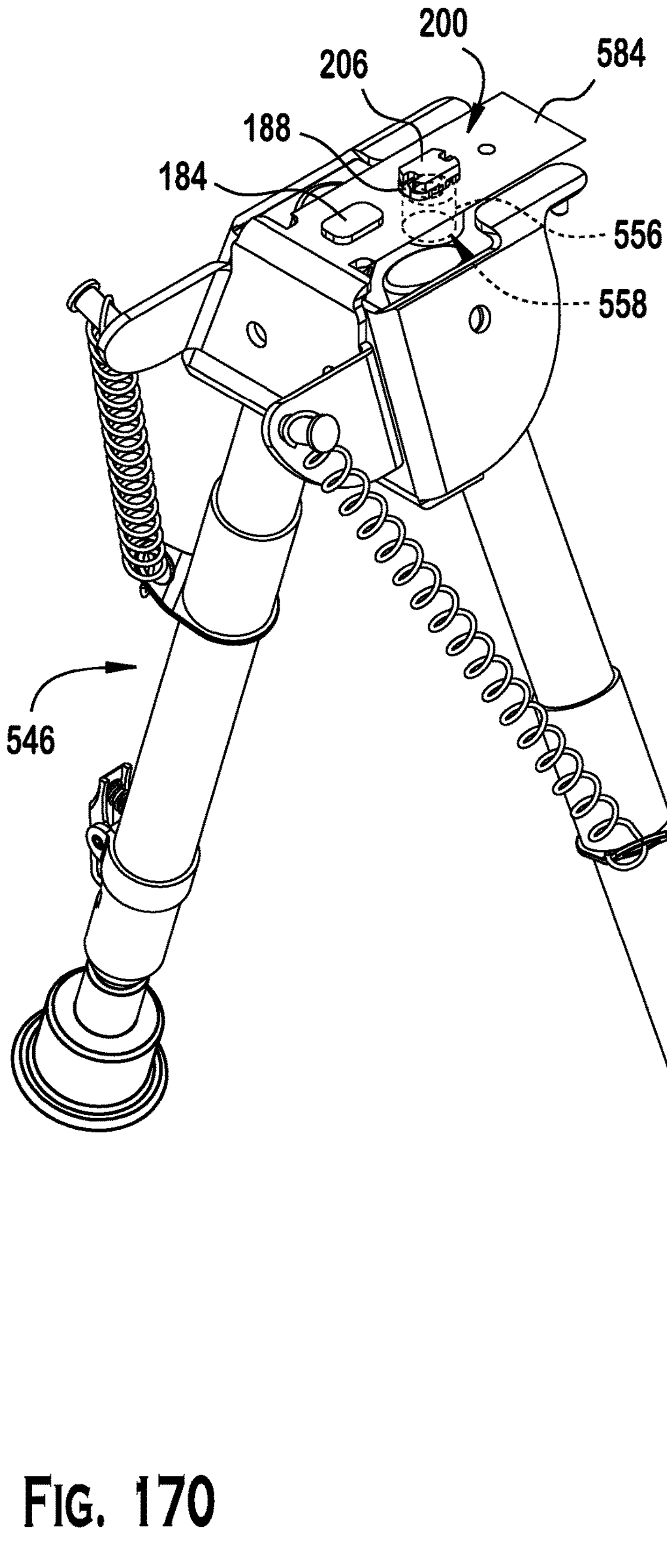
Figure 171:
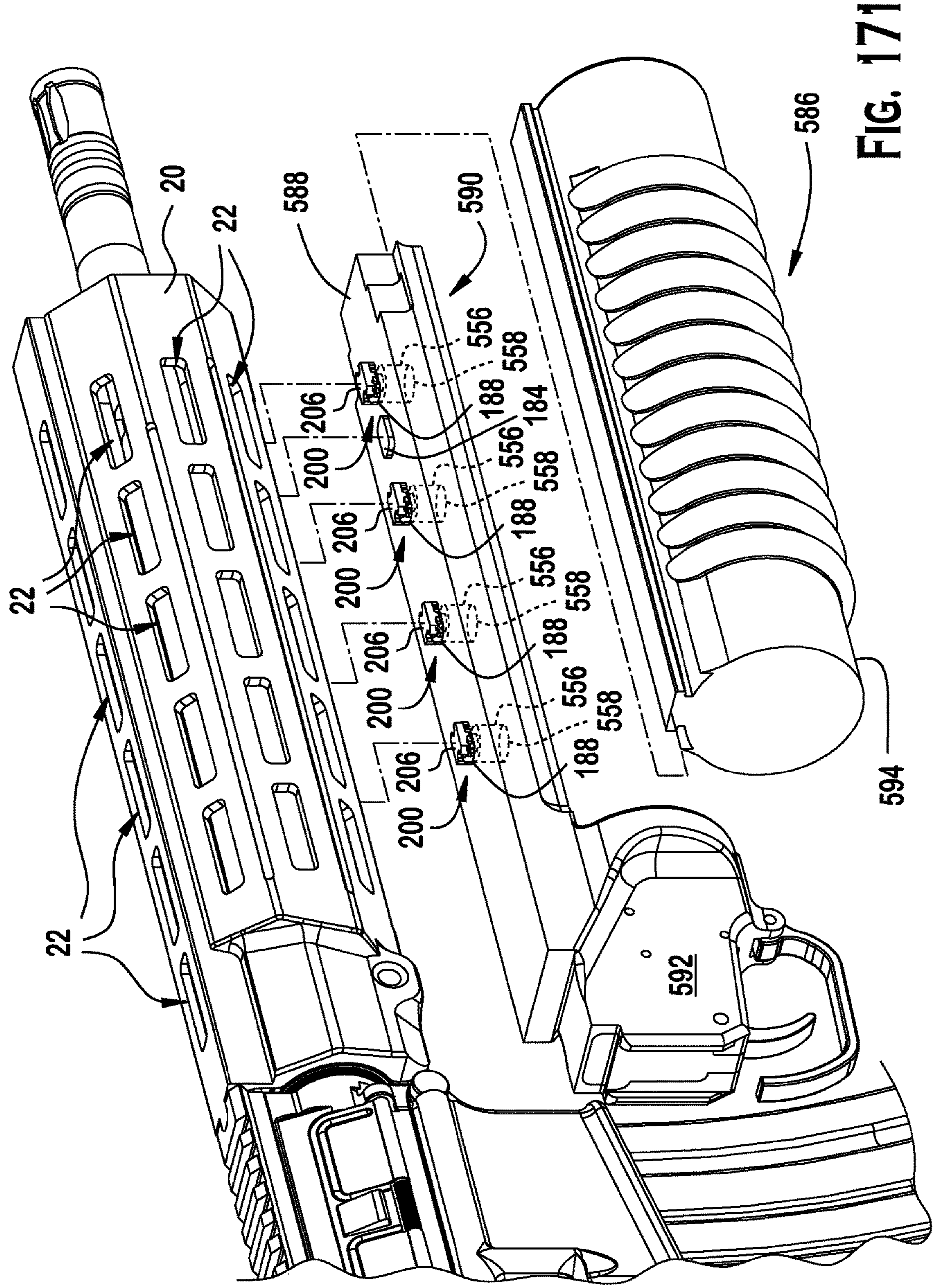

FIG. 160 is a perspective view of a firearm equipped with another exemplary embodiment of the universal interface system of the present invention;

FIG. 161 is a perspective view of the exemplary front sight of FIG. 160;

FIG. 162 is a perspective view of the exemplary rear sight of FIG. 160;

FIG. 163 is a perspective view of the exemplary angled foregrip of FIG. 160;

FIG. 164 is a perspective view of the exemplary tactical flashlight of FIG. 160;

FIG. 165 is a perspective view of the exemplary optical sight of FIG. 160;

FIG. 166 is a front perspective view of the exemplary quick disconnect mount of FIG. 160;

FIG. 167 is a rear perspective view of the exemplary quick disconnect mount of FIG. 166;

FIG. 168 is a perspective view of the exemplary vertical foregrip of FIG. 160;

FIG. 169 is a perspective view of the exemplary bipod of FIG. 160;

FIG. 170 is a perspective view of an exemplary grenade launcher for use with the exemplary embodiment of the universal interface system of FIG. 60;

FIG. 171 is a perspective view of an exemplary optical sight mounted on an exemplary 6-slot accessory rail that secured to the exemplary universal interface system of FIG. 60;

DESCRIPTION

Accessories may be secured to small arms weapons using various mounting methods. Generally, the various mounting methods may include a rail interface system having an integral accessory mounting rail (e.g., Rail Interface Systems developed by Knight's Armament Company of Titusville, Fla. or by Daniel Defense, Inc. of Black Creek, Ga.) or a universal interface system (e.g., the KeyMod system developed by VLTOR Weapon Systems of Tucson, Ariz. or the M-LOK system developed by Magpul Industries, Corp. of Austin, Tex.).

Figure 1:
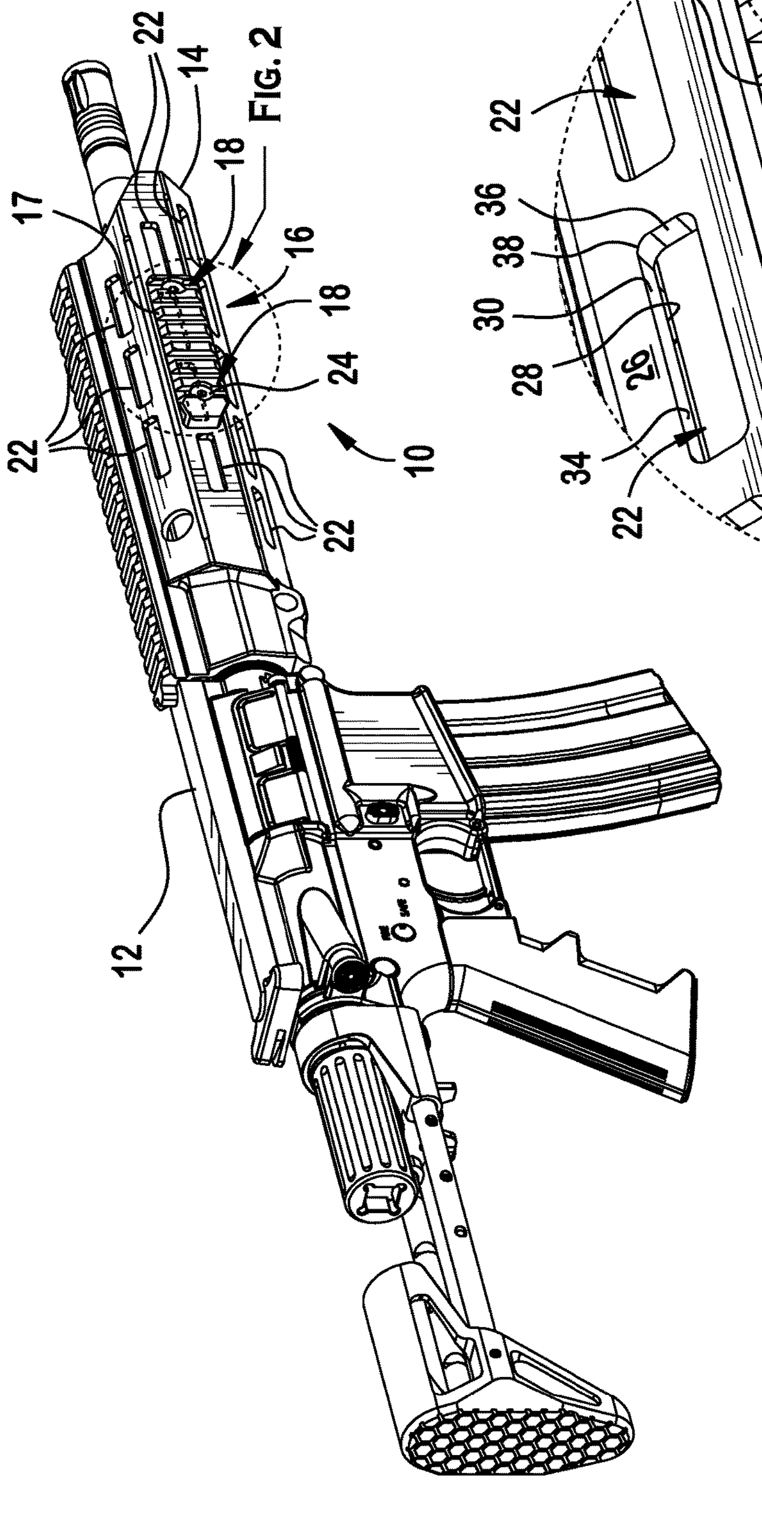
FIG. 1 is a perspective view of a firearm equipped with an exemplary embodiment of a universal interface system of the present invention.

FIG. 1 presents an illustrative embodiment of a universal interface system 10 in accordance with the present invention. The universal interface system 10 may be used to secure accessories to a firearm 12, as well as to other small arms weapons or equipment. The universal interface system 10 may include a slotted object 14, an accessory 16, and a fastener apparatus 18. For instance, the object may be a rifle handguard 20 which includes one or more slots 22. The accessory 16 may be an accessory mounting rail (or accessory rail) 17. The fastener apparatus 18 may be a spring-loaded fastener which is housed in the accessory 16, and that cooperates with one or more slots 22 to securely connect the accessory rail 17 to the handguard 20.

Figure 2:
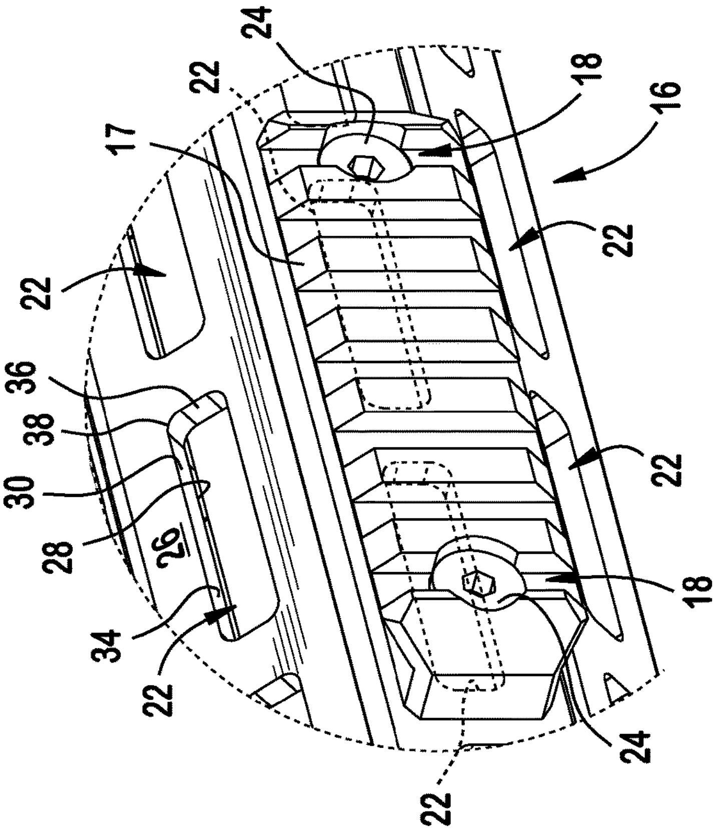
FIG. 2 is a detail view of the exemplary universal interface system of FIG. 1.

Referring to FIG. 1 and FIG. 2, the one or more slots 22 on the handguard 20 may be substantially the same. Each slot may pass through the handguard 20 and may extend from an exterior surface 26 to an interior surface 28 of the handguard. Each slot 22 may have a shape that is defined by a sidewall 30 which extends from the exterior surface 26 to the interior surface 28 of the handguard. The sidewall 30 may include multiple segments. Referring to FIGS. 63-66, each slot 22 may be generally rectangular, have a longitudinal axis 32, and may include two parallel segments 34 aligned with the longitudinal axis, as well as two parallel segments perpendicular 36 to the longitudinal axis. The corners 38 of each slot may be rounded.

Referring to FIG. 1, the accessory rail 17 may be a Picatinny rail (MIL-STD-1913), Weaver rail, NATO Accessory rail (Stanag 4694) or other type of accessory mounting rail. The accessory rail 17 may be configured and dimensioned to connect with two adjacent slots 22 on the handguard 20. The accessory rail 17 further may be configured and dimensioned to cover the two adjacent slots 22. Thus, the accessory rail 17 of FIG. 1 may be identified as a 2-slot accessory rail.

Figures 3, 4:
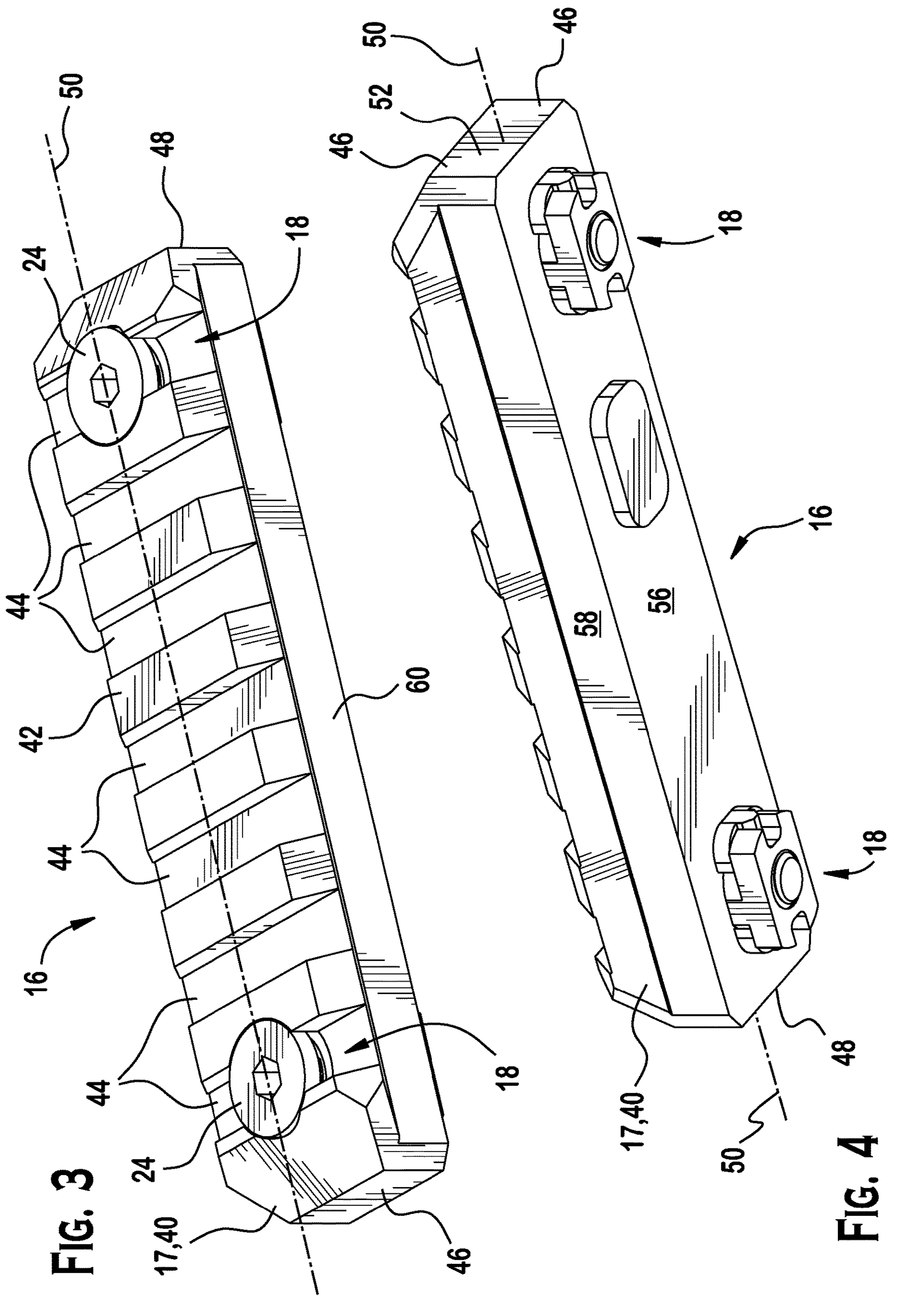
FIG. 3 is a top perspective view of an exemplary accessory rail and an exemplary fastener apparatus in accordance with the present invention.
FIG. 4 is a bottom perspective view of the accessory rail and fastener apparatus of FIG. 3.
Figure 5:
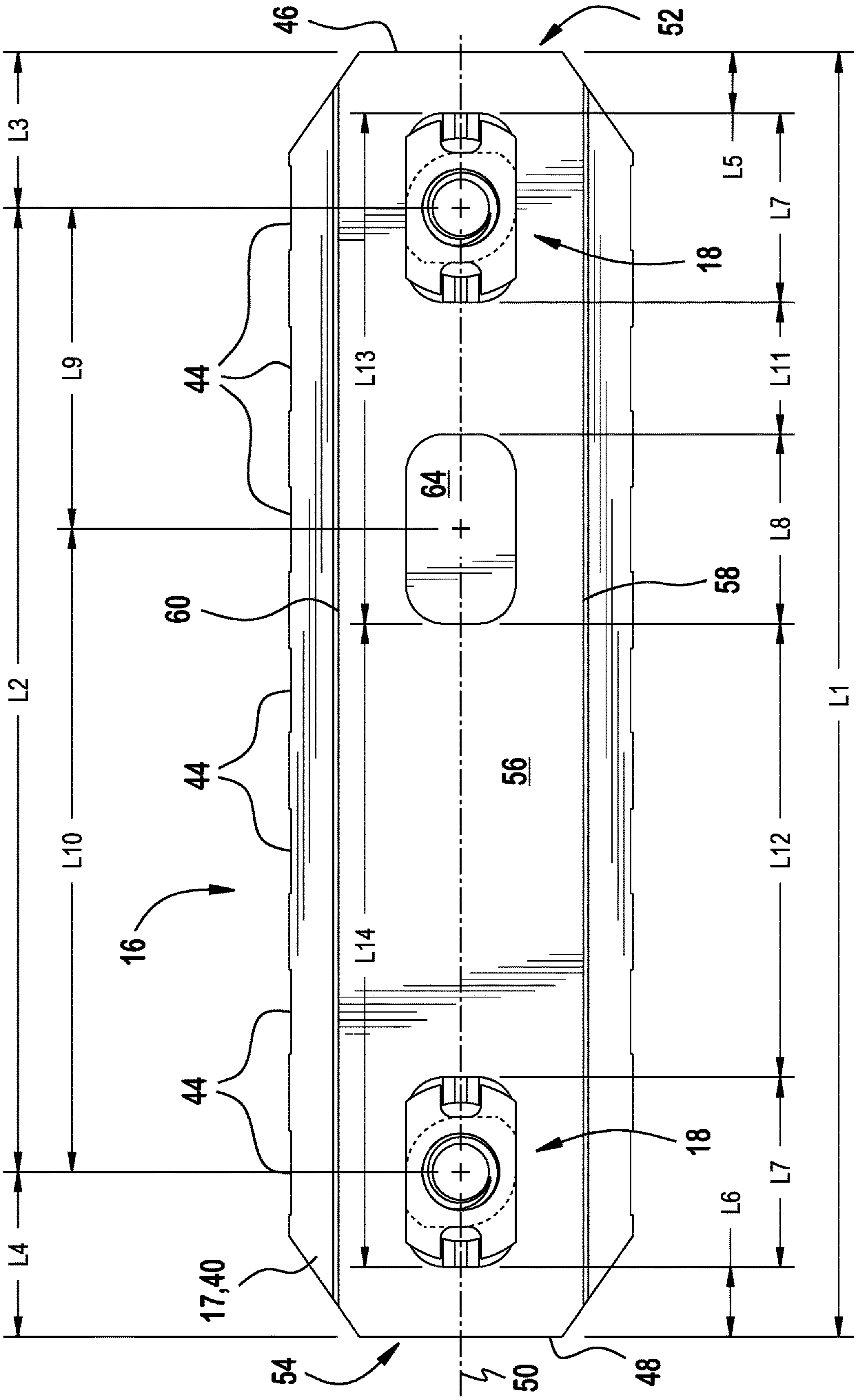
FIG. 5 is a bottom view of the accessory rail and fastener apparatus of FIG. 3.

FIGS. 3-5 and FIGS. 8-13 depict a first exemplary embodiment of an accessory rail 17, 40 in accordance with the present invention. Referring to FIG. 3, the accessory rail 17, 40 may include a top surface 42. The top surface 42 may include plurality of parallel grooves 44. Each of the parallel groves 44 may have a rectangular cross section (see e.g., FIG. 12). Although the accessory rail 40 may comply with MIL-STD-191, the rail 17, 40 may conform to other mounting rail standards or form any shape or configuration which may serve a particular use or application, provided that the accessory rail 17, 40 may be secured to a slotted object in accordance with the present invention. Referring to FIGS. 3-5, the accessory rail 17, 40 may include a distal end 46 and a proximal end 48. The accessory rail 17, 40 further may possess a longitudinal axis 50 extending from the distal end 46 to the proximal end 48. The distal end 46 and the proximal end 48 may be flat surfaces. Referring to FIG. 5, the distal end surface 52 and the proximal end surface 54 may be parallel surfaces.

Figure 9:
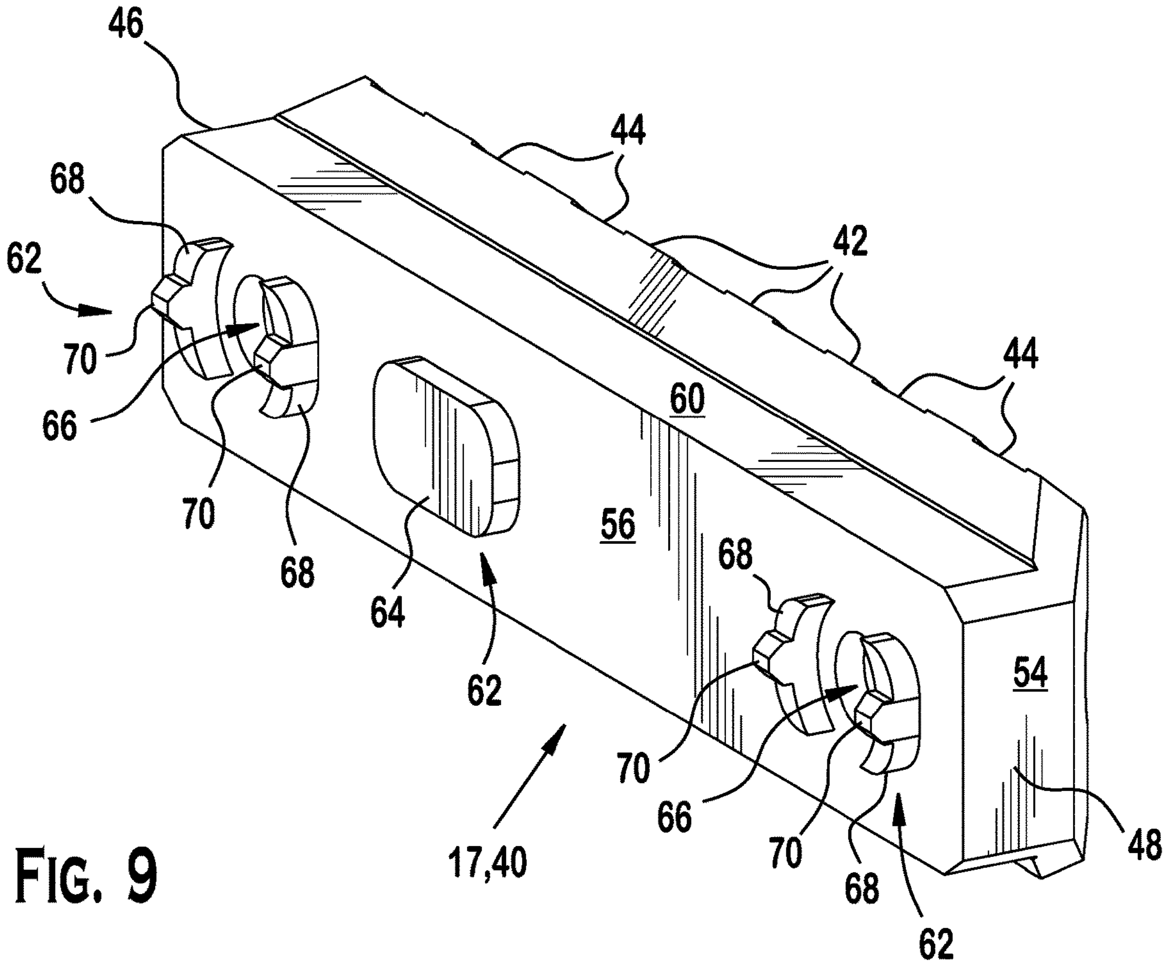
FIG. 9 is a bottom perspective view of the accessory rail of FIG. 3.
Figure 10:
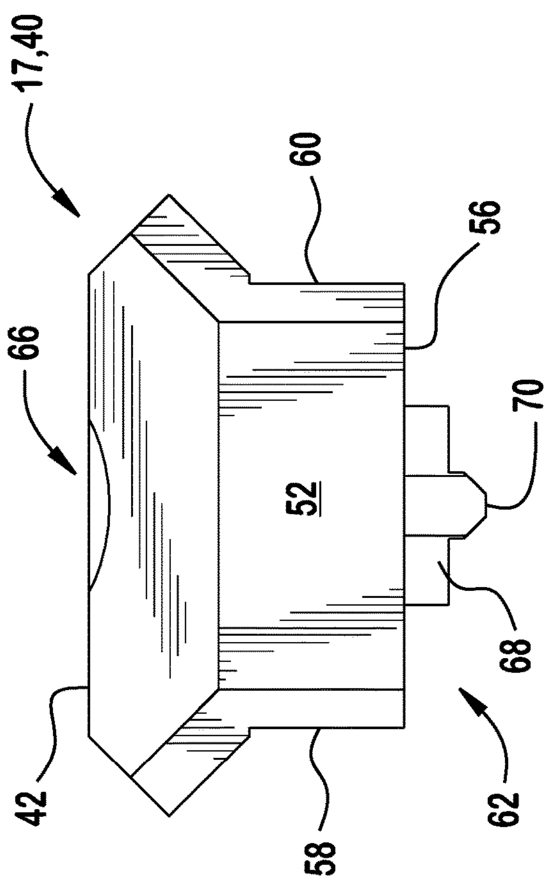
FIG. 10 is a front view of the accessory rail of FIG. 3.
Figure 11:
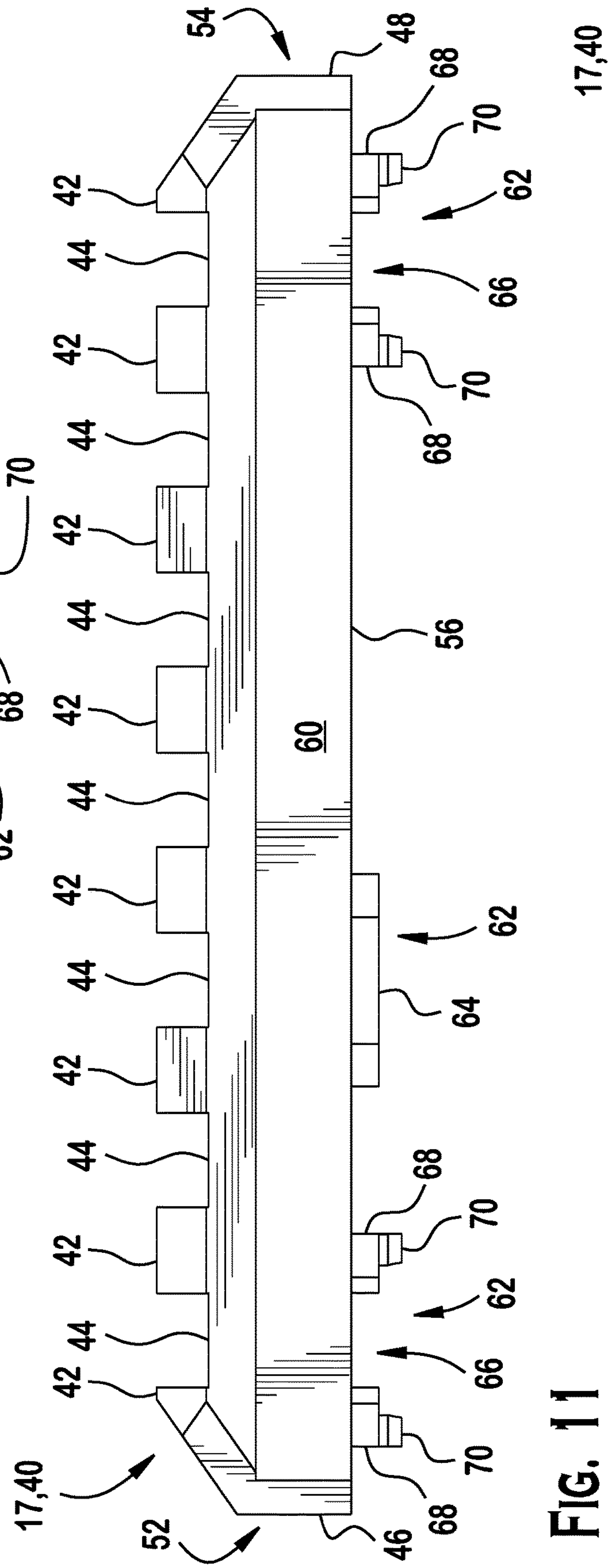
FIG. 11 is a side view of the accessory rail of FIG. 3.

As shown in FIGS. 4 and 5 and FIGS. 9-11, the accessory rail 17, 40 may include a bottom surface 56. Referring to FIG. 10, the accessory rail 17, 40 further may include a right side surface 58 and a left side surface 60. The right side surface 58 and the left side surface 60 may each extend between the top surface 42 and the bottom surface 56. As shown in FIGS. 4-5 and 9-10, although the bottom surface 56 generally may be flat and smooth, the bottom surface 56 may include one or more raised features 62. For example, the bottom surface 56 may include a projection 64 located between the two fastener receiving holes 66. The projection 64 may be aligned with the fastener receiving holes 66. Additionally, each of the faster receiving holes 66 may include one or more guides 68. Referring to FIG. 9, each guide 68 may be a curved wall. Further, the curved wall may be crescent shaped. As shown in FIGS. 5, 10 and 11, the guides 68 may include a tip or crest 70. The tips 70 may be aligned with the longitudinal axis 50 of the accessory rail 17, 40.

In FIG. 5, the accessory rail 17 may have a length L1 measured from the distal end 46 to the proximal end 48. The fastener receiving holes 66 holes (see e.g., FIG. 8 and FIG. 9) may be spaced, on center, a distance L2. The center of each fastener hole 66 may be spaced a distance L3 and L4 respectively from the nearest end of the accessory rail. The distance L3 and the distance L4 may be the same. Two guides 68 may be positioned near each fastener receiving hole 66. As described further below, two guides may define a seat 86 for the T-nut 82 or more generally for an interior fastener. Each seat 86 may be spaced a distance L5 and L6 respectively from the nearest end of the accessory rail. The distance L5 and the distance L6 may be the same. Each seat may have a length L7.

Figure 12:
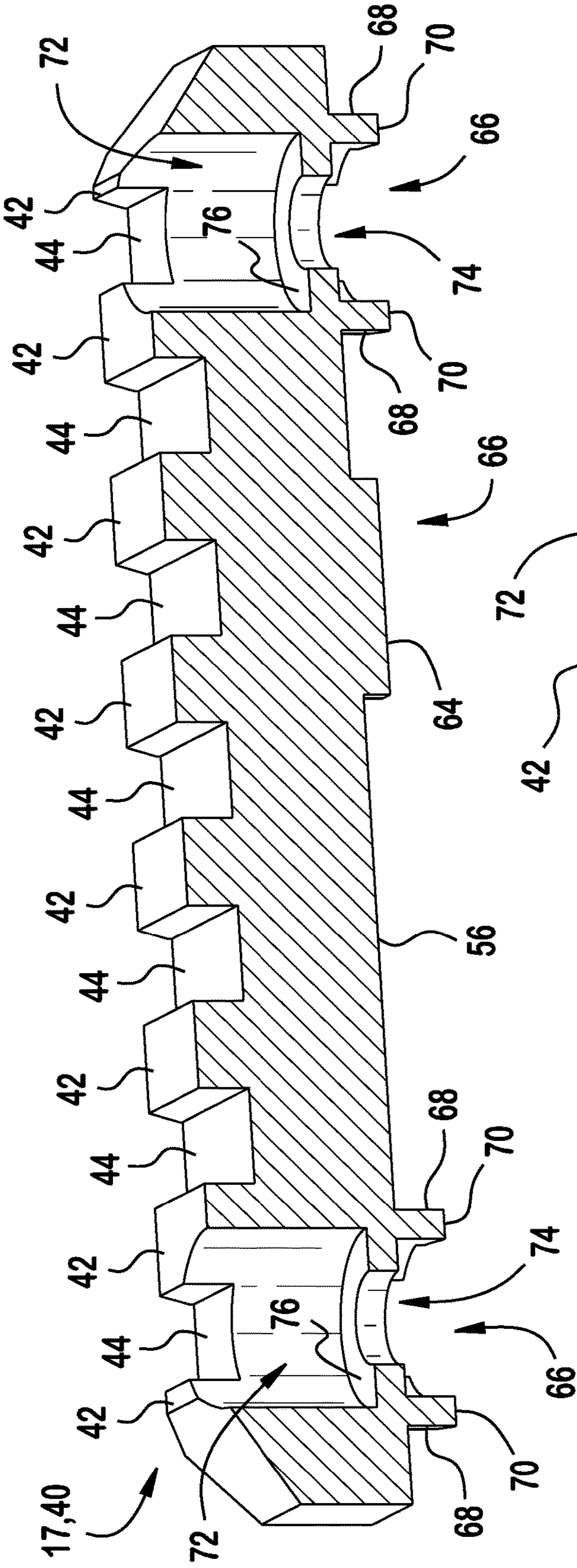
FIG. 12 is a cross-sectional view of the accessory rail of FIG. 11 along line 12-12.
Figure 13:
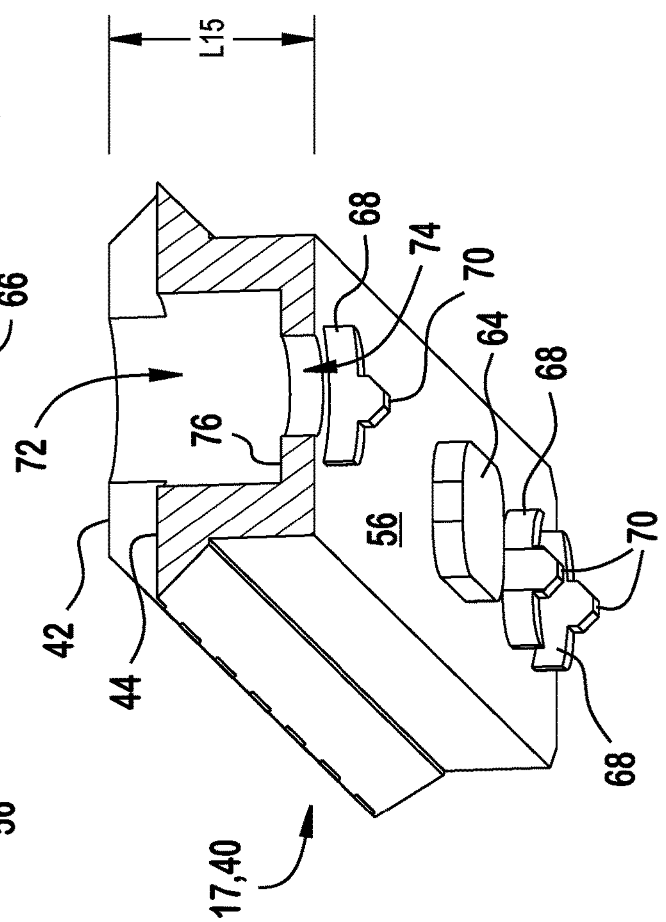
FIG. 13 is a cross-sectional view of the accessory rail of FIG. 10 along line 13-13.

Moreover, the accessory rail may include a projection 64 (see e.g., FIG. 12 and FIG. 13). The projection may have a length L8. The length L8 of the projection may be the same as the length L7 of each seat 86. The projection may be spaced, on center, from the nearest fastener receiving hole by a distance L9. The projection may also be spaced, on center, from the furthest fastener receiving hole by a distance L10. Accordingly, the projection may be spaced a distance L11 from the nearest seat and a distance L12 from the other seat.

Generally, the distance L13 measured from the guide 68 nearest the distal end 46 of the accessory rail 17 to the proximal end of the projection 64 may define dimension identified as a first accessory feature span. Additionally, the distance L14 measured from the guide 68 nearest the proximal end 48 of the accessory rail 17 to the proximal end of the projection 64 may define a dimension identified as a second accessory feature span. Illustrative approximate values for the dimensions disclosed in FIG. 5 are presented in Table 1. Other feature configurations or dimensions are contemplated, however, and may be implemented in other embodiments.

TABLE 1

Exemplary Dimensions for Accessory Rail Features

| Dimension | Length (Inches) |
|---|---|
| L1 | 3.1450 |
| L2 | 2.3620 |
| L3 | 0.3915 |
| L4 | 0.3915 |
| L5 | 0.1590 |
| L6 | 0.1590 |
| L7 | 0.4650 |
| L8 | 0.4650 |
| L9 | 0.7870 |
| L10 | 1.5750 |
| L11 | 0.3220 |
| L12 | 1.1100 |
| L13 | 1.2520 |
| L14 | 1.5750 |

Referring to FIGS. 3 and 6-9, the accessory rail 17, 40 may include a fastener receiving hole 66 adjacent the distal end 52. Also, the accessory rail 17, 40 may include a fastener receiving hole 66 adjacent to the proximal end 54. The fastener receiving holes 66 may be disposed along the longitudinal axis 50. Referring to FIGS. 12 and 13, the fastener receiving holes 66 may extend from the top surface 42 to the bottom surface 56. Each fastener receiving hole 66 may include a counterbore. For example, the fastener receiving hole 66 may include a larger diameter bore 72 extending from the top surface 42 toward the bottom surface 56. The larger diameter bore 72 may include an end wall 76 which is parallel to the top surface. The end wall 72 may be parallel to the bottom surface 56. A smaller diameter bore 74 may extend from the end wall 72 to the bottom surface 56 of the accessory rail 17, 40.

Figure 6:
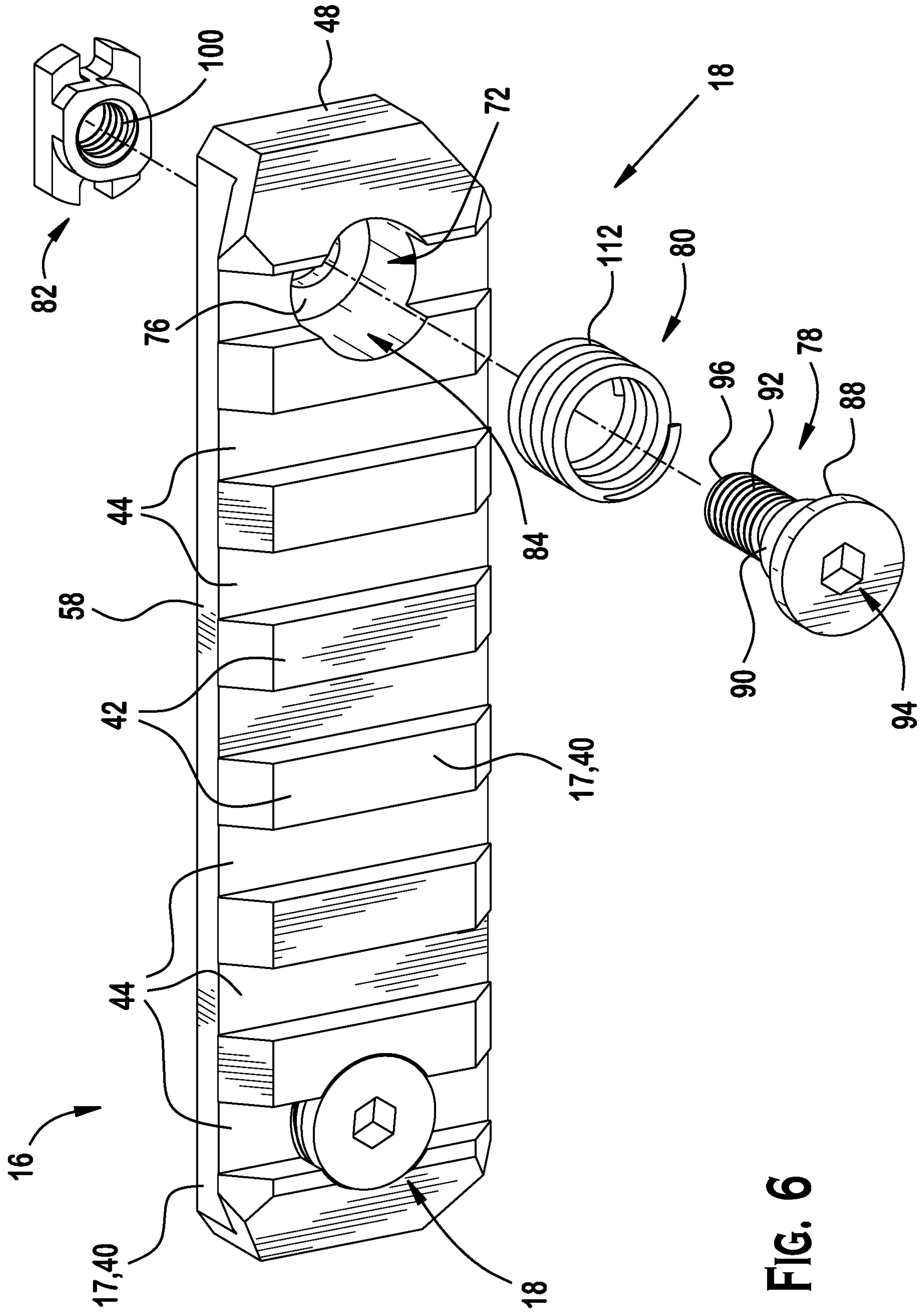
FIG. 6 is a top partial exploded view of the accessory rail and fastener apparatus of FIG. 3.
Figure 7:
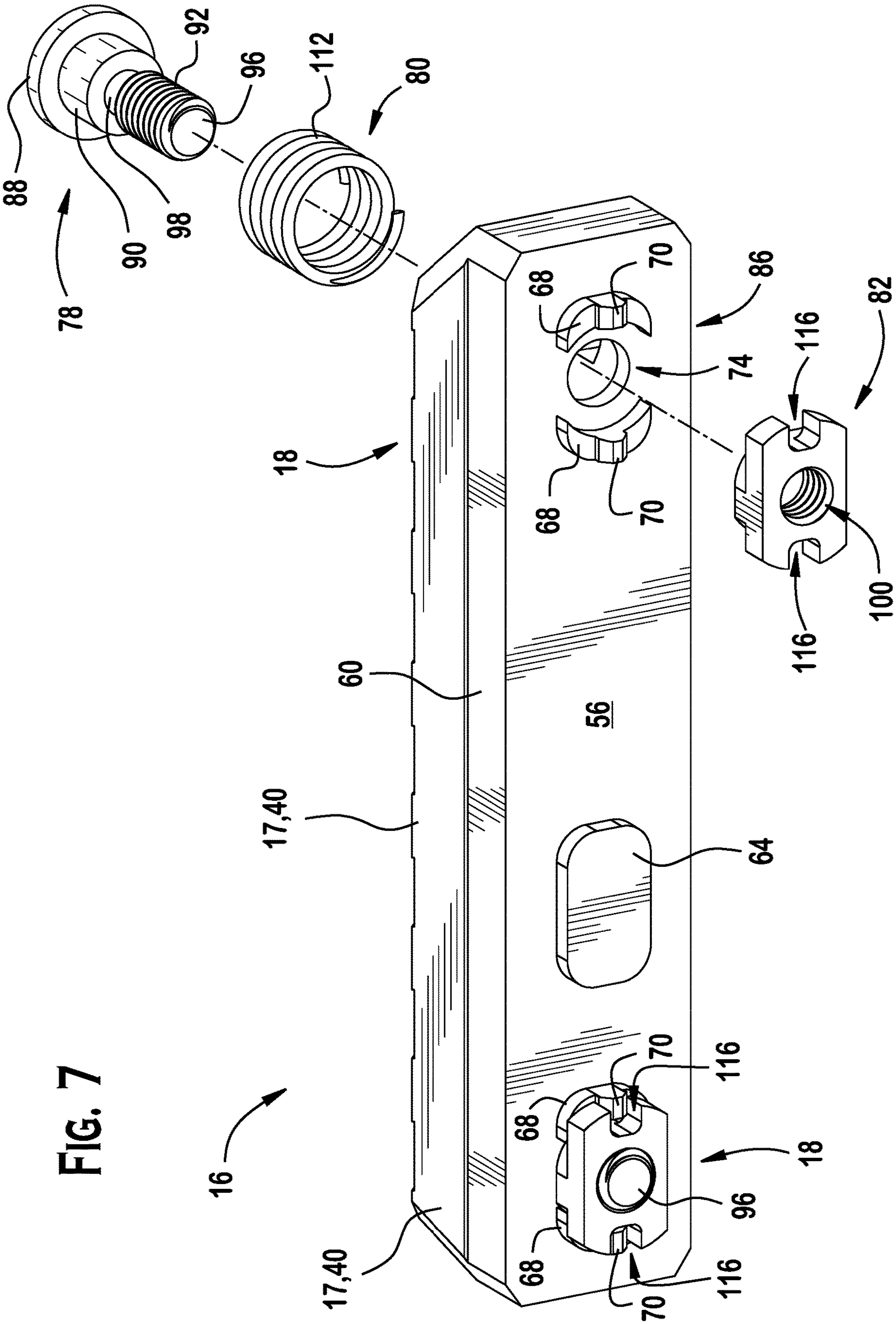
FIG. 7 is a bottom view of the accessory rail and fastener apparatus of FIG. 6.
Figure 8:
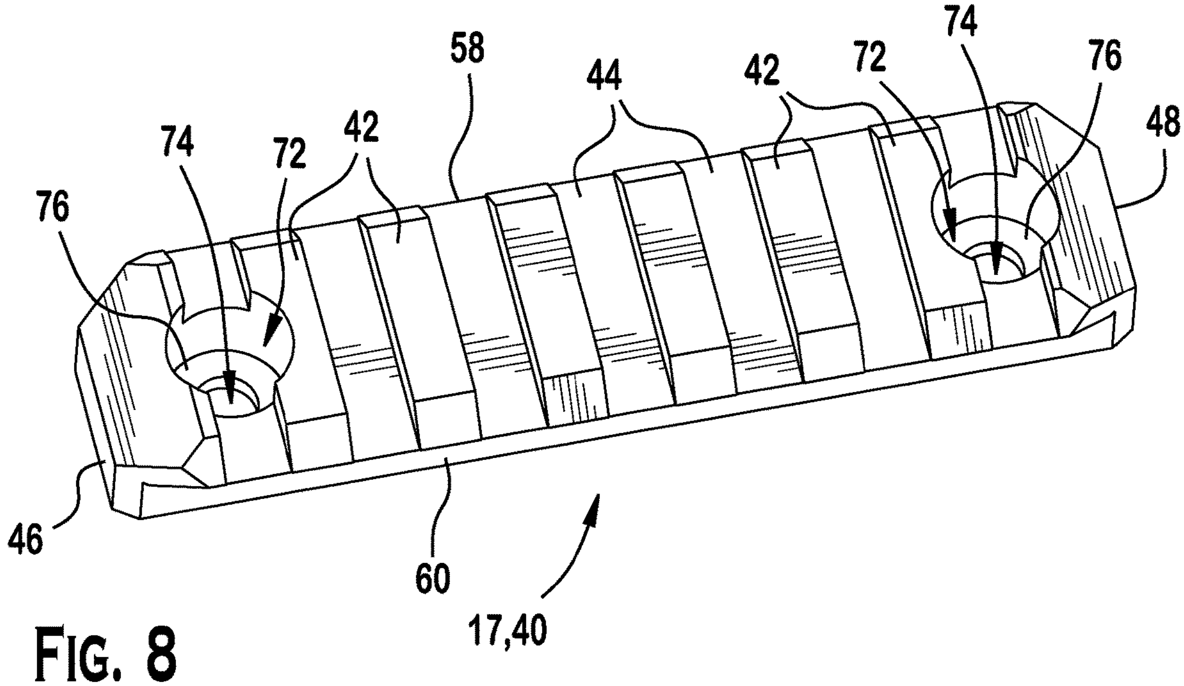
FIG. 8 is a top perspective view of the accessory rail of FIG. 3.

Referring to FIGS. 6 and 7, one embodiment of a fastener apparatus 18 in accordance with the present invention may include a fastener (e.g., a bolt or screw) 78, a resilient member (e.g., a coil spring) 80, and a T-nut 82. Referring to FIGS. 12 and 13, the counterbore 72, 74 and guides 68 next to the smaller diameter bore 74 on the bottom surface 56 may provide a housing 84 (see e.g., FIG. 6) and a seat 86

Figure 14:
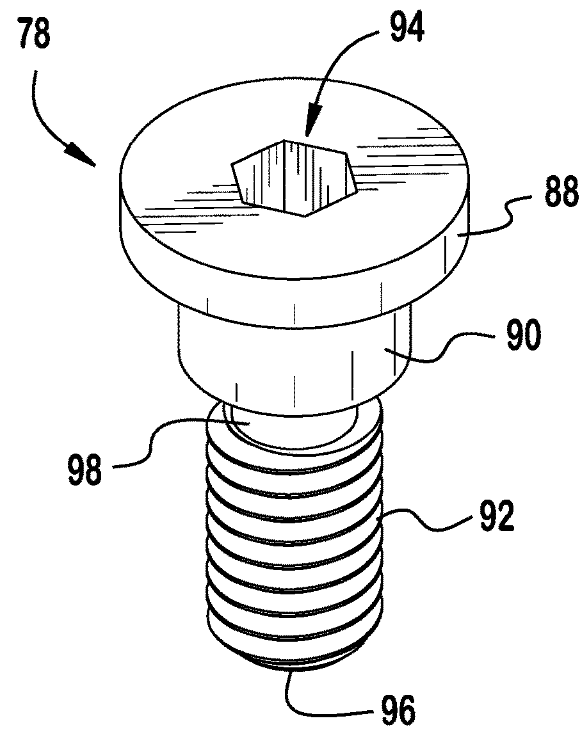
FIG. 14 is a top perspective view of a fastener of the fastener apparatus of FIG. 3.
Figure 15:
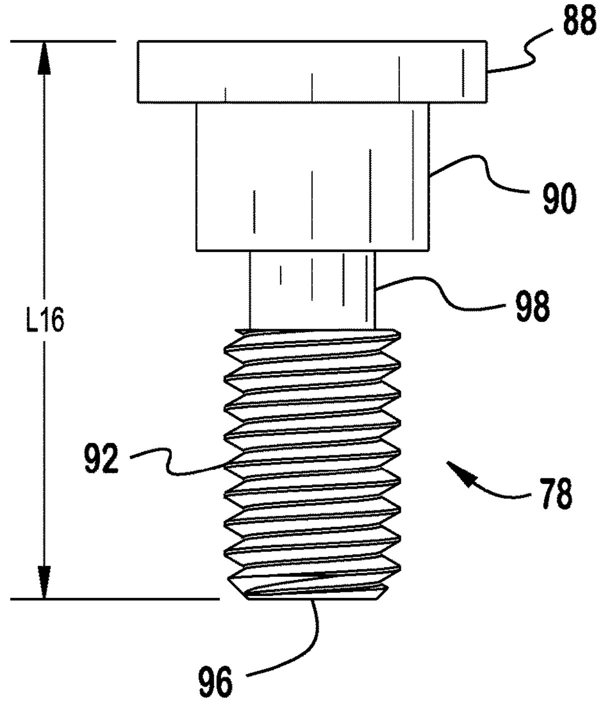
FIG. 15 is a side view of the fastener of FIG. 14.
Figure 16:
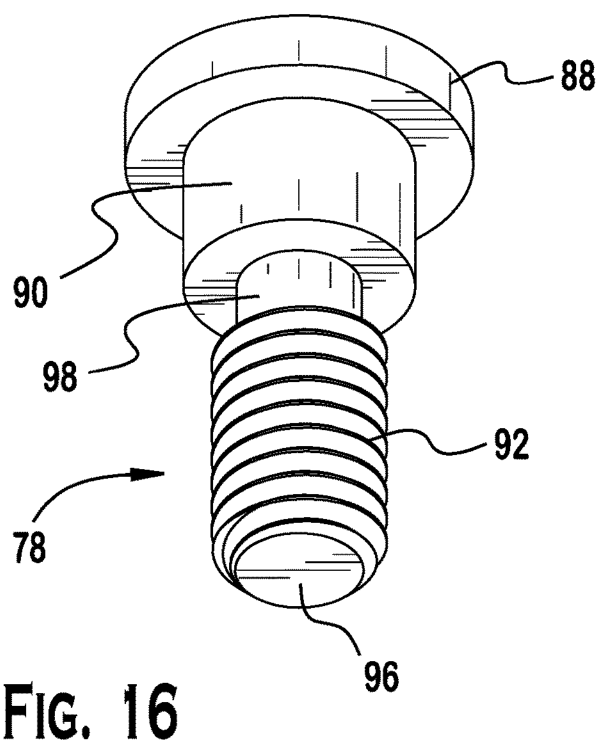
FIG. 16 is a bottom perspective view of the fastener of FIG. 14.
Figure 17:
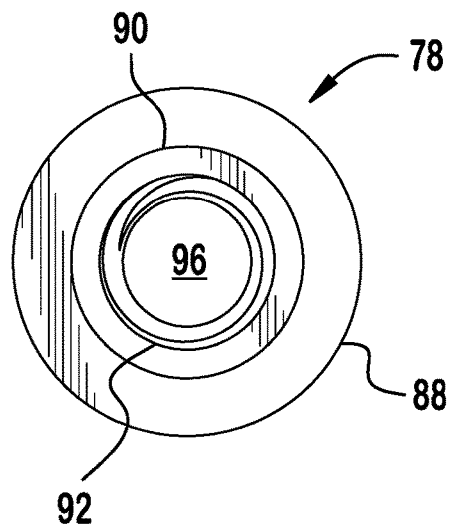
FIG. 17 is a top view of the fastener of FIG. 14.

(see e.g., FIG. 7), respectively for a fastener apparatus 18 in accordance with the present invention. For instance, as shown in FIGS. 14-17, the fastener 78 may include a head 88, a spring guide 90, and a threaded shaft 92. Referring to FIGS. 6 and 14, the fastener head 88 may further include a drive slot 94. For example, the drive slot 94 may be a hex socket. Although the disclosed fastener 78 has a hex socket, any suitable drive socket may be used provided it allows the corresponding driver to turn the fastener head 88 when the fastener head is within the recessed rectangular groove 44 of the accessory rail 17. The fastener 78 may have a length L16 (see e.g., FIG. 15) greater than the length L15 (see e.g., FIG. 13) of the fastener receiving hole 66. For example, dimension L16 may be approximately 0.600 inches and dimension L15 may be approximately 0.426 inches. The screw threads 92 may extend from the distal end 96 of the fastener 78 along the shaft 98 toward the spring guide 90. The length of screw threads 92 on the shaft 98 may be sufficient to provide a strong clamping force on different objects 14 having various thickness. The screw threads 92 may be configured and dimensioned to mate with a threaded bore 100 of the T-nut 82.

Figure 18:
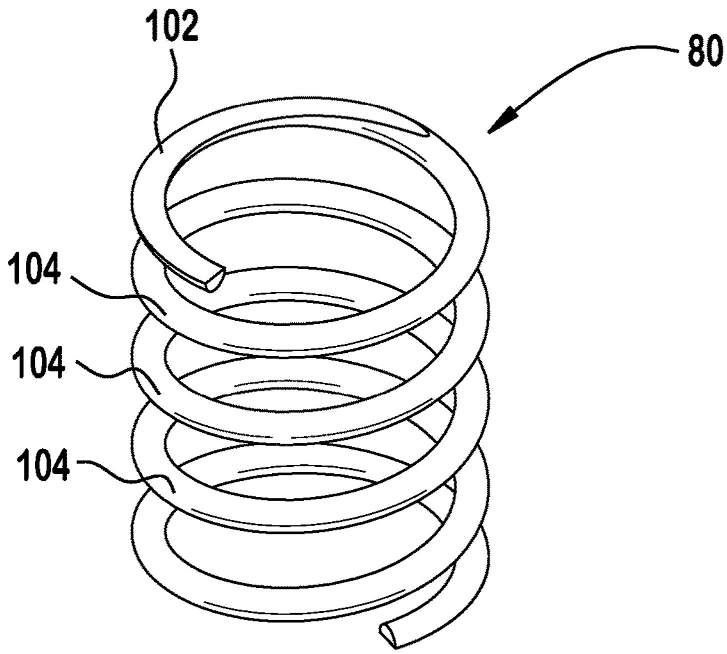
FIG. 18 is a top perspective view of a coil spring of the fastener apparatus of FIG. 3.
Figure 19:
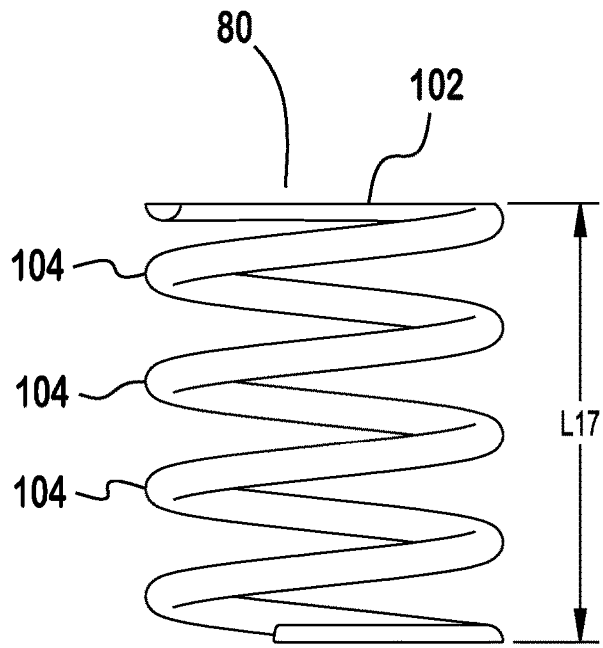
FIG. 19 is a side view of a coil spring of FIG. 18.
Figure 20:
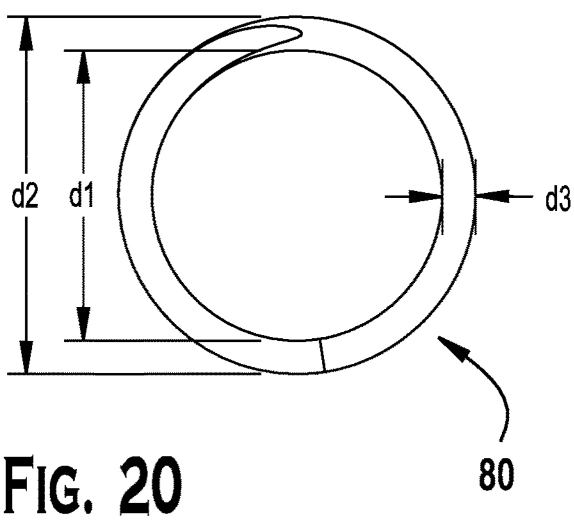
FIG. 20 is a top view of the coil spring of FIG. 18.

Referring to FIGS. 18 and 19, the resilient member 80 may be a coil spring 102, and the coil spring may include two or more active coils 104. For instance, the coil spring 102 may have three active coils 104. The coil spring 102 may be a compression spring. Generally, the coil spring may have a free length L17 and working length suitable for operation inside the larger diameter bore 74. For example, the dimension L17 may be approximately 0.460 inches. Referring to FIG. 20, the coil may include an outer diameter, $d_1$, which is less than the diameter of the fastener head 88 and an inner diameter $d_2$ greater than the diameter of the spring guide 90. Further, the wire may be round wire having diameter $d_3$. For example, the dimension $d_1$ may be approximately 0.305 inches, the dimension $d_2$ may be approximately 0.375 inches, and the dimension $d_3$ may be approximately 0.035 inches. The resilient member 80 may be designed for corrosion resistance and repeated and reliable operation of the fastener apparatus. The coil spring 80 may not fully compress during use. The spring force at its maximum working length may be sufficient to position and hold the fastener 78 and T-nut 82 in a retracted configuration, as shown in FIGS. 4 and 5. Generally, the wire may be spring wire, but music wire, chrome silicon, chrome vanadium, 302 stainless steel, 316 stainless steel, other alloys, or materials may be used for a particular application or environmental conditions.

Figure 21:
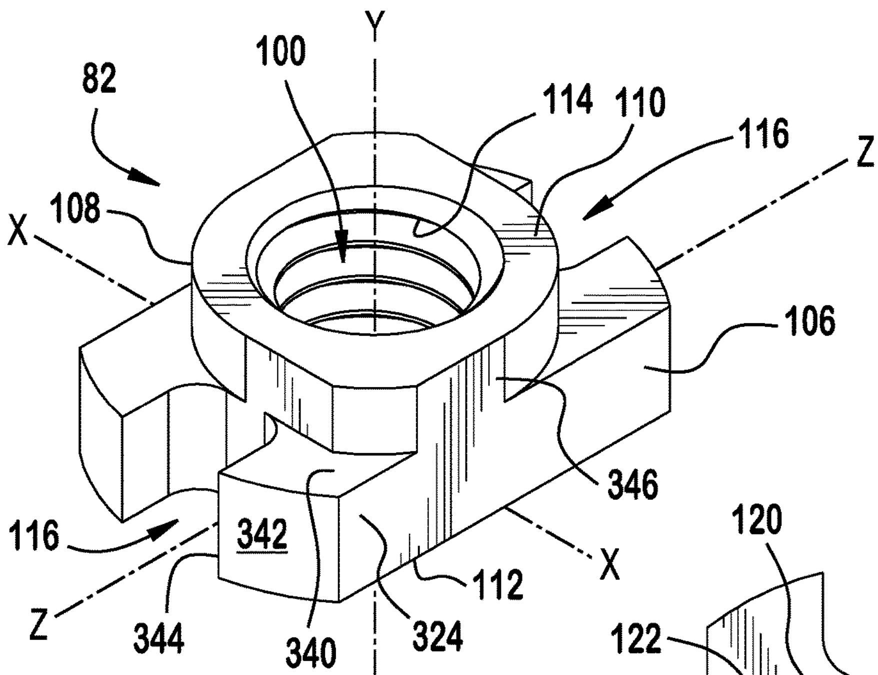
FIG. 21 is a top perspective view of an exemplary T-nut in accordance with the present invention.
Figure 22:
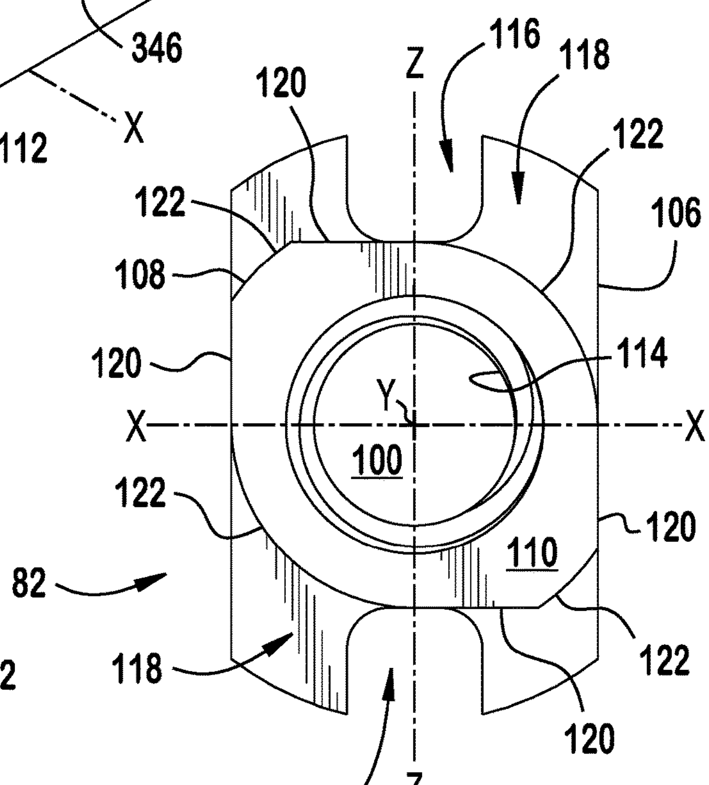
FIG. 22 is a top view of the T-nut of FIG. 21.
Figure 23:
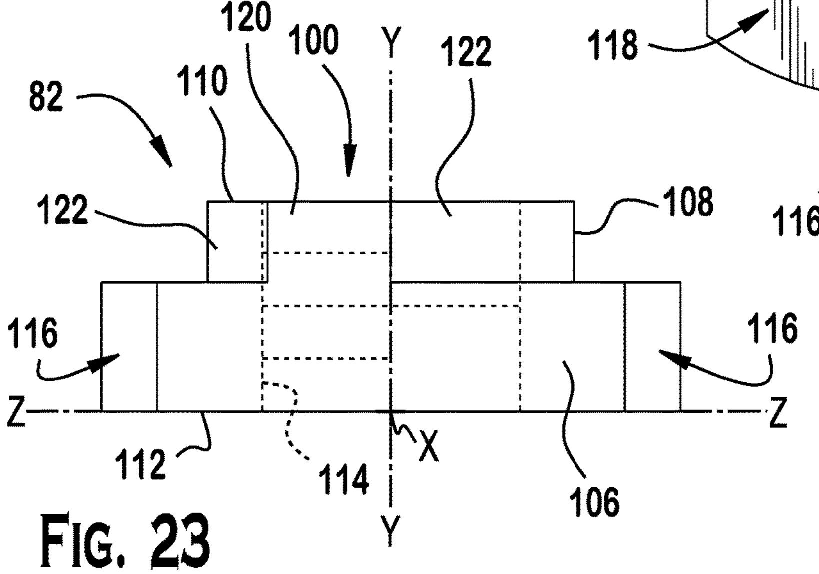
FIG. 23 is a side view of the T-nut of FIG. 21.

FIGS. 21-26 show an exemplary embodiment of a T-nut 82 in accordance with the present invention. The T-nut is shown with a three dimensional Cartesian coordinate system. In this embodiment, the T-nut 82 may include an elongated base 106 and a cylindrical head 108. The elongated base may have a longitudinal axis along the z-axis. The term cylindrical head generally refers herein to a non-circular region. More broadly, however, the cylindrical head 108 may be a shoulder of the fastener. The cylindrical head 108 may be centrally positioned on the elongated base 106. A bore 100 may extend from the top 110 of the cylindrical head 108 to the bottom 112 of the elongated base. The bottom 112 of the elongated base may lie in the x-z plane, and the bore 100 may have a central axis along the y-axis. The bore 100 may include screw threads 114 which are configured and dimensioned to mate with screw threads 92 on the fastener 78 (see e.g., FIG. 6). Referring to FIG. 22, each end of the elongated base 106 may include a notch 116. Each notch 116 may be aligned with the center of the bore 100. Also, the cylindrical head 108 of the T-nut 82 may possess a cam profile 118. The cam profile 118 may include one or more straight sidewall segments 120 and one or more curved sidewall segments 122. Except for the notches 116, the T-nut 82 in other embodiments may be substantially the same as nuts disclosed in U.S. Pat. No. 9,239,209 to Mayberry et al, which is incorporated in its entirety by reference herein.

Figure 24:
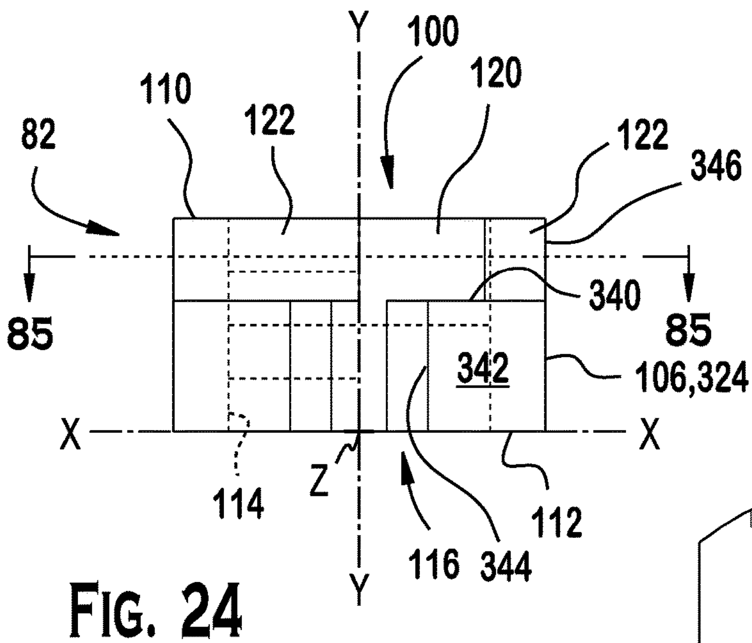
FIG. 24 is a front view of the T-nut of FIG. 21.
Figure 25:
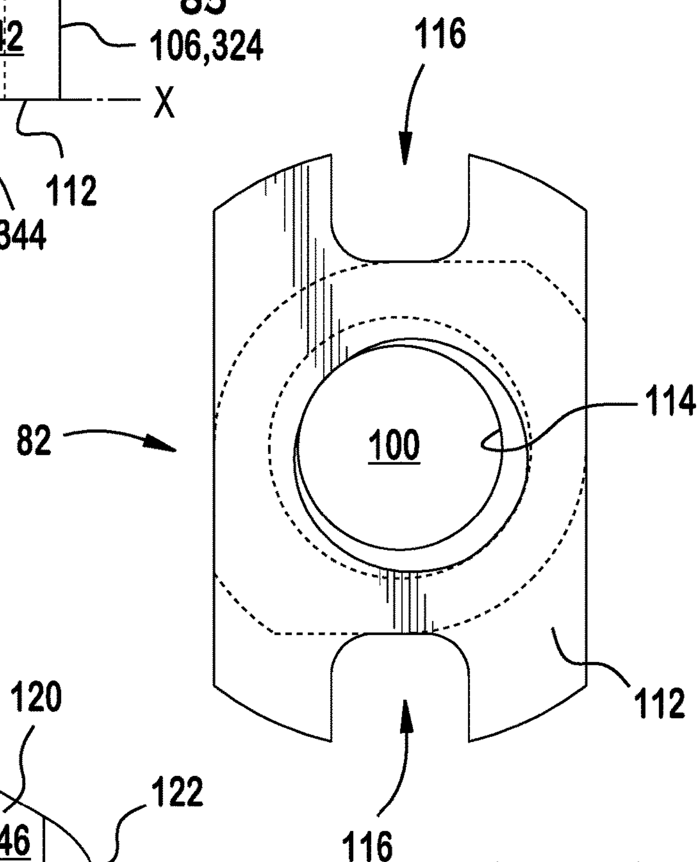
FIG. 25 is a bottom view of the T-nut of FIG. 21.
Figure 26:
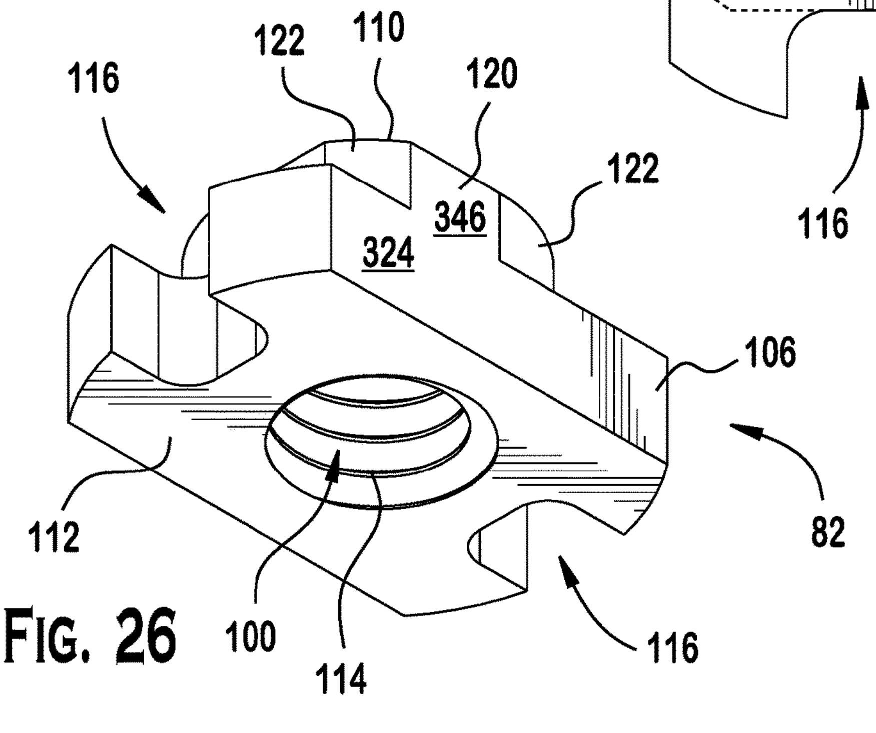
FIG. 26 is a bottom perspective view of the T-nut of FIG. 21.

Referring to FIG. 21, the elongated base 106 may include a bottom or lower surface 112. Further, the elongated base may include a first side 324 near the lower surface 112, a second side 340 near the first side 324, and a third side 342 near the first side 324 and the second side 340. Referring to FIG. 21 and FIG. 24, the elongated base may include a notch 116. The notch 116 may include a first interior sidewall 344 which extends from the second side 340 to the lower surface 112 of the elongated base.

The T-nut may further include a shoulder 108 next to the elongated base 106. The shoulder 108 may have a longitudinal axis along the y-axis. The shoulder 108 may include a first sidewall-segment 346 near the first side 324 of the elongated base 106. The shoulder 108 further may include an end surface 110. A bore 100 may extend from the end surface 110 to the lower surface 112. The bore 100 may include a screw thread 114 for receiving a mating fastener.

Figure 85:
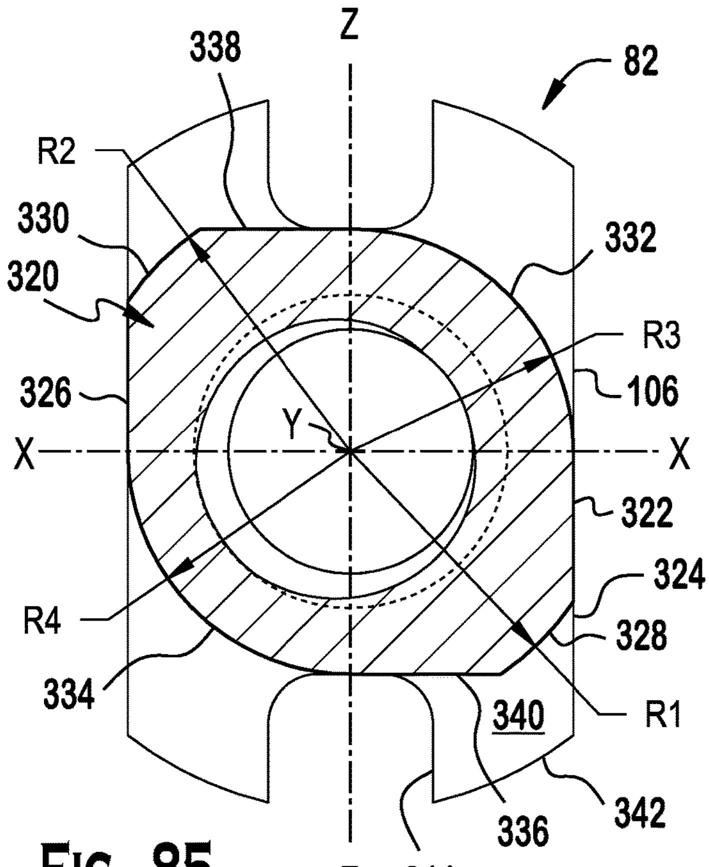
FIG. 85 is a cross-sectional view of FIG. 24 along line 85-85.

Referring to FIG. 85, the T-nut 82 may include a cross-sectional profile 320 normal to the y-axis. The cross-sectional profile 320 may include a first straight wall segment 322 next to the first side 324 of the elongated base 106. The cross-sectional profile 320 may include a second straight wall segment 326 spaced from the first straight wall segment 322. A first curved wall segment 328 may be disposed between the first straight wall segment 322 and the second straight wall segment 326.

A second curved wall segment 330 may be disposed between the first straight wall segment 322 and the second straight wall segment 326. The first curved wall segment 328 may possess a first radius of curvature R1 and the second curved wall segment 330 may possess a second radius of curvature R2. The first radius of curvature R1 may be substantially equal to the second radius of curvature R2.

The cross-sectional profile 320 may further include a third curved wall segment 332 abutting the first straight wall segment 322, as well as a fourth curved wall segment spaced 334 from the first straight wall segment 322. The third curved wall segment 332 may possess a third radius of curvature R3 and the fourth curved wall segment 334 may possess a fourth radius of curvature R4. The third radius of curvature R3 may be substantially equal to the fourth radius of curvature R4. And, the first radius of curvature R1 may be substantially unequal to the third radius of curvature R3. For example, the third radius of curvature R3 may be less than the first radius of curvature R1. Illustrative approximate values for the dimensions disclosed in FIG. 85 are presented in in Table 2. Other feature configurations or dimensions are contemplated, however, and may be implemented in other embodiments,

TABLE 2

Exemplary Shoulder Dimensions for First Interior Fastener

| Demension | Length (Inches) |
|---|---|
| R1 | 0.163 |
| R2 | 0.163 |

TABLE 2-continued

| Exemplary Shoulder Dimensions for First Interior Fastener | |
|---|---|
| Demension | Length (Inches) |
| R3 | 0.135 |
| R4 | 0.135 |

The cross-sectional profile 320 may further include a third straight wall segment 336 abutting the first curved wall segment 328, as well as a third straight wall segment 338 abutting the third curved wall segment 332. The third straight wall segment 336 may abut the fourth curved wall segment 334. Additionally, the fourth straight wall segment 338 may abut the second curved wall segment 330.

Referring to FIGS. 6 and 7, the coil spring 112 may be positioned over the threaded shaft 92 and spring guide 90 of the fastener. The fastener 78 and coil spring 112 assembly then may be inserted (threaded shaft end first) into the larger diameter bore 72. The fastener head 88 may be depressed toward the accessory rail 17, 40 until the distal end 96 of the fastener 78 extends from the smaller diameter bore 74. Depressing the fastener 78 in this fashion may compress the coil spring 112 between the end wall of the larger diameter bore 76 and the fastener head. One T-nut 82 may be threaded (cylindrical head 108 first) onto a portion of the threaded shaft 92 that extends from the smaller diameter bore 74. The T-nut 82 may be advanced onto the threaded shaft 92 of the fastener until the distal end 96 of the fastener is flush (or level) with the bottom surface 112 of the elongated base 106 of the T-nut. Then the fastener head 88 may be depressed, and the T-nut 82 and fastener 78 rotated until the notches 116 in the elongated base 106 of the T-nut 82 are aligned with the tips 70 of the accessory rail 17, 40 guides 68. After the T-nut 82 and guides 68 are aligned in this manner, the fastener head 88 may be released to allow the T-nut 82 to seat between the guides 68, as shown in FIGS. 4 and 5. When properly seated, the notches 116 of the T-nut 68 are engaged by the tips 70 of the accessory rail. In this configuration, the coil spring 112 may press against the end wall of the larger diameter bore 72 and the fastener head 88 to pull the T-nut 82 against the accessory rail 17, 40. The accessory rail 17, 40 may be deployed (i.e., mounted on a suitable slotted object 14) after the fasteners 78, coil springs 112, and T-nut 82 assemblies are assembled and positioned in this manner.

Figure 33:
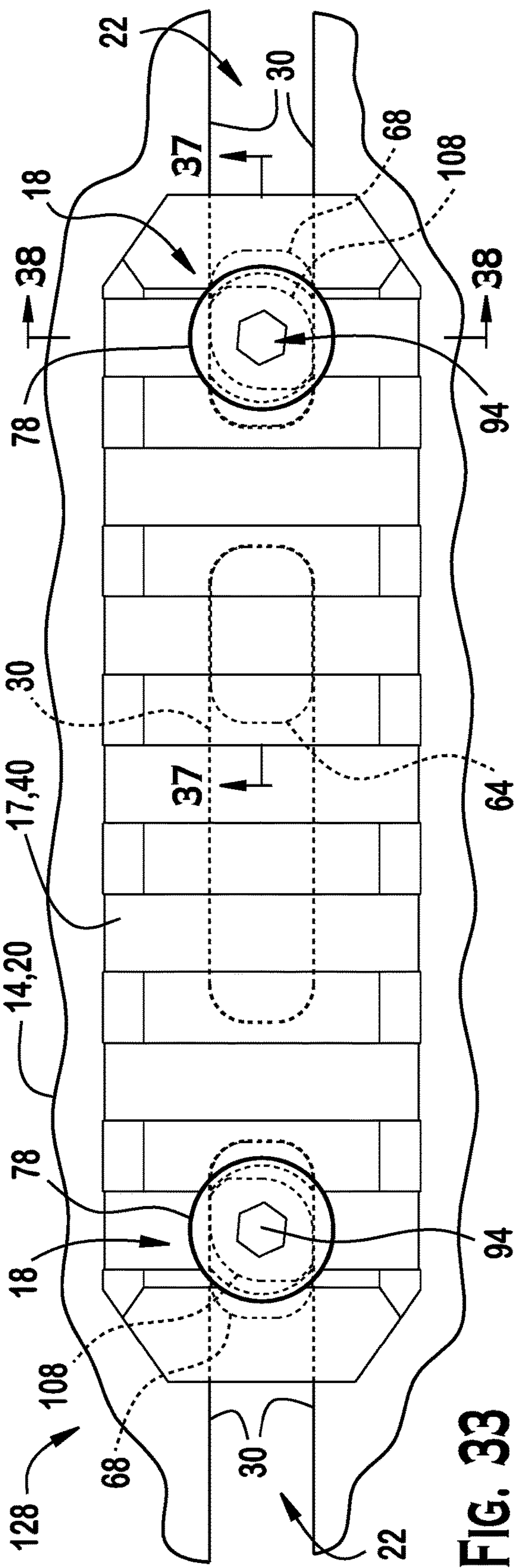
FIG. 33 is a partial view of an exemplary embodiment of an accessory interface system in a ready configuration, as viewed from the mounting surface side of the accessory interface system.

Referring to FIG. 33, the exemplary two-slot accessory rail 17, 40 may cooperate with two or more slots of an object, such as the rifle handguard. It is preferred, however, that a two-slot accessory rail mount over two adjacent slots as depicted in FIGS. 1 and 36. Still, the slot configuration and pattern of the handguard in FIG. 1 may accept a two-slot accessory rail connected to three slots, as illustrated in FIGS. 33-35.

Figure 34:
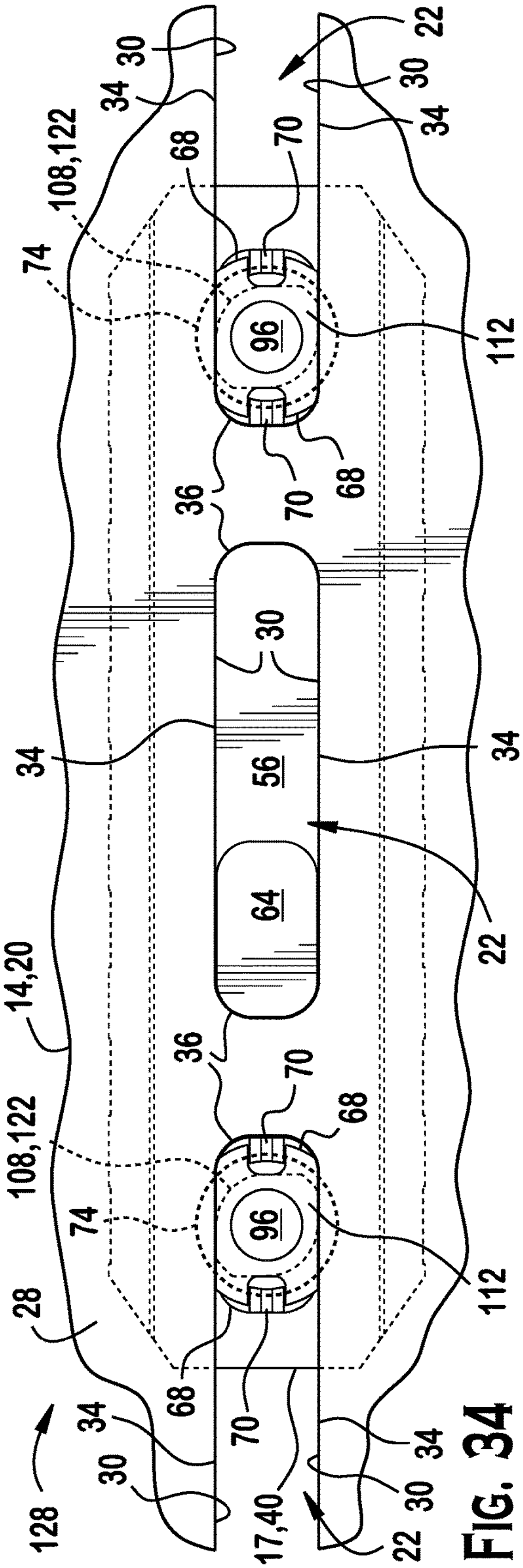
FIG. 34 is a partial view of the accessory interface system of FIG. 33, as viewed from the locking surface side of the accessory interface system.

Referring to FIGS. 33-34 and 37-38, the two-slot accessory rail 17, 40 may be placed over three adjacent slots 22 such that a projection 64 and a T-nut 82 of each fastener apparatus 18 is seated in one slot 22. The bottom 56 of the two-slot accessory rail 17, 40 around the T-nut 82 and guides 68 may be pressed flat against the exterior surface 26 of the handguard abutting the slots 22 (see e.g., FIG. 33). More generally, the handguard 20 may be an object 14 that includes an exterior surface 26 (see e.g., FIG. 33) and an interior surface 28 (see e.g., FIG. 34). As shown in FIG. 33, the exterior surface of the handguard 28 near each slot 22 may be a mounting surface 124; whereas, as shown in FIG. 34 the interior surface of the handguard 20 near the slots 22 may be a locking surface 126. The mounting surface 124 and the locking surface 126 may be flat and smooth.

Figure 37:
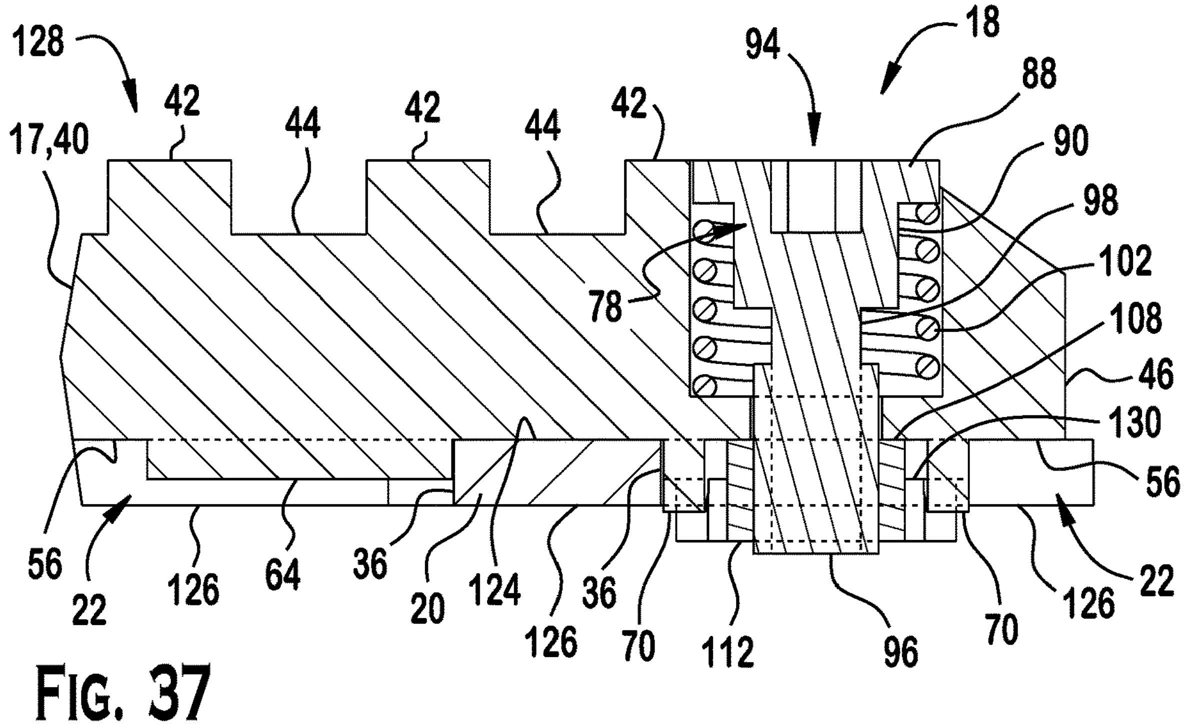
FIG. 37 is a cross-sectional view of the accessory interface system of FIG. 33 along line 37-37.
Figure 38:
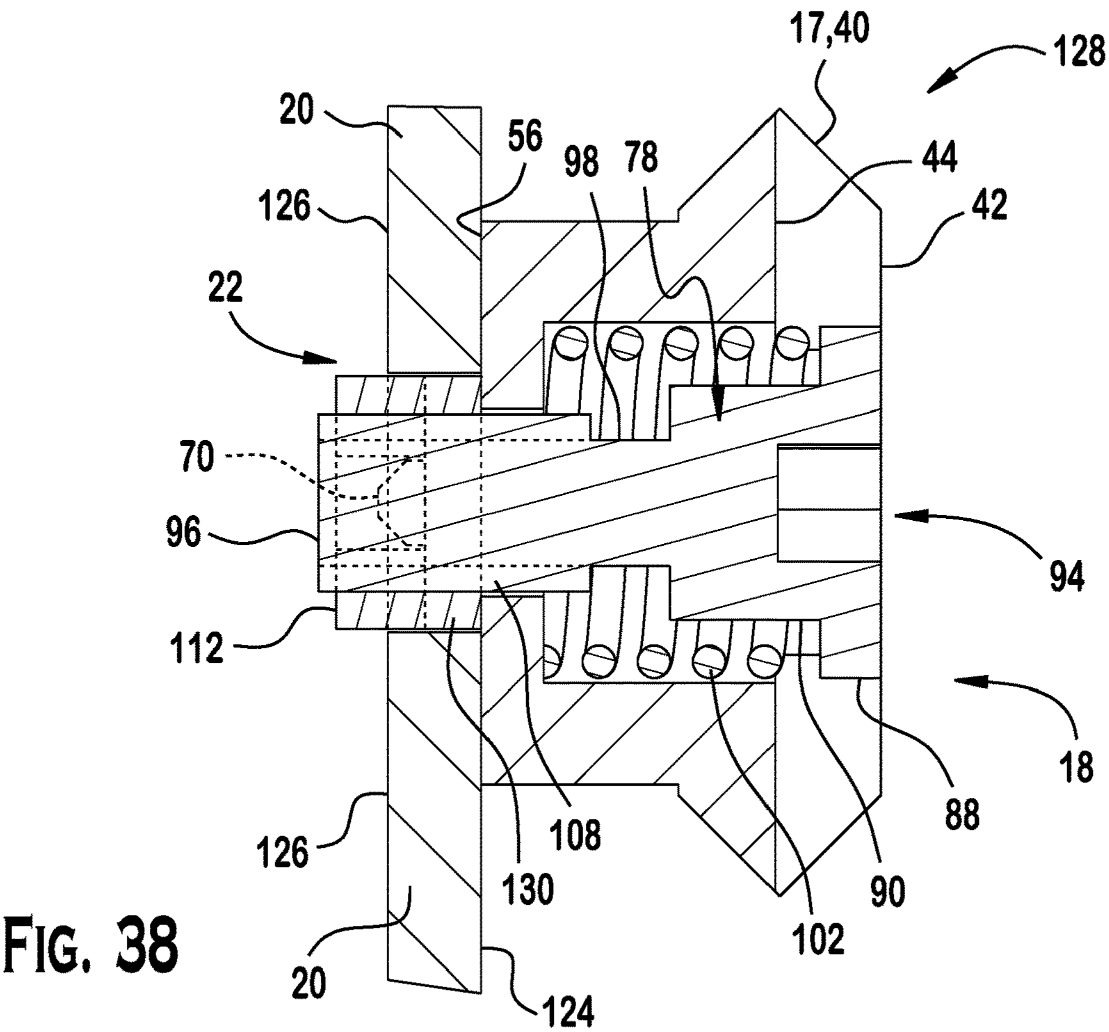
FIG. 38 is a cross-sectional view of the accessory interface system of FIG. 33 along line 38-38.

FIGS. 33 and 34 depict the two-slot accessory rail 17, 40 in a ready configuration 128. In the ready configuration 128 the accessory 16 contacts the mounting surface 124 of the object 14, each T-nut 82 is seated on the adjacent guides 68, and the elongated base 106 of each T-nut 82 is held by the guide tips 70 in alignment with the longitudinal axis 50 of the accessory rail 17, 40. Referring to FIG. 37, the top surface of the elongated base 130 is inside the slot 22. As shown in FIGS. 33 and 34, the curved sidewall segments 122 of the cylindrical head (or stud) 108 of each T-nut 82 may be positioned to allow approximately 90° of rotation in a clockwise direction.

Figure 35:
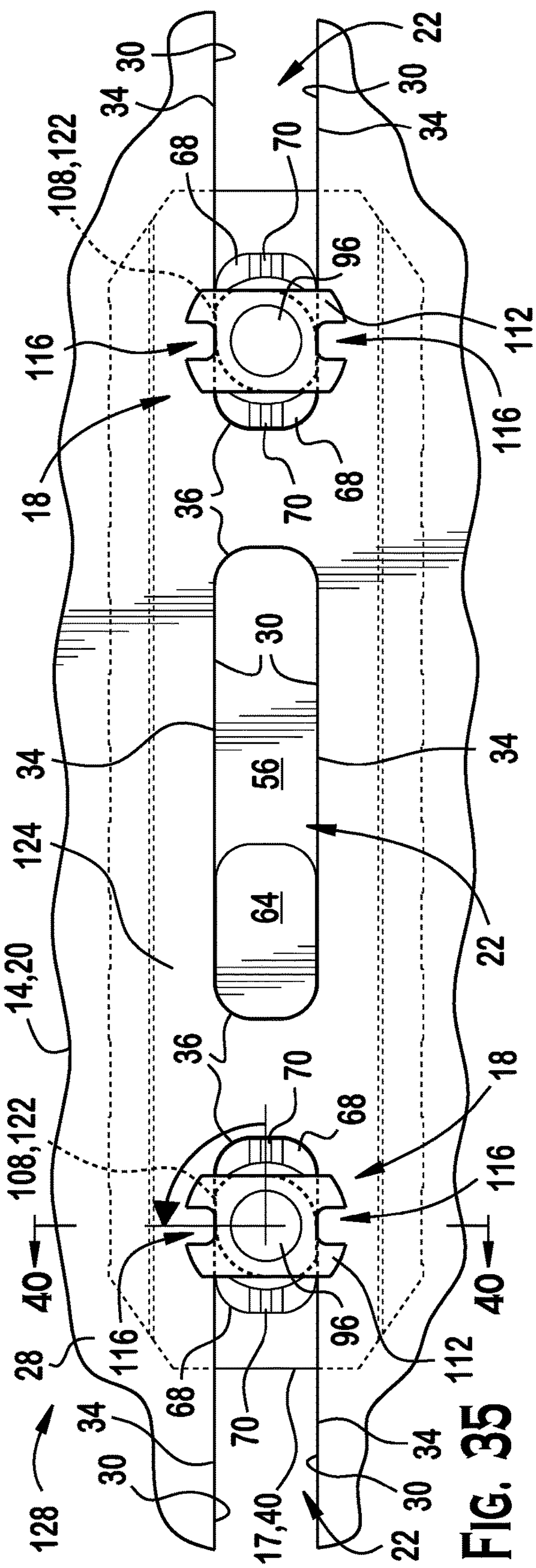
FIG. 35 is another view of the accessory interface system of FIG. 34 in a latched configuration.
Figure 36:
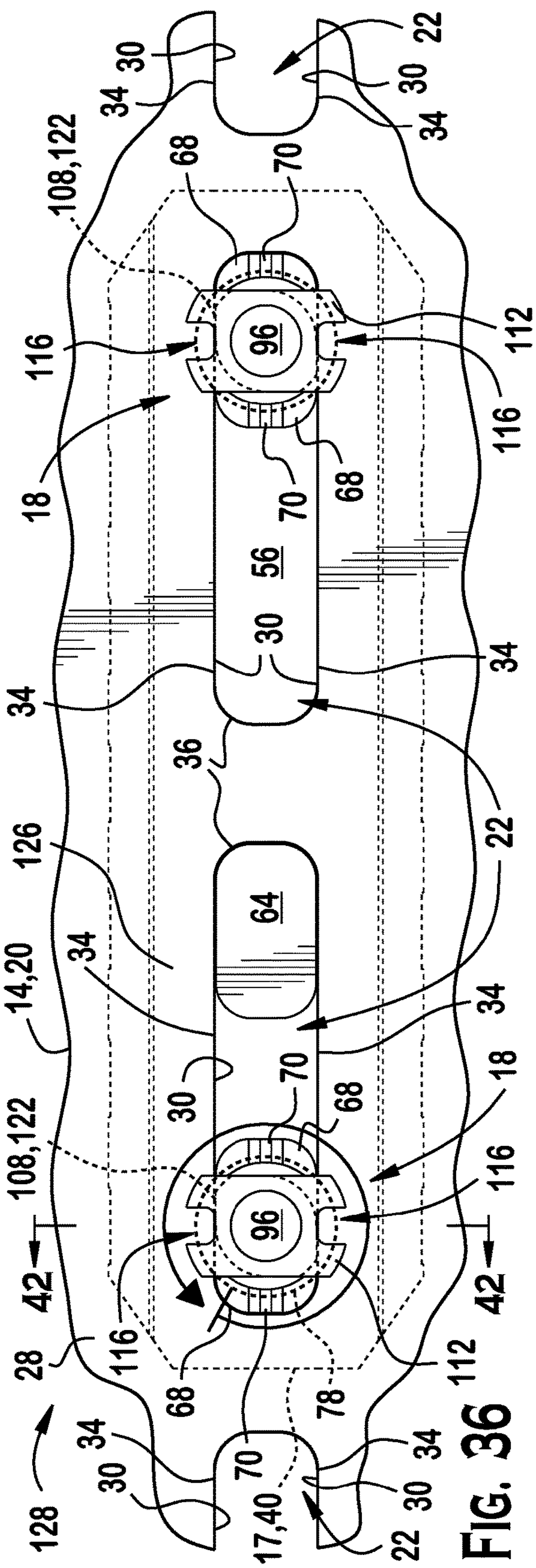
FIG. 36 is another view of the accessory interface system of FIG. 34, in a locked configuration.
Figure 39:
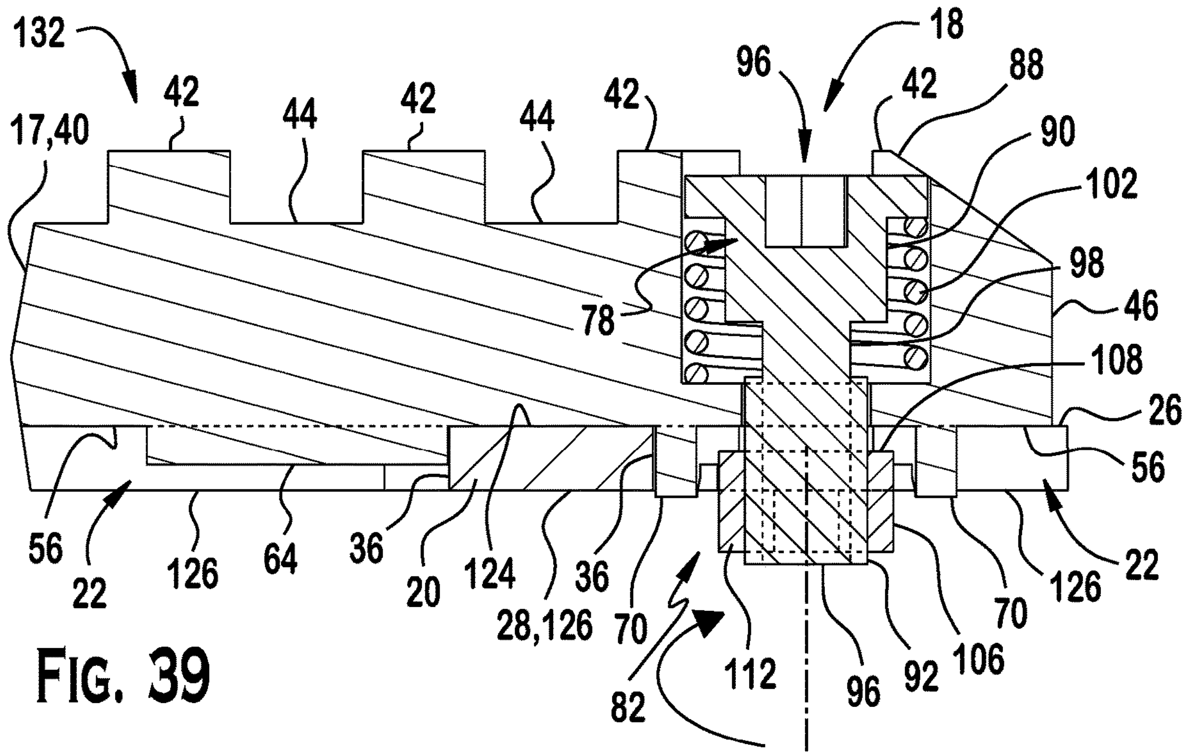
FIG. 39 is a cross-sectional view of the accessory interface system of FIG. 35 along line 39-39.
Figure 40:
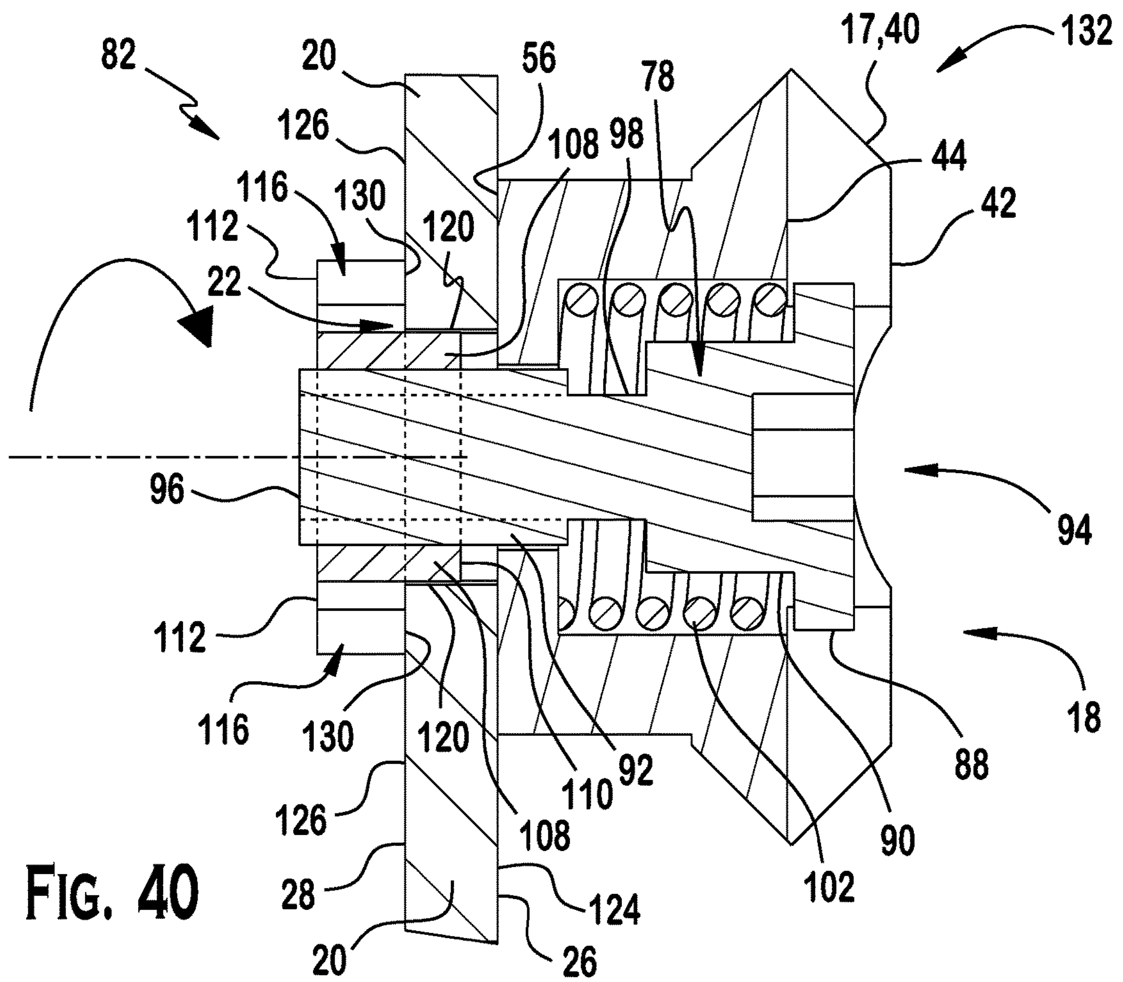
FIG. 40 is a cross-sectional view of the accessory interface system of FIG. 35 along line 40-40.

FIGS. 35, 39 and 40 depict the two-slot accessory rail 17, 40 in a rotated configuration 132. Referring to FIG. 39, an operator may insert an appropriate drive tool (not shown), such as a hex socket drive, into the drive slot 94 and depress the fastener 78 sufficiently to disengage the nut 82 from the guides 68 and move the elongated base 112 of the T-nut 68 through the slot 22 past the locking surface 126 of the handguard. Referring to FIGS. 35 and 40, the operator may then rotate the driver until the straight wall segments 120 of the stud 108 block further rotation of the T-nut 68. In this embodiment, the maximum allowable degree of rotation may be approximately 90 degrees in a clockwise direction.

Figure 41:
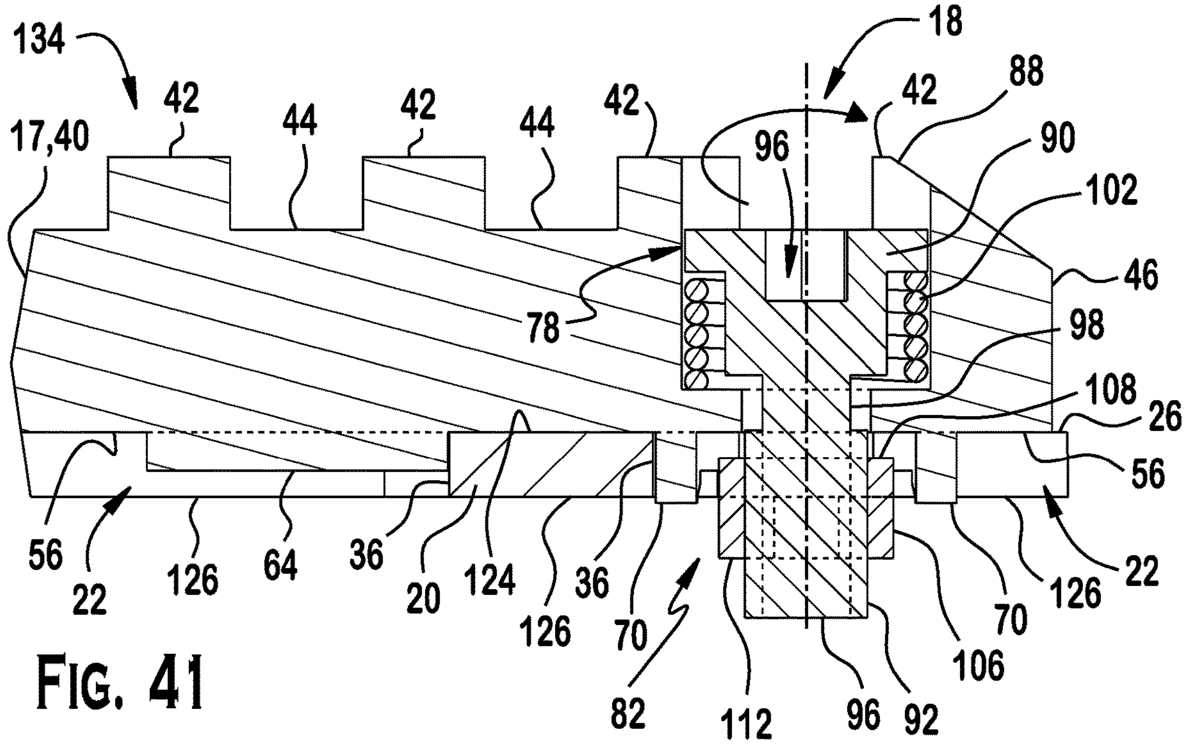
FIG. 41 is a cross-sectional view of the accessory interface system of FIG. 36 along line 41-41.
Figure 42:
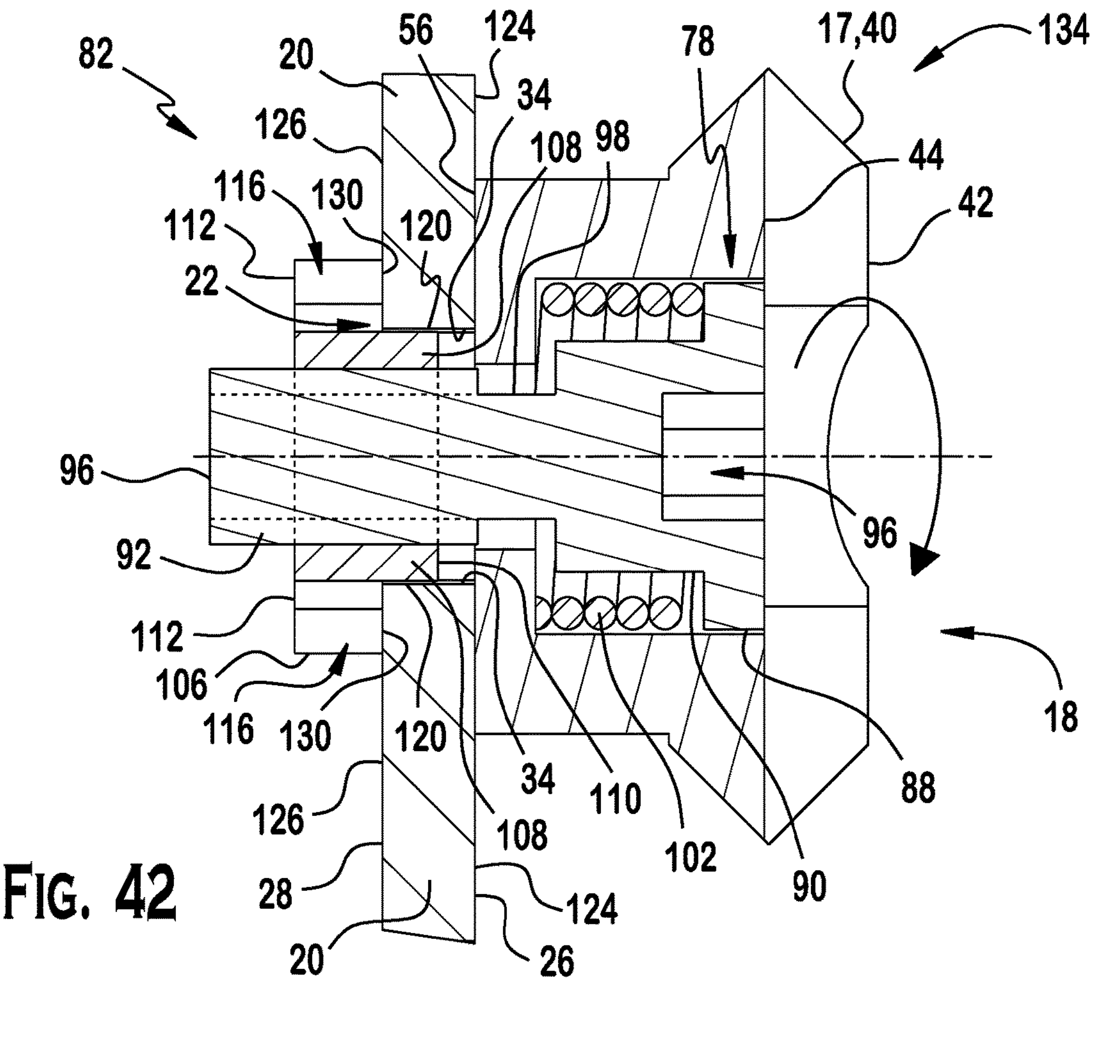
FIG. 42 is a cross-sectional view of the accessory interface system of FIG. 36 along line 42-42.

FIGS. 36 and 41-42 depict the two-slot accessory rail 17, 40 in a locked configuration 134. Referring to FIGS. 36 and 42, after the T-nut 82 has been rotated in this manner, the elongated base 106 of the T-nut 82 may be positioned generally perpendicular to the slot 22 (FIG. 36), and the top surface of the elongated base 130 may contact the locking face 126. The operator may then advance the fastener 78 into the T-nut 82 to securely clamp (or fix) the accessory rail 14, 40 to the handguard 20.

Figure 27:
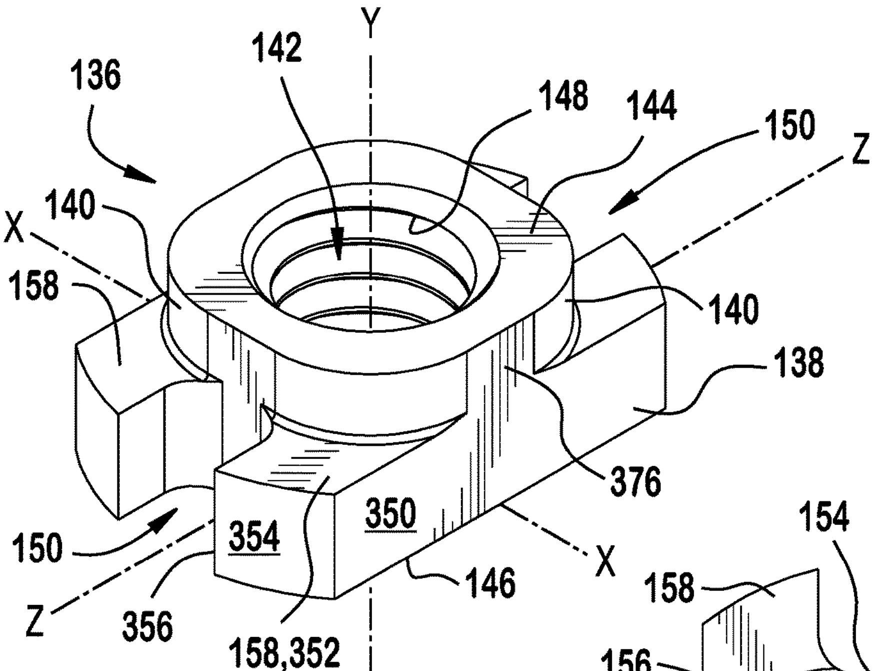
FIG. 27 is a top perspective view of an exemplary locking nut in accordance with the present invention.
Figure 28:
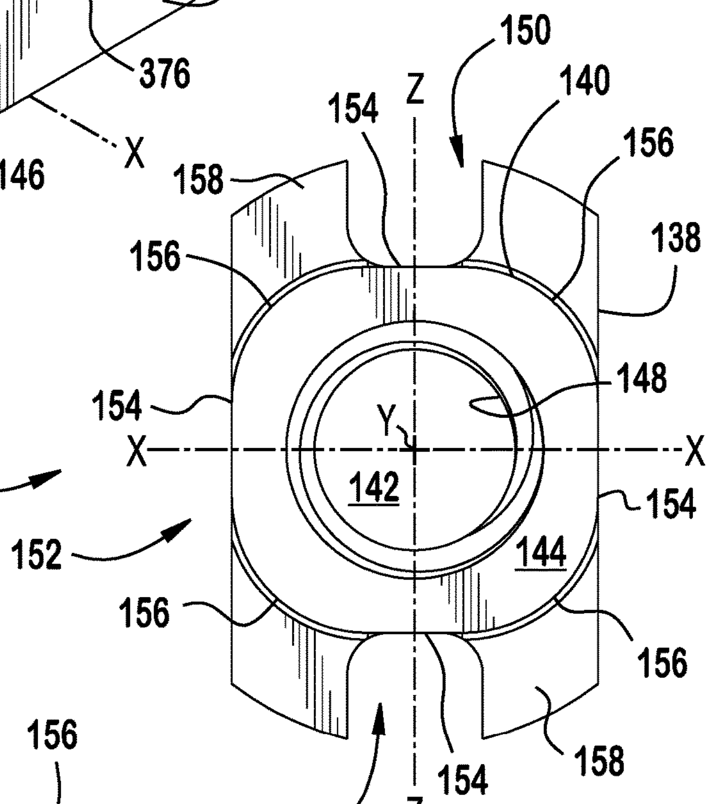
FIG. 28 is a top view of the locking nut of FIG. 27.
Figure 29:
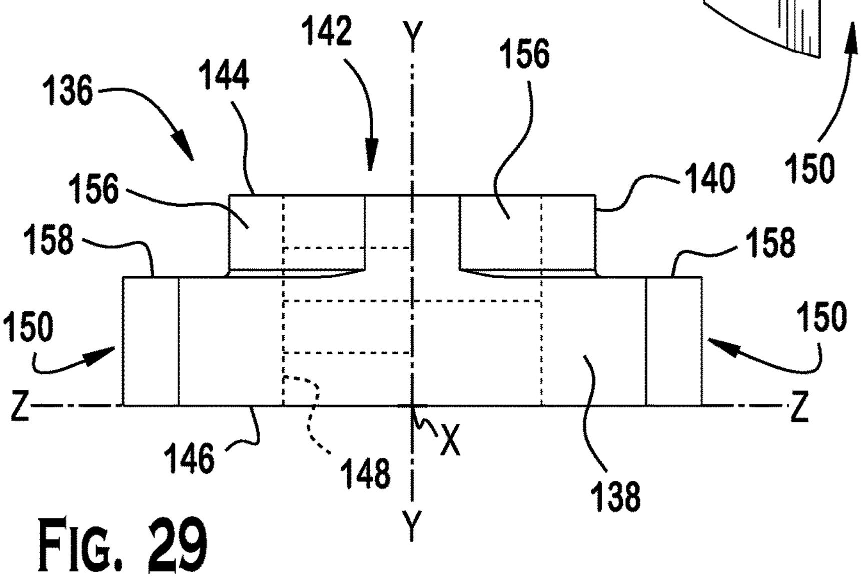
FIG. 29 is a side view of the locking nut of FIG. 27.

FIGS. 27-31 show another embodiment of a T-nut 136 in accordance with the present invention. The T-nut is shown with a three dimensional Cartesian coordinate system. In this embodiment, the T-nut 136 may include an elongated base 138 and a cylindrical head (or shoulder) 140. The elongated base may have a longitudinal axis along the z-axis. The cylindrical head 140 may be centrally positioned on the elongated base 138. A bore 142 may extend from a top surface of the cylindrical head 144 to the bottom 146 of the elongated base 146. The bottom 146 of the elongated base may lie in the x-z plane. The bore 142 may have a central axis along the y-axis. The bore 142 may include screw threads 148 which are configured and dimensioned to mate with screw threads 92 on a fastener 78 (see e.g., FIG. 14). Each end of the elongated base 138 may include a notch 150. Each notch 150 may be aligned with the center of the bore. Referring to FIG. 28, the cylindrical head 140 of the T-nut may possess a rounded square profile perpendicular to the axis of the bore. The rounded square profile 152 may include four straight sidewall segments 154 and four curved sidewall segments 156.

Figure 30:
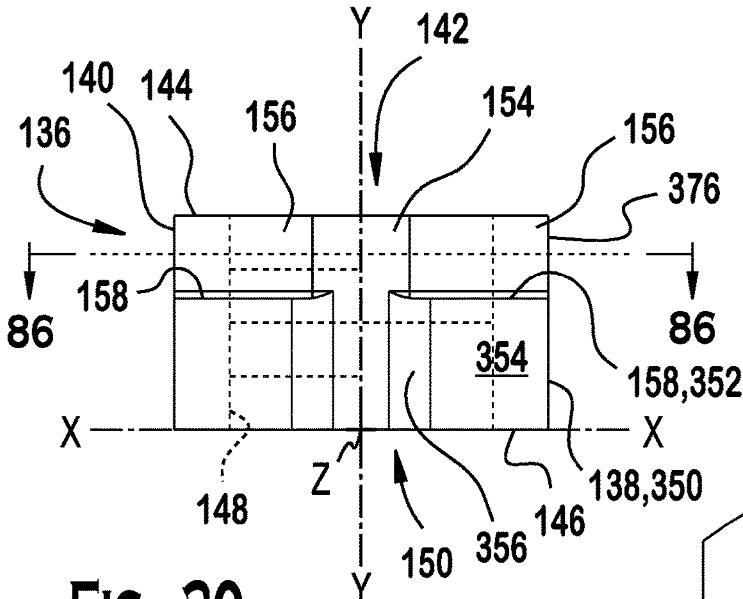
FIG. 30 is a front view of the locking nut of FIG. 27.
Figure 31:
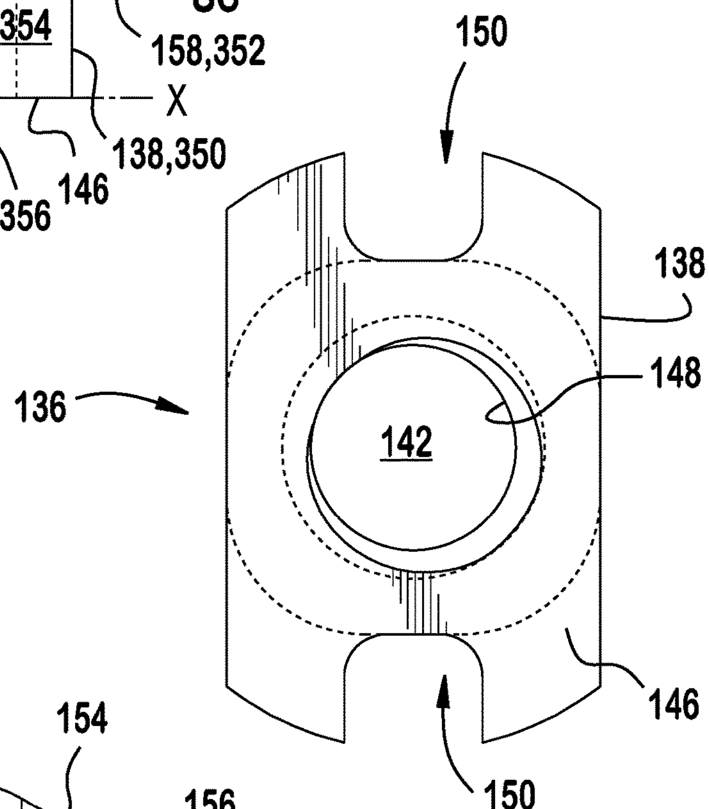
FIG. 31 is a bottom view of the locking nut of FIG. 27.
Figure 32:
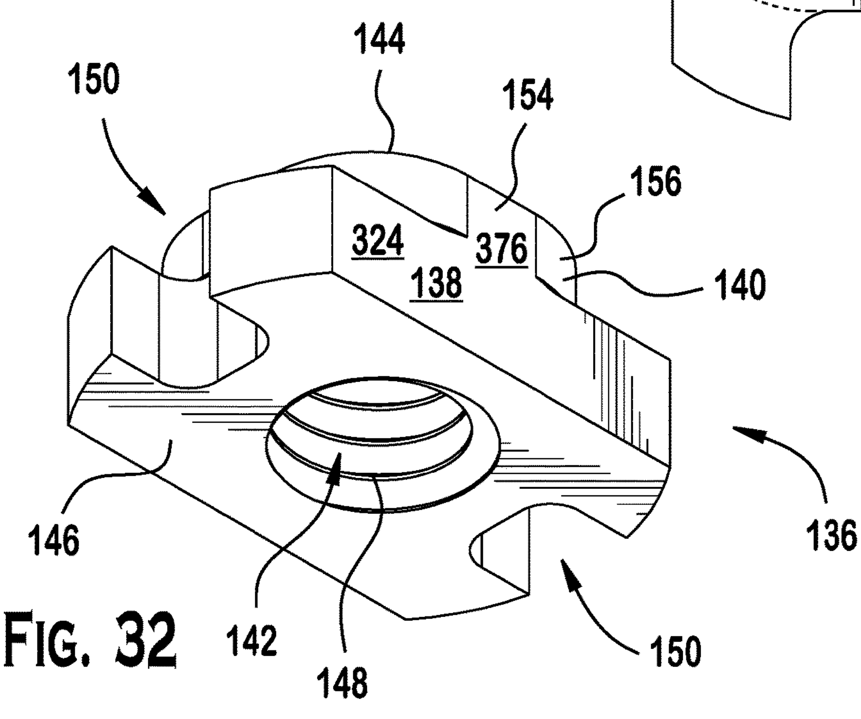
FIG. 32 is a bottom perspective view of the locking nut of FIG. 27.

Referring to FIG. 27, the elongated base 138 may include a bottom or lower surface 146. Further, the elongated base may include a first side 350 near the lower surface 146, a second side 352 near the first side 350, and a third side 354 near the first side 350 and the second side 352. Referring to FIG. 27 and FIG. 30, the elongated base 138 may include a notch 150. The notch 150 may include a first interior sidewall 356 which extends from the second side 352 to the lower surface 146 of the elongated base.

The T-nut 136 may further include a shoulder 140 next to the elongated base 138. The shoulder 140 may have a longitudinal axis along the y-axis. The shoulder 140 may include a first sidewall-segment 376 near the first side 350 of the elongated base 136. The shoulder further may include an end surface 144. A bore 142 may extend from the end surface 144 to the lower surface 146. The bore may include a screw thread 148 for receiving a mating fastener.

Figure 86:
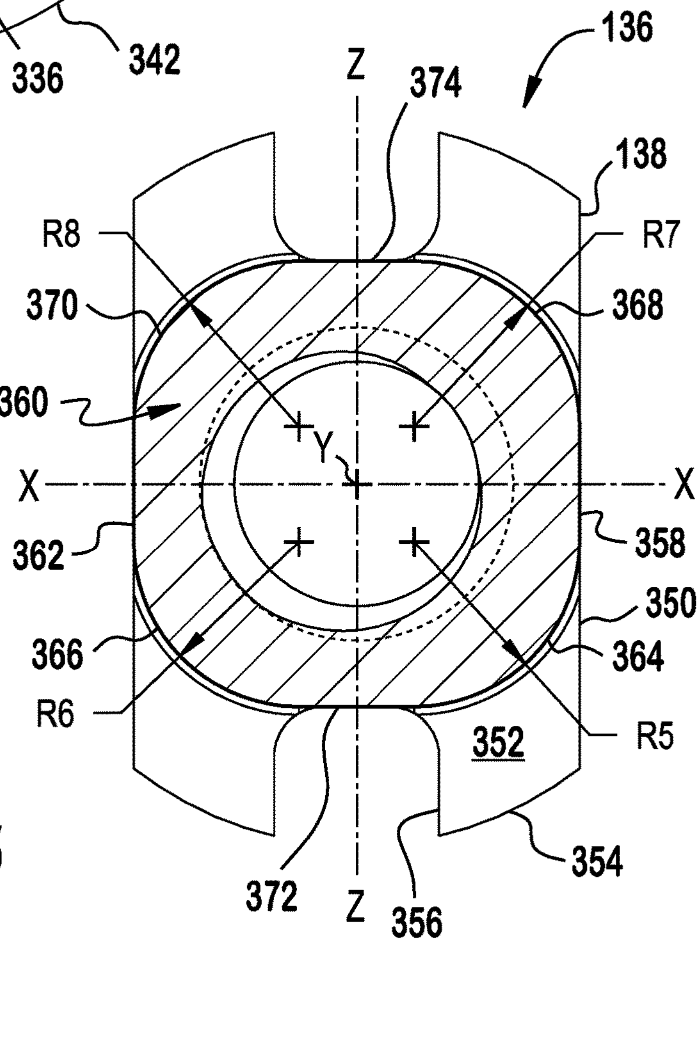
FIG. 86 is a cross-sectional view of FIG. 30 along line 86-86.

Referring to FIG. 86, the T-nut 136 may include a cross-sectional profile 360 normal to the y-axis. The cross-sectional profile 360 may include a first straight wall segment 358 next to the first side 350 of the elongated base 136. The cross-sectional profile 360 may include a second straight wall segment 362 spaced from the first straight wall segment 358. A first curved wall segment 364 may be disposed between the first straight wall segment 358 and the second straight wall segment 362.

A second curved wall segment 366 may be disposed between the first straight wall segment 358 and the second straight wall segment 362. The first curved wall segment 364 may possess a first radius of curvature R5 and the second curved wall segment 366 may possess a second radius of curvature R6. The first radius of curvature R5 may be substantially equal to the second radius of curvature R6.

The cross-sectional profile 360 may further include a third curved wall segment 368 abutting the first straight wall segment 358, as well as a fourth curved wall segment spaced 370 from the first straight wall segment 358. The third curved wall segment 368 may possess a third radius of curvature R7 and the fourth curved wall segment 370 may possess a fourth radius of curvature R8. The first radius of curvature R5 may be substantially equal to the third radius of curvature R7. Illustrative approximate values for the dimensions disclosed in FIG. 86 are presented in in Table 3. Other feature configurations or dimensions are contemplated, however, and may be implemented in other embodiments.

TABLE 3

Exemplary Dimensions for a Second Embodiment of an Interior Fastener

| Dimension | Length (Inches) |
|---|---|
| R5 | 0.100 |
| R6 | 0.100 |
| R7 | 0.100 |
| R8 | 0.100 |

The cross-sectional profile 360 may further include a third straight wall segment 372 between the first curved wall segment 364 and the second curved wall segment 366. The cross-sectional profile further may include a fourth straight wall segment 374 between the third curved wall segment 368 and the fourth curved wall segment 370.

The cross-sectional profile 360 may include a first plane of symmetry (e.g., a plane formed by the z-axis and y-axis). The cross-sectional profile 360 further may include a second plane of symmetry (e.g., a plane formed by the x-axis and y-axis).

The T-nut of FIGS. 27-32 may replace the T-nuts shown in FIGS. 6 and 7. Once assembled, however, such an embodiment may operate like the fastener apparatus 18 and accessory 16 of FIGS. 63-76. For example, an operator may insert an appropriate drive tool, such as a hex socket drive, into the drive slot 94 and depress the fastener 78 sufficiently to disengage the T-nut 136 from the guide(s) 68 and tips 70 of the accessory rail 17, 40, and then move the T-nut (including the cylindrical head) 136 through the slot 22 past the locking surface 126 of the handguard 20 (see also, FIGS. 69 and 70). The operator may then rotate the driver approximately 90° (in either direction). Accordingly, the elongated base 138 of the T-nut 136 may be positioned generally perpendicular to the slot 22, and two opposite straight side wall segments 154 on the cylindrical head 140 may be aligned with the slot 22 (see also, FIGS. 71-72). An operator may then release downward pressure on the fastener head 88 to allow the coil spring 102 to bias the cylindrical head 140 into the slot 22 (see also, FIGS. 73-74). Further, this may allow the coil spring 102 to bias the top surface of the elongated base 158 against the locking surface 126. After the T-nut 136 is positioned generally transverse to the slot 22 and two straight sidewall segments 154 of the cylindrical head 140 are positioned in the slot 122, the operator may then advance the fastener 78 into the T-nut 136 to securely clamp (or fix) the accessory rail 17, 40 to the handguard 20 (see also, FIGS. 75-76).

Figure 44:
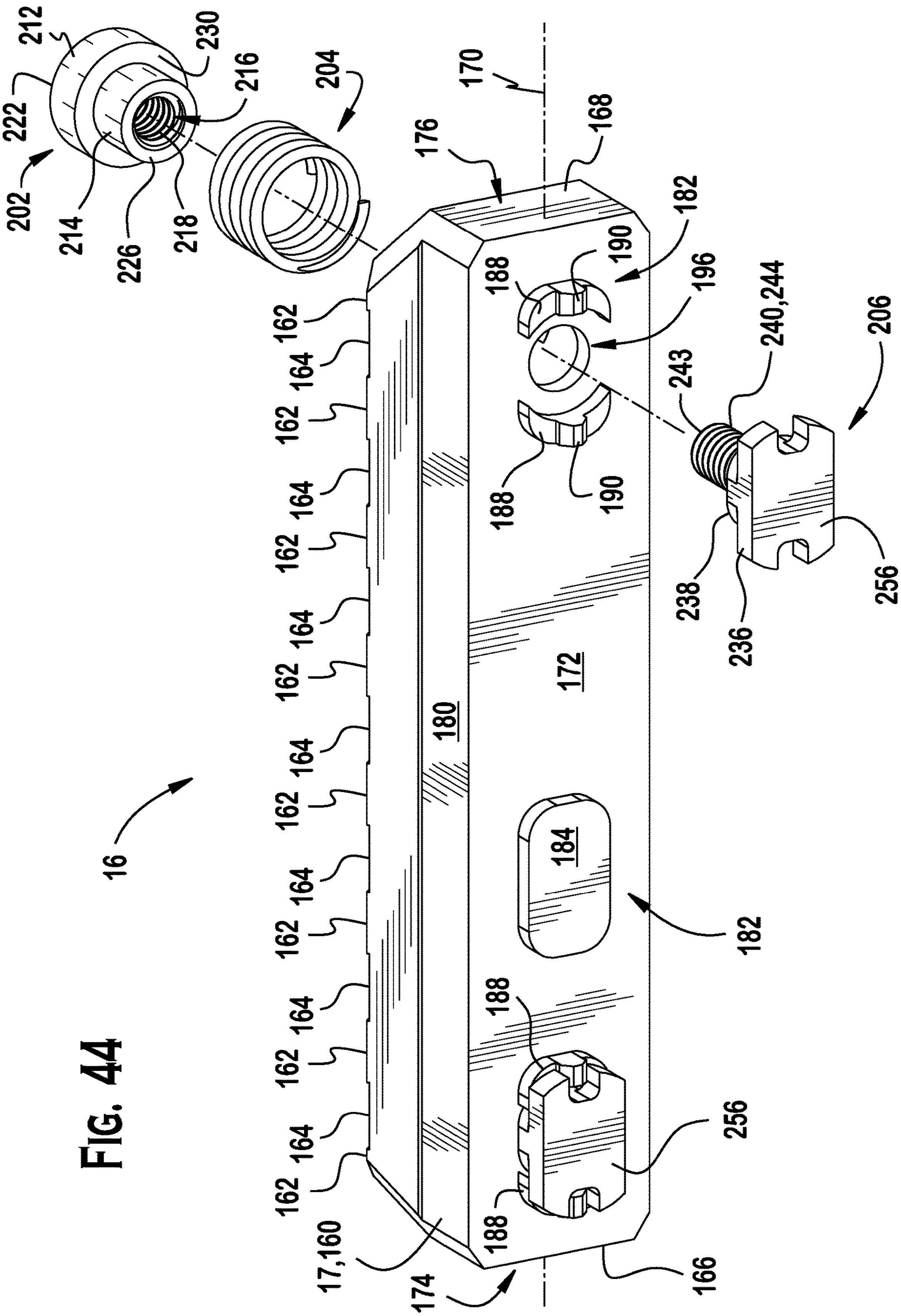
FIG. 44 is a bottom view of the accessory rail and fastener apparatus of FIG. 43.
Figure 45:
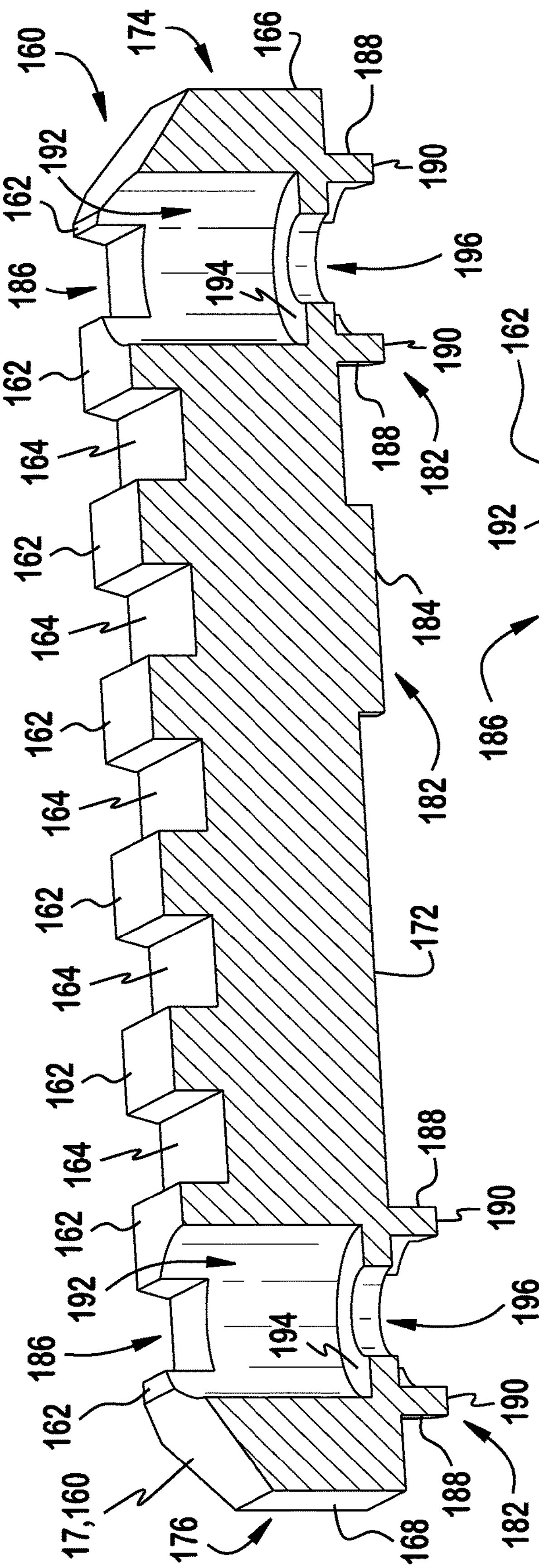
FIG. 45 is a cross-sectional view of the accessory rail of FIG. 43 along line 45-45.

FIGS. 43-46 depict a second exemplary embodiment of an accessory rail 160 in accordance with the present invention. Referring to FIG. 43, the accessory rail 160 may include a top surface 162. The top surface 162 may include plurality of parallel grooves 164. Each of the parallel groves 164 may have a rectangular cross section (see e.g., FIG. 45). Although the accessory rail 160 may comply with MIL-STD-191, the rail 160 may conform to other mounting rail standards or form any shape or configuration which may serve a particular use or application, provided that the accessory rail 160 may be secured to a slotted object in accordance with the present invention. Referring to FIGS. 43 and 44, the accessory rail 160 further may include a distal end 166 and a proximal end 168. Additionally, the accessory rail 160 may possess a longitudinal axis 170 extending from the distal end 166 to the proximal end 168. The distal end 166 and the proximal end 168 may be flat surfaces. Referring to FIG. 45, the distal end surface 174 and the proximal end surface 176 may be parallel surfaces.

Figure 46:
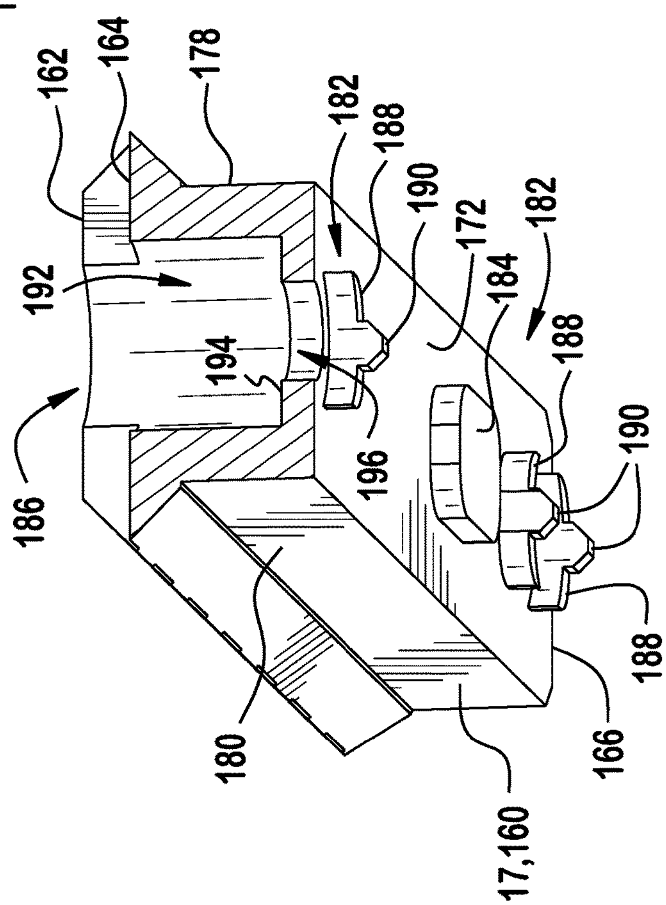
FIG. 46 is a cross-sectional view of the accessory rail of FIG. 43 along line 46-46.

As shown in FIGS. 44, 45 and 46, the accessory rail 160 may include a bottom surface 172. Referring to FIG. 46, the accessory rail 160 further may include a right side surface 178 and a left side surface 180. The right side surface 178 and the left side surface 180 may each extend between the top surface 162 and the bottom surface 172. As shown in FIGS. 44-46, although the bottom surface 172 generally may be flat and smooth, the bottom surface 172 may include one or more raised features 182. For example, referring to FIG. 45, the bottom surface 172 may include a projection 184 located between the two fastener receiving holes 186. The projection 184 may be aligned with the fastener receiving holes 186. Additionally, each of the fastener receiving holes 186 may include one or more guides 188. Referring to FIGS. 44-46, each guide 188 may be a curved wall. Further, the curved wall may be crescent shaped. The guides 188 may include a tip or crest 190. The tips 70 may be aligned with the longitudinal axis 170 of the accessory rail 160.

Referring to FIG. 45, the accessory rail 160 may include a fastener receiving hole 186 adjacent the distal end 166. Also, the accessory rail 160 may include a fastener receiving hole 186 adjacent to the proximal end 168. The fastener receiving holes 168 may be disposed along the longitudinal axis 170. Referring to FIGS. 45 and 46, the fastener receiving holes 186 may extend from the top surface 162 to the bottom surface 172. Each fastener receiving hole 186 may include a counterbore. For example, the fastener receiving hole 186 may include a larger diameter bore 192 extending from the top surface 162 toward the bottom surface 172. The larger diameter bore 192 may include an end wall 194. The end wall 192 may be parallel to the top surface 162. The end wall 192 may be parallel to the bottom surface 172. A smaller diameter bore 196 may extend from the end wall 192 to the bottom surface 172 of the accessory rail 160.

Figure 47:
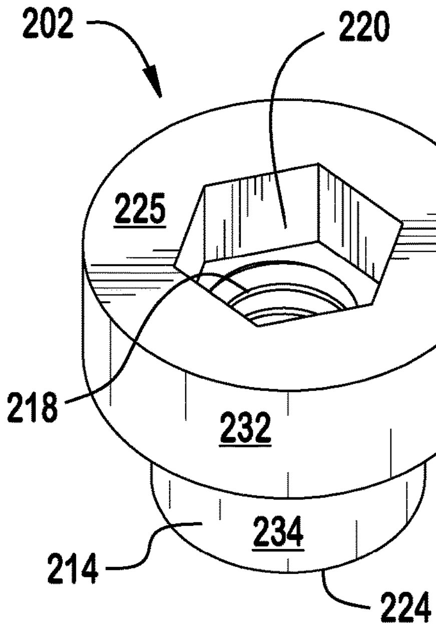
FIG. 47 is a top perspective view of a fastener of the fastener apparatus of FIG. 43.
Figure 48:
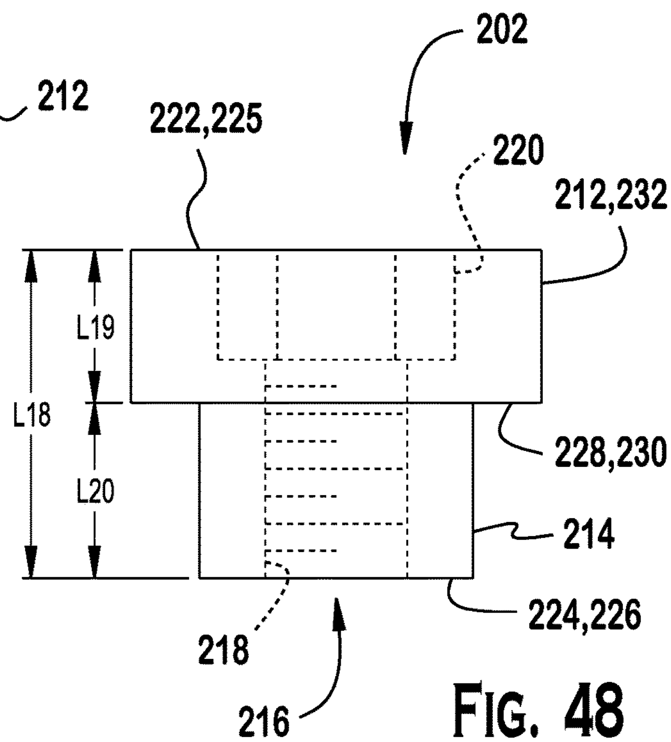
FIG. 48 is a side view of the fastener of FIG. 47.

Referring to FIGS. 43 and 44, another embodiment of a fastener apparatus 200 in accordance with the present invention may include a fastener (e.g., nut) 202, a resilient member (e.g., a coil spring) 204, and a T-bolt 206. Referring to FIGS. 45 and 46, the counterbore 192, 196 and guides 188 next to the smaller diameter bore 196 on the bottom surface 172 may provide a housing 208 (see e.g., FIG. 43) and a seat 210 (see e.g., FIG. 44), respectively for a fastener apparatus 200 in accordance with the present invention. For example, as shown in FIGS. 47-50, the fastener 202 may include a fastener head 212, a spring guide 214, and a central bore 216. The central bore 216 may include screw threads 218. Referring to FIGS. 43 and 44, the fastener 202 may mate with the T-bolt 206. Referring to FIGS. 47 and 48, the fastener head 212 further may include a drive slot 220. The drive slot 220 may be a hex socket. Although the fastener 202 may include a hex socket, any suitable drive socket or shape may be used. For example, the drive slot may be a cross, square, double square or other type.

Referring to FIG. 48, the fastener 202 may include a proximal end 222 and a distal end 224. The proximal end 222 may include a proximal end surface 225. The distal end 224 may include a distal end surface 226. The central bore 216 may extend from the distal end surface 226 toward the proximal end surface 225. The distal end surface 226 of the fastener may be annular. The distal end surface 226 of the fastener may be flat. The drive slot 220 may extend from the proximal end surface 225 toward the distal end surface 226 of the fastener 202. The central bore 216 may terminate in the drive slot 220. Thus, the fastener 202 may have a length $L_{18}$ measured from the proximal end of the fastener 222 to the distal end 226 of the fastener. The fastener 202 may further have a length $L_{19}$ measured from the proximal end surface 222 to the distal end of the fastener head 228. And, the fastener may have a length $L_{20}$ measured from the distal end surface 230 of the fastener head 212 to the distal end surface of the fastener 226. Illustrative values for the dimensions disclosed in FIG. 48 are presented in Table 4. Other feature configurations and dimensions, however, may be implemented in other embodiments.

TABLE 4

Exemplary Dimensions for a Fastener

| Dimension | Length (Inches) |
|---|---|
| L18 | 0.300 |
| L19 | 0.140 |
| L20 | 0.160 |

Figure 49:
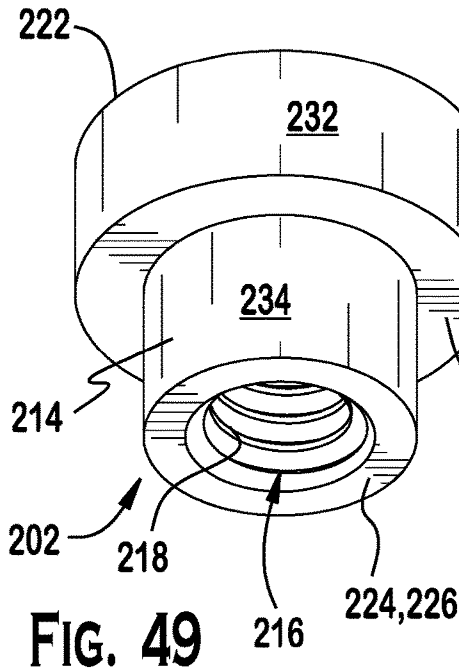
FIG. 49 is a bottom perspective view of the fastener of FIG. 47.
Figure 50:
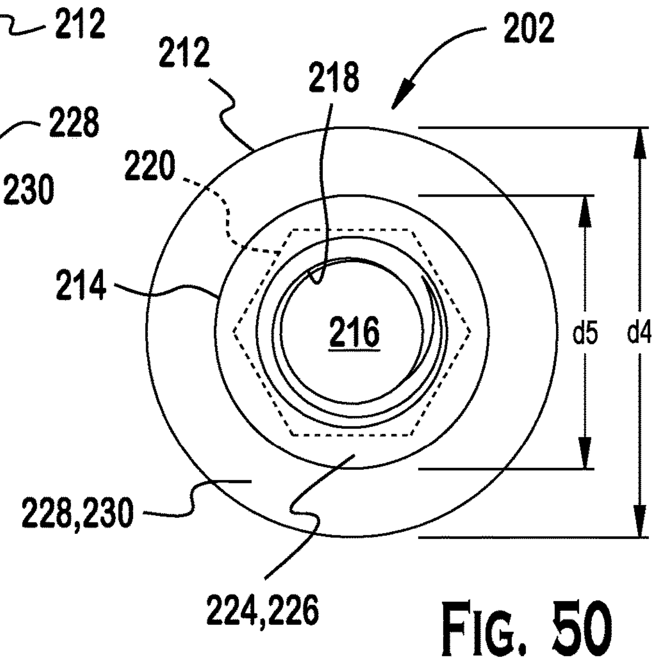
FIG. 50 is a top view of the fastener of FIG. 47.

Referring to FIG. 49, the fastener head 212 may include a distal end 228. The distal end 228 of the fastener head 212 may include a distal end surface 230. A side surface 232 may extend from the proximal end 222 of the fastener 202 to the distal end surface 230 of the fastener head 212. Referring to FIG. 50, the side surface 212 may have a maximum outer dimension, $d_4$. For example, the dimension $d_4$ may be approximately 0.375 inches. The maximum outer dimension of the side surface 212 may be an outer diameter of the fastener head 212. The distal end surface 230 may be annular. The distal end surface 230 may be flat.

Referring to FIG. 49, the spring guide 214 may be disposed between the distal end surface 230 of the fastener head 212 and the distal end surface of the fastener 226. Another side surface 234 may extend from the distal end surface 230 of the fastener head 212 to the distal end surface 226 of the fastener 202. Referring to FIG. 50, the other side surface 234 may have a maximum outer dimension, $d_5$. For example, the dimension $d_5$ may be approximately 0.250 inches. The maximum outer dimension of the other side surface 234 may be an outer diameter of the spring guide 212.

Figure 51:
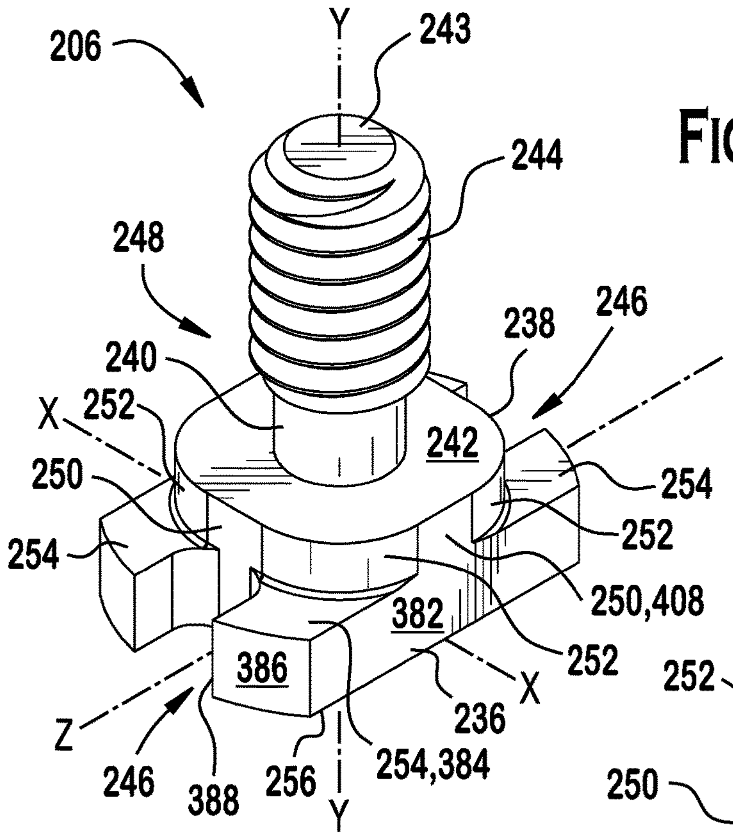
FIG. 51 is a top perspective view of an exemplary locking bolt in accordance with the present invention.
Figure 52:
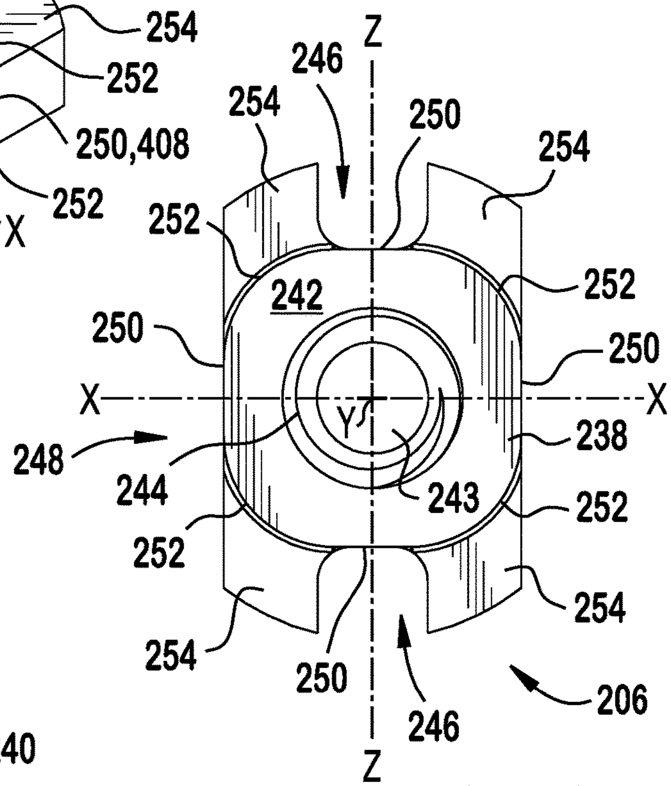
FIG. 52 is a top view of the locking bolt of FIG. 51.

FIGS. 51-56 show an exemplary embodiment of a T-bolt 206 in accordance with the present invention. The T-bolt is shown with a three dimensional Cartesian coordinate system. In this embodiment, the T-bolt 206 may include an elongated base 236 and a cylindrical head (or shoulder) 238. The elongated base 236 may have a longitudinal axis along the z-axis. The cylindrical head 238 may be centrally positioned on the elongated base 236. A shaft 240 may extend from a top surface 242 of the cylindrical head to a proximal end 243. The shaft 240 may have a central axis along the y-axis. The shaft 240 may include screw threads 244 which are configured and dimensioned to mate with screw threads 218 on a fastener 202 (see e.g., FIG. 44). Each end of the elongated base 236 may include a notch 246. Each notch 246 may be aligned with the shaft 240. Referring to FIG. 52, the cylindrical head 238 of the T-bolt 206 may possess a rounded square profile 248 perpendicular to the central longitudinal axis of the shaft 240. The rounded square profile 248 may include four straight sidewall segments 250 and four curved sidewall segments 252.

Figure 53:
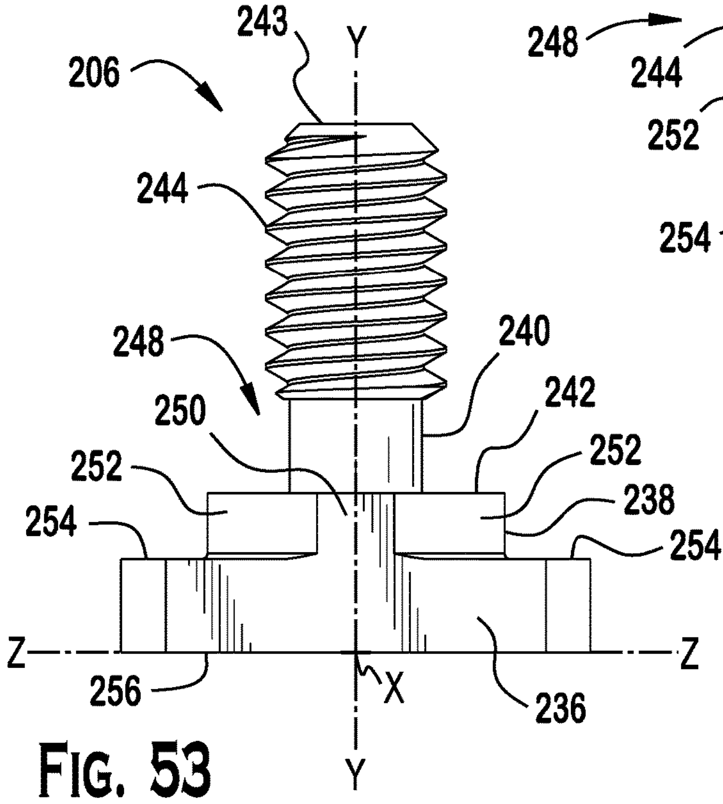
FIG. 53 is a side view of the locking nut of FIG. 51.

Referring to FIG. 53, the T-bolt may include a lower surface 256 of the elongated base 236. The lower surface 256 may be flat and smooth. The lower surface 256 of the elongated base 236 may define a distal end (or bottom) of the T-bolt 206. The lower surface 256 of the elongated base 236 may lie in the x-z plane.

Figure 54:
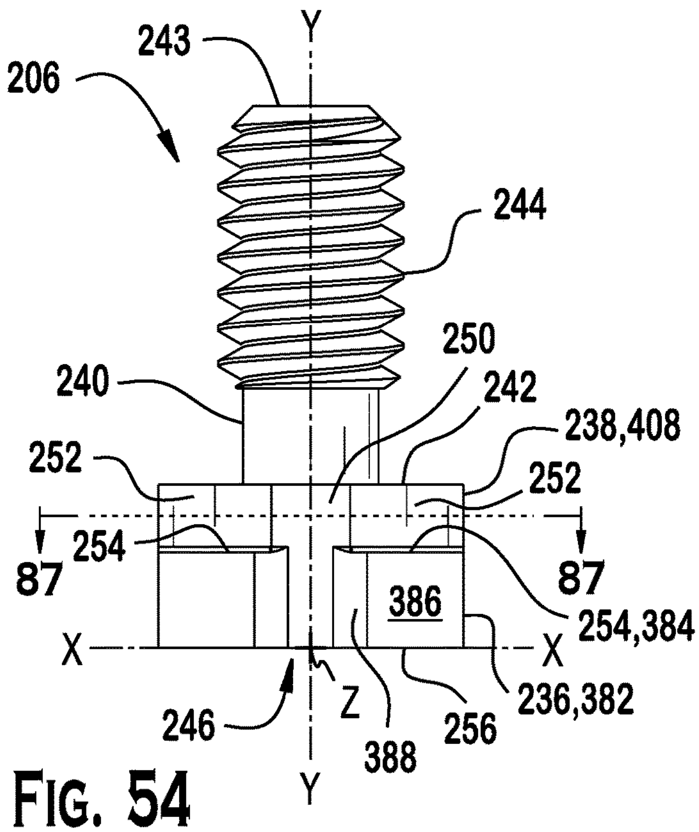
FIG. 54 is a front view of the locking nut of FIG. 51.
Figure 55:
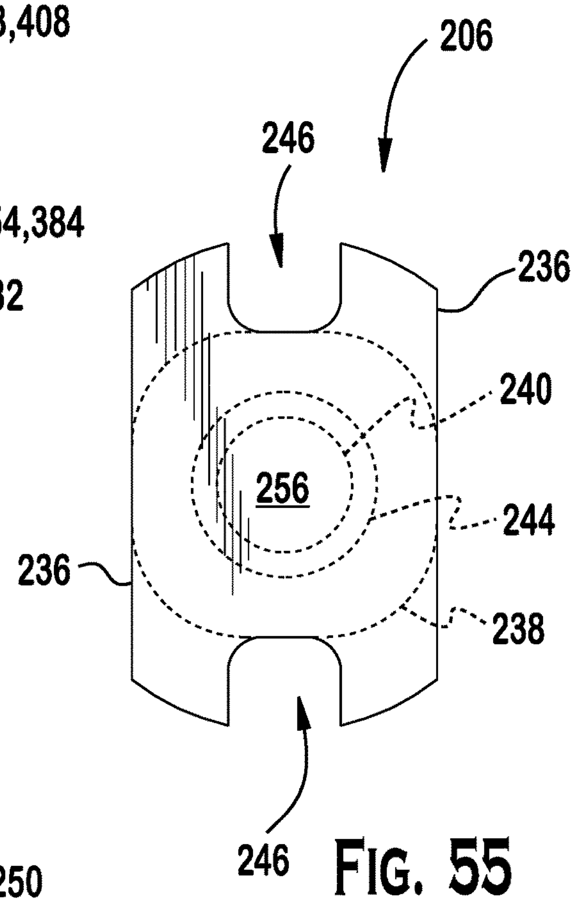
FIG. 55 is a bottom view of the locking nut of FIG. 51.
Figure 56:
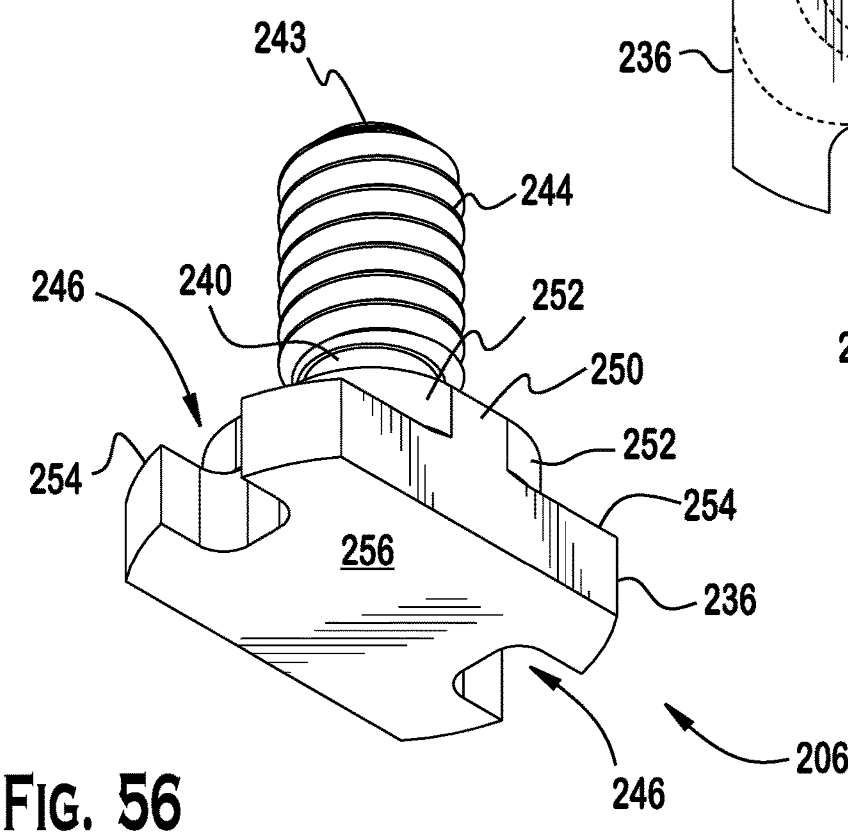
FIG. 56 is a bottom perspective view of the locking nut of FIG. 51.

Referring to FIG. 51, the elongated base 236 may include a bottom or lower surface 256. Further, the elongated base may include a first side 382 near the lower surface 256, a second side 384 near the first side 382, and a third side 386 near the first side 382 and the second side 384. Referring to FIG. 51 and FIG. 54, the elongated base 236 may include a notch 246. The notch 246 may include a first interior sidewall 388 which extends from the second side 382 to the lower surface 256 of the elongated base.

The T-bolt 206 may further include a shoulder 238 next to the elongated base 236. The shoulder 238 may have a longitudinal axis along the y-axis. The shoulder 238 may include a first sidewall-segment 408 near the first side 382 of the elongated base 236. The shoulder further may include an end surface 242. A shaft 240 may extend from the end surface 242. The shaft 242 may include a screw thread 244 for receiving a mating fastener.

Figure 87:
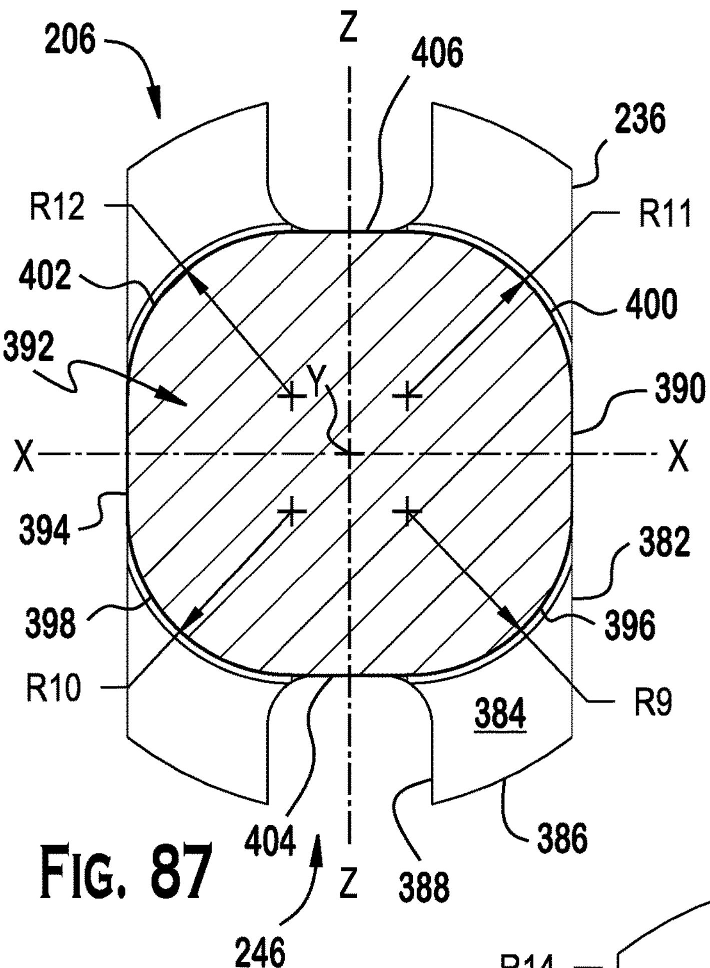
FIG. 87 is a cross-sectional view of FIG. 54 along line 87-87.

Referring to FIG. 87, the T-bolt 206 may include a cross-sectional profile 392 normal to the y-axis. The cross-sectional profile 392 may include a first straight wall segment 390 next to the first side 382 of the elongated base 236. The cross-sectional profile 392 may include a second straight wall segment 394 spaced from the first straight wall segment 390. A first curved wall segment 396 may be disposed between the first straight wall segment 390 and the second straight wall segment 394.

A second curved wall segment 398 may be disposed between the first straight wall segment 390 and the second straight wall segment 394. The first curved wall segment 396 may possess a first radius of curvature R9 and the second curved wall segment 398 may possess a second radius of curvature R10. The first radius of curvature R9 may be substantially equal to the second radius of curvature R10.

The cross-sectional profile 392 may further include a third curved wall segment 400 abutting the first straight wall segment 390, as well as a fourth curved wall segment 402 spaced from the first straight wall segment 390. The third curved wall segment 400 may possess a third radius of curvature R11 and the fourth curved wall segment 402 may possess a fourth radius of curvature R12. The first radius of curvature R9 may be substantially equal to the third radius of curvature R11. Illustrative approximate values for the dimensions disclosed in FIG. 87 are presented in in Table 5. Other feature configurations or dimensions are contemplated, however, and may be implemented in other embodiments.

TABLE 5

Exemplary Dimensions for a Third Embodiment of an Interior Fastener

| Dimension | Length (Inches) |
|---|---|
| R9 | 0.100 |
| R10 | 0.100 |
| R11 | 0.100 |
| R12 | 0.100 |

The cross-sectional profile 392 may further include a third straight wall segment 404 between the first curved wall segment 396 and the second curved wall segment 398. The cross-sectional profile 392 further may include a fourth straight wall segment 406 between the third curved wall segment 400 and the fourth curved wall segment 402.

The cross-sectional profile 392 may include a first plane of symmetry (e.g., a plane formed by the z-axis and y-axis). The cross-sectional profile 392 further may include a second plane of symmetry (e.g., a plane formed by the x-axis and y-axis).

Referring to FIGS. 43 and 44, the lock bolt (or interior fastener) 206 may include a shaft 240 which extends upward through the smaller diameter bore 196 of the accessory rail 160. The shaft 240 further may include a threaded portion 244 near the tip 243 of the shaft. The shaft 240 may include a stem between the threaded portion 244 of the shaft and the cylindrical head 238. The threaded portion 244 of the shaft may mate with a nut (or exterior fastener) 202 which may include a centrally aligned bore 216 having mating screw threads 218. The nut 202 may include a proximal portion or head 212. The proximal end surface 225 of the nut (or exterior fastener) 202 may include a drive slot 220 (see e.g., FIG. 43). The nut 202 further may include a spring guide 214 that extends from the head 212. The bore 216 may extend from the distal end surface 226 to the drive slot 220. The bore 216 may include screw threads 218 which are configured and dimensioned to mate with screw threads 244 on the T-bolt (or interior fastener) 206. Hence, the nut 202 may be a receptacle that receives and couples to the shaft 240 of the lock bolt 206 within a counterbore 192, 196 of the accessory rail 160. The coil spring 204 may be disposed in the larger diameter bore 192 between an end wall 194 of the larger diameter bore 192 and an annular surface (or spring face) 230 on the head 212 of the nut 202. After the fastener apparatus 200 is assembled, the coil spring 204 may bias the lock bolt 206 against the accessory rail 160.

Referring to FIGS. 63-76, the accessory rail 160 may be placed over two adjacent slots 22. One projection 184 and one fastener apparatus 200 may be seated in one slot 22.

Figure 64:
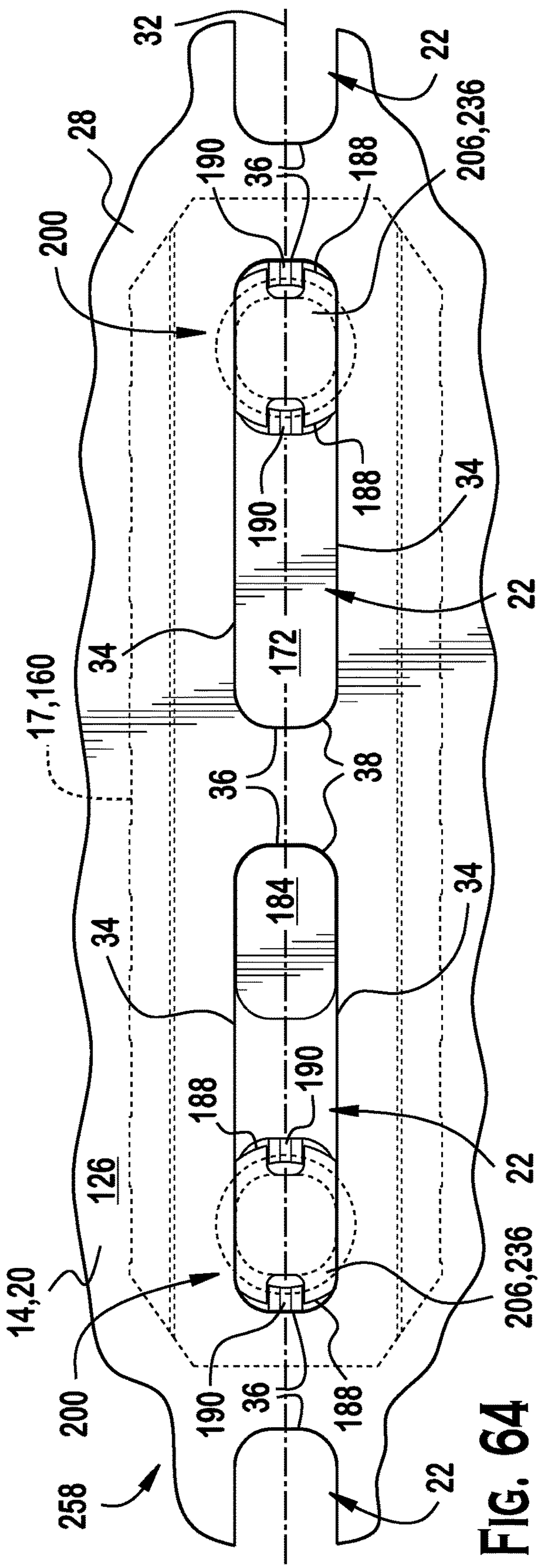
FIG. 64 is a partial view of the accessory interface system of FIG. 63 from the locking surface side of the accessory interface system.

Another fastener apparatus 200 may be seated in the adjacent slot 22. The bottom surface 172 of the accessory rail 140 near the fastener apparatus 200 and projection 184 may be pressed flat against the exterior surface 26 of the handguard 20. More generally, the handguard 20 may be an object 14 that includes an exterior surface 26 (see e.g., FIG. 63) and an interior surface 28 (see e.g., FIG. 64). As shown in FIG. 63, the exterior surface 26 of the rifle handguard 20 near each slot 22 may be a mounting surface 124; whereas, as shown in FIG. 64 the interior surface 28 of the handguard 20 near the slots 22 may be a locking surface 126. The mounting surface 124 and the locking surface 126 may be flat and smooth.

FIGS. 63-64 and 67-68 depict the accessory rail 160 and handguard 20 in a ready configuration 258. In the ready configuration 258, the accessory 16 contacts the mounting surface 124 of the object 14, each lock bolt 206 is seated on the adjacent guides 188, and the elongated base 236 of each respective lock bolt 206 notch 246 is held by a guide crest (or tips) 190 in alignment with the longitudinal axis 32 of the accessory rail 160.

Figure 67:
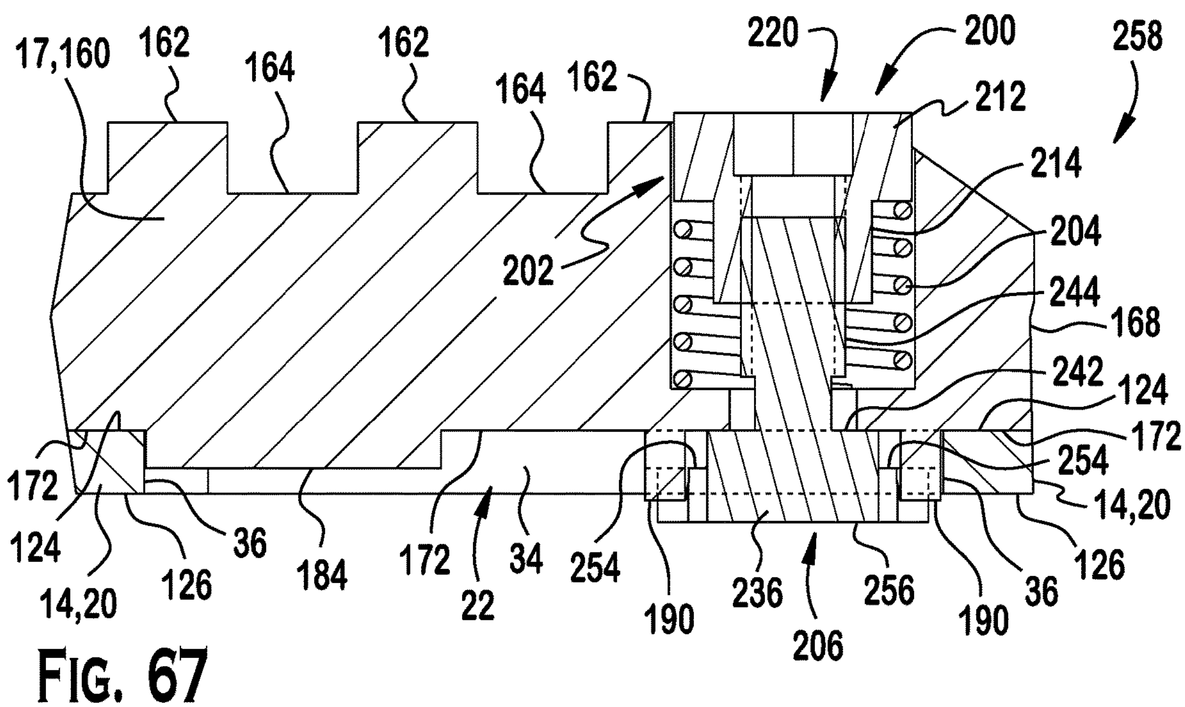
FIG. 67 is a cross-sectional view of the accessory interface system of FIG. 63 along line 67-67.
Figure 68:
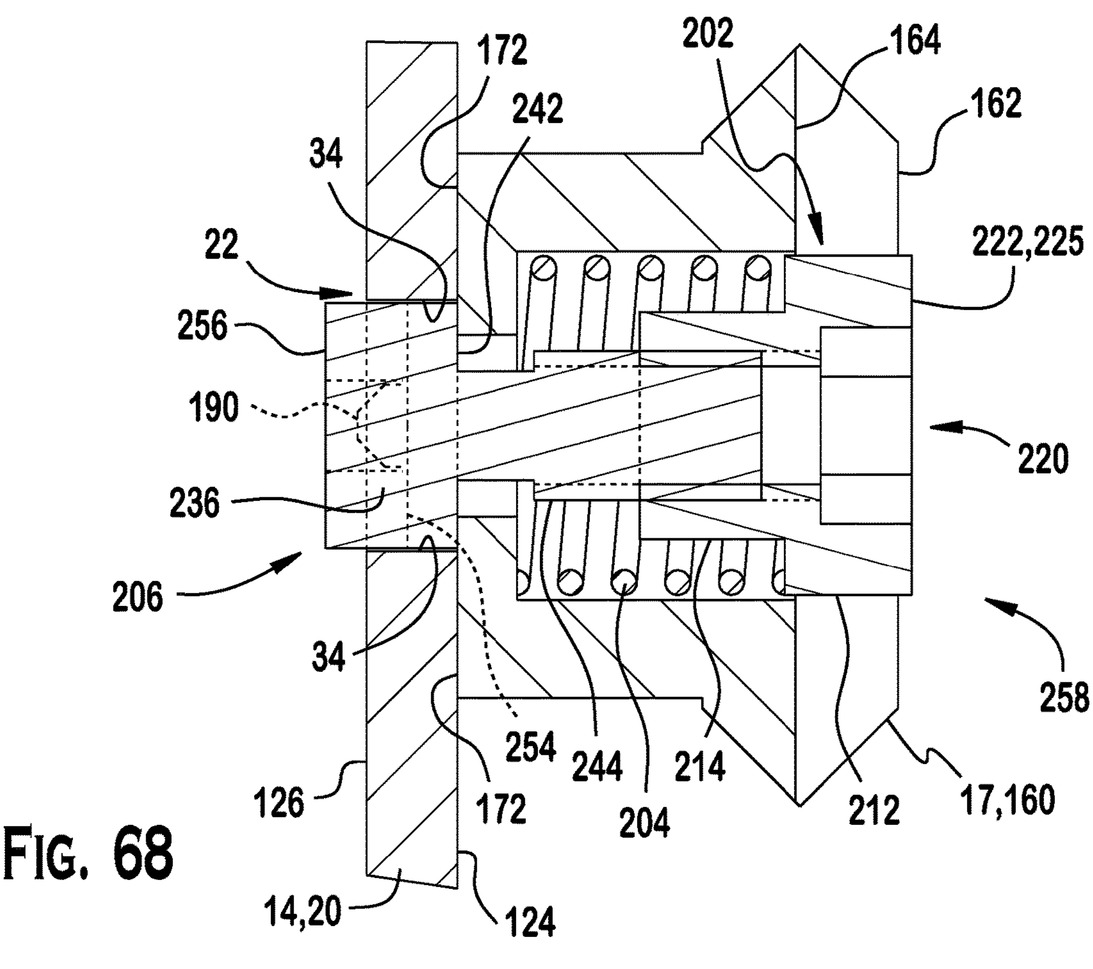
FIG. 68 is a cross-sectional view of the accessory interface system of FIG. 63 along line 68-68.

Referring to FIG. 67 and FIG. 68, the top surface 254 of the elongated base 236 may be situated inside the slot 22. As shown in FIGS. 63 and 64, opposite straight sidewall segments 250 of the cylindrical head (or stud) 238 of each lock bolt 206 may be positioned in the slot 22 adjacent to the slot segments 34 which are aligned with the longitudinal axis 32 of the slot. Referring to FIG. 68, rotation of the lock bolt 206 within the slot 22 may be blocked by contact between the lock bolt 206 (e.g., elongated base 236 and cylindrical head 238) and adjacent slot segments 34.

Figure 69:
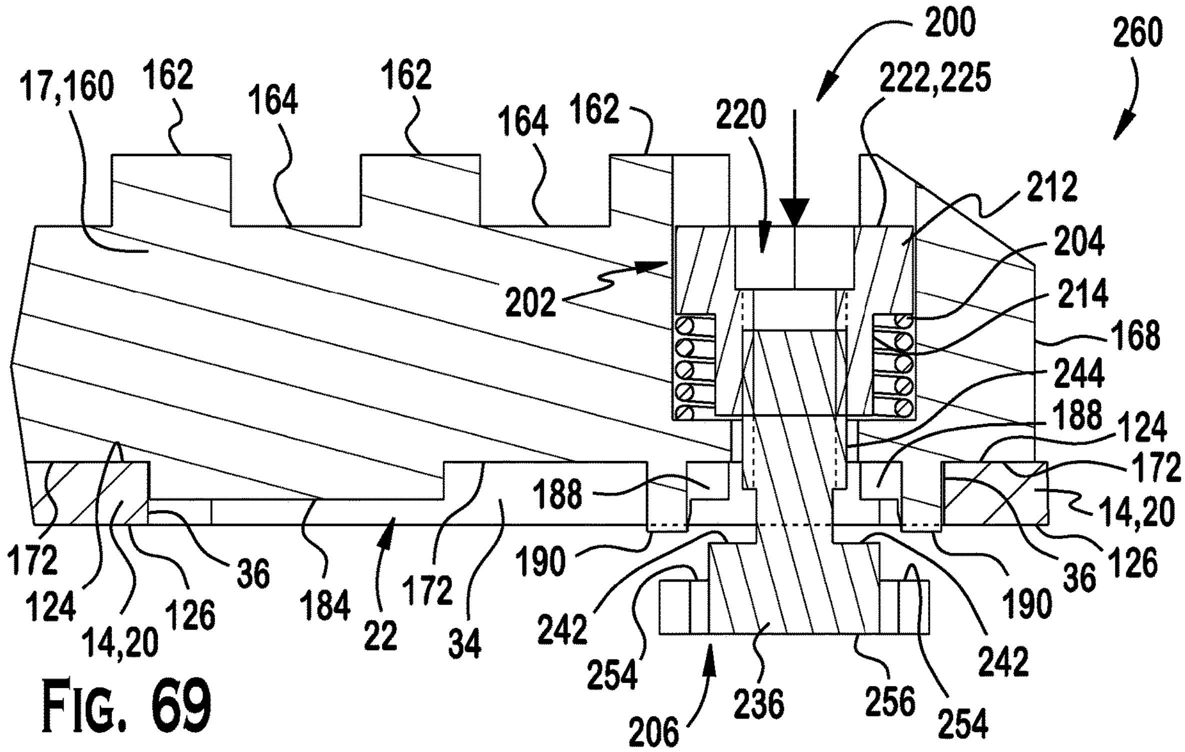
FIG. 69 is another view of the accessory interface system of FIG. 67 in a deployed configuration.
Figure 70:
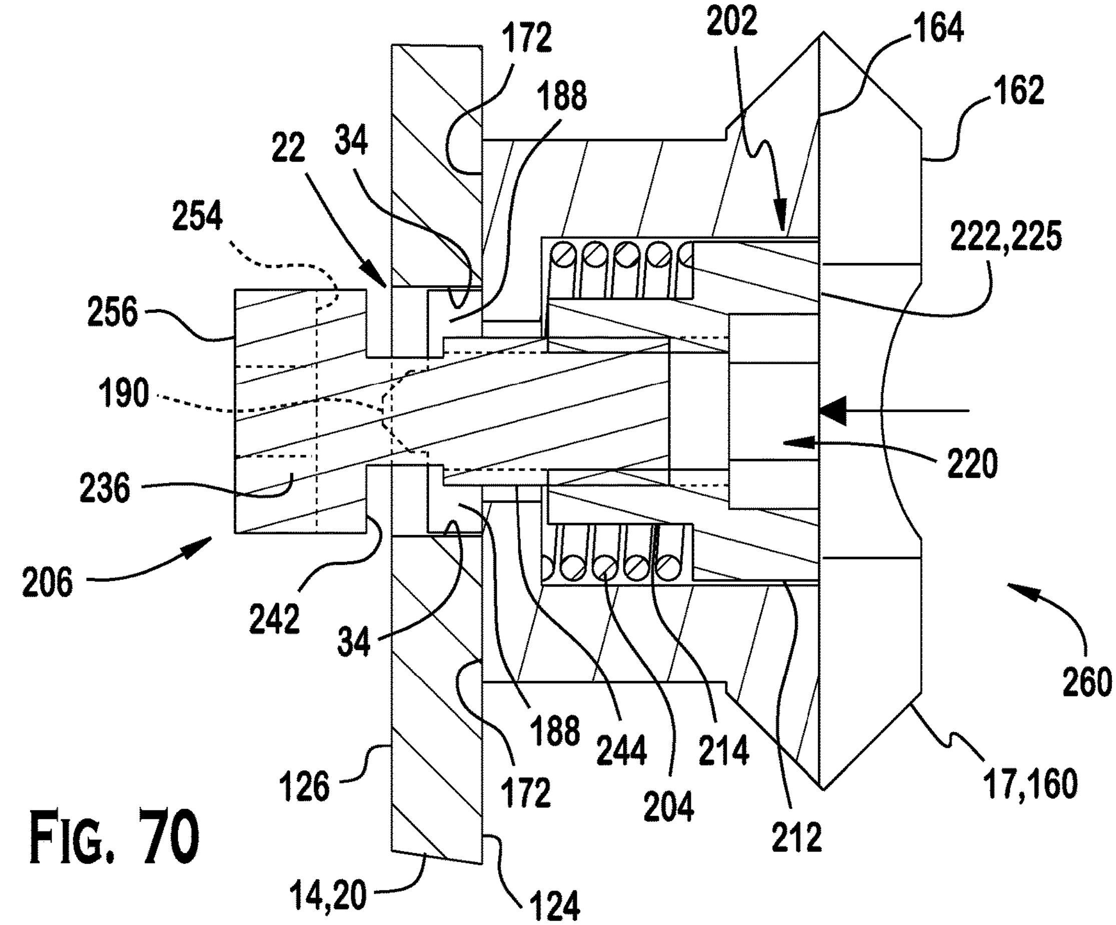
FIG. 70 is another view of the accessory interface system of FIG. 68 in a deployed configuration.

FIGS. 69 and 70 depict the accessory rail 160 and handguard 20 in a released configuration 260. An operator may insert an appropriate drive tool (not shown), such as a hex socket drive, into the drive slot 220 and depress the fastener 202 sufficiently to disengage the lock bolt 206 from the guides 188 and move the elongated base 236 and cylindrical head 238 through the slot 22 past the locking surface 126 of the handguard 20.

Figure 71:
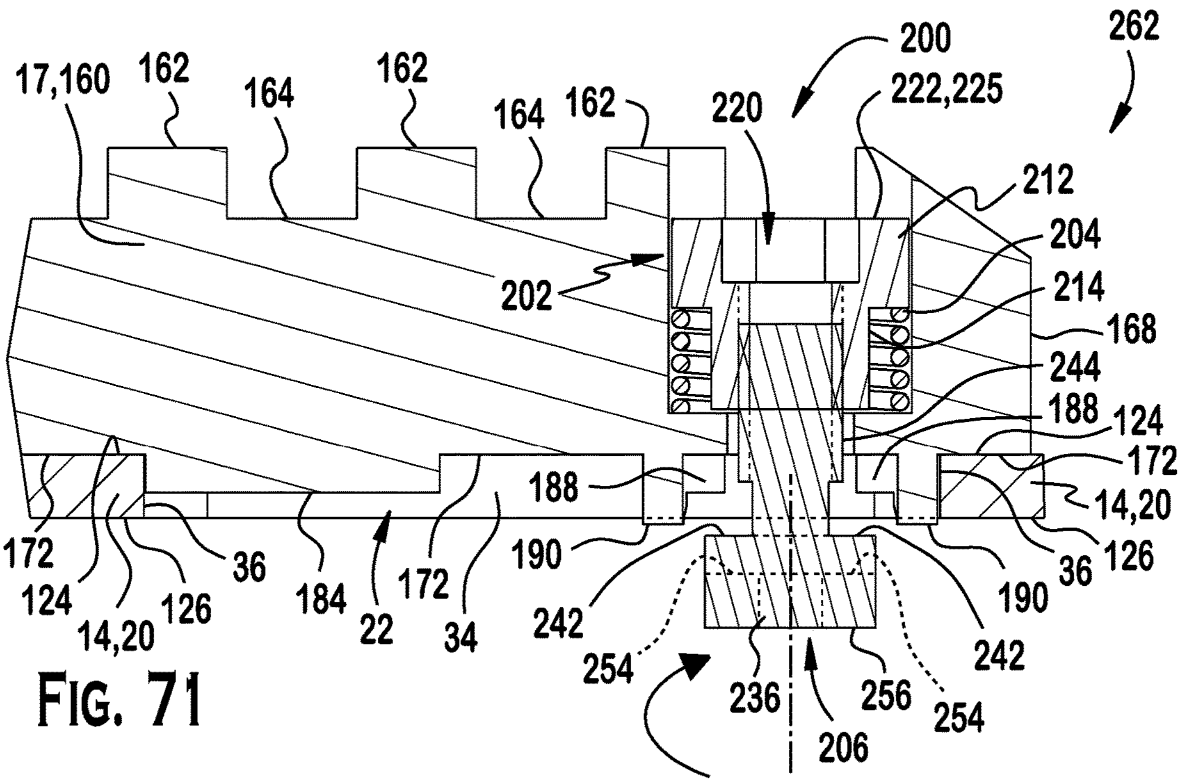
FIG. 71 is a cross-sectional view of the accessory interface system of FIG. 65 along line 71-71.
Figure 72:
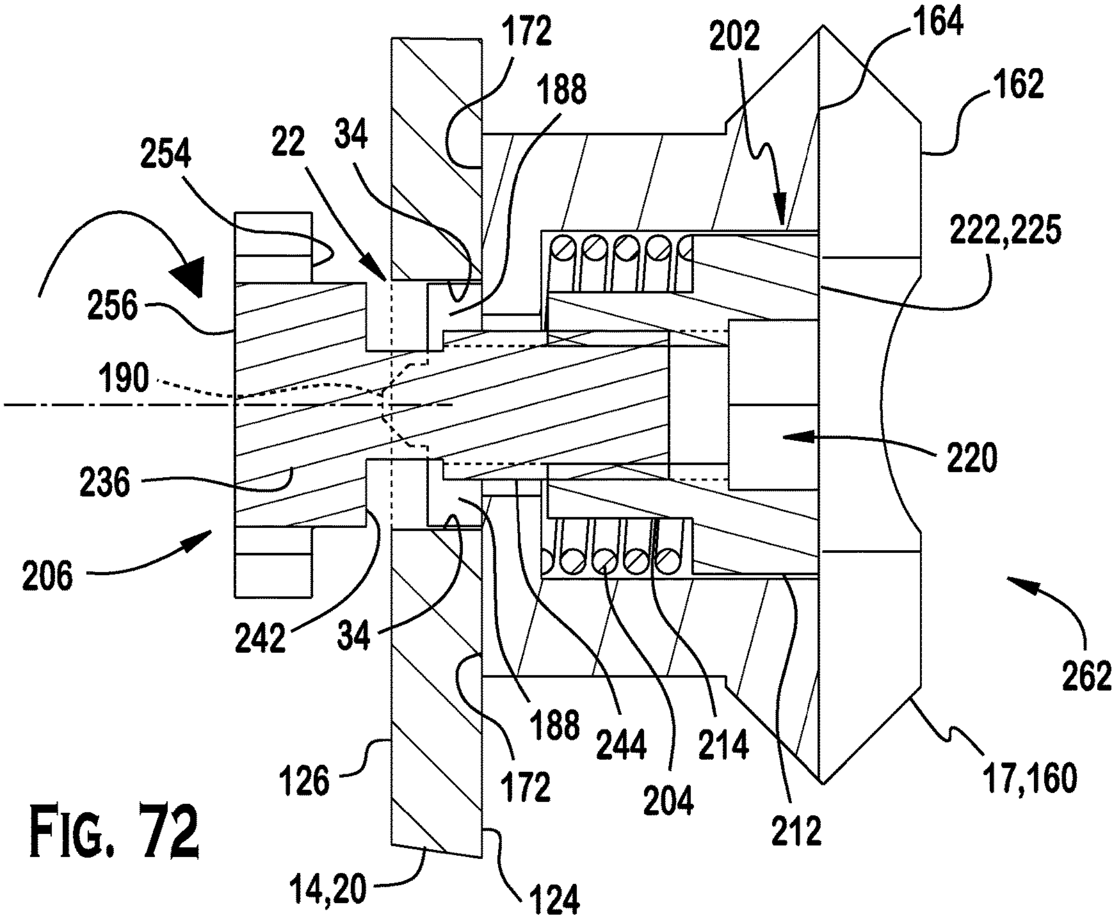
FIG. 72 is a cross-sectional view of the accessory interface system of FIG. 65 along line 72-72.

FIGS. 71 and 72 depict the accessory rail 160 and handguard 20 in a rotated configuration 262. An operator may rotate the drive tool (not shown) to turn the fastener head 212 and lock bolt 206 and change the orientation of the elongated base 236. The fastener head 212 and lock bolt 206 may be rotated until the elongated base 236 is oriented generally perpendicular to the longitudinal axis of the slot 22.

Figure 65:
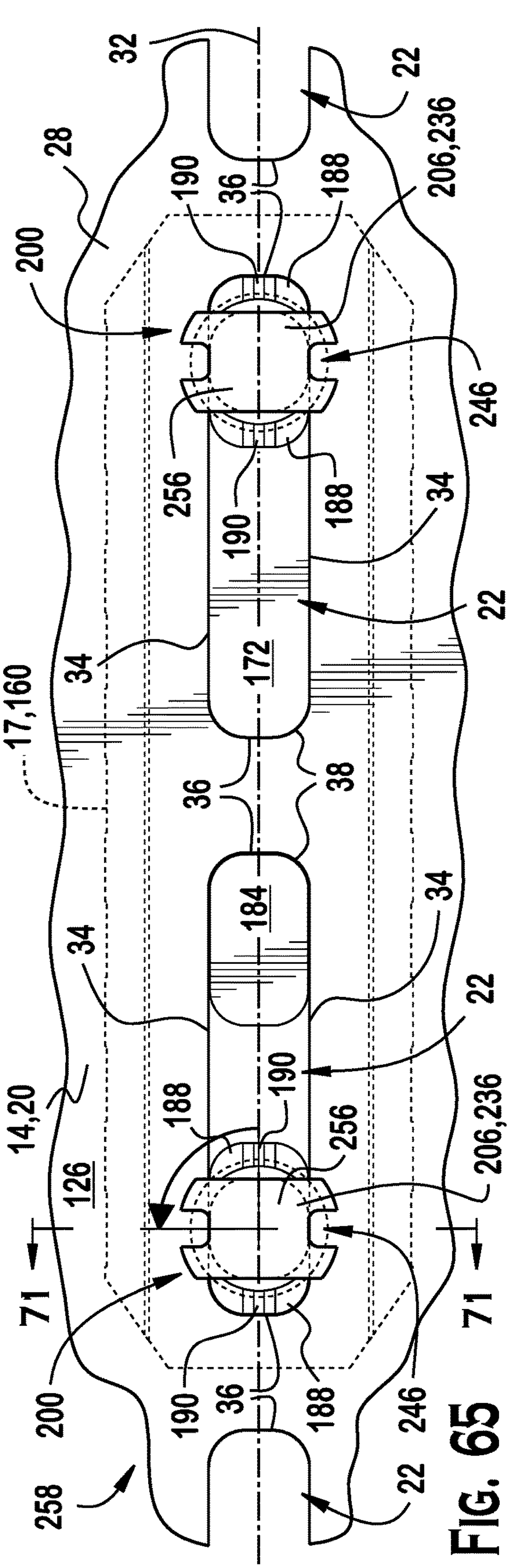
FIG. 65 is another view of the accessory interface system of FIG. 64 in a rotated configuration.
Figure 73:
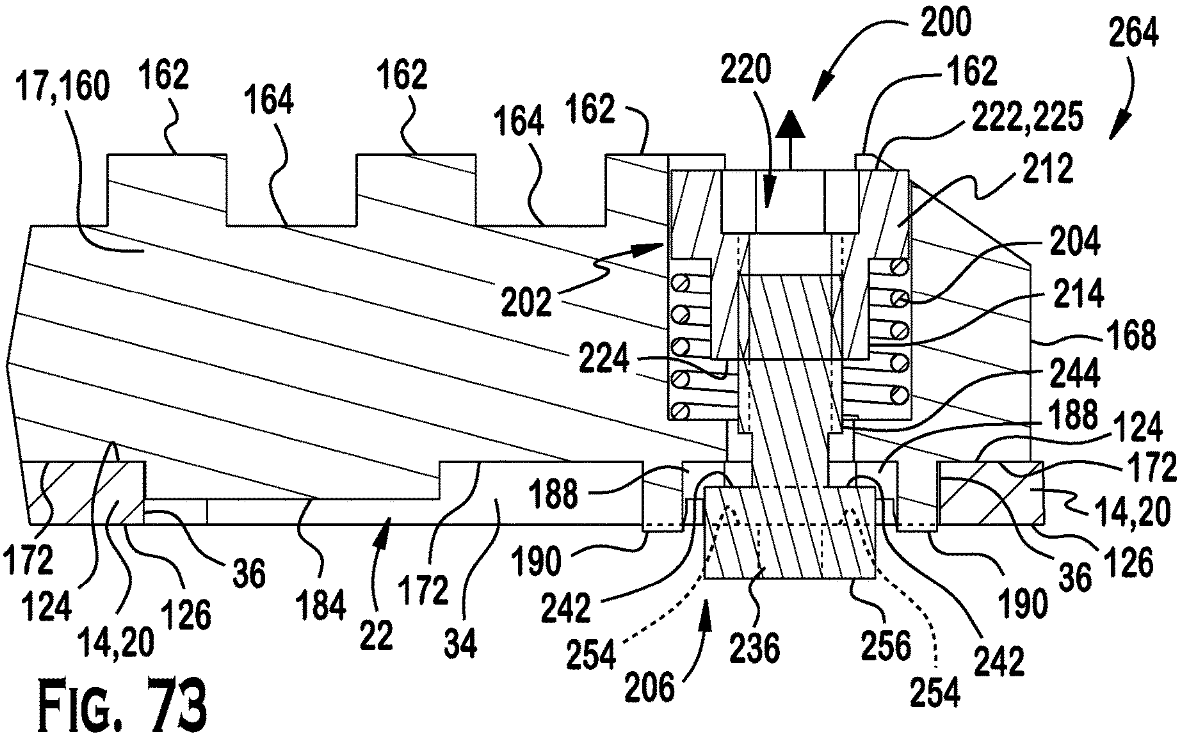
FIG. 73 is another view of the accessory interface system of FIG. 71 in a latched configuration.
Figure 74:
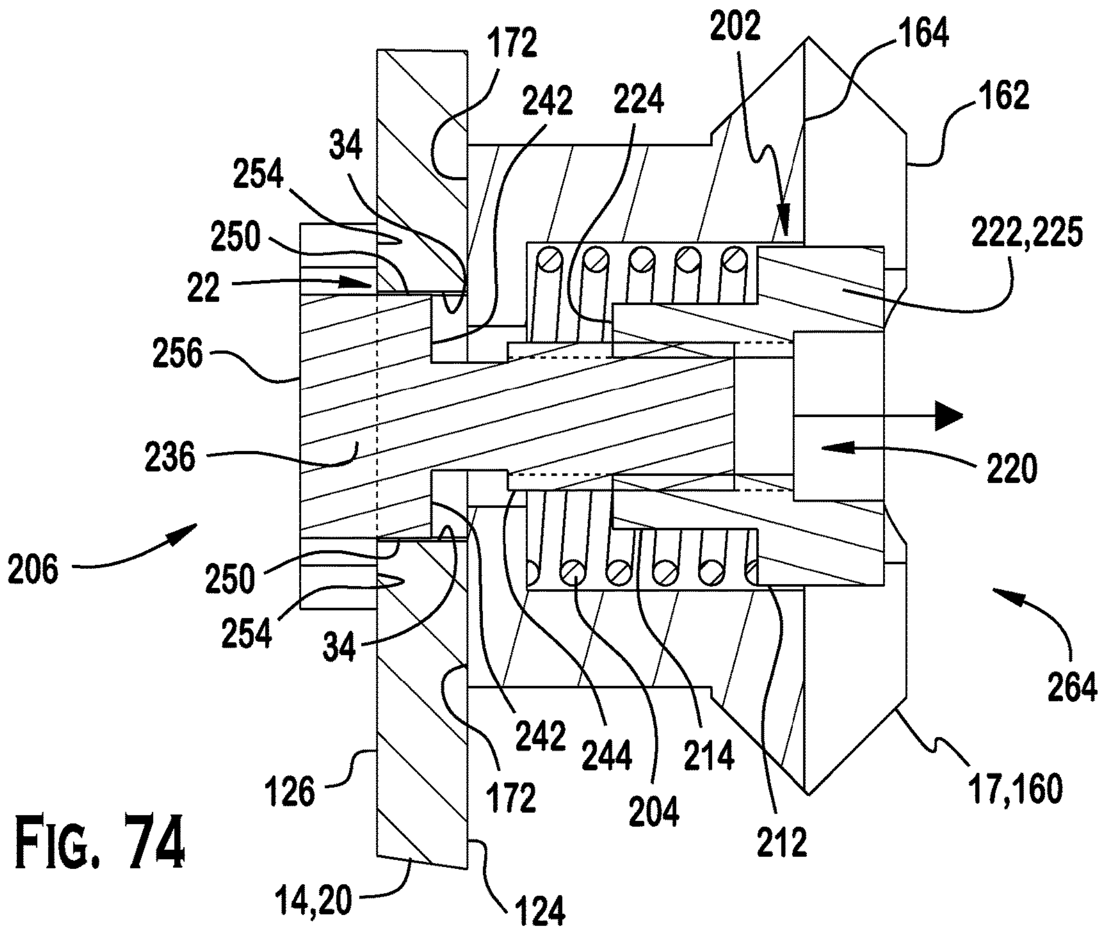
FIG. 74 is another view of the accessory interface system of FIG. 72 in a latched configuration.

FIGS. 65 and 73-74 depict the accessory rail 160 and handguard 20 in a deployed configuration 264. Referring to FIGS. 73 and 74, after the lock bolt 206 has been rotated, the operator may release downward pressure on the fastener head 212 to allow the coil spring 204 to bias the cylindrical head 238 into the slot. Further, this may allow the coil spring 204 to bias the top surface 254 of the elongated base 236 against the locking surface 126.

Figure 66:
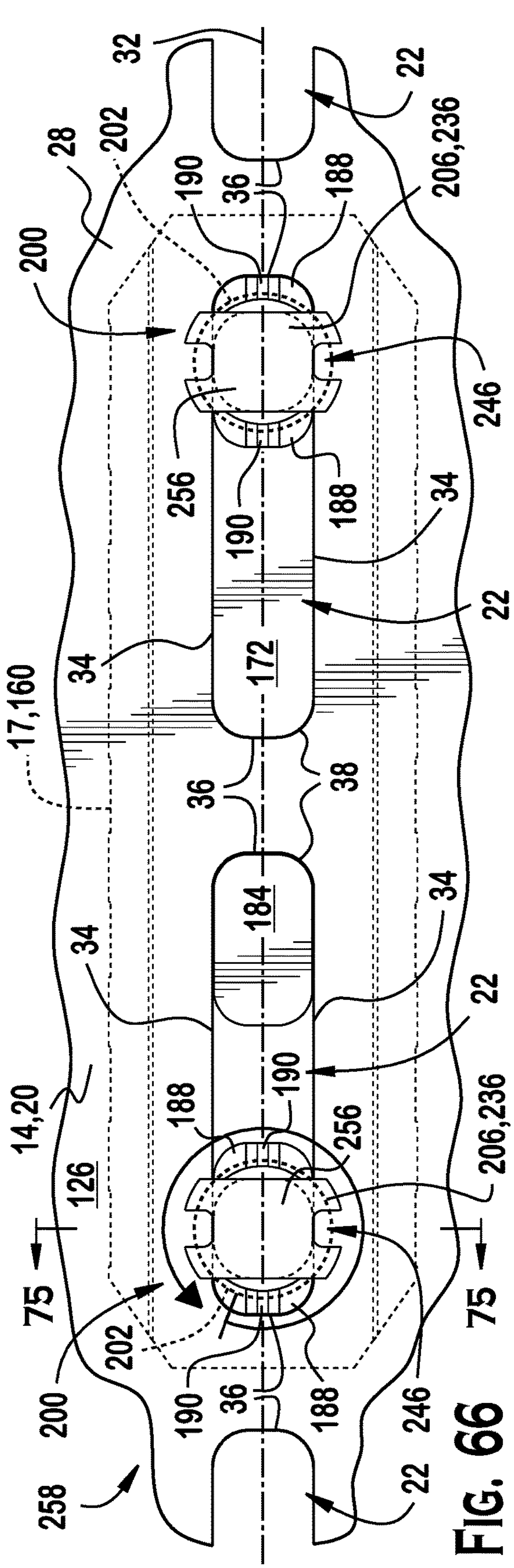
FIG. 66 is another view of the accessory interface system of FIG. 64, in a locked configuration.
Figure 75:
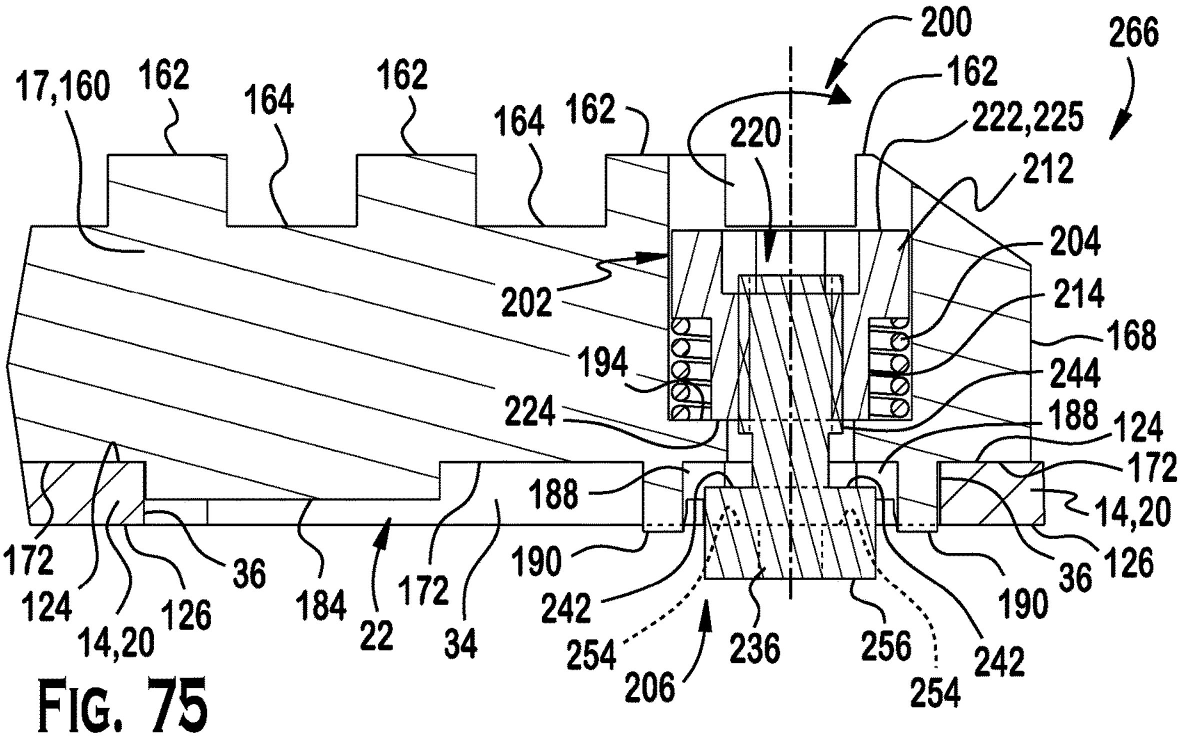
FIG. 75 is a cross-sectional view of the accessory interface system of FIG. 66 along line 75-75.
Figure 76:
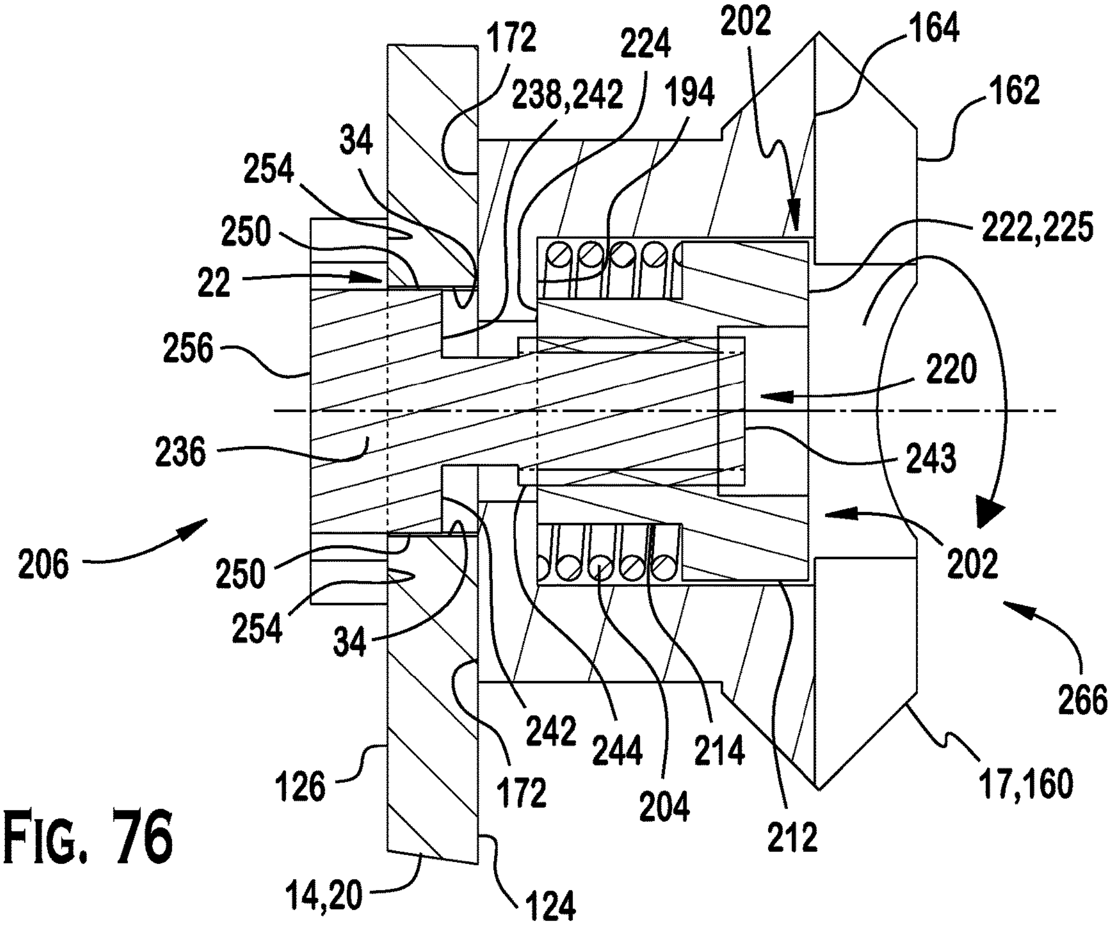
FIG. 76 is a cross-sectional view of the accessory interface system of FIG. 66 along line 76-76.

FIGS. 66 and 75-76 depict the accessory rail 160 in a locked configuration 266. Referring to FIGS. 75-76, after the lock bolt 206 is positioned generally transverse to the slot 22, and two straight sidewall segments 250 of the cylindrical head 238 may be positioned in the slot 22, the top surface 254 of the elongated base 236 may contact the locking surface 126. The operator may then rotate the fastener head 212 with respect to the lock bolt 206, and thereby advance the proximal fastener 202 with respect to the lock bolt 206 to securely clamp (or fix) the accessory rail 160 to the handguard 20. For example, the distal end 224 of the proximal fastener 202 may be fixed to the end wall 194 of the larger diameter bore 192, the bottom surface 172 of the accessory rail 160 may be fixed to the mounting surface 124 of the handguard 20, and the top surface 254 of the elongated base 236 may be fixed to the locking surface 126 of the accessory 20 to clamp the accessory rail 160 to the handguard 20.

Figure 57:
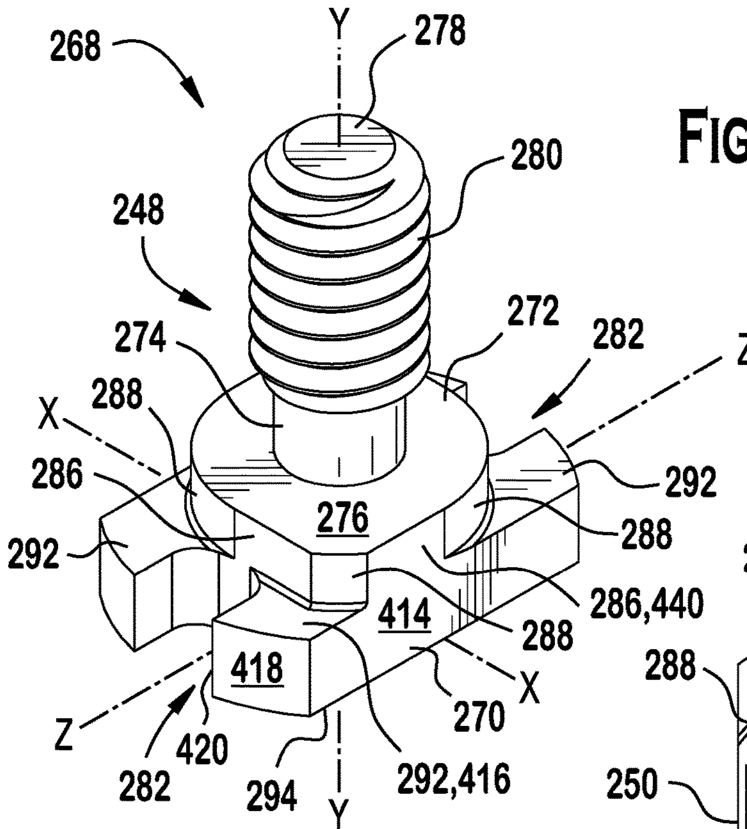
FIG. 57 is a top perspective view of an exemplary T-bolt in accordance with the present invention.
Figure 58:
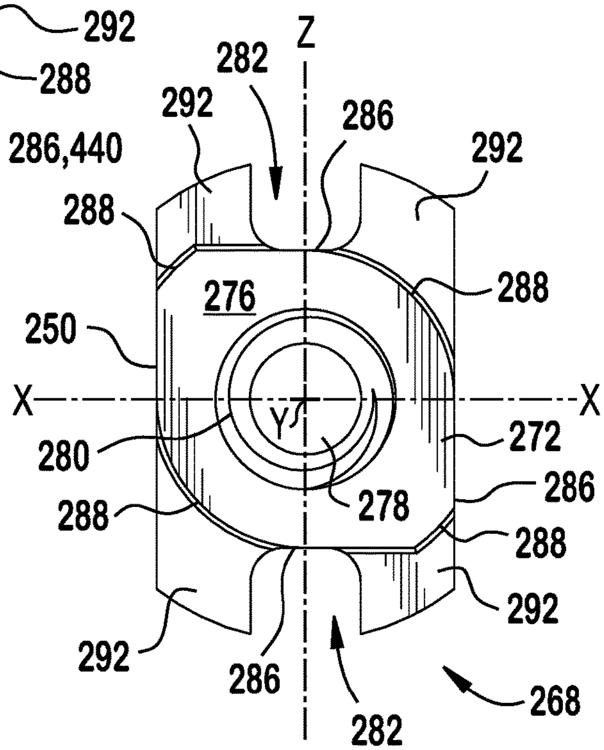
FIG. 58 is a top view of the T-bolt of FIG. 57.
Figure 59:
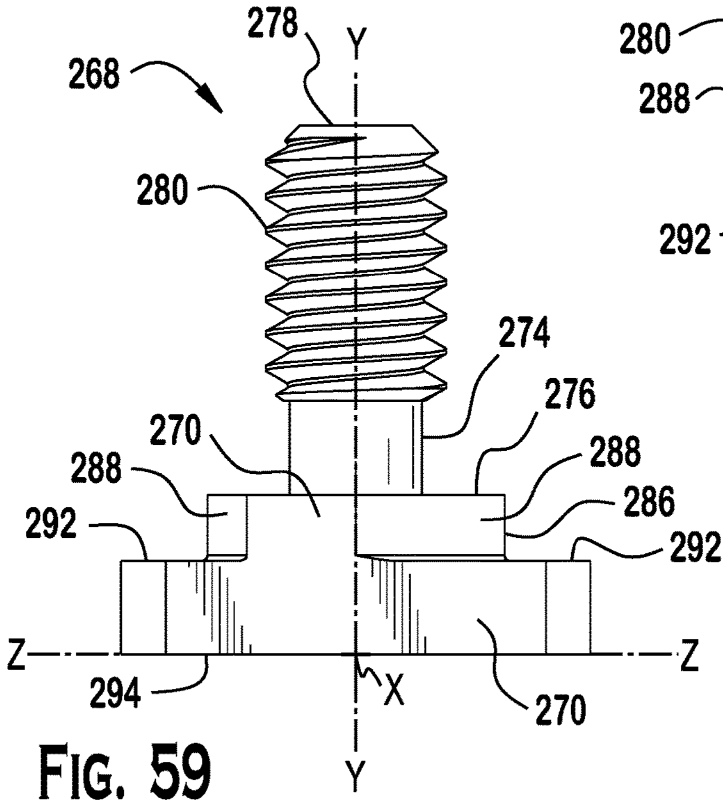
FIG. 59 is a side view of the T-bolt of FIG. 57.

FIGS. 57-62 show another exemplary embodiment of a T-bolt 268 in accordance with the present invention. The T-bolt is shown with a three dimensional Cartesian coordinate system. In this embodiment, the T-bolt 268 may include an elongated base 270 and a cylindrical head or (shoulder) 272. The elongated base 270 may have a longitudinal axis along the z-axis. The cylindrical head 272 may be centrally positioned on the elongated base 270. A shaft 274 may extend from an upper surface 276 of the cylindrical head 272 to a proximal end 278. The shaft 274 may have a central axis along the y-axis. The shaft 274 may include screw threads 280 which are configured and dimensioned to mate with screw threads 218 on a proximal (or exterior) fastener 202 (see e.g., FIG. 47). Each end of the elongated base 270 may include a notch 282. Each notch 282 may be aligned with the center of the shaft 274. Referring to FIGS. 57 and 58, the cylindrical head 272 of the T-bolt 268 may possess a cam profile 284 perpendicular to the central longitudinal axis of the shaft 274. The cam profile 284 may include one or more straight sidewall segments 286 and one or more curved sidewall segments 288. The elongated base 270 of the T-bolt 268 may include an upper surface 292 and a lower surface 294. Thus, the lower surface 294 of the elongated base 270 may lie in the x-z plane.

Referring to FIG. 57, the elongated base 270 may include a bottom or lower surface 294. Further, the elongated base may include a first side 414 near the lower surface 294, a second side 416 near the first side 414, and a third side 418 near the first side 414 and the second side 416. Referring to FIG. 57 and FIG. 60, the elongated base 270 may include a notch 282. The notch 282 may include a first interior sidewall 420 which extends from the second side 416 to the lower surface 294 of the elongated base.

The T-bolt 268 may further include a shoulder 272 next to the elongated base 270. The shoulder 272 may have a longitudinal axis along the y-axis. The shoulder 272 may include a first sidewall-segment 440 near the first side 414 of the elongated base 272. The shoulder further may include an end surface 276. A shaft 274 may extend from the end surface 276. The shaft 274 may include a screw thread 280 for receiving a mating fastener.

Figure 88:
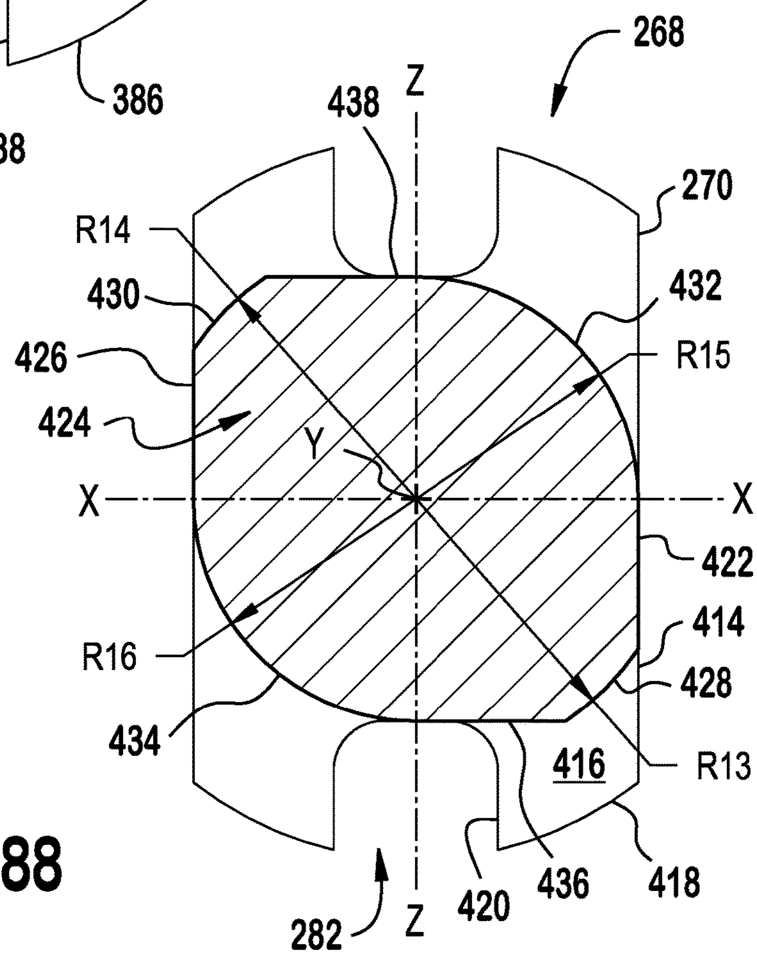
FIG. 88 is a cross-sectional view of FIG. 60 along line 88-88.

Referring to FIG. 88, the T-bolt 268 may include a cross-sectional profile 424 normal to the y-axis. The cross-sectional profile 424 may include a first straight wall segment 422 next to the first side 414 of the elongated base 270. The cross-sectional profile 424 may include a second straight wall segment 426 spaced from the first straight wall segment 422. A first curved wall segment 428 may be disposed between the first straight wall segment 422 and the second straight wall segment 424.

A second curved wall segment 430 may be disposed between the first straight wall segment 422 and the second straight wall segment 426. The first curved wall segment 428 may possess a first radius of curvature R13 and the second curved wall segment 430 may possess a second radius of curvature R14. The first radius of curvature R13 may be substantially equal to the second radius of curvature R14.

The cross-sectional profile 424 may further include a third curved wall segment 432 abutting the first straight wall segment 422, as well as a fourth curved wall segment spaced 434 from the first straight wall segment 422. The third curved wall segment 432 may possess a third radius of curvature R15 and the fourth curved wall segment 434 may possess a fourth radius of curvature R16.

The third radius of curvature R15 may be substantially equal to the fourth radius of curvature R16. And, the first radius of curvature R13 may be substantially unequal to the third radius of curvature R15. For example, the third radius of curvature R15 may be less than the first radius of curvature R13. Illustrative approximate values for the dimensions identified in FIG. 88 are presented in Table 6. Other feature configurations or dimensions are contemplated, however, and may be implemented in other embodiments.

TABLE 6

Exemplary Dimensions for a Fourth Embodiment of an Interior Fastener

| Dimension | Length (inches) |
|---|---|
| R13 | 0.163 |
| R14 | 0.163 |
| R15 | 0.135 |
| R16 | 0.135 |

The cross-sectional profile 424 may further include a third straight wall segment 436 abutting the first curved wall segment 428, as well as a fourth straight wall segment 438 abutting the third curved wall segment 432. The third straight wall segment 436 may abut the fourth curved wall segment 434. Additionally, the fourth straight wall segment 438 may abut the second curved wall segment 430.

Figure 77:
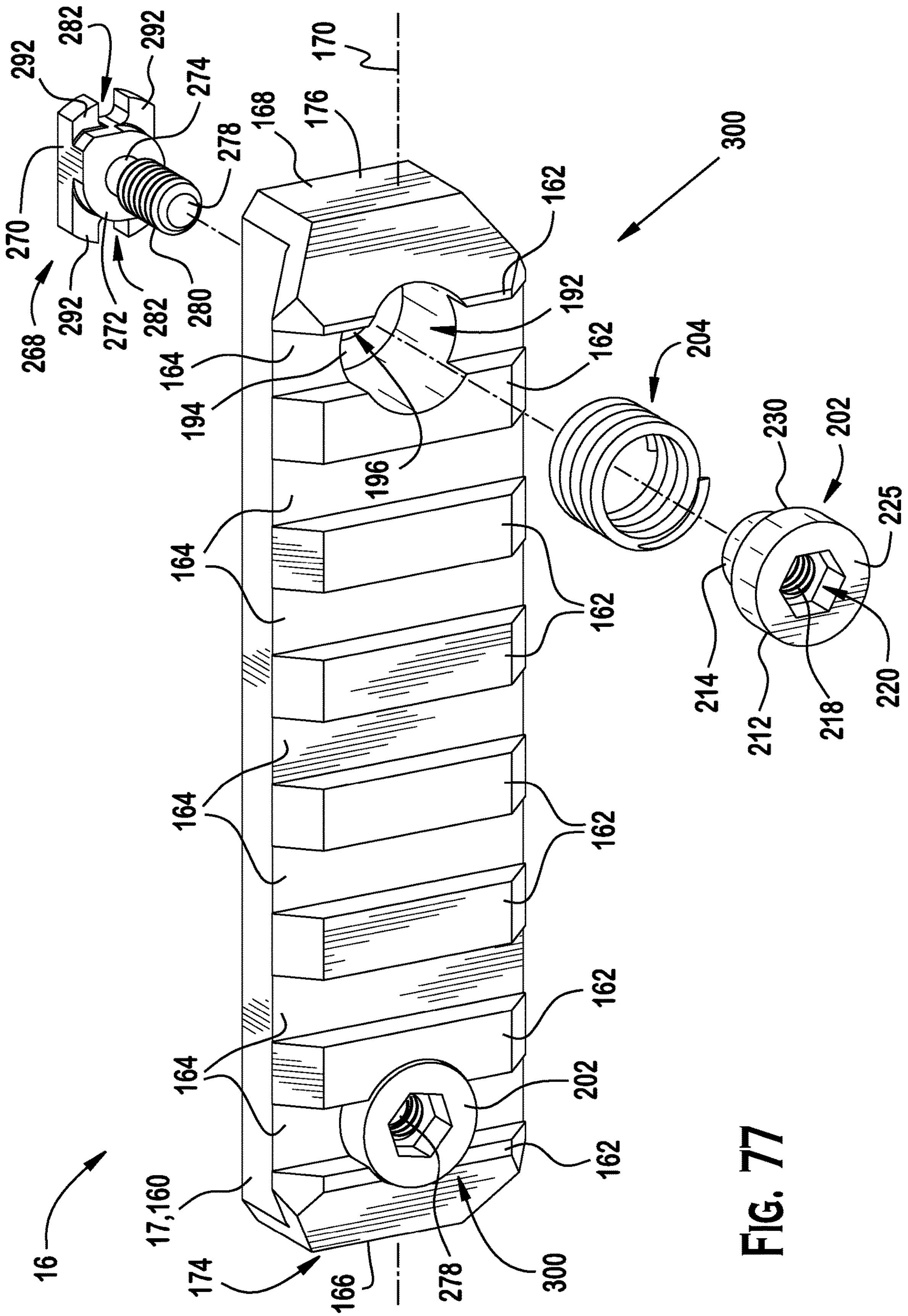
FIG. 77 is a top partial exploded view of another embodiment of an accessory rail and fastener apparatus in accordance with the present invention.
Figure 78:
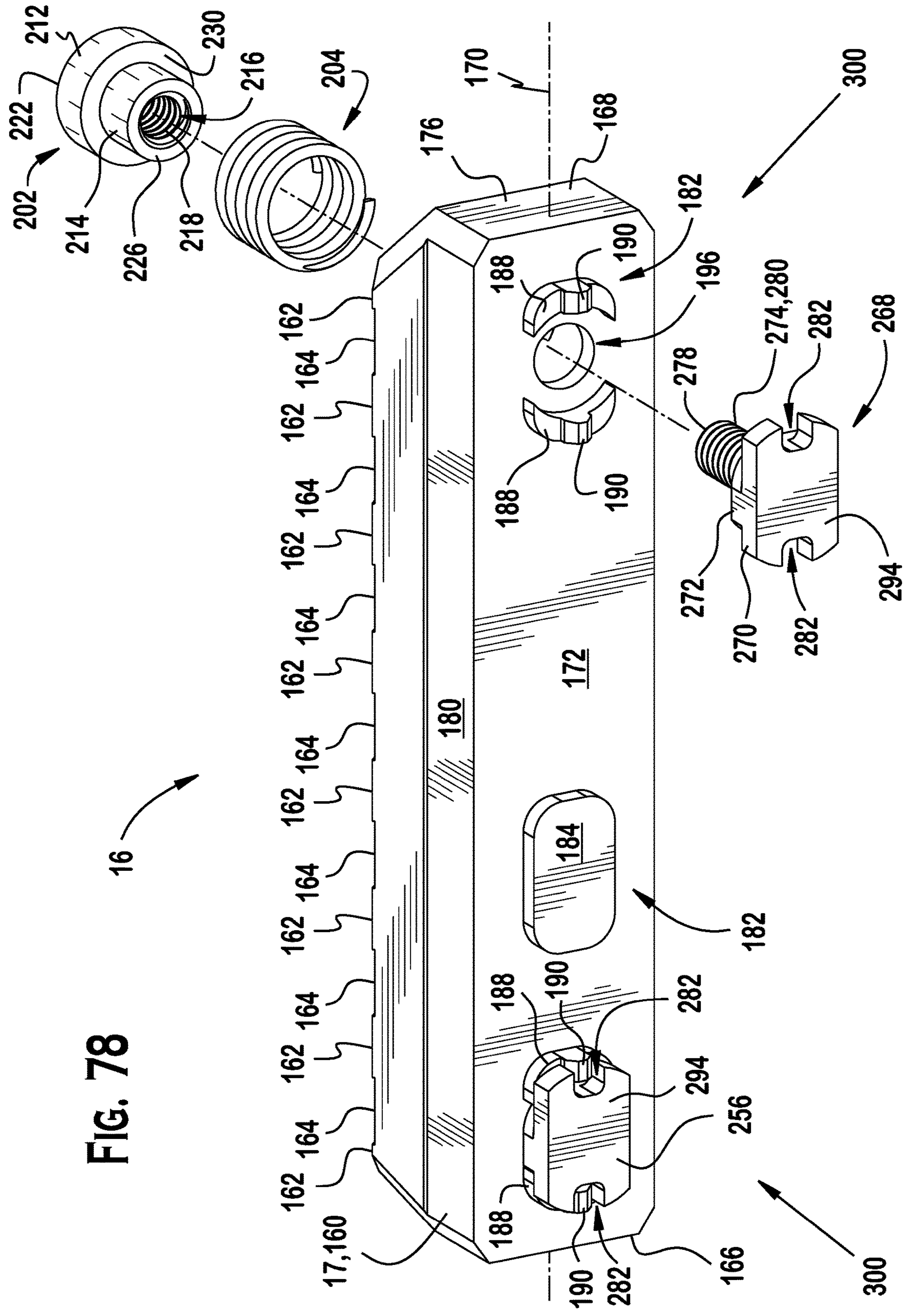
FIG. 78 is a bottom view of the accessory rail and fastener apparatus of FIG. 77.

Referring to FIGS. 77 and 78, another embodiment of an accessory rail 160 and fastener apparatus 300 may include a fastener (e.g., nut) 202, a resilient member (e.g., a coil spring) 204, and a second exemplary embodiment of a T-bolt 268. The counterbore 192, 196 may provide a housing (see e.g., FIG. 77) and guides 188 next to the smaller diameter bore 196 on the bottom surface 172 may provide a seat 210 (see e.g., FIG. 78) for the fastener apparatus 300. Additionally, the fastener 202 may include a fastener head 212, a spring guide 214, and a central bore 216. The central bore 216 may include screw threads 218. The fastener 202 may mate with the T-bolt 268. The fastener head 212 further may include a drive slot 220. The drive slot 220 may be a hex socket. Although the fastener 202 may include a hex socket, any suitable drive socket or shape may be used. For example, the drive slot may be a cross, square, double square or other type.

Once assembled, the fastener apparatus 300 and accessory rail 160 may operate like the fastener apparatus 18 and accessory 16 of FIGS. 63-76. For example, the curved wall segments 288 of the cylindrical head 272 of each T-bolt may be positioned to allow approximately 90° of rotation in a clockwise direction (see e.g., FIGS. 33 and 34). Then an operator may insert an appropriate drive tool (not shown), such as a hex socket drive, into the drive slot 220 and depress the proximal fastener 202 sufficiently to disengage the T-bolt 268 from the guides 188 and move the elongated base 270 of the T-bolt 268 through the slot 22 past the locking surface 126 of the handguard 20 (see e.g., FIGS. 39 and 40) The operator may then rotate the driver to turn the proximate fastener 202 and T-bolt 268 coupling until the straight wall segments 286 of the cylindrical head 272 block further rotation of the T-bolt (see e.g., FIGS. 35 and 40). In this embodiment, the maximum allowable degree of rotation may be approximately 90° in a clockwise direction. After the T-bolt 268 has been rotated in this manner, the elongated base 270 may be positioned generally perpendicular to the slot 22 (see e.g., FIG. 35), and the top surface 292 of the elongated base 270 may contact the locking surface 126 (see e.g., FIGS. 39-40). The operator may then advance the fastener 202 with respect to the T-bolt 268 to securely clamp (or fix) the accessory rail 160 to the handguard 20 (see e.g., FIGS. 36 and 41-42).

Figure 83:
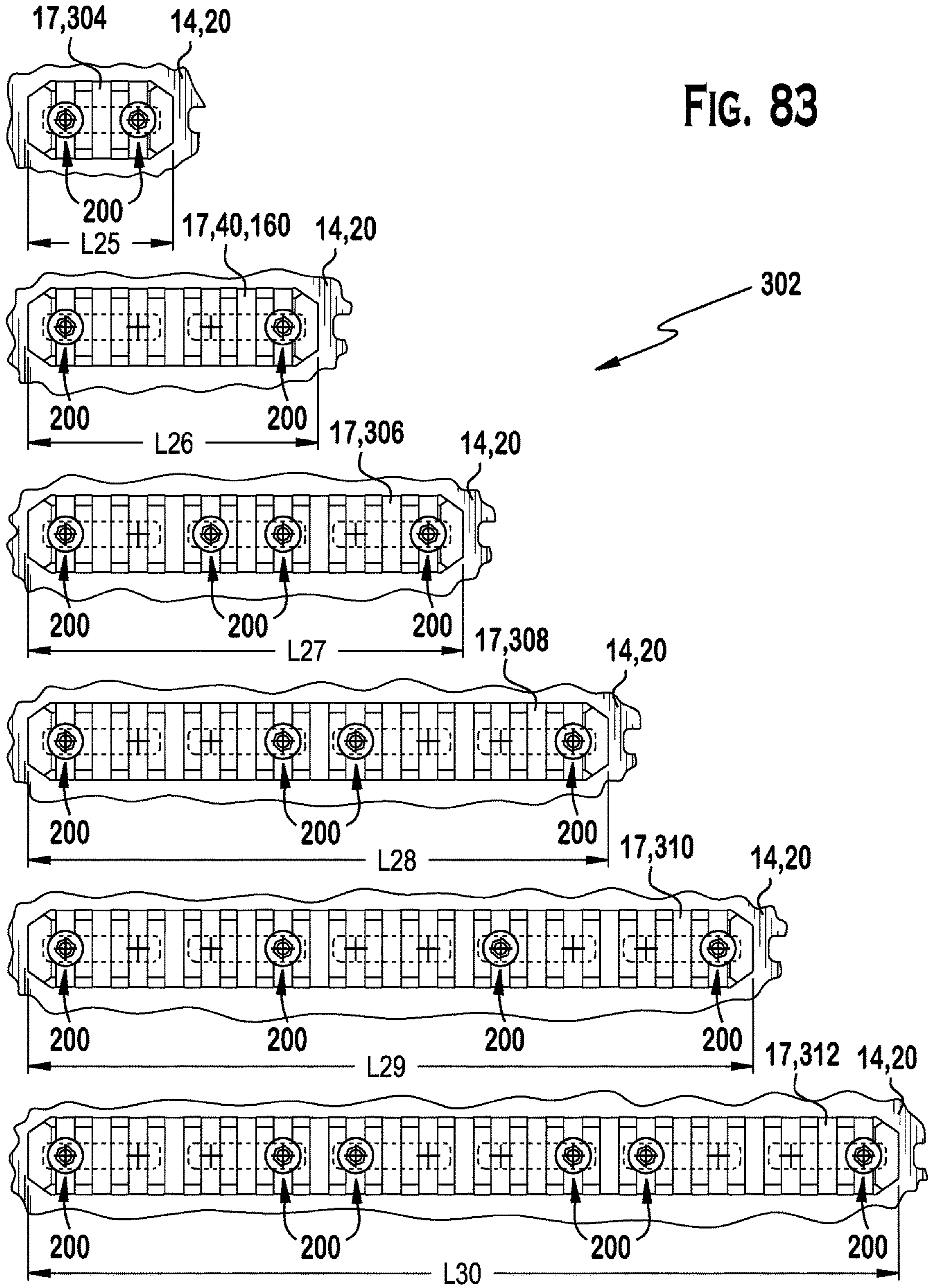
FIG. 83 is a plan view of an exemplary set of modular accessory rails having in accordance with an aspect of the present invention.

FIG. 83 depicts an exemplary set 302 of modular accessory rails 17. Each accessory rail 17 may have a standardized length. The standardized length of each accessory rail 17 may be different. Additionally, the accessory rails 17 may be configured and dimensioned to connect with and cover one or more slots 22 on an object 14 (see. e.g., handguard 20).

For example, one accessory rail 17, 304 may be configured and dimensioned to connect with and cover one slot 22 on an object 14. This accessory rail 17, 304 may be referred to as a “1-slot” accessory rail. In another example, an accessory rail 17, 160 may be configured and dimensioned to connect with and cover two adjacent slots 22 on an object 14. This accessory rail 17, 160 may be referred to as a “2-slot” accessory rail. In another example, an accessory rail 17, 306 may be configured and dimensioned to connect with and cover three adjacent slots 22 on an object 14. This accessory rail 17, 306 may be referred to as a “3-slot” accessory rail. In another example, an accessory rail 17, 308 may be configured and dimensioned to connect with and cover four adjacent slots 22 on an object 14. This accessory rail 17, 308 may be referred to as a “4-slot” accessory rail. In yet another example, an accessory rail 17, 310 may be configured and dimensioned to connect with and cover five adjacent slots on an object 14. This accessory rail 17, 310 may be referred to as a “5-slot” accessory rail. In yet another example, an accessory rail 17, 312 may be configured and dimensioned to connect with and cover six adjacent slots on an object 14. This accessory rail 17, 312 may be referred to as a “6-slot” accessory rail.

Figure 80:
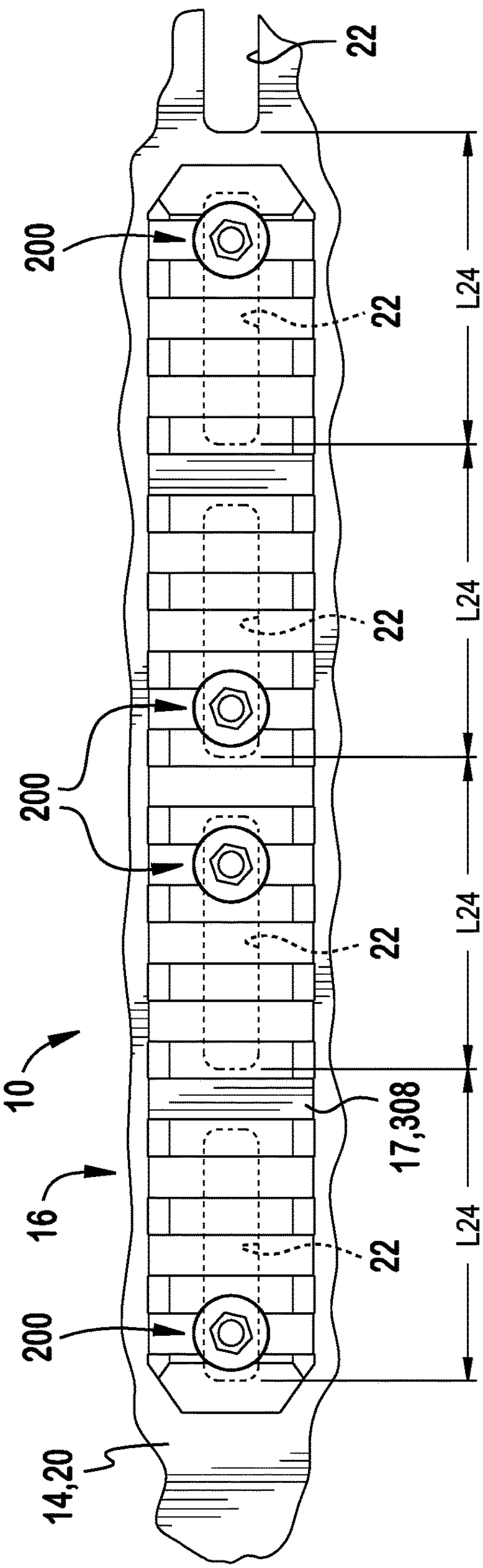
FIG. 80 is a plan view of one exemplary 4-slot accessory rail connected to four exemplary slots of a handguard, in accordance with an embodiment of a universal interface system of the present invention.
Figure 81:
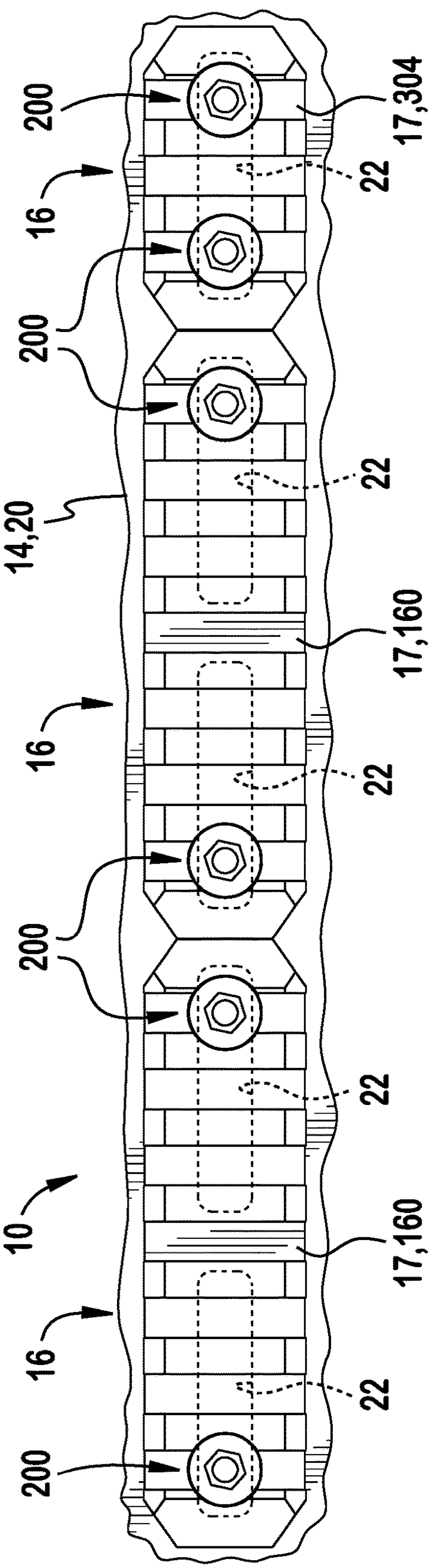
FIG. 81 is a plan view of two exemplary 2-slot accessory rails and one 1-slot accessory rail connected to five exemplary slots of a handguard, in accordance with an embodiment of a universal interface system of the present invention.
Figure 82:
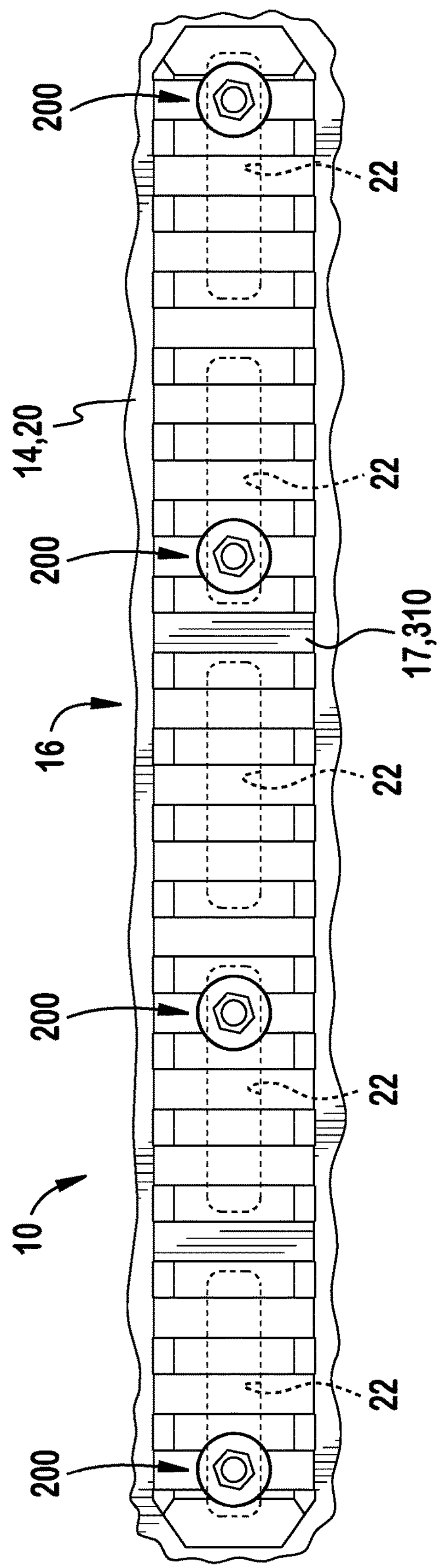
FIG. 82 is a plan view of one exemplary 5-slot accessory rail connected to five exemplary slots of a handguard, in accordance with an embodiment of a universal interface system of the present invention.

Accordingly, a 3-slot accessory rail may be configured to mate with and cover three adjacent slots 22 on the handguard 20 of FIG. 1. And, a 4-slot accessory rail may be configured to mate with and cover four adjacent slots 22 on the handguard 20 of FIG. 1. Moreover, four adjacent slots 22 on a handguard 20 may be mated with two 2-slot accessory rails 17, 160 or one 4-slot accessory rail 17, 308 (see e.g., FIG. 79 and FIG. 80, respectively). Similarly, five adjacent slots 22 on a handguard 20 may be mated with two 2-slot accessory rails 17, 160 and one 1-slot accessory rail 17, 302 or by one 5-slot accessory rail 17, 310 (see e.g., FIG. 81 and FIG. 82, respectively). Hence, a set 302 of modular accessory rails of differing lengths and identified by slot counts may be developed for use with a universal interface system in accordance with the present invention.

Figure 79:
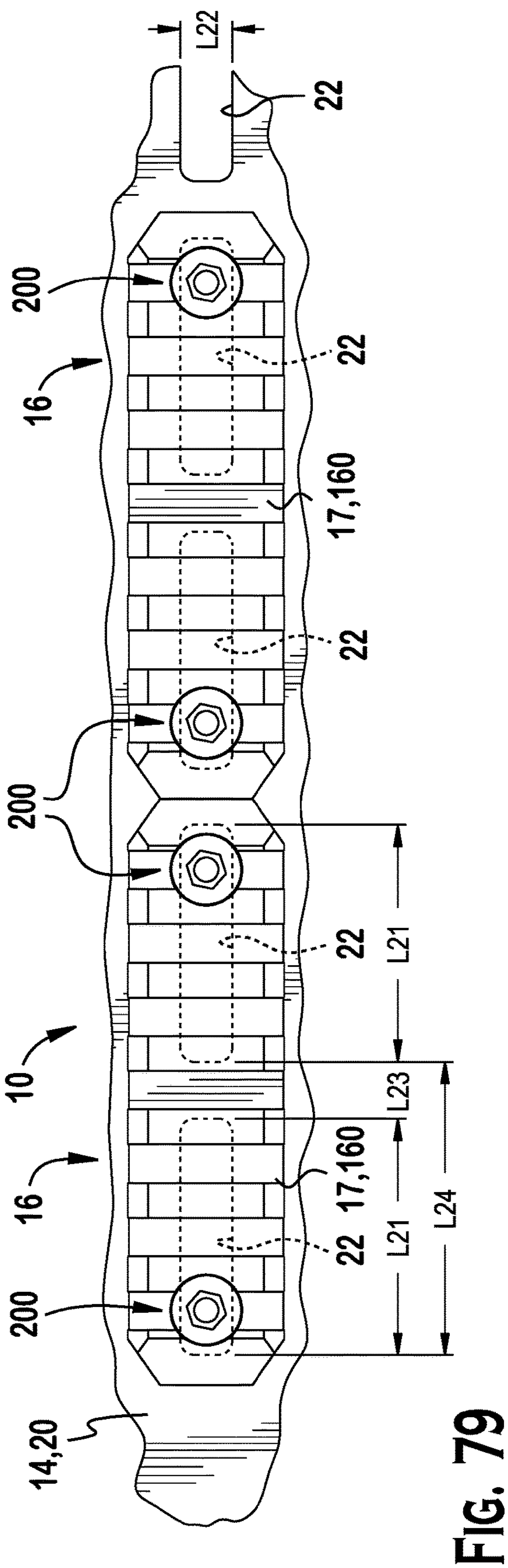
FIG. 79 is a plan view of two exemplary 2-slot accessory rails connected to four exemplary slots of a handguard, in accordance with an embodiment of a universal interface system of the present invention.

For example, as shown in FIG. 79, each slot 22 may have a length L21 and a width L22. The slots 22 may be spaced from each other by a length L23. The proximal ends of two adjacent slots 22 may be spaced from each other by a distance L24. Also, the dimension L24 measured from the proximal end of a first slot 22 to the proximal end of an adjacent slot may be identified as a slot spacing span. Illustrative values for the dimensions disclosed in FIG. 79 are presented in Table 7. Other feature configurations and dimensions, however, may be implemented in other embodiments.

TABLE 7

Exemplary Dimensions for a Slotted Object

| Dimension | Length (Inches) |
|---|---|
| L21 | 1.270 |
| L22 | 0.2785 |
| L23 | 0.305 |
| L24 | 1.575 |

Referring to Table 1 and Table 7, the slot spacing span L24 and the second accessory feature span L14 may be the same length. Additionally, referring FIG. 83, a “n-slot rail”—where n is the number of slots covered by the rail—the length LN of the rail may be approximately equal to the number of slots n multiplied by the slot spacing span L24 of an associated slotted object. For example, the slotted object of FIG. 79 may have a slot spacing span L24 of 1.575 inches, and one accessory rail may cover n=2 slots. Thus, the length of the 2-slot accessory rail may be approximately equal to the product of 2 and 1.575 inches or 3.145 inches. Similarly, the 4-slot accessory rail of FIG. 80 may have a length of 4*1.575 inches or approximately 6.300 inches.

Table 8 presents illustrative values for the set 302 of standardized modular accessory rails 17 of FIG. 83. Other feature configurations and dimensions, however, may be implemented in other embodiments.

TABLE 8

Illustrative Standardized Lengths for a Set of Modular Accessory Rails

| Description | Dimension | Slot Spacing Span (Inches) | Approximate Length (Inches) |
|---|---|---|---|
| 1-Slot Accessory Rail | L25 | 1.575 | 1.575 |
| 2-Slot Accessory Rail | L26 | 1.575 | 3.150 |
| 3-Slot Accessory Rail | L27 | 1.575 | 4.725 |
| 4-Slot Accessory Rail | L28 | 1.575 | 6.300 |
| 5-Slot Accessory Rail | L29 | 1.575 | 7.875 |
| 6-Slot Accessory Rail | L30 | 1.575 | 9.450 |

Hence, a universal interface system may include a slotted object with two or more elongated slots, and an accessory mounted on to the slotted object. The slotted object may include a plurality of slots. Each of the slots may have approximately the same shape and dimensions. Further, the accessory may include features (e.g., a projection, a seat, etc.) that fit into one or more of the slots (see e.g., FIG. 5). Adjacent slots may have a slot spacing span L24 of approximately a first distance. Similarly, the accessory may have a second accessory feature span L14 of approximately a second distance. The first distance and the second distance may be substantially equal. Further, the accessory may cover the adjacent slots. Moreover, the approximate length of a rail that covers n slots may be equal to the number of covered slots n multiplied by the slot spacing span L24 of the slotted object.

Figure 84:
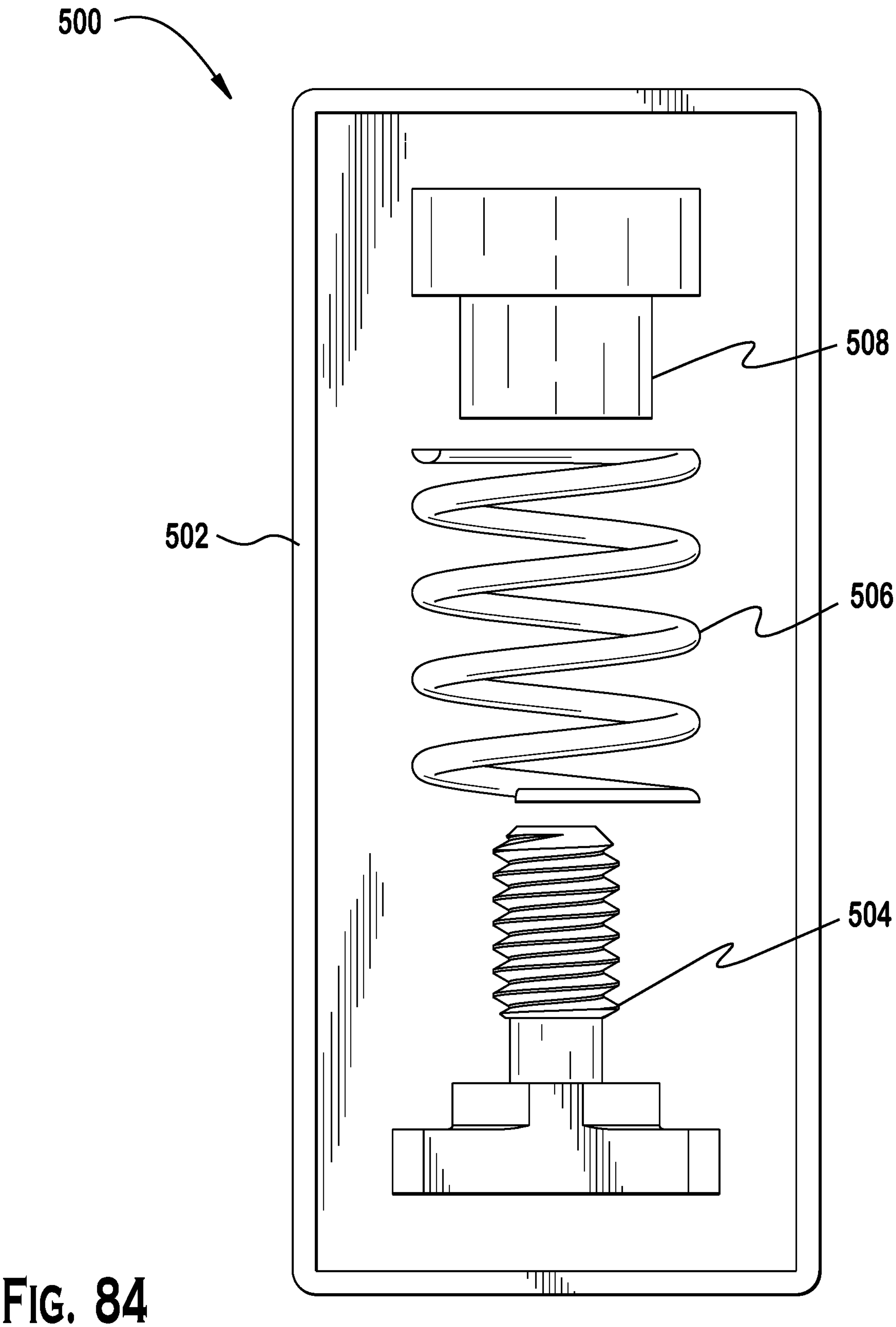
FIG. 84 is a plan view of an exemplary kit including an exterior fastener, a resilient member, and an interior fastener for creating a fastener apparatus in accordance with the present invention.

FIG. 84 shows a kit 500 for use with an accessory 16 and a universal interface system 10 in accordance with the present invention. The kit may include a sealed container 502. Inside the sealed container 502, the kit may include an interior fastener 504, a resilient member 506, and an exterior fastener 508. The interior fastener 504 and exterior fastener 508 may be selected from any of the complementary pairs of fastener parts disclosed herein. For instance, in one embodiment the kit 500 may include a lock bolt 206 of FIG. 51, a mating fastener 202 of FIG. 47, and a coil spring 80 of FIG. 18. In another embodiment, the kit 500 may include a lock nut 136 of FIG. 27, a mating fastener 78 of FIG. 14, and a coil spring 80 of FIG. 18. In another embodiment, the kit 500 may include a T-nut 82 of FIG. 21, a mating fastener 78 of FIG. 14, and a coil spring 80 of FIG. 18. In yet another embodiment, the kit 500 may include a T-bolt 268 of FIG. 57, a mating fastener 202 of FIG. 47, and a coil spring 80 of FIG. 18. The kit 500 may be used to create a fastener apparatus 18, 200, 300 and an accessory 16. Although the kit may be used to create accessory rails, the kit may be used to create other accessories that may be used with the universal interface system. For example, the kit may be used to create a foregrip, tactical light, or sling mount that may be secured directly to a slotted object of the universal interface system. The slotted object may be the handguard of FIG. 1.

Figure 90:
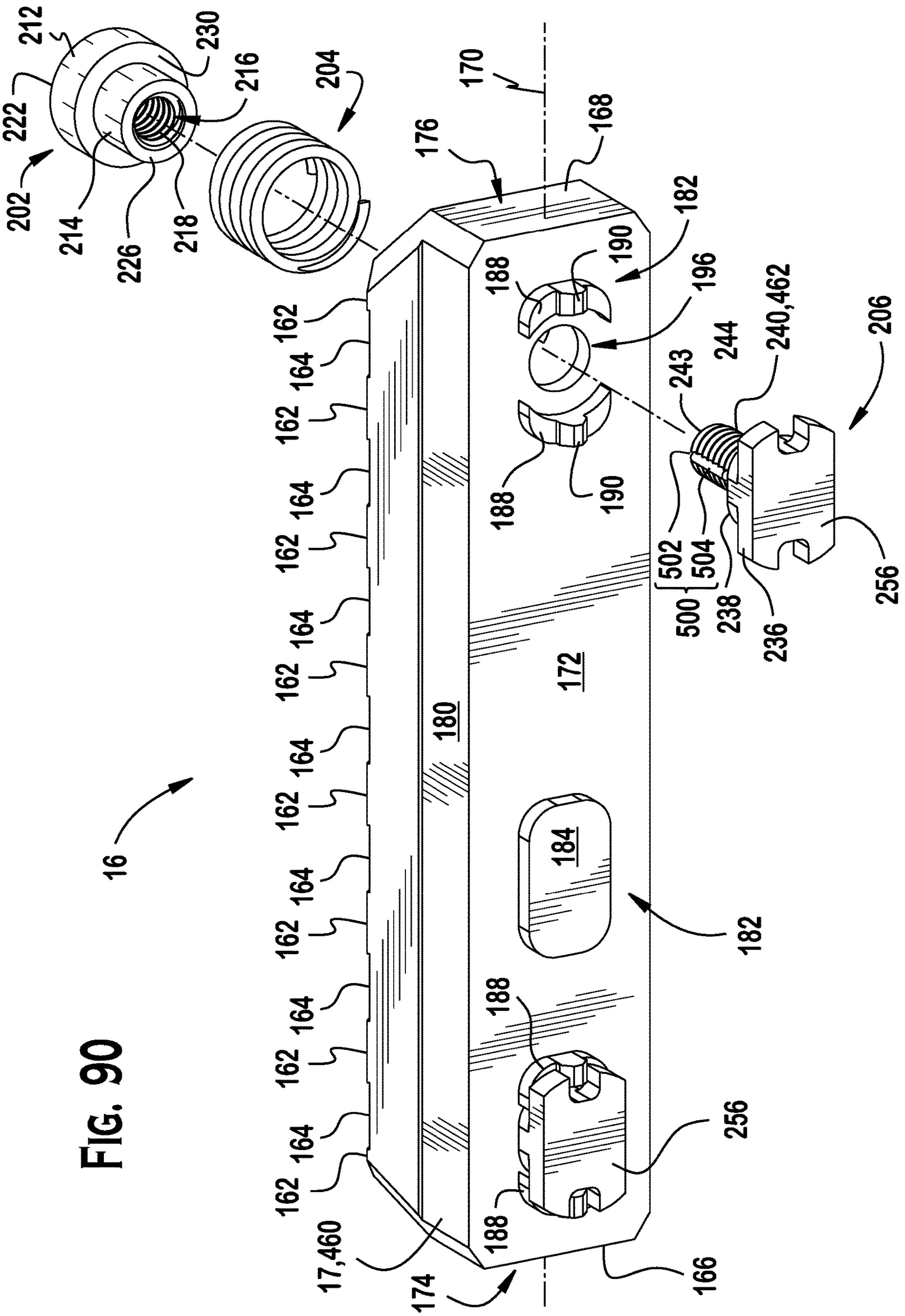
FIG. 90 is a bottom view of the accessory rail and fastener apparatus of FIG. 89.
Figure 91:
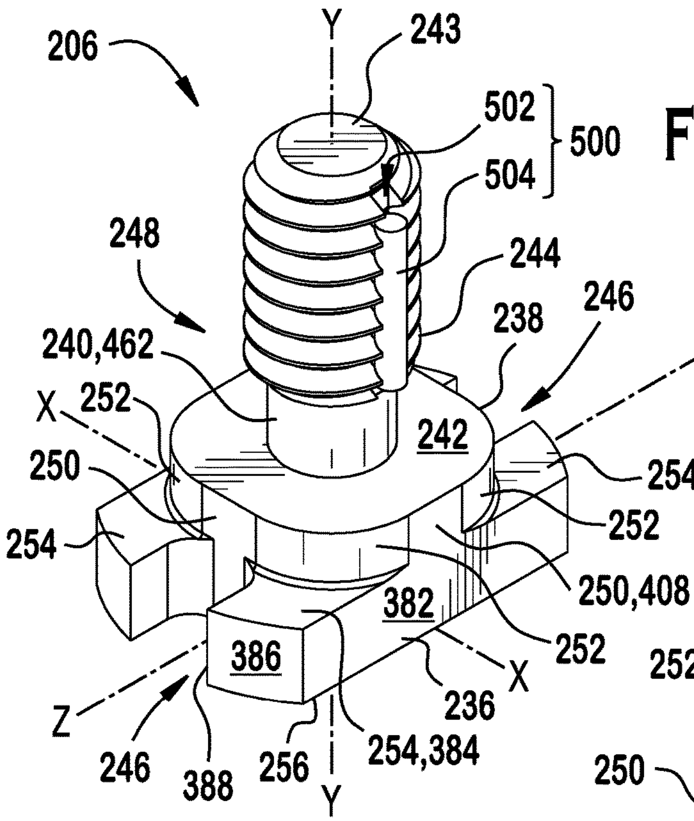
FIG. 91 is a top perspective view of an exemplary locking bolt of FIG. 89.
Figure 92:
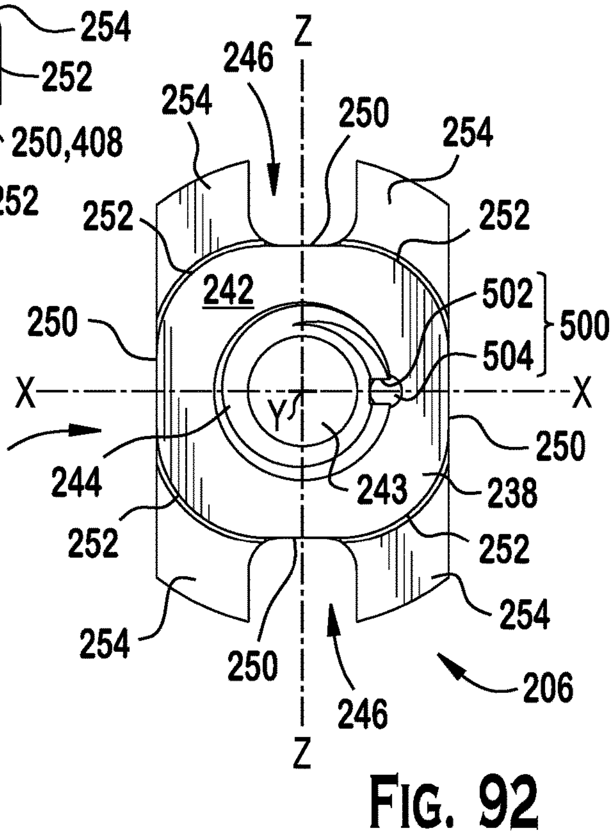
FIG. 92 is a top view of the locking bolt of FIG. 91.

FIGS. 89 and 90 depict a third exemplary embodiment of an accessory rail 460 in accordance with the present invention. The accessory rail 460 may include structural features and dimensions as described in connection with the second exemplary embodiment of an accessory rail 160 disclosed in FIGS. 43 and 44. For example, the accessory rail 460 may include a top surface 162. The top surface 162 may include plurality of parallel grooves 164. Each of the parallel groves 164 may have a rectangular cross section (see e.g., FIG. 45). Although the accessory rail 460 may comply with MIL-STD-191, the rail 460 may conform to other mounting rail standards or form any shape or configuration which may serve a particular use or application. The accessory rail 460 further may include a distal end 166 and a proximal end 168. Additionally, the accessory rail 460 may possess a longitudinal axis 170 extending from the distal end 166 to the proximal end 168. The distal end 166 and the proximal end 168 may be flat surfaces. The distal end surface 174 and the proximal end surface 176 may be parallel surfaces see e.g. FIG. 45).

Additionally, the fastener apparatus 200 of FIGS. 89 and 90 may include a fastening aid 500. For instance, the T-bolt shaft 240 of the fastener apparatus 200 may include a fastening aid 500. FIGS. 91-97 and 99-106 disclose a second exemplary embodiment of a T-bolt shaft 240, 462, FIG. 106 discloses a third exemplary embodiment of a T-bolt shaft 240, 464, FIG. 107 discloses a fourth exemplary embodiment of a T-bolt shaft 240, 466, FIG. 108 discloses a fifth exemplary embodiment of a T-bolt shaft 240, 468, FIG. 109 discloses a sixth exemplary embodiment of a T-bolt shaft 240, 470, FIGS. 98 and 110 disclose a seventh exemplary embodiment of a T-bolt shaft 240, 472, FIGS. 124-131 disclose an eighth exemplary embodiment of a T-bolt shaft 240, 474, FIGS. 138-145 disclose a ninth exemplary embodiment of a T-bolt shaft 240, 476, and FIGS. 146-153 disclose a tenth exemplary embodiment of a T-bolt shaft 240, 478.

Figure 115:
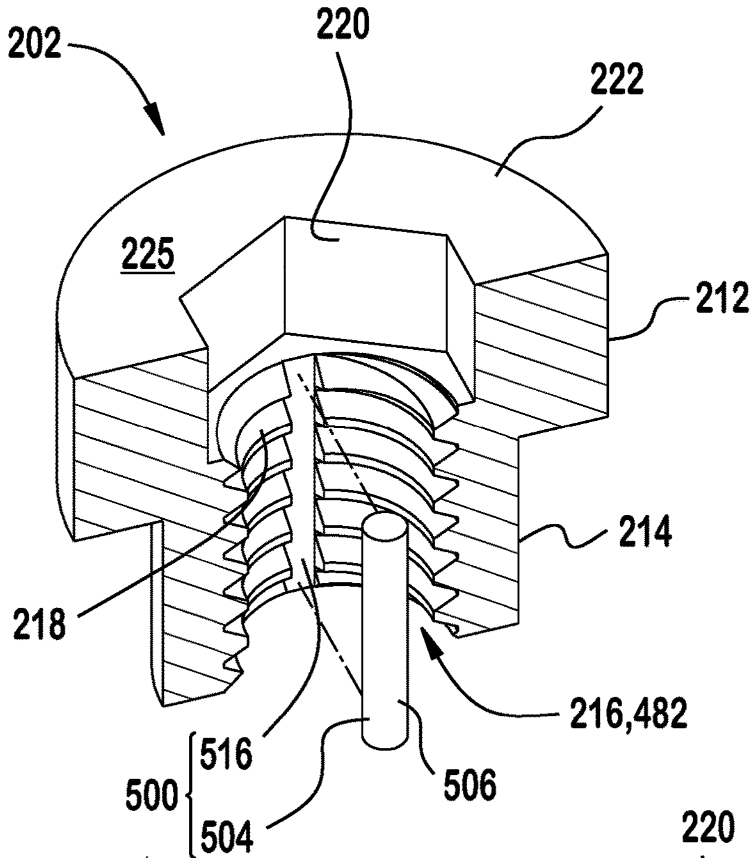
FIG. 115 is an exploded cross-sectional view of the fastener of FIG. 111 along line 115-115.

Referring to FIGS. 43 and 44 the fastener 202 of the fastener apparatus 200 may include a fastening aid 500. FIGS. 111-114 and 116-119 disclose a second exemplary embodiment of a fastener bore 216, 480 with a fastening aid 500; FIGS. 115 and 120 disclose a third exemplary embodiment of a fastener bore 216, 482 with a fastening aid 500; FIG. 121 discloses a fourth exemplary embodiment of a fastener bore 216, 484 with a fastening aid 500; FIG. 122 discloses a fifth exemplary embodiment of a fastener bore 216, 486 with a fastening aid 500 with a fastening aid 500; FIG. 123 discloses a sixth exemplary embodiment of a fastener bore 216, 488 with a fastening aid 500; FIGS. 132-137 disclose a seventh exemplary embodiment of a fastener bore 216, 490, and FIGS. 156-159 disclose an eighth exemplary embodiment of a fastener bore 492.

Referring to FIGS. 89 and 90, the T-bolt (or interior fastener) 206 may include a shaft 240, 462 which extends upward through the smaller diameter bore 196 of the accessory rail 460. The shaft 240, 462 further may include a threaded portion 244 near the proximal end 243 of the shaft. The threaded portion 244 of the shaft 240, 462 may include a groove 502. The groove 502 may be milled into the screw threads 244 of the shaft. The groove 502 may be deburred of any edges, and the T-bolt may be finished or coated. For example, without limitation, the part may be finished in accordance with MIL-STD-171 5.3.1.2-4 Black (31 May 2011).

The groove (or thread locking insert area) 502 may receive a thread locking insert 504. The thread locking insert 504 may include a resilient bar of nylon which is inserted into the groove 502. When assembled with a mating part (e.g., fastener 202), the resilient bar of nylon may be compressed. This compression may exert a force 180° opposite, increasing metal to metal contact and holding the fastener 202 in place without adhesives or thread distortion. In this manner, an engineered plastic strip may provide locking action in the thread instead of at the bearing surface. The engineered plastic strip further may provide effective locking action under high and low temperature extremes. Also, the T-bolt 206 or the mating fastener 202 may be repeatedly adjusted due to the compressibility, resiliency, and resistance to deformation of the engineered plastic strip. In some embodiments, the engineered plastic strip may comply with MIL-DTL-18240F (2 Mar. 1997) and/or Amendment 1 (13 Mar. 2000). Generally, the engineered plastic strip may be an ND Strip® manufactured by ND Industries, Inc., 1000 North Crooks Road, Clawson, Mich. 48017. Also, the engineering plastic strip may be a Nylok® Blue™ Nylon Strip manufactured by Nylok, LLC, 15260 Hallmark Court, Macomb, Mich. 48042.

Accordingly, the fastening aid 500 may facilitate a secure fit between the shaft 240, 462 and the fastener 202. The secure fit may promote operation of the fastener apparatus. For example, the fastening aid 500 may facilitate a secure fit between the shaft 240, 462 and the fastener 202 which allows the T-bolt 206 and mating fastener 202 to move in unison when manipulated from a ready configuration 258 (see e.g., FIGS. 67 and 68) to a rotated configuration 262 (see e.g., FIGS. 71 and 72). Further, the fit may allow the T-bolt 206 and mating fastener 202 to translate relative to each other when the fastener 202 is manipulated from a deployed configuration 264 (see e.g., FIGS. 73 and 74) to a locked configuration 266 (see e.g., FIGS. 75 and 76). Moreover, these actions may be repeatedly performed and reversed due to the compressibility, resiliency, and resistance to deformation of the engineered plastic strip, including under high and low temperature extremes.

Figure 93:
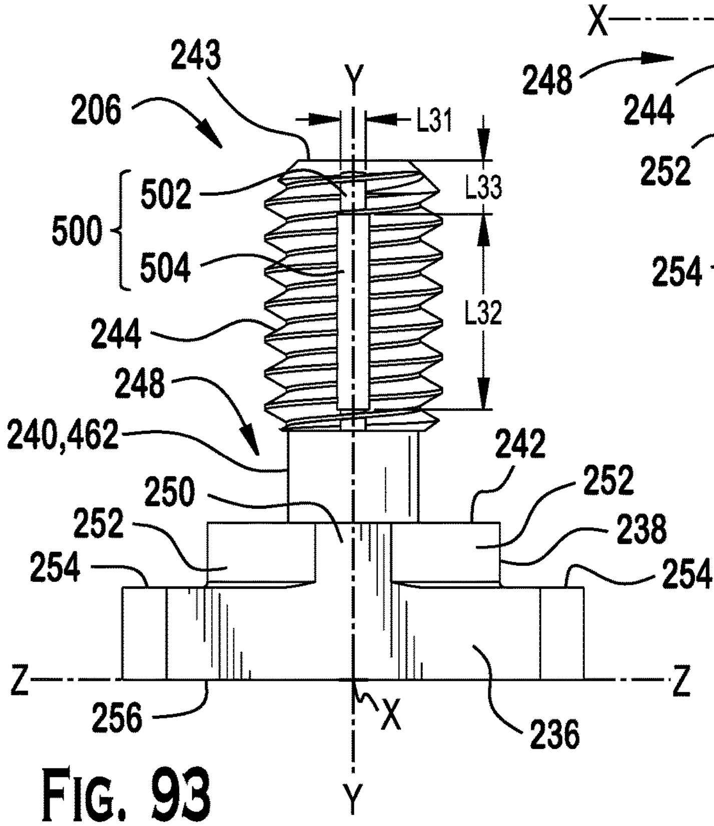
FIG. 93 is a side view of the locking nut of FIG. 91.
Figure 94:
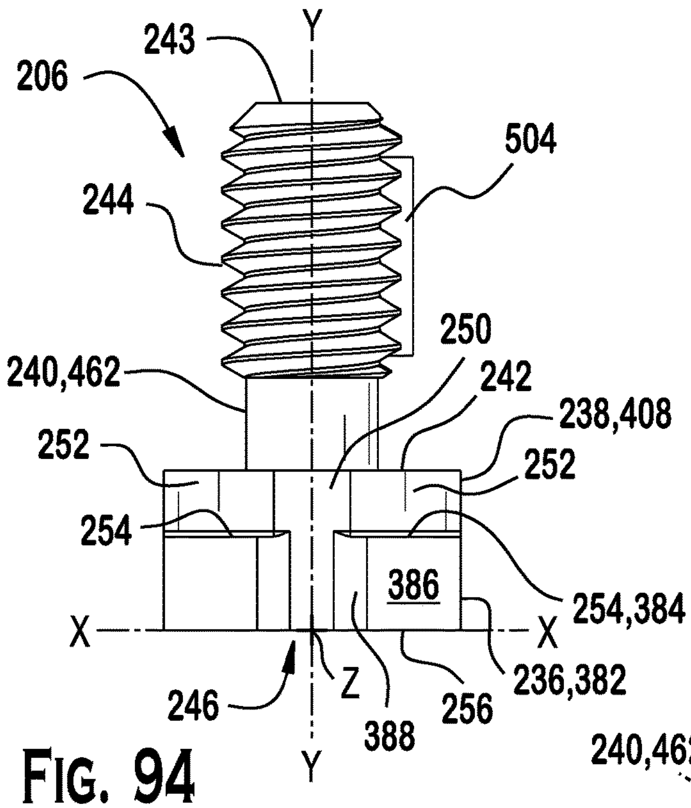
FIG. 94 is a front view of the locking nut of FIG. 91.
Figure 95:
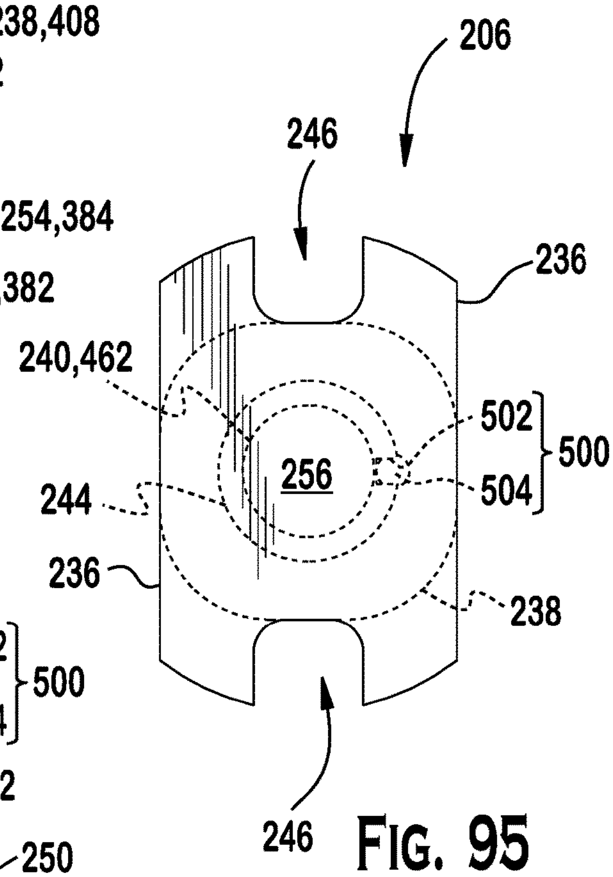
FIG. 95 is a bottom view of the locking nut of FIG. 91.
Figure 96:
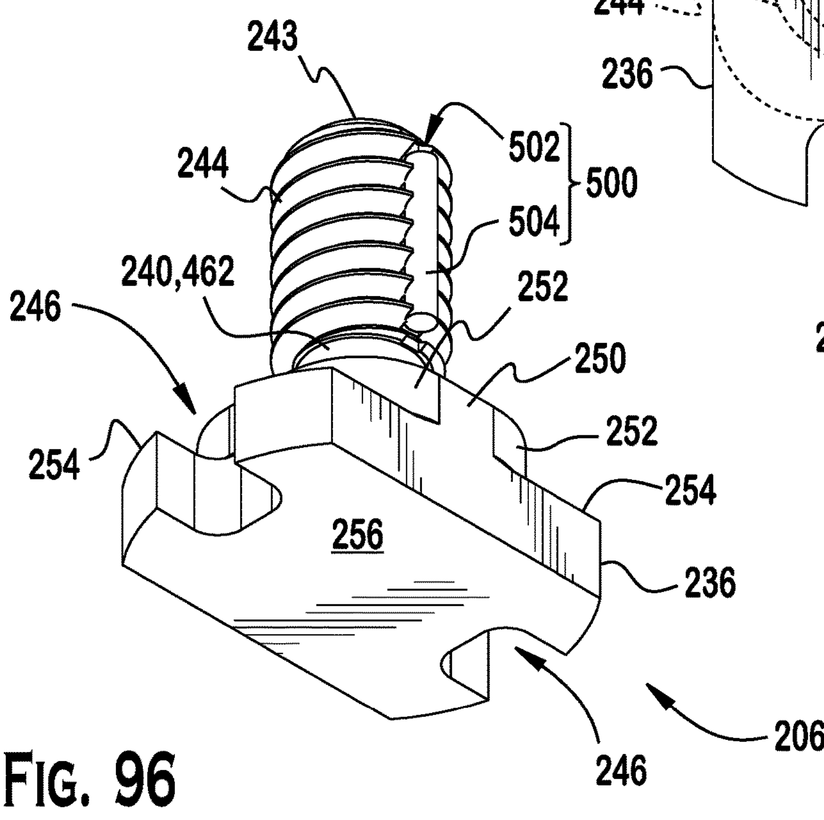
FIG. 96 is a bottom perspective view of the locking nut of FIG. 91.

Referring to FIG. 93, the groove 502 may possess a width L31 of approximately 0.023 inches and a length L32 of approximately 0.180 inches. The groove 502 may be spaced from the proximal end 243 of the shaft 240, 462 by approximately 0.050 inches. The engineered plastic strip may have a width of 0.030 inches. The thread locking insert 504 may include one or more segments of material. Generally, the material may be an engineered material or a suitable natural material. For example, one suitable natural material may be rubber. Preferably, however, the material may be an engineered material. More preferably, the engineered material may be an engineered plastic material (e.g., nylon, nylon 6/6, polyether ether ketone (PEEK), teflon, or other polymer based materials, which may include commercially available proprietary mechanical thread locking and sealing products).

Figure 97:
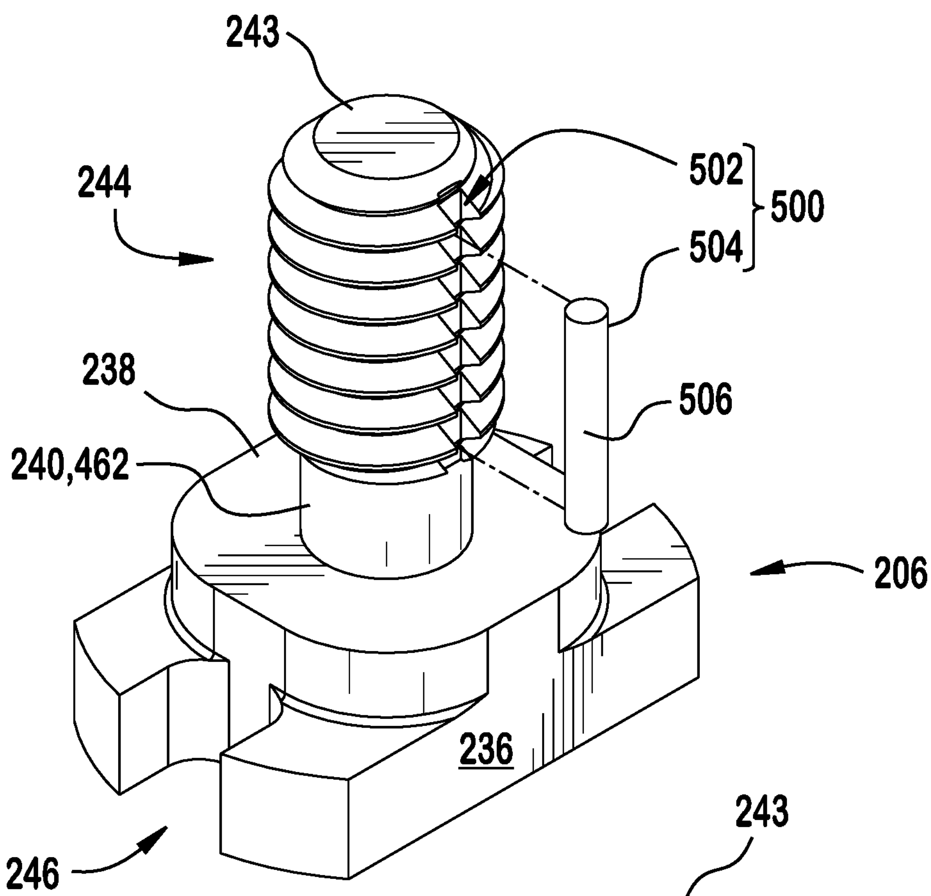
FIG. 97 is an exploded view of the locking bolt of FIG. 91.
Figure 98:
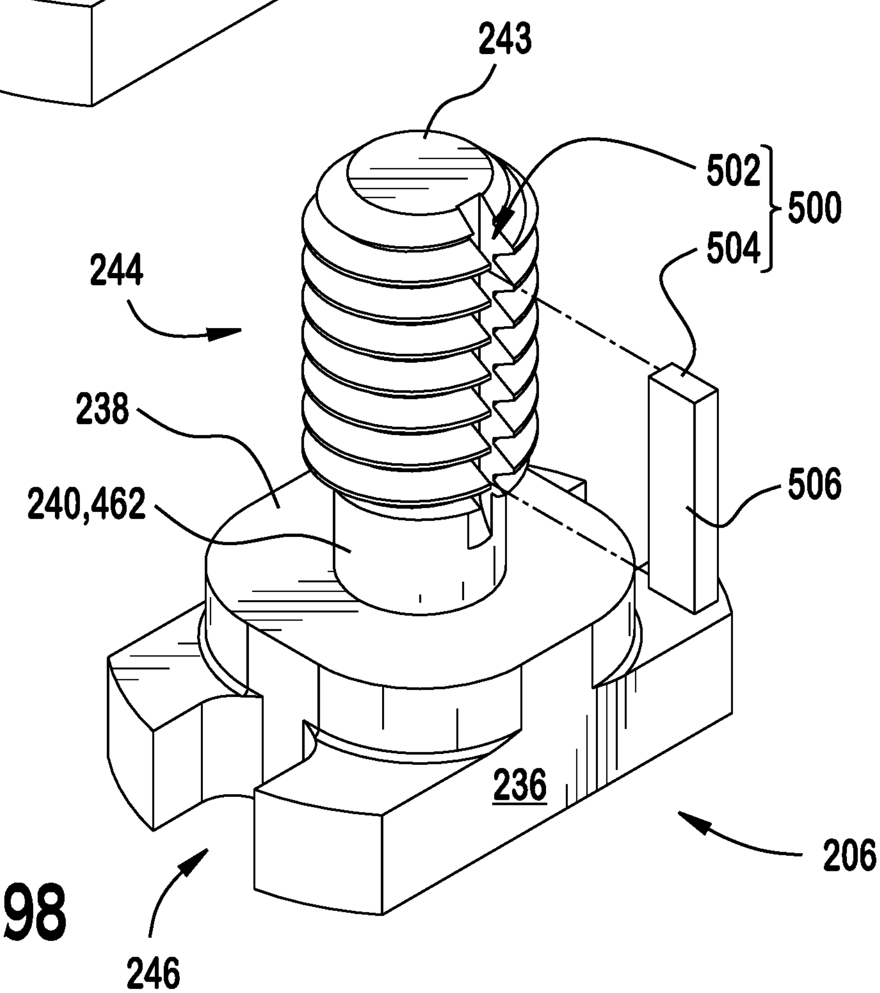
FIG. 98 is an exploded view of another embodiment of the locking bolt of FIG. 91.

As shown in FIGS. 97 and 98, the fastening aid 500 may include thread locking insert 504 constructed from a single segment 506 of material. In FIG. 97, the segment 506 may be a generally circular cylindrical strip of material. In FIG. 98, the segment 506 may be a rectangular strip of material. The segment 506, however, may have other cross-sectional shapes or forms. The thread locking insert 504 may be secured to the shaft 240, 462 by an interference fit with the groove 502. Other fastening techniques may be used to supplement or replace an interference fit between the thread locking insert 504 and the shaft 240, 462.

Figure 105:
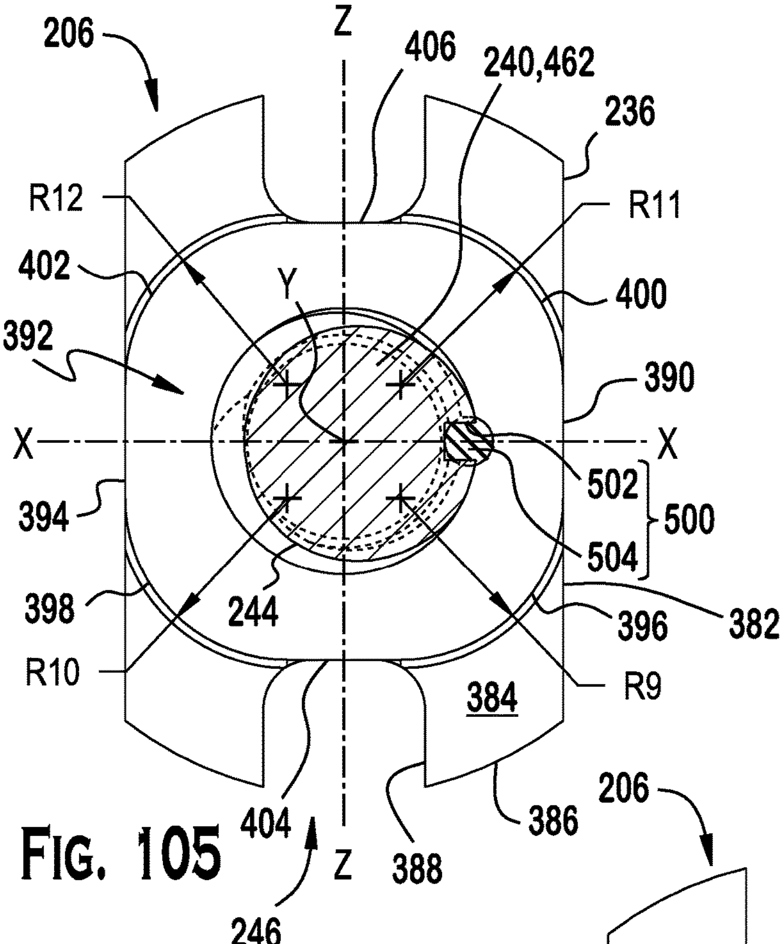
FIG. 105 is a cross-sectional view of FIG. 91 along line 105-105.
Figure 106:
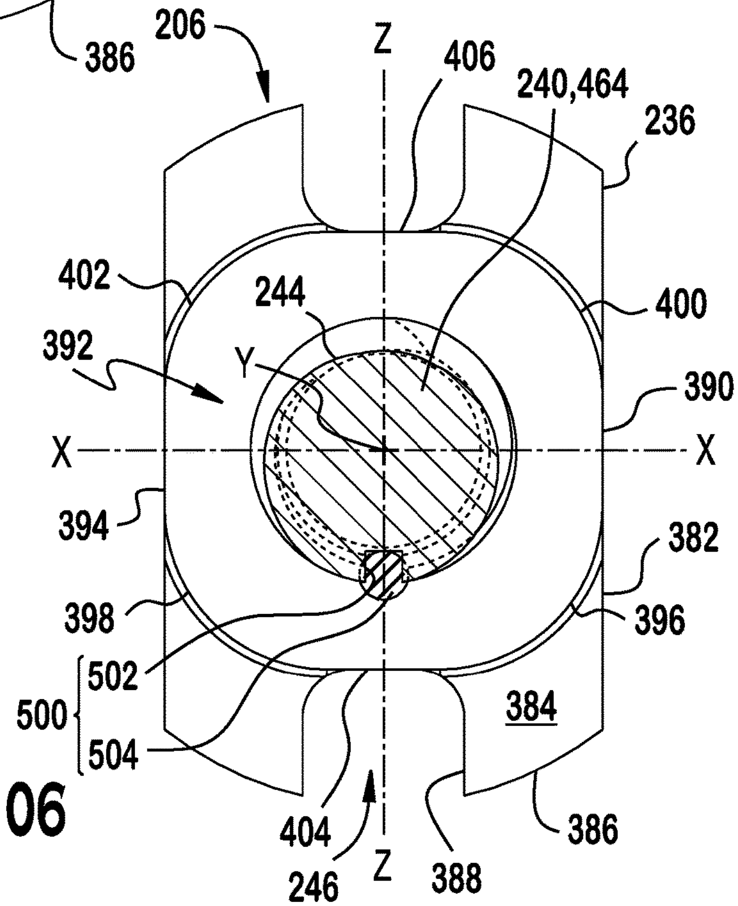
FIG. 106 is a cross-sectional view of another exemplary locking bolt of FIG. 91 along line 105-105.

Referring to FIGS. 91-97, the groove 502 may have a longitudinal axis which is generally parallel to the longitudinal axis of the shaft 240, 462. Referring to FIGS. 105 and 106, the groove 502 may include a cross-section taken perpendicular to the longitudinal axis of the groove. The cross-section of the groove may have a generally U-shape profile. Although, the base of the groove is shown approximately at a depth approximately equal to the depth of the screw threads 244, the base of the grove may be set at other depths within the shaft 240, 462. For example, the groove 502 may have a generally U-shaped profile with a shallower base such that the groove is not as deep as the screw threads 244. In another example, the groove 502 may have a generally U-shaped profile with a deeper base such that the groove 502 is deeper than the screw threads 244. Moreover, the cross-section of the groove 502 may have another shape provided that the groove 502 can properly and securely receive the thread locking insert 504.

Figure 99:
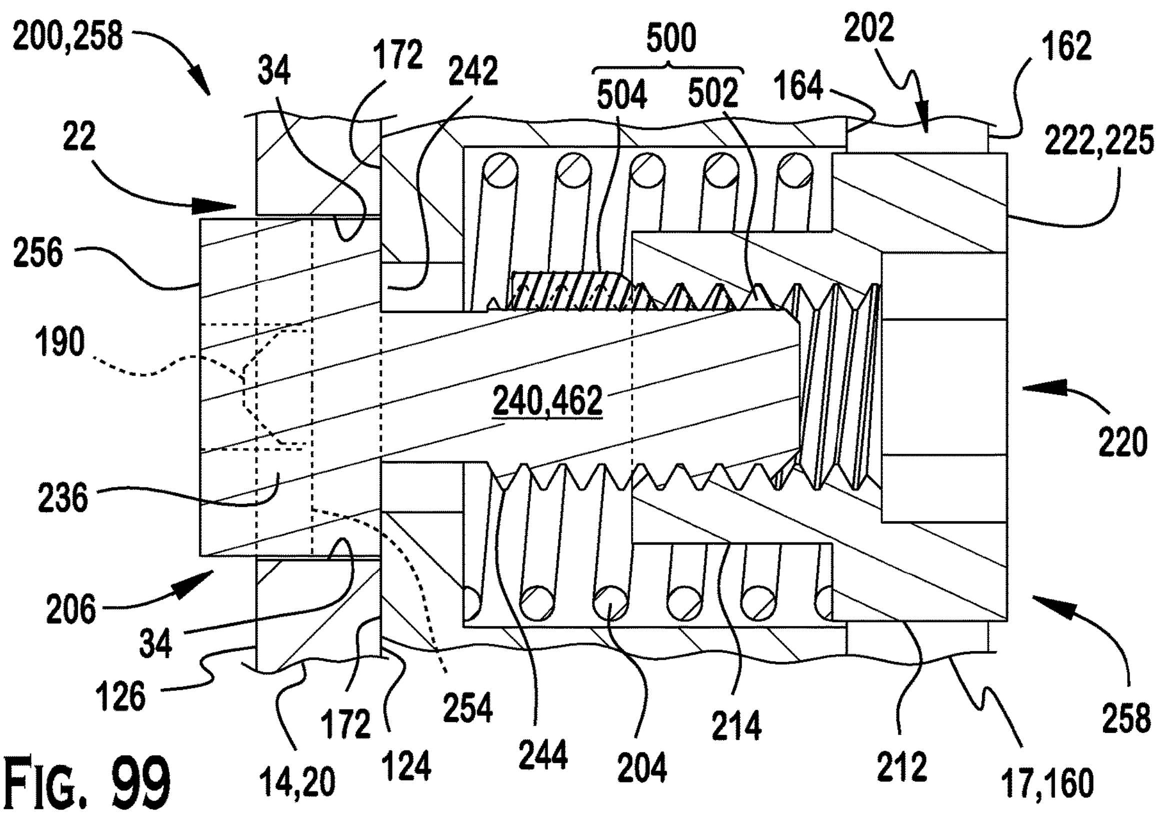
FIG. 99 is a cross-sectional view of another embodiment of an accessory interface system of FIG. 63 in a ready configuration.
Figure 100:
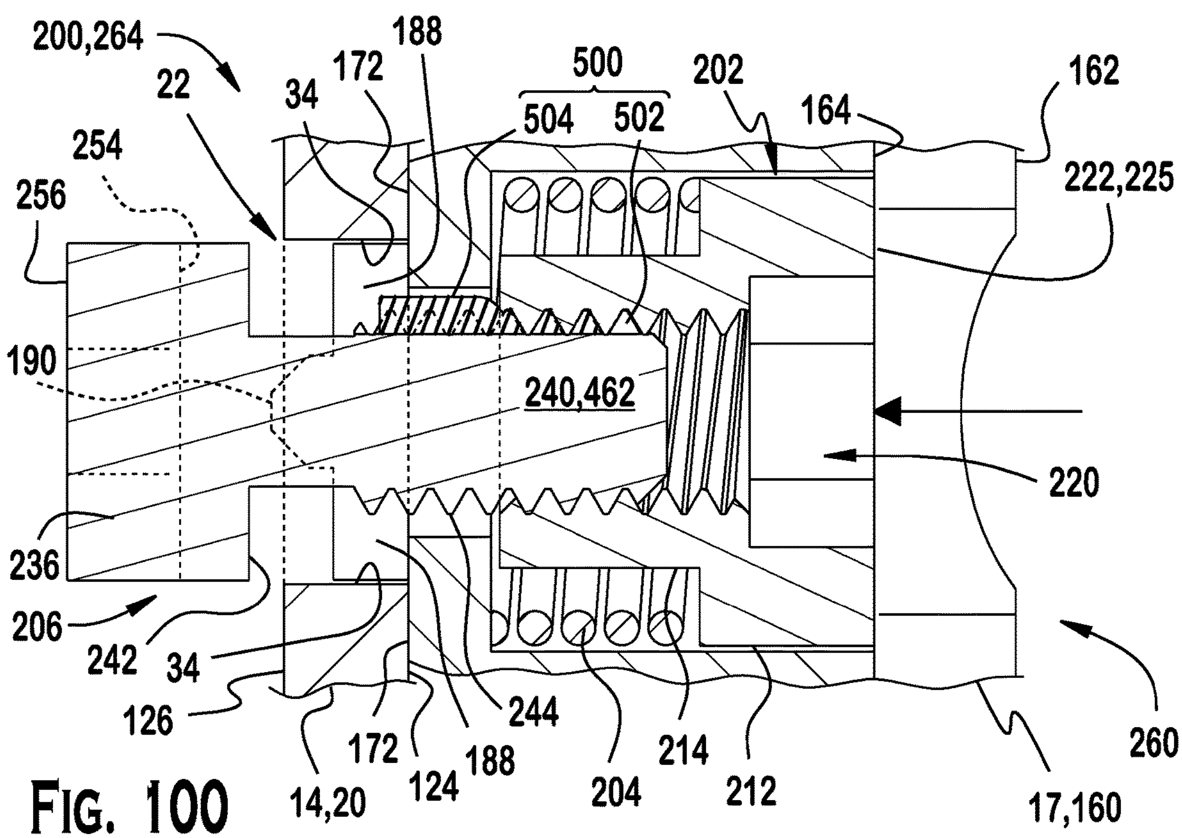
FIG. 100 is another view of the accessory interface system of FIG. 99 in a deployed configuration.
Figure 102:
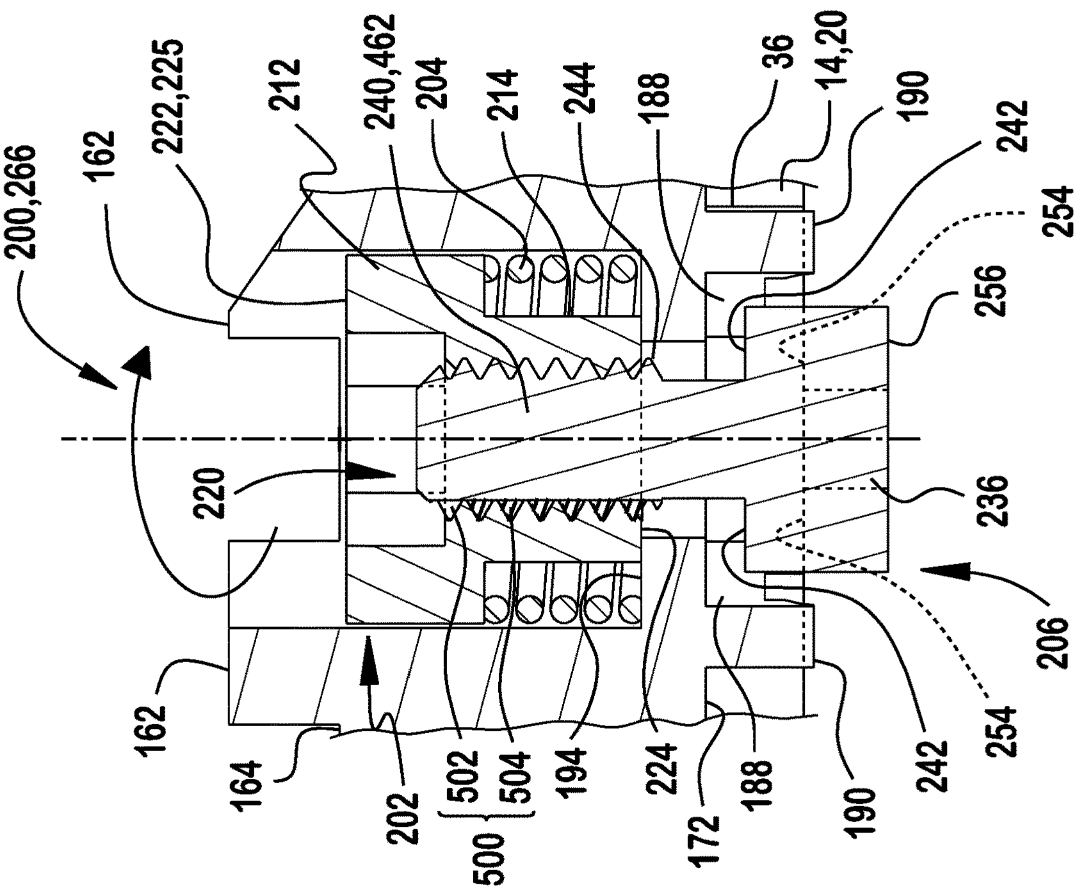
FIG. 102 is another view of the accessory interface system of FIG. 101 in a locked configuration.
Figure 101:
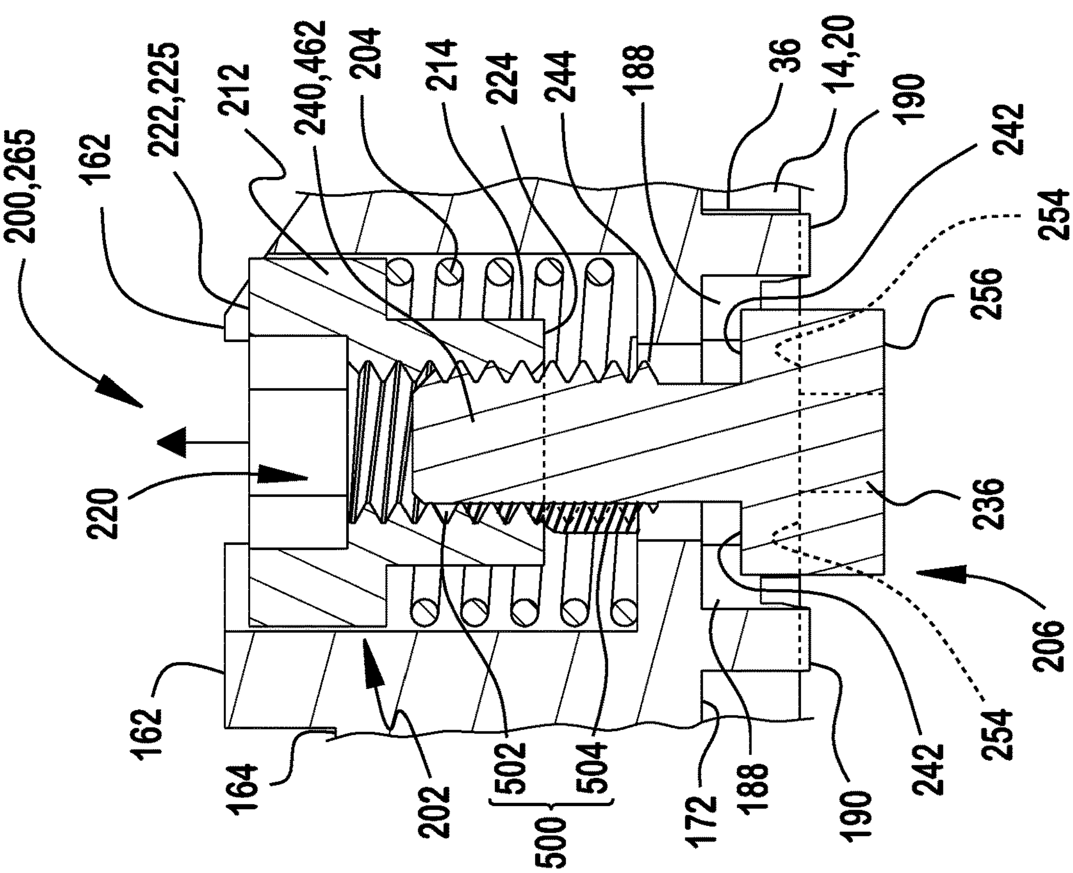
FIG. 101 is another cross-sectional view of the accessory interface system of FIG. 99 in a latched configuration.
Figure 104:
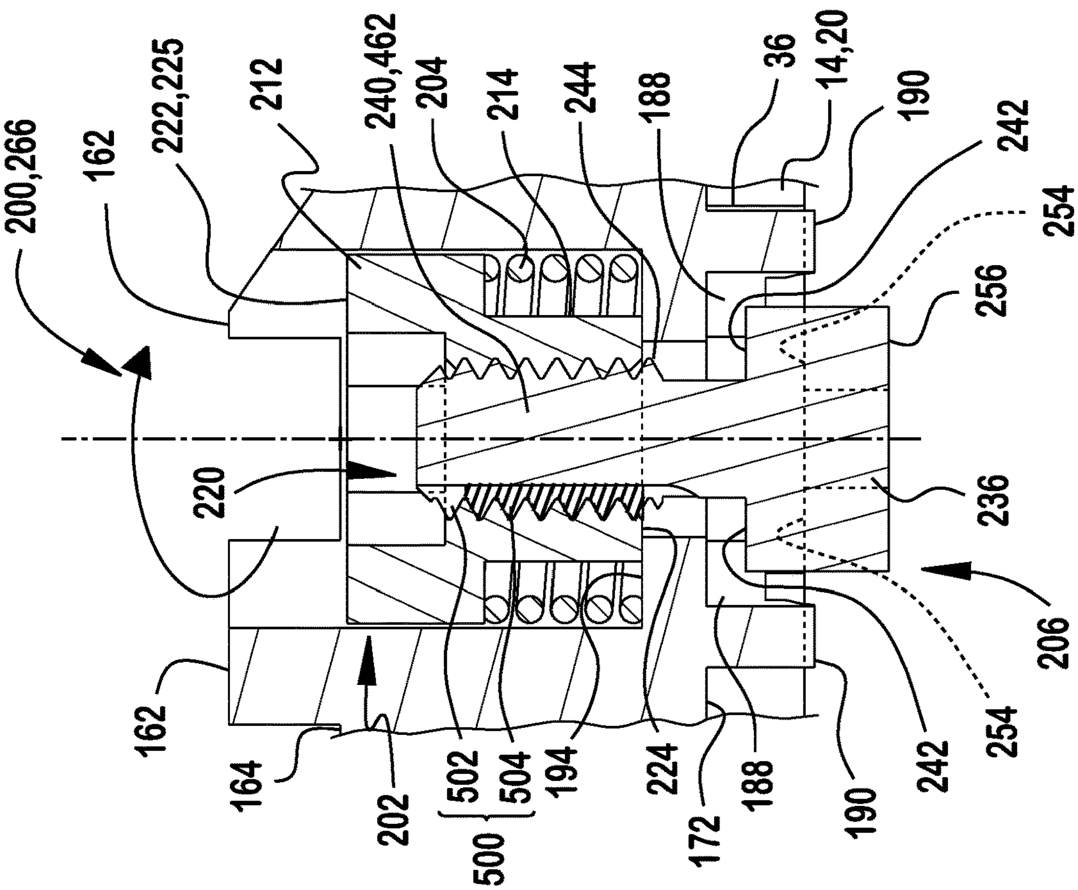
FIG. 104 is another view of the accessory interface system of FIG. 103 in a locked configuration.
Figure 103:
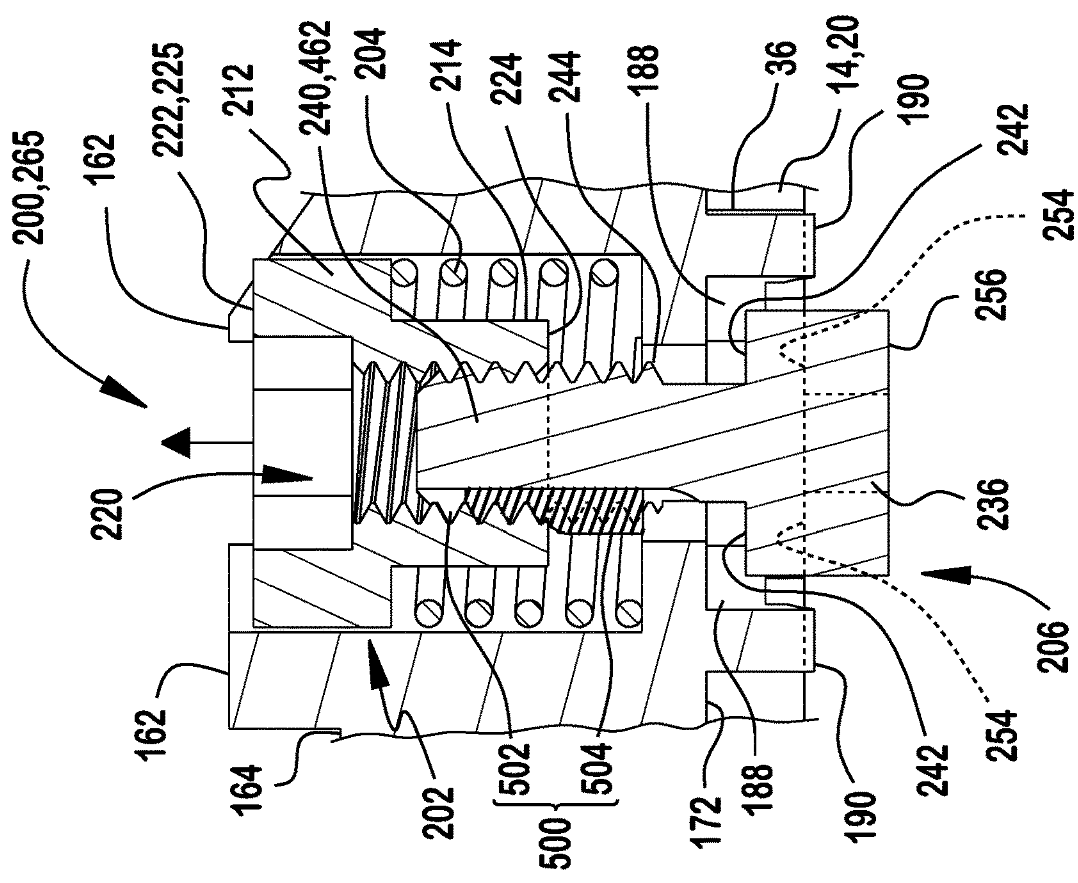
FIG. 103 is another cross-sectional view of yet another embodiment of the accessory interface system of FIG. 99 in a latched configuration.

Referring to FIGS. 99-104, the fastening aid 500 may be compressed between the shaft 240, 462 and the mating fastener 202. As shown in FIGS. 99 and 100, the thread locking insert 504 may be disposed near the proximal end of the shaft 240, 462 such that as the mating fastener 202 advances down the shaft 240, 462, the thread locking insert 504 may be compressed between the mating screw threads 218, 244 and the groove 502. The fastener 202, T-bolt 206 and compressed portion of the thread locking insert 504 may form a coupling which facilitates controlled movement of the T-bolt and fastener in unison when the fastener apparatus is manipulated from a ready configuration 258 (e.g., FIG. 99) to a deployed configuration 264 (see e.g., FIG. 100), and a latched configuration 265 (see e.g., FIG. 101). Further, as the fastener 202 is advanced on the shaft 240, 246 and the slotted object 14 is clamped between the T-bolt 206 and the bottom surface 172 of the accessory rail 460 to achieve a locked configuration 266 (see e.g., FIG. 102), any remaining uncompressed length of the thread locking insert 504 may be compressed between the mating screw 218, 244 and the groove 502 and may more evenly distribute forces acting between the fastener 202 and the shaft 240, 462. The forces acting between the fastener 202, the shaft 240, 462, and the thread locking insert 504 may provide a secure connection by preventing inadvertent slippage between the fastener 202 and the shaft 240, 462 which may otherwise result from vibrations or impact forces acting upon the accessory rail 460 during use.

Still further, FIGS. 105-110, show illustrative fastening aid configurations 500 for the shaft 240 of a T-bolt 206 which may be used in the fastener apparatus 200 of FIGS. 89 and 90.

In FIG. 105, the shaft 240, 462 may have a fastening aid 500 which includes a segment 506 of material (e.g., nylon) that is disposed within a groove 502 cut in the screw threads 244 of the shaft 240, 462 at a location adjacent to the first wall segment 390.

In FIG. 106, the shaft 240, 464 may have a fastening aid 500 which includes a segment 506 of material (e.g., nylon) that is disposed within a groove 502 cut in the screw threads 244 of the shaft 240, 464 at a location adjacent to the third straight wall segment 404.

Figure 107:
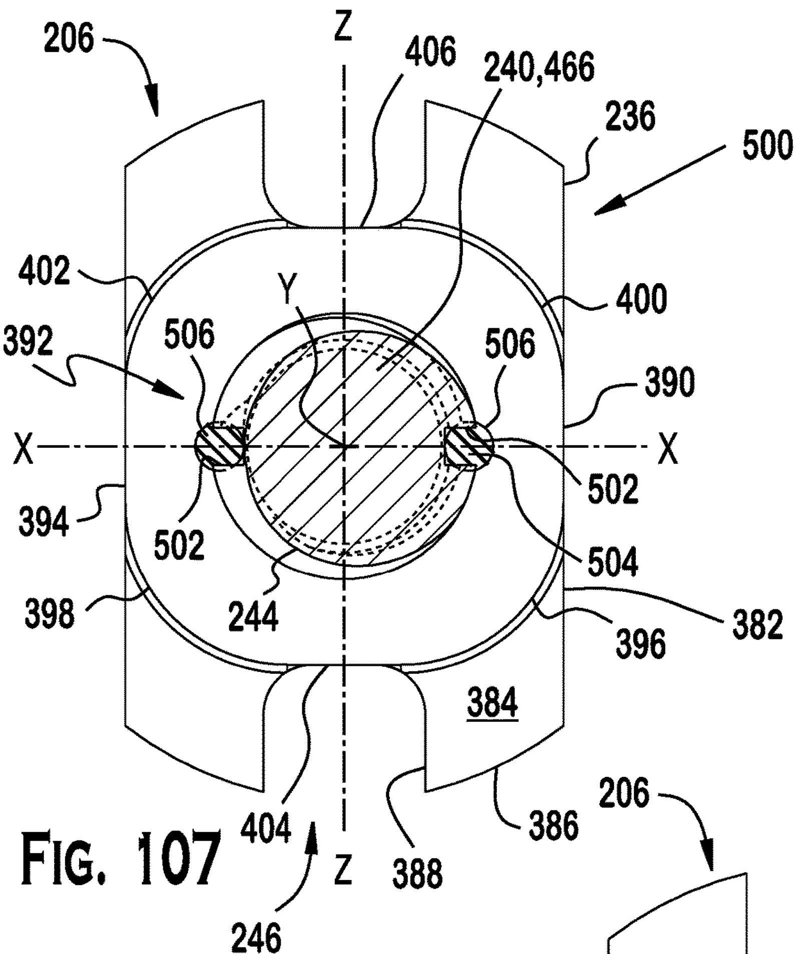
FIG. 107 is a cross-sectional view of another exemplary locking bolt of FIG. 91 along line 105-105.

In FIG. 107, the shaft 240, 466 may have a fastening aid 500 which includes two segments 506 of material (e.g., nylon). One segment 506 of material may be disposed within a groove 502 cut in the screw threads 244 at a location adjacent the first straight wall segment 390, and a second segment 506 of material may be disposed within a groove 502 cut in the screw threads 244 at a location adjacent to the second straight wall segment 394.

Figure 108:
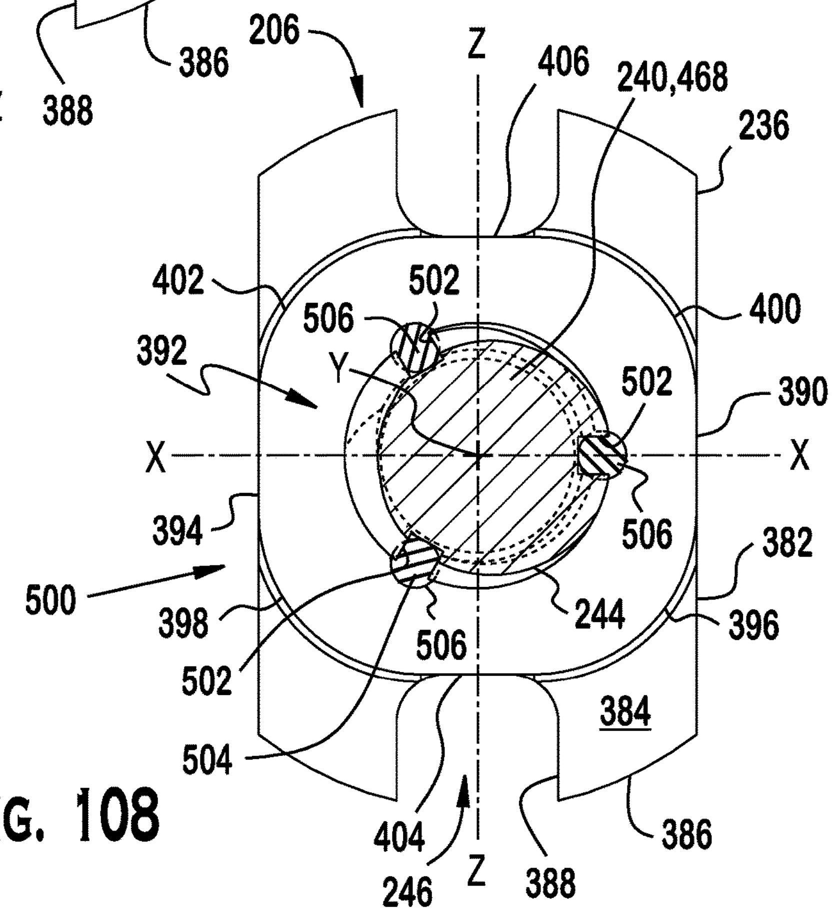
FIG. 108 is a cross-sectional view of another exemplary locking bolt of FIG. 91 along line 105-105.

In FIG. 108, the shaft 240, 468 may have a fastening aid 500 which includes three segments 506 of material (e.g., nylon). Each of the three segments 506 of material may be disposed within a groove 502. Each groove 502 may be cut in the screw threads 244. The grooves 502 may be spaced equally about the circumference of the shaft 240, 468, and thus the grooves 502 may be spaced approximately at 120° intervals. One groove 502 may be located adjacent to the first straight wall segment 390.

Figure 109:
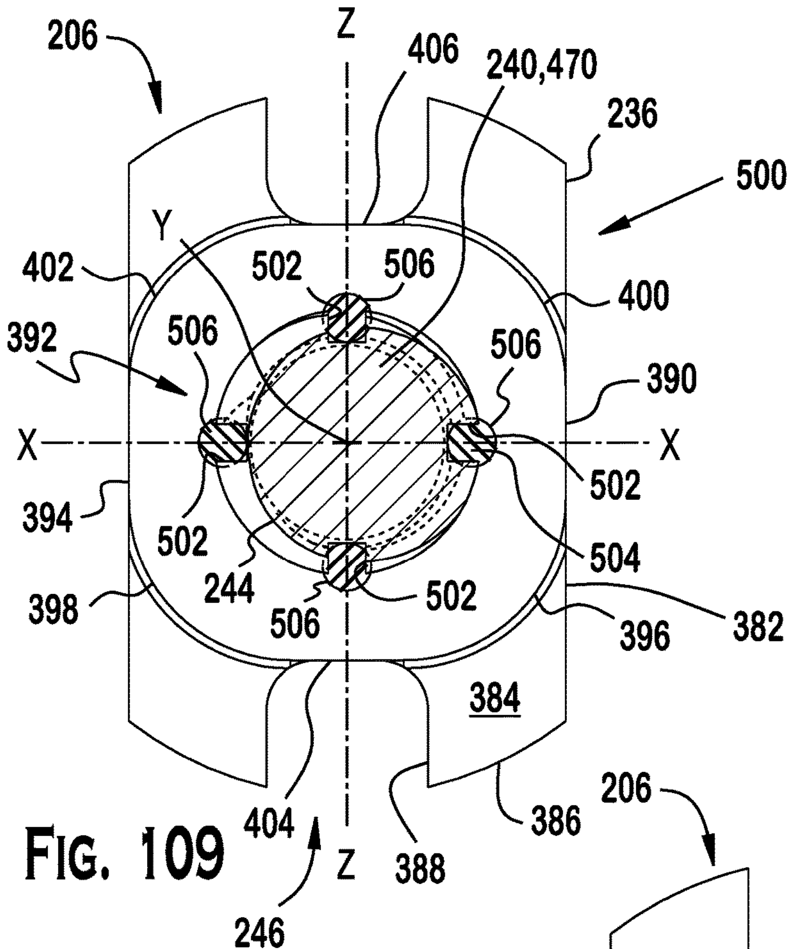
FIG. 109 is a cross-sectional view of another exemplary locking bolt of FIG. 91 along line 105-105.

In FIG. 109, the shaft 240, 470 may have a fastening aid 500 which includes four segments 506 of material (e.g., nylon). Each of the four segments 506 of material may be disposed within a groove 502. Each groove 502 may be cut in the screw threads 244. The grooves 502 may be spaced equally about the circumference of the shaft 240, 470, and thus the grooves 502 may be spaced approximately at 90° intervals. One groove 502 may be located adjacent to the first straight wall segment 390.

Figure 110:
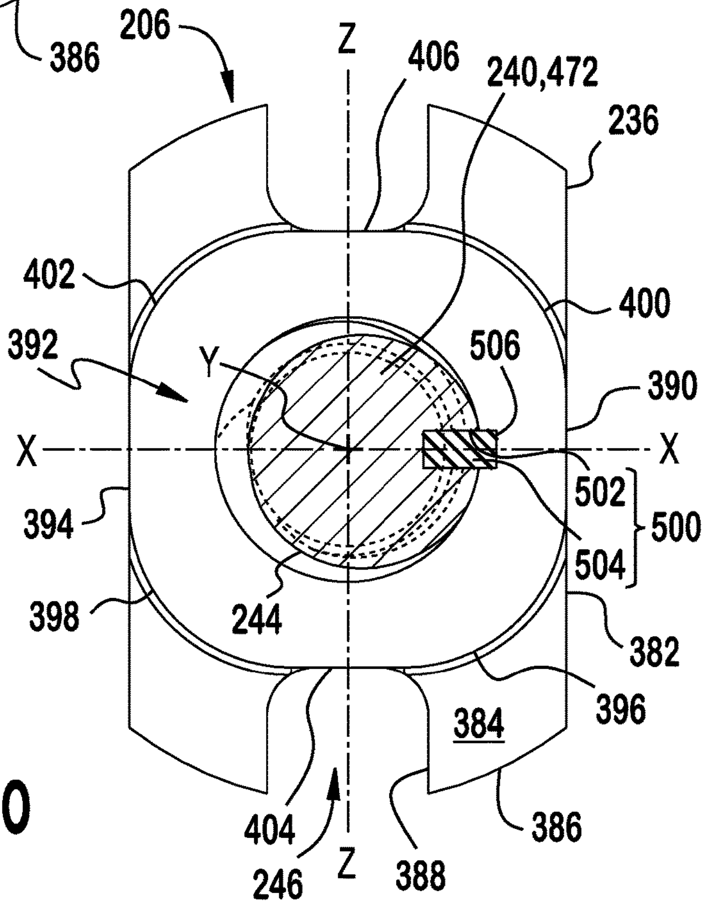
FIG. 110 is a cross-sectional view of another exemplary locking bolt of FIG. 91 along line 105-105.
Figure 111:
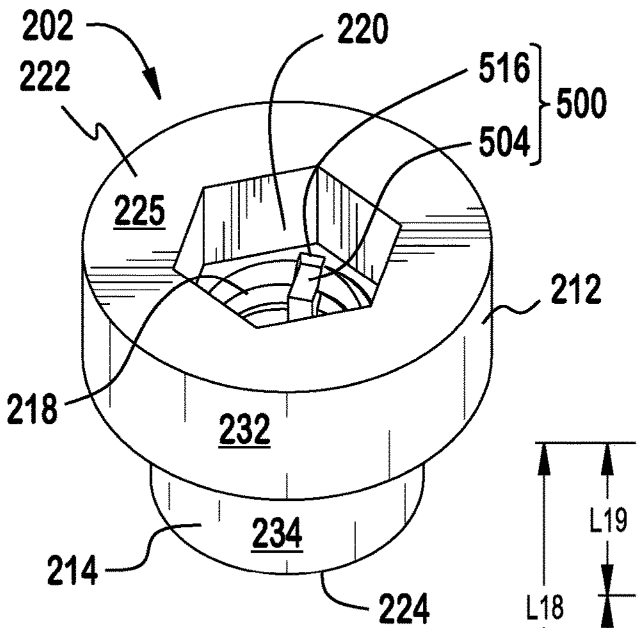
FIG. 111 is a top perspective view of another exemplary fastener of the fastener apparatus of FIG. 43.
Figure 112:
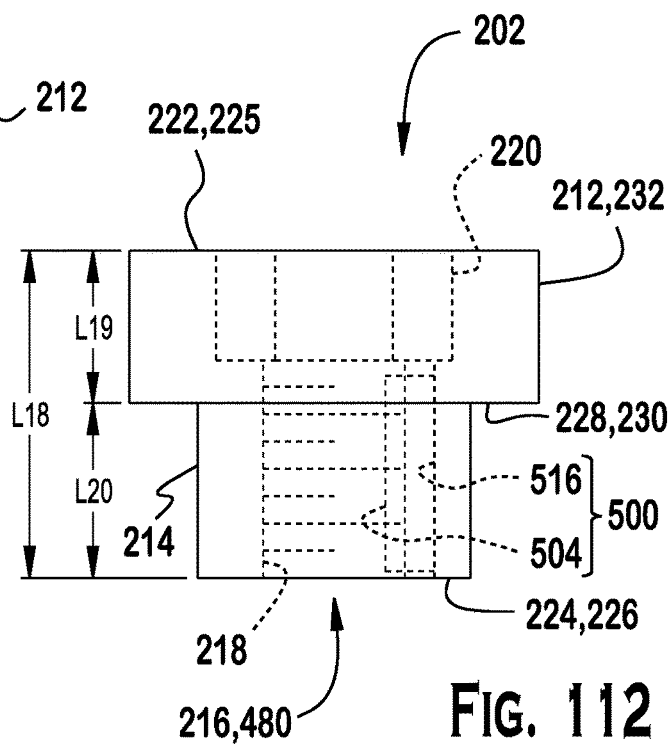
FIG. 112 is a side view of the fastener of FIG. 111.
Figure 113:
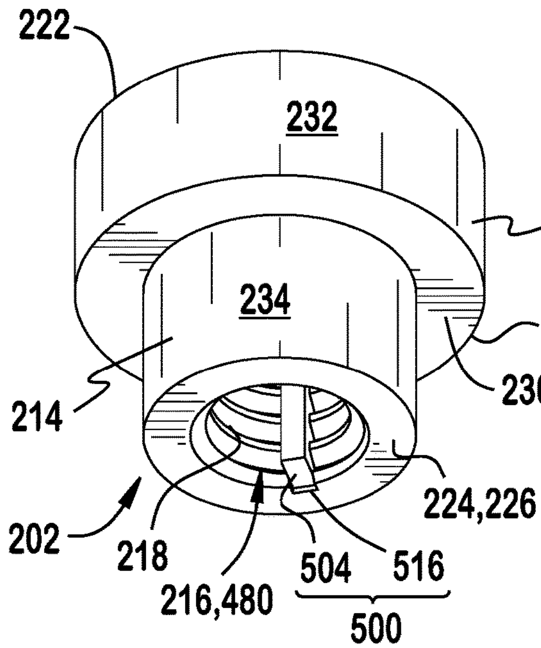
FIG. 113 is a bottom perspective view of the fastener of FIG. 111.
Figure 114:
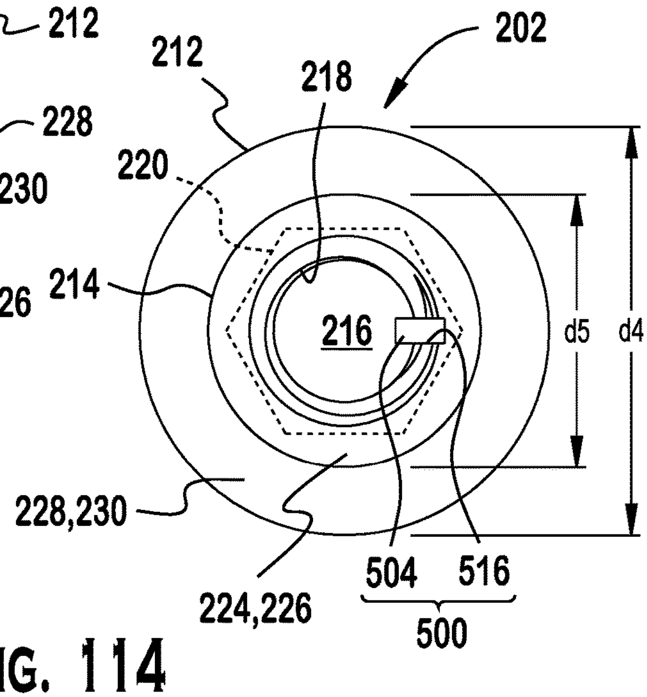
FIG. 114 is a top view of the fastener of FIG. 111.

In FIG. 110, the shaft 240, 472 may have a fastening aid 500 that includes a segment 506 of material (e.g., nylon 6/6) that is disposed within a groove 502 cut in the screw threads 244 at a location adjacent the first wall segment 390. The groove 502 may extend into the shaft 240, 472 beyond the base of the screw thread. The segment 506 of material may have a rectangular cross-section perpendicular to the longitudinal axis of the segment.

Referring to FIGS. 124-131, the shaft 240, 474 may have a fastening aid which is disposed circumferentially around the screw threads near the proximal end 243 of the shaft. As shown in FIGS. 130 and 131 the fastening aid 500 may be received in a circumferential groove 508. The circumferential groove 508 may include a cross-section taken through the longitudinal axis of the shaft 240, 474. The cross-section of the circumferential groove 508 may have a generally U-shape profile. Although, the base of the groove 508 is shown approximately at a depth approximately equal to the depth of the screw threads, the base of the circumferential groove 508 may be set at other depths within the shaft. For example, the circumferential groove 508 may have a generally U-shaped profile with a shallower base such that the circumferential groove 508 is not as deep as the screw threads. In another example, the circumferential groove 508 may have a generally U-shaped profile with a deeper base such that the circumferential groove 508 is deeper than the screw threads. Moreover, the cross-section of the circumferential groove 508 may have another shape provided that the circumferential groove 508 can securely receive the thread locking insert 504. The thread locking insert 504 may be compressed between the shaft 240, 476, the fastener 202, and the circumferential groove 508. As shown in FIG. 130, the fastening aid 500 may be disposed near the proximal end 243 of the shaft 240, 474 such that as the fastener 202 advances down the shaft, the thread locking insert 504 is compressed between the mating screw threads 218, 244 and the circumferential groove 508. As shown in FIG. 131, the thread locking insert 504 may be retained within the circumferential groove 508 in the shaft 240, 474 as the fastener 202 advances down the shaft.

Referring to FIGS. 138-145, the shaft 240, 476 may have a fastening aid 500 which is disposed on the screw threads 244. The fastening aid 500 may include a material which is applied to the screw threads 244 as a liquid, aerosol, or film. Although a liquid, aerosol or film based coating of material 510 may be applied to the entire threaded portion of the shaft 240, 476, the coating of material 510 may be applied to a selected portion of the screw threads 244. For example, the coating of material 510 may be applied in a patch on one localized portion of the screw threads 244 or as a band which circumscribes an area of the screw threads 244. For example, nylon may be bonded to the screw threads 244 to form a patch (e.g., approximately 90-120° coverage) or a band (360° degree coverage) about the screw threads. Generally, 1-2 threads near the proximal end 243 of the shaft 240, 476 may remain uncovered and the next 4-6 threads may be covered by the patch or band. Other patch or band locations and coverage may be implemented as appropriate for a given application or material. One material which may be used to create a fastening aid 500 on the screw threads 244 of the shaft 240, 476 may be Loctite® Threadlocker Blue 242® manufactured by Henkel Corporation, 26235 First Street, Westlake Ohio 44145. Another material may be Nylok® Blue Nylon Torq-Patch® Tuflok® manufactured by Nylok, LLC located at 15260 Hallmark Court, Macomb, Mich. 48042-4007. For instance, when the Nylok® Blue Nylon Torq-Patch® Tuflok® is engaged it may create a wedge between the fastener 202 and the shaft 240, 476 compressing the nylon and creating metal to metal contact opposite the patch. The metal to metal between the screw threads 218, 244 may result in a positive resistance to vibration and loosening. Also, a Teflon (PTFE) tape may be wrapped on (or otherwise applied) to the screw threads 240, 476 serve as a fastening aid 500.

Referring to FIGS. 146-153, the shaft 240, 478 may have a fastening aid 500 which includes a plug or pellet 512 of material which may be disposed in a transverse bore 514 within the screw threads 244 and the shaft. Generally, the plug or pellet 512 may be formed from an engineered plastic material, a metal, an alloy or other material. As shown in FIGS. 152 and 153, the plug or pellet 512 may be retained within the transverse bore 514 as the fastener 202 advances down the shaft 240, 478. The plug or pellet 512 may create a wedge between the fastener 202 and the shaft 240, 478 compressing the material (e.g. nylon) and creating metal to metal contact opposite the plug or pellet 512. Metal to metal contact may result in a positive resistance to vibration and loosening. The plug or pellet 512 may be a replaceable part of the fastener apparatus 200. The shape and placement of the plug or pellet 512 may vary based on the application. Additionally, the fastening aid 500 may be implemented with more than one transverse bore 514 and its associated plug or pellet 512. Accordingly, the fastening aid 500 may be a plug or pellet 512 of oversized nylon which is wedged into a transverse bore 514 in the screw threads 244 of the shaft 240, 478.

Figure 116:
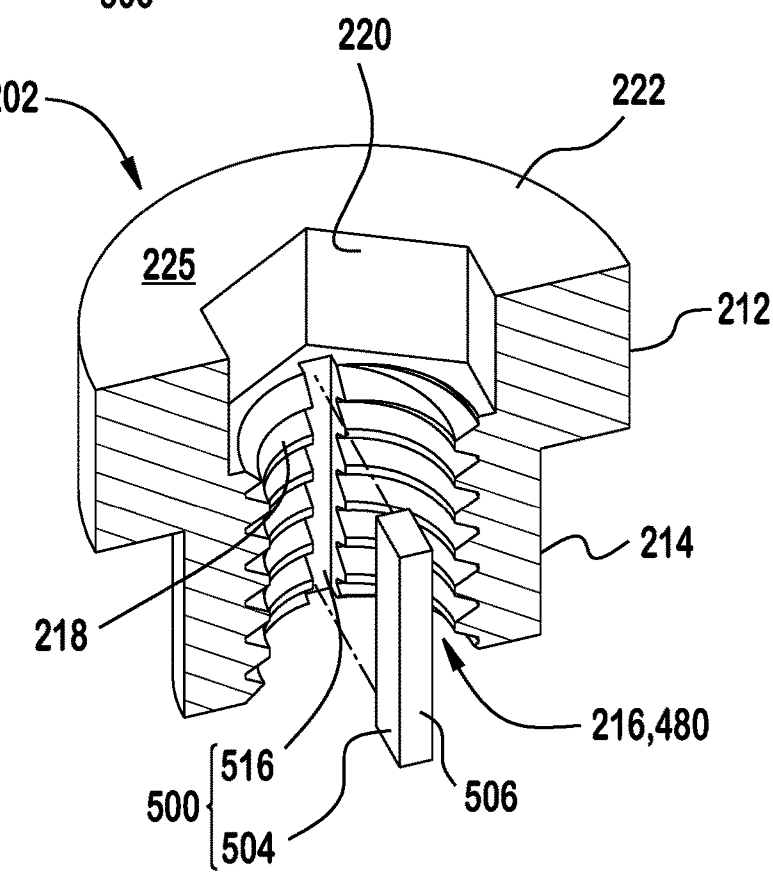
FIG. 116 is an exploded cross-sectional view of another embodiment of the fastener of FIG. 111 along line 115-115.
Figure 118:
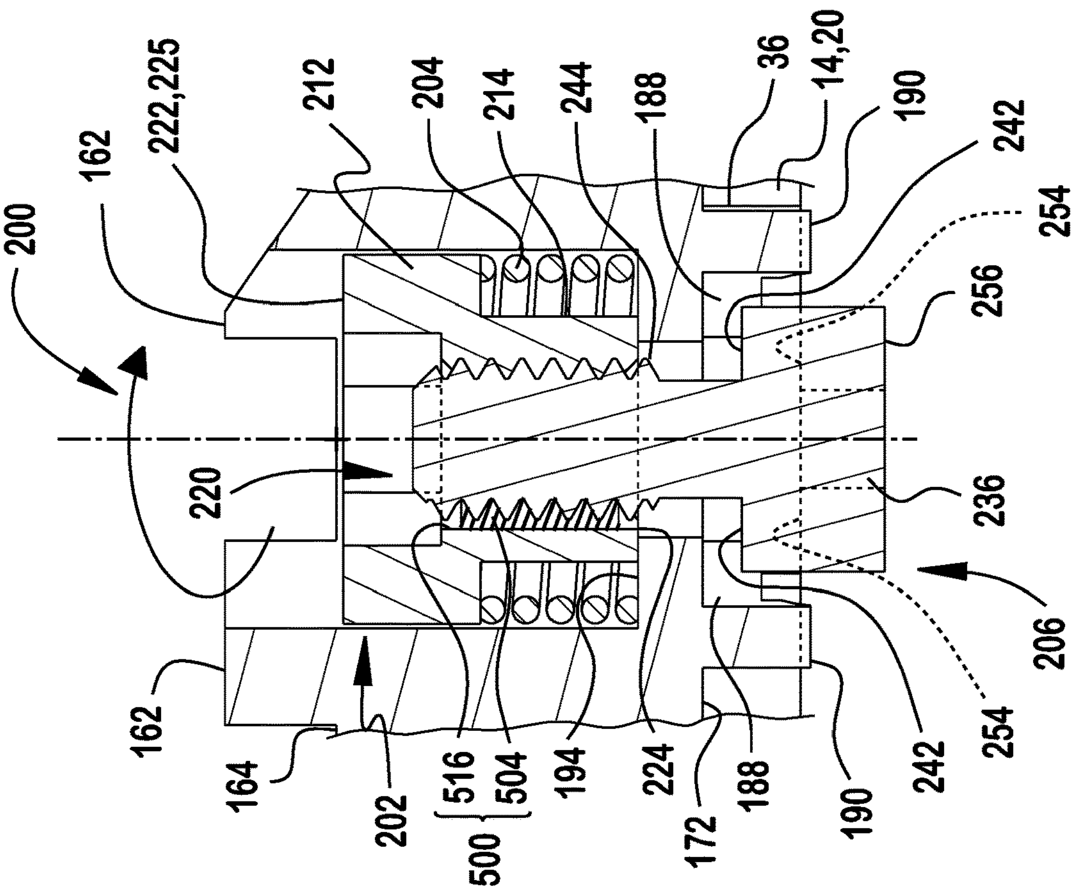
Figure 117:
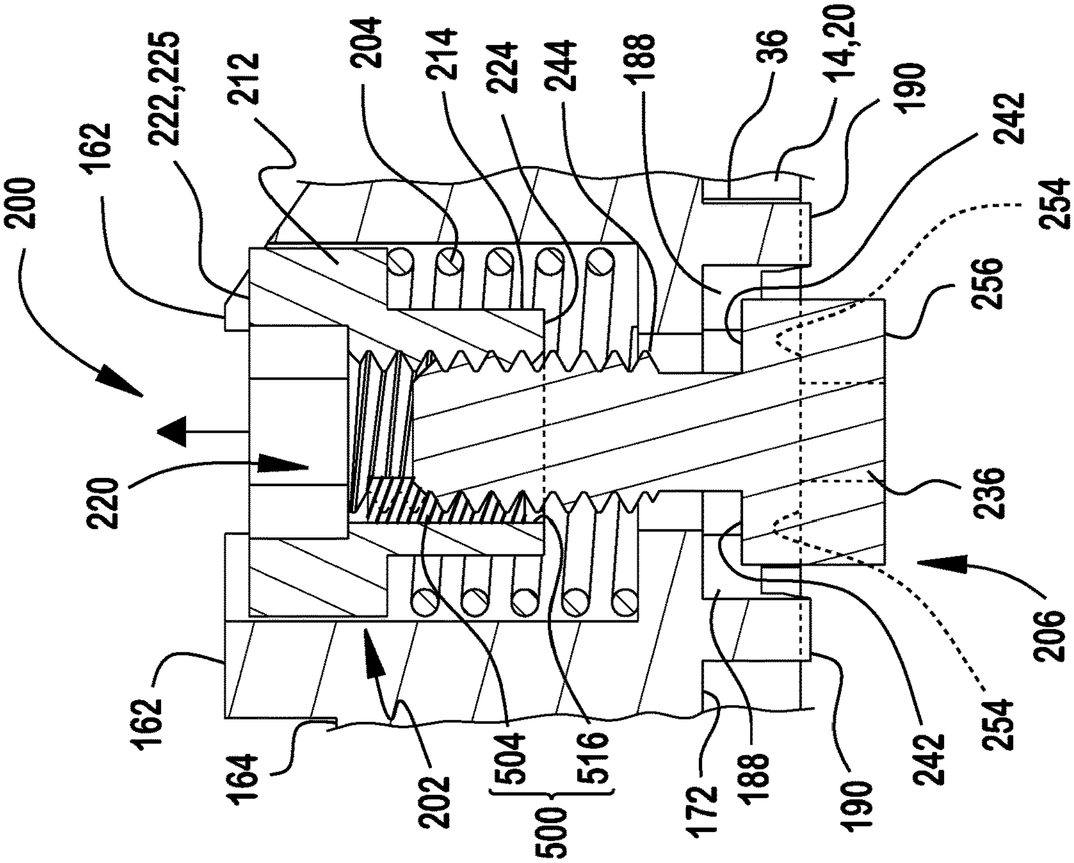
FIG. 117 is cross-sectional view of another embodiment of the accessory interface system of FIG. 63 in a latched configuration.

Referring to FIGS. 111-114 and 116-119, the fastener 202 of the fastener apparatus 200 may include a fastening aid 500. For example, the fastener bore 216, 480 may include a fastening aid 500 which includes a thread locking insert 504 that is disposed within a groove 516 cut in the screw threads 218 of the fastener bore 216, 480. As shown in FIGS. 115 and 116, the fastening aid 500 may include a thread locking insert 504 constructed from a single segment 506 of material. In FIG. 115, the segment 506 may be a generally circular cylindrical strip of material. In FIG. 116, the segment 506 may be a rectangular strip of material. The segment, however, may have other cross-sectional shapes or forms. The thread locking insert 504 may be secured to the fastener bore 216, 480 by an interference fit with the groove 516. Other fastening techniques may be used to supplement or replace an interference fit between the thread locking insert 504 and the groove 516. As shown in FIGS. 117 and 118, the thread locking insert 504 may be retained within the groove 516 as the fastener 202 advances down the shaft 240. The thread locking insert 504 may create a wedge between the fastener 202 and the shaft 240 compressing the material and creating metal to metal contact opposite the thread locking insert 504. This may result in a positive resistance to vibration and loosening.

Figure 119:
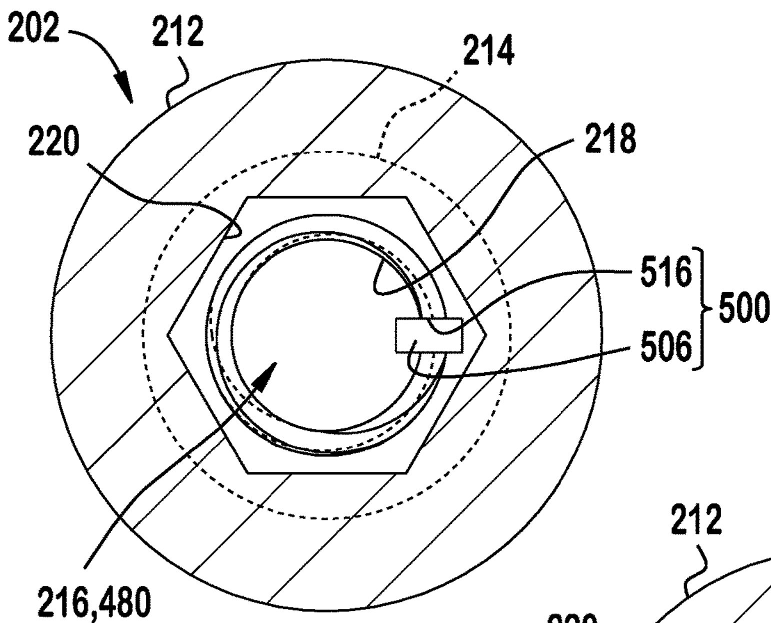
Figure 120:
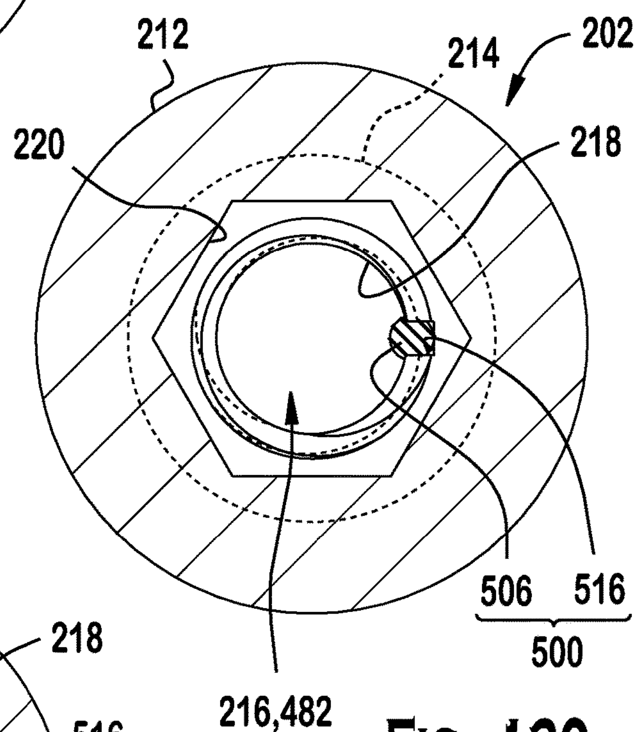
Figure 121:
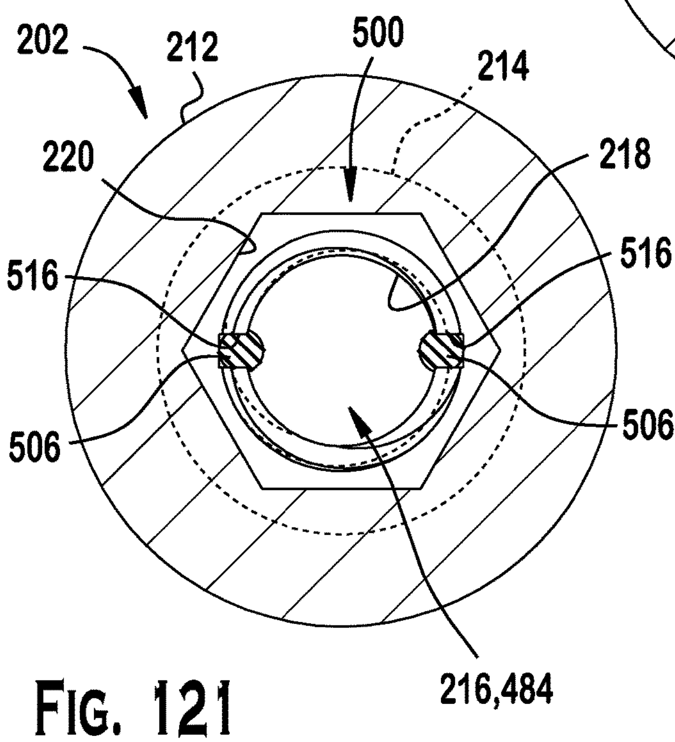
Figure 122:
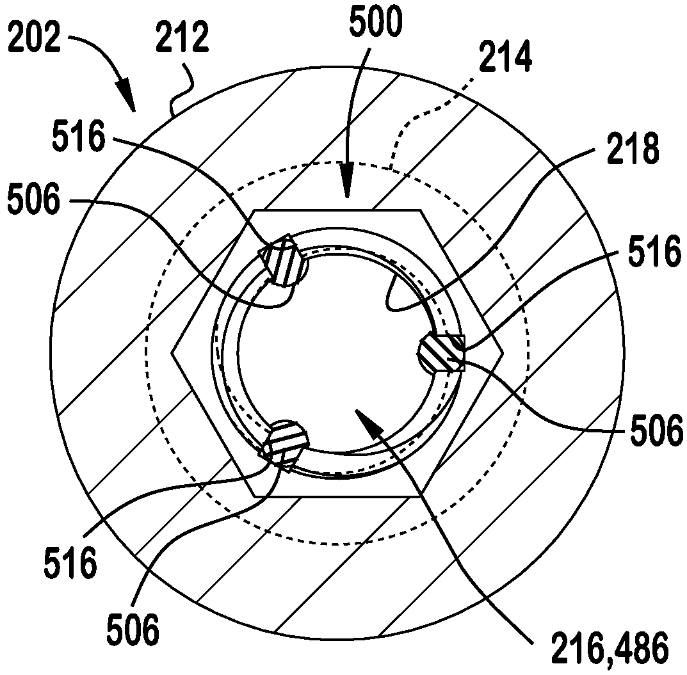
Figure 123:
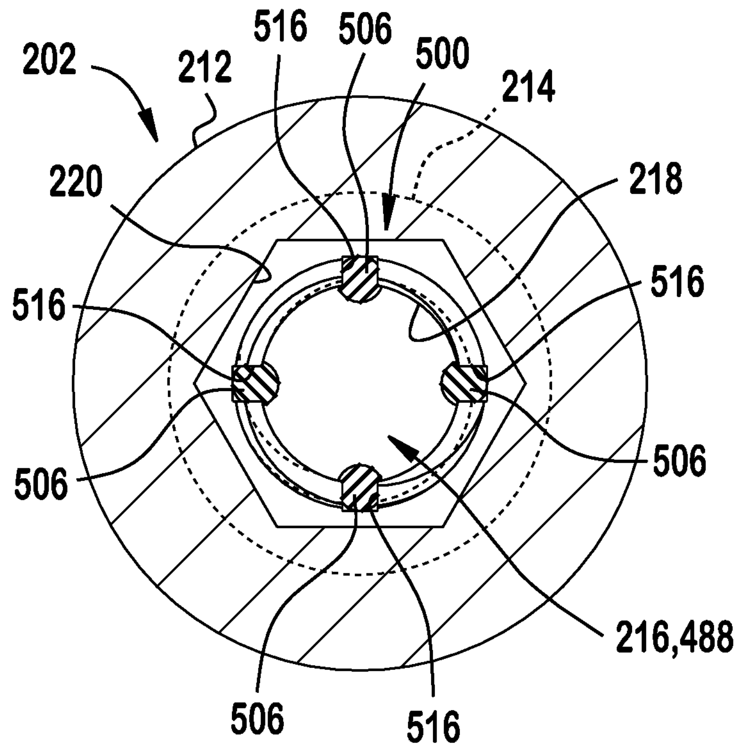
Figure 124:
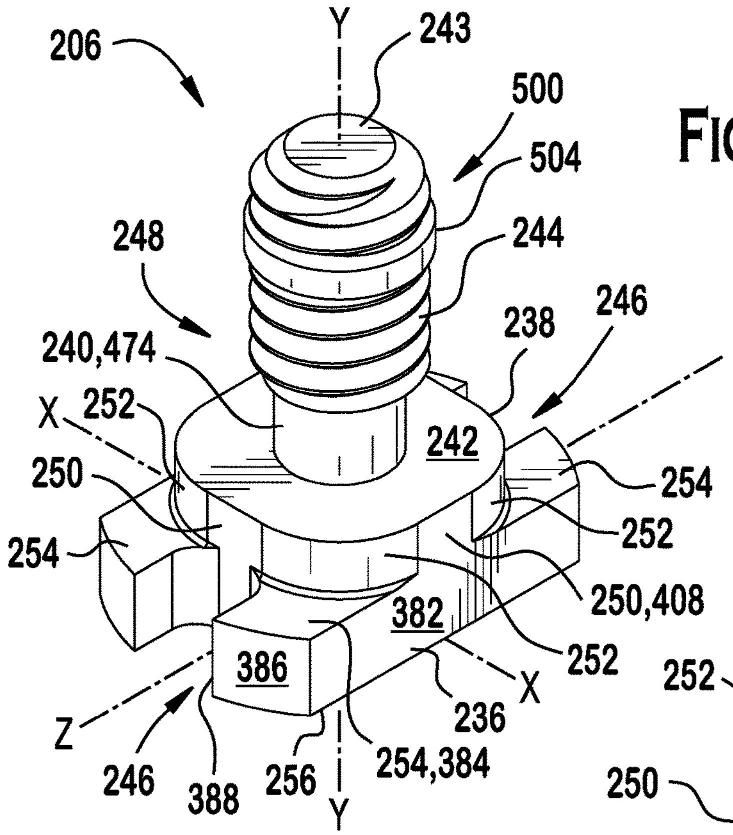
Figure 125:
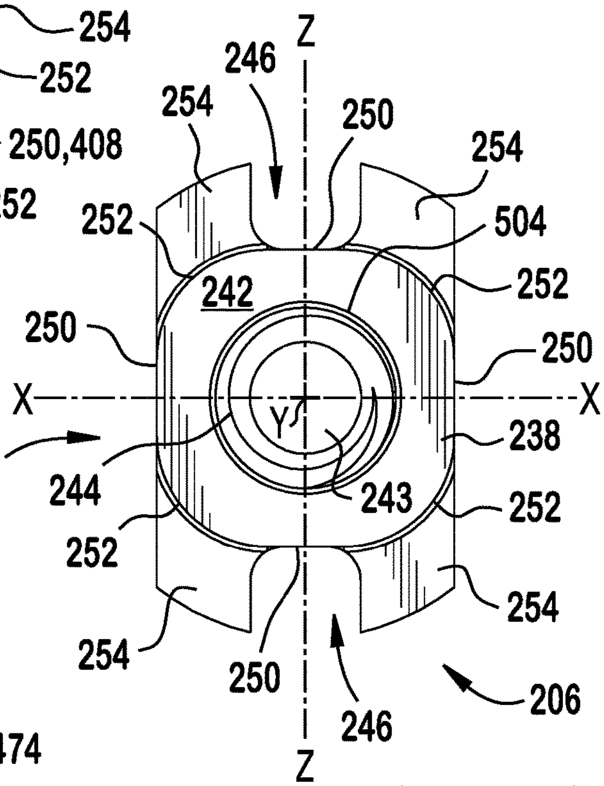
Figure 126:
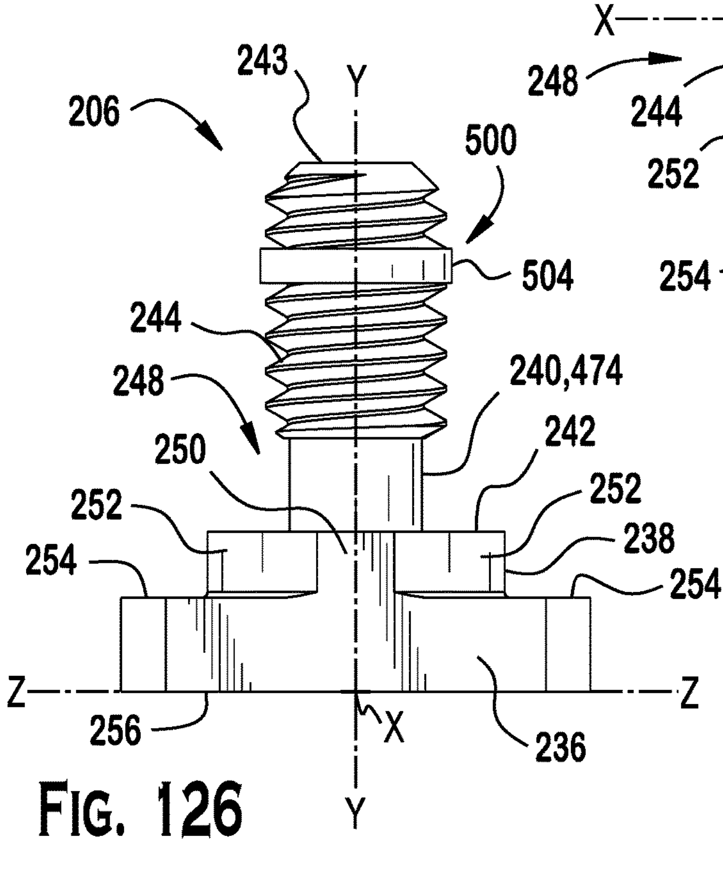
Figure 127:
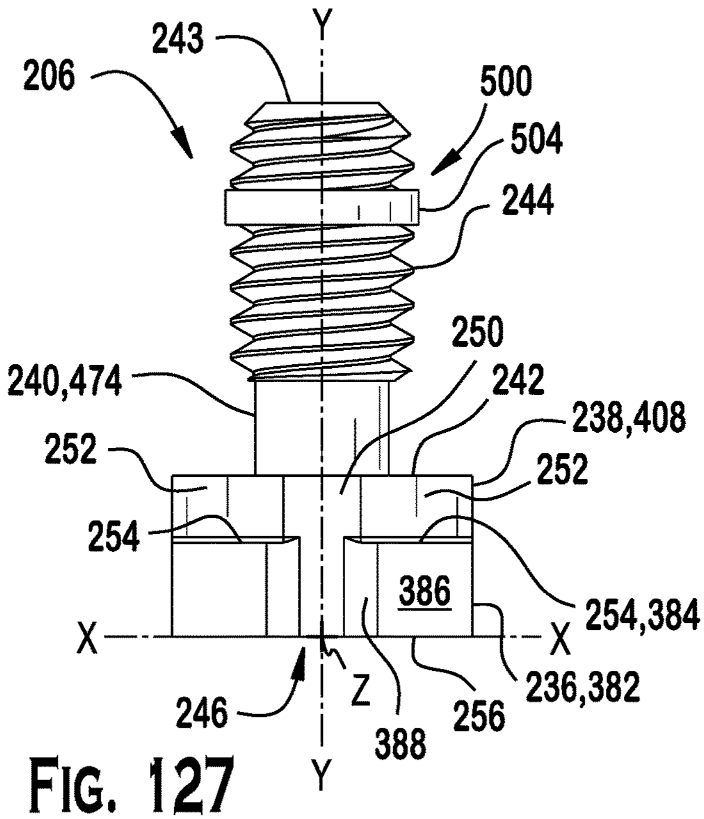
Figure 128:
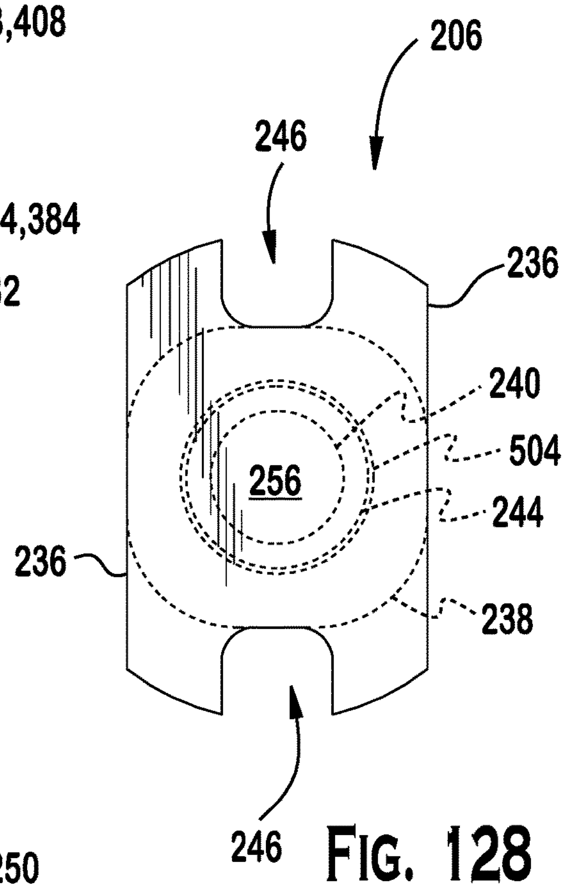
Figure 129:
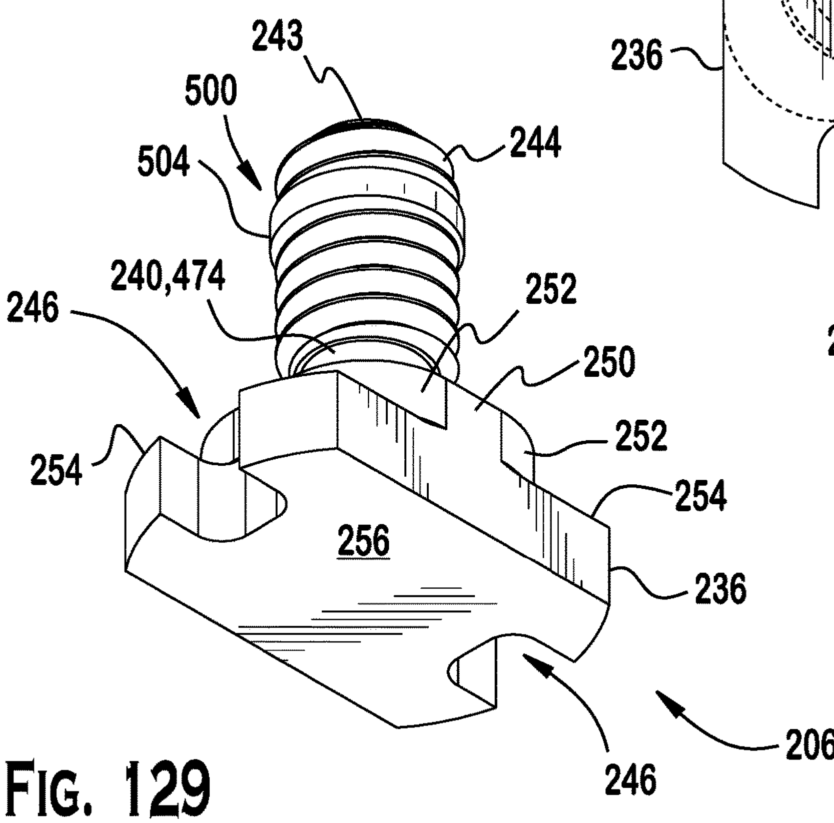

FIGS. 119-123, show illustrative fastening aid 500 configurations for the fastener bore 216 of the fastener apparatus 200 of FIGS. 43 and 44. In FIG. 119, the fastener bore 216, 480 may have a fastening aid 500 which includes a segment 506 of material that is disposed within a groove 516 cut into the screw threads 218 and abutting portions of the fastener. In this embodiment, the segment 506 may be a rectangular strip of material. In FIG. 120, the fastener bore 216, 482 may have a fastening aid 500 which includes a segment 506 of material that is disposed within a groove 516 cut into the screw threads 218 of the fastener 202. In this embodiment, the segment 506 may be a circular cylindrical strip of material.

In FIG. 121, the fastener bore 216, 484 may have a fastening aid 500 which includes two segments 506 of material that are each disposed within a groove 516 cut into the screw threads of the fastener. The grooves 516 may face one another. In this embodiment, the segments 506 may be a circular cylindrical strip of material.

In FIG. 122, the fastener bore 216, 486 may have a fastening aid 500 which includes three segments 506 of material which may each be disposed within a groove 516 cut into the screw threads 218 of the fastener 202. The grooves 516 may be evenly spaced about the fastener bore, and thus the channels may be spaced at approximately 120° intervals. In this embodiment, the segments 506 may be circular cylindrical strips of material.

In FIG. 123, the fastener bore 216, 488 may have a fastening aid 500 which includes four segments 506 of material each of which may be disposed within a groove 516 cut into the screw threads 218 of the fastener 202. The channels may be evenly spaced about the fastener bore, and thus the grooves 516 may be spaced at approximately 90° intervals. In this embodiment, the segments 506 may be a circular cylindrical strip of material.

Referring to FIGS. 132-137, the fastener bore 216, 450 may have a fastening aid 500 which includes a thread locking insert 504 in the shape of a ring. The ring of material may be disposed in a circumferential groove 518 within the screw threads 218. The thread locking insert may be constructed from an engineered plastic material. As shown in FIGS. 136 and 137, the thread locking insert 504 may be retained within the circumferential groove 518 as the fastener 202 advances down the shaft 240. The ring of material may create a wedge between the fastener 202 and the shaft 240 compressing the thread locking insert 504 and creating positive resistance to vibration and loosening.

Referring to FIGS. 154-159, the bore 216, 490 may have a fastening aid 500 which includes a thread locking insert 504 in the form of a plug or pellet 512 that is disposed in a transverse bore 520 within the screw threads 218. The transverse bore 520 may extend into the fastener. The plug or pellet 512 may be constructed from an engineered plastic material, a suitable metal, alloy or other appropriate material. As shown in FIGS. 158 and 159, the plug or pellet 512 may be retained within the transverse bore 520 as the fastener 202 advances down the shaft 240. The plug or pellet 512 may create a wedge between the fastener 202 and the shaft 240 compressing the thread locking insert 504 and creating metal to metal contact opposite the plug or pellet 512. This may result in a positive resistance to vibration and loosening. The plug or pellet 512 may be a replaceable part of the fastener apparatus 200.

Accordingly, the fastener apparatus 200 may incorporate a fastening aid 500. Generally, the fastening aid 500 may be associated with external screw threads 244 of the fastener apparatus, internal screw threads 218 of the fastener apparatus, or a combination thereof. The fastening aid 500 may facilitate operation of fastener apparatus 200 by forming a coupling with the interior fastener 206 and exterior fastener 202. The coupling may provide controlled movement of the internal fastener 206 and the external fastener 202 in unison when the fastener apparatus 200 is manipulated between a ready configuration 258 (e.g., FIG. 99) and a deployed configuration 264 (see e.g., FIG. 100).

Referring to FIGS. 89 and 90 the threaded portion 244 of the shaft may mate with a nut (or exterior fastener) 202 which may include a centrally aligned bore 216 having mating screw threads 218. The nut 202 may include a proximal portion or head 212. The proximal end surface 225 of the nut (or exterior fastener) 202 may include a drive slot 220 (see e.g., FIG. 89). The nut 202 further may include a spring guide 214 that extends from the head 212. The bore 216 may extend from the distal end surface 226 to the drive slot 220. The bore 216 may include screw threads 218 which are configured and dimensioned to mate with screw threads 244 on the T-bolt (or interior fastener) 206. Hence, the nut 202 may be a receptacle that receives and couples to the shaft 240 of the lock bolt 206 within a counterbore 192, 196 of the accessory rail 460. The coil spring 204 may be disposed in the larger diameter bore 192 between an end wall 194 of the larger diameter bore 192 and an annular surface (or spring face) 230 on the head 212 of the nut 202. After the fastener apparatus 200 is assembled, the coil spring 204 may bias the lock bolt 206 against the accessory rail 460.

FIG. 160 shows an illustrative rifle 530 with an exemplary hand guard 20 and upper receiver 532 each bearing a plurality of slots 22. The firearm 530 may include a first exemplary configuration of weapon accessories that are secured to various slots 22 using a fastener apparatus as disclosed herein. For example, a front flip sight 534, a tactical flashlight 536, an angled fore grip 538, and a quick disconnect mount 540 may be secured to various slots 22 on the handguard 14, 20; whereas, a rear flip sight 542 and an electronic optical sight (or other active device e.g. a laser sight, a night vision sight, etc.) 544 may be secured to slots on the upper receiver 14, 532. By contrast, FIG. 161 shows the rifle 530 with a second exemplary configuration of weapon accessories secured to various slots using a fastener apparatus as disclosed herein. The second exemplary configuration of weapon accessories may include a front flip sight 534, five 2-slot accessory rails 460, a bipod 546, a vertical grip 548, and a quick disconnect mount secured to various slots 22 on the handguard 14, 20. A scope 550 may be secured to two of the 2-slot accessory rails 460, and a rear flip sight 542 may be secured to a slot 22 on the upper receiver 14, 532. Each of the first and second exemplary configurations of weapon accessories may be selected for an operational purpose.

FIG. 162 shows an exemplary front flip site 534 with a fastener apparatus 18, 200 for use with a universal interface system 10. The front flip sight 534 may include a block 552, a front sight 554 pivotally connected to the block, a counterbore 556 in the block, a guide 188 adjacent the counterbore, and a T-bolt 206 depending from the counterbore. The exterior fastener 202 and spring 240 may be disposed within the counterbore 556. Access to the exterior fastener may be provided from the open end 558 of the counterbore. In use, the front flip sight 534 may be positioned over a slot 22 of a slotted object 14 such that the T-bolt 206 is received within the slot. A tool may be inserted into the open end 558 of the counterbore 556 to manipulate the exterior fastener 202. The fastening apparatus 200 may be operated as previously described (see e.g., FIGS. 63-76) to secure an accessory 16, 534 to a slotted object 14, 30 which is associated with the firearm 530.

FIG. 163 shows an exemplary rear flip site 542 with a fastener apparatus 200 for use with a universal interface system 10. The rear flip sight 542 may include a block 560, a rear sight 562 pivotally connected to the block, a counterbore 566 in the block, a guide 188 adjacent the counterbore, and a T-bolt 206 depending from the counterbore. The exterior fastener 202 and spring 240 may be disposed within the counterbore. Access to the exterior fastener 202 may be provided from the open end 558 of the counter bore. In use, the rear flip sight 542 may be positioned over a slot 22 of a slotted object 14 such that the T-bolt 206 is received within the slot. A tool may be inserted into the open end 558 of the counterbore to manipulate the exterior fastener 202. The fastening apparatus 200 may be operated as previously described (see e.g., FIGS. 63-76) to secure an accessory 16, 542 to a slotted object 14, 532 which is associated with the firearm 530.

FIG. 164 shows an exemplary angled foregrip 538 with three fastener apparatus 200 and a projection 184 of a universal interface system 10. The angled foregrip 538 may include an elongated block 566 having a triangular shaped portion 568, three counterbores 556 in the block, guides 188 adjacent the counterbores, a projection 184 adjacent one of the counterbores 556, and a T-bolt 206 depending from each counterbore. The exterior fastener 202 and spring 204 may be disposed within the counter bore. Access to the exterior fasteners 202 may be provided from the open end 558 of the respective counterbores. In use, the angled fore grip 538 may be positioned over three adjacent slots 22 of a slotted object 14. One T-bolt 206 may be received within each slot 22. The projection 148 may be received in one of the slots 22 such that one end of the projection abuts a short end of the slot and the guide 188 for the adjacent T-bolt 206 abuts the opposite short end of the slot. A tool may be inserted into the open ends 558 of the counterbores 556 to manipulate the exterior fasteners 202. The fastening apparatus 200 may be operated as previously described (see e.g., FIGS. 63-76) to secure an accessory 16, 538 to a slotted object 14, 20 which is associated with the firearm 530.

FIG. 165 shows an exemplary tactical flashlight 536 with a fastener apparatus 200 and projection 148 of a universal interface system 10. The tactical flashlight 536 may be secured within a clamp 570. The base of the clamp 570 is connected to a block 572. The block 572 includes a counterbore 556, a guide 188 adjacent the counterbore, a T-bolt 206 depending from the counterbore, and a projection 184 adjacent the T-bolt. An exterior fastener 202 and spring 204 may be disposed within the counterbore. Access to the exterior fastener 202 may be provided from the open end 558 of the counterbore. In use, the block 572 may be positioned over a slot 22 of a slotted object 14. The T-bolt 206 and projection 184 may be received in the slot 22 such that one end of the projection abuts a short end of the slot and the guide 188 for the adjacent T-bolt abuts the opposite short end of the slot. A tool may be inserted into the open end 558 of the counterbore to manipulate the exterior fastener 202. The fastening apparatus 200 may be operated as previously described (see e.g., FIGS. 63-76) to secure an accessory 16, 536 to a slotted object 14, 20 which is associated with the firearm 530.

FIG. 166 shows an exemplary optical sight 544 with a fastener apparatus 200 and projection 184 of a universal interface system 10. The optical sight 544 may be fixed to a mounting device 576. The mounting device 576 may include a counterbore 556, a guide 188 adjacent the counterbore, a T-bolt 206 depending from the counterbore, and a projection 184 adjacent the T-bolt. An exterior fastener 202 and spring 204 may be disposed within the counterbore. Access to the exterior fastener may be provided from the open end 558 of the counter bore. In use, the mounting device 576 may be positioned over a slot 22 of a slotted object 14. The T-bolt 206 and projection 184 may be received in the slot 22 such that one end of the projection 184 abuts a short end of the slot and the guide 188 for the adjacent T-bolt abuts the opposite short end of the slot. A tool may be inserted into the open end 558 of the counterbore to manipulate the exterior fastener 202. The fastening apparatus 200 may be operated as previously described (see e.g., FIGS. 63-76) to secure an accessory 16, 544 to a slotted object 14, 532 which is associated with the firearm 530.

FIG. 167 shows a quick disconnect (QD) mount 540 with a fastener apparatus 200 of a universal interface system 10. The QD mount 540 includes a block 578, a counterbore 556 in the block, a guide 188 adjacent the counterbore, and a T-bolt 206 depending from the counterbore 556. Referring to FIG. 168, the counterbore 556 may include a receptacle 580 for a quick disconnect fitting near the open end 558 of the counterbore. Also, the external fastener 202 and spring 204 may be disposed within the counterbore. Access to the exterior fastener 202 may be provided from the open end 558 of the counterbore. In another embodiment, the block 578 may include a projection 184 adjacent the T-bolt. In use, the QD mount 540 may be positioned over a slot 22 of a slotted object 14 such that the T-bolt 206 is received within a slot 22. A tool may be inserted into the open end 558 of the counterbore 556 to manipulate the exterior fastener 202. The fastening apparatus 200 may be operated as previously described (see e.g., FIGS. 63-76) to secure an accessory 16, 540 to a slotted object 14, 30 which is associated with the firearm 530.

FIG. 169 shows an exemplary vertical grip 548 with a fastener apparatus 200 and a projection 184 of a universal interface system 10. The vertical grip 548 may be fixed to a mounting device 582. The mounting device 582 may include a counterbore 556, a guide 188 adjacent the counterbore, a T-bolt 206 depending from the counterbore 556, and a projection 184 adjacent the T-bolt 206. An exterior fastener 202 and spring 204 may be disposed within the counterbore. Access to the exterior fastener may be provided from the open end 558 of the counter bore. In use, the mounting device 582 may be positioned over a slot 22 of a slotted object 14. The T-bolt 206 and projection 184 may be received in the slot 22 such that one end of the projection 184 abuts a short end of the slot and the guide 188 for the adjacent T-bolt abuts the opposite short end of the slot. A tool may be inserted into the open end 558 of the counterbore 556 to manipulate the exterior fastener 202. The fastening apparatus 200 may be operated as previously described (see e.g., FIGS. 63-76) to secure an accessory 16, 548 to a slotted object 14, 30 which is associated with the firearm 530.

FIG. 170 shows an exemplary bipod 546 with a fastener apparatus 200 and a projection 184 of a universal interface system 10. The bipod 546 may be fixed to a mounting device 584. The mounting device 584 may include a counterbore 556, a guide 188 adjacent the counterbore 556, a T-bolt 206 depending from the counterbore, and a projection 184 adjacent the T-bolt. An exterior fastener 202 and spring 204 may be disposed within the counterbore 556. Access to the exterior fastener 202 may be provided from the open end 558 of the counterbore. In use, the mounting device 584 may be positioned over a slot 22 of a slotted object 14. The T-bolt 206 and projection 184 may be received in the slot 22 such that one end of the projection 184 abuts a short end of the slot and the guide 188 for the adjacent T-bolt abuts the opposite short end of the slot. A tool may be inserted into the open end 558 of the counterbore 556 to manipulate the exterior fastener 202. The fastening apparatus 200 may be operated as previously described (see e.g., FIGS. 63-76) to secure an accessory 16, 546 to a slotted object 14, 30 which is associated with the firearm 530.

FIG. 171 shows an exemplary grenade launcher 586 with four fastener apparatus 200 and a projection 184 of a universal interface system. The grenade launcher 586 may include an elongated member 588 having a dovetail track 590, a trigger housing 592 adjacent the dovetail track, and a barrel 594 that mounts within the dovetail track and abuts the trigger housing. The grenade launcher 586 may be configured for 40 mm ammunition. The elongated member 588 further may include four counterbores 556, guides 188 adjacent the counterbores, a projection 184 adjacent one of the counterbores, and a T-bolt 206 depending from each counterbore. An exterior fastener 202 and spring 204 may be disposed within each counterbore 556. Access to the exterior fastener 202 may be provided from the open ends 558 of the counterbores. In use, the elongated member 588 may be positioned over four or more adjacent slots 22 of a slotted object 14. One T-bolt 206 may be received within each slot 22. The projection 184 may be received in one of the slots 22 such that one end of the projection 184 abuts a short end of the slot and the guide 188 for the adjacent T-bolt abuts the opposite short end of the slot. A tool may be inserted into the open ends 558 of the counterbores 556 to manipulate the exterior fasteners 202. The fastening apparatus 200 may be operated as previously described (see e.g., FIGS. 63-76) to secure an accessory 16, 586 to a slotted object 14, 30 which is associated with the firearm 530.

Accordingly, these and other accessories 16 may be secured to a slotted object 14 of a universal interface system 10, using a fastener apparatus 18, 200, and accessory rails 17, 160, 460 as disclosed and described herein.

While it has been illustrated and described what at present are considered to be embodiments of the present invention, it will be understood by those skilled in the art that various changes and modifications may be made, and equivalents may be substituted for elements thereof without departing from the true scope of the invention. For example, different spring types, biasing mechanisms, fastening aids, thread locking insert materials, accessories or slot spacing span values may be used in modified configurations and combinations as those embodiments of a fastener apparatus, accessory rails, and universal interface system disclosed herein. Additionally, features and/or elements from any embodiment may be used singly or in combination with other embodiments. Therefore, it is intended that these inventions not be limited to the particular embodiments disclosed herein, but that they have the full scope defined by the language of the following claims, and equivalents thereof.

What is claimed is:

1. A fastener apparatus for a universal interface system which comprises an object that includes a mounting surface, a locking surface, and an elongated slot extending from the mounting surface to the locking surface, the fastener apparatus comprising:
- a weapon accessory body comprising a crest, and
- an interior fastener which comprises
  - an elongated base having a first longitudinal axis, the elongated base including
    - a lower surface,
    - a first side proximate to the lower surface,
    - a second side proximate to the first side, and
    - a third side proximate to the first side and the lower surface, the third side including
      - a notch which comprises
      - a first interior sidewall, the first interior sidewall extending from the second side to the lower surface of the elongated base, the notch being configured and dimensioned to receive the crest and being mated with the crest to block rotational movement of the elongated base;
- a shoulder next to the elongated base, the shoulder having a second longitudinal axis, the shoulder including
  - an end surface spaced from the second side of the elongated base along the second longitudinal axis; and
- a first screw thread proximate to the end surface for receiving a mating fastener.

2. The fastener apparatus of claim 1, wherein the first side abuts the lower surface.

3. The fastener apparatus of claim 2, wherein the second side abuts the first side and the third side.

4. The fastener apparatus of claim 1, further comprising a bore in the end surface, the bore being internally threaded with the first screw thread.

5. The fastener apparatus of claim 4, wherein the bore extends from the end surface to the lower surface.

6. The fastener apparatus of claim 1, further comprising a shaft extending from the end surface, the shaft being externally threaded with the first screw thread.

7. The fastener apparatus of claim 1, wherein the shoulder further comprises a first cross-sectional profile perpendicular to the second longitudinal axis, the first cross-sectional profile comprising
- a first straight wall segment proximate the first side,
- a second straight wall segment spaced from the first straight wall segment,
- a first curved wall segment between the first straight side wall segment and the second straight wall segment, and
- a second curved wall segment between the first straight side wall segment and the second straight wall segment.

8. The fastener apparatus of claim 7, wherein the first cross-sectional profile further comprises
- a third curved wall segment abutting the first straight wall segment,
- a third straight wall segment abutting the first curved wall segment, and
- a fourth straight wall segment abutting the third curved wall segment.

9. The fastener apparatus of claim 8, wherein the first cross-sectional profile comprises a cam profile.

10. The fastener apparatus of claim 1, wherein the shoulder further comprises a first cross-sectional profile normal to the second longitudinal axis, and the first cross-sectional profile has a first plane of symmetry.

11. The fastener apparatus of claim 9, wherein the first cross-sectional profile has a second plane of symmetry.

12. The fastener apparatus of claim 1, further comprising a fastening aid.

13. The fastener apparatus of claim 11, wherein the fastening aid comprises a wedge in the first screw thread.

14. A fastener apparatus for a universal interface system comprising:
- the fastener apparatus of claim 1; and
- an exterior fastener which comprises a proximal end and a distal end, the exterior fastener comprising
  - a head, and
  - a second screw thread adjacent to the distal end, the second screw thread being configured and dimensioned to mate with the first screw thread; and
- a spring spaced from the second side of the elongated base.

15. The fastener apparatus of claim 13, further comprising a fastening aid wherein the first screw thread, the second screw thread, and the fastening aid form a coupling.

16. An accessory for a small arms weapon comprising:
- a device comprising a weapon accessory; and
- the fastener apparatus of claim 13 incorporated into the device.

17. An accessory for a small arms weapon comprising:
- the fastener apparatus of claim 13, and
- a weapon accessory which comprises
  - a first surface,
  - a second surface spaced from the first surface along a third longitudinal axis, and
  - a fastener apparatus receiving bore extending from the first surface to the second surface, the fastener apparatus receiving bore including
    - a first bore adjacent the first surface, and
    - a second bore adjacent the second surface,
- wherein, the spring is disposed in the first bore, and the second bore is intermediate to the spring and the elongated base.

18. The accessory of claim 16, wherein the first bore comprises a first cross-sectional area perpendicular to the third longitudinal axis, and the second bore comprises a second cross-sectional area perpendicular to the third longitudinal axis, the first cross-sectional area being greater than the second cross-sectional area.

19. The accessory of claim 17, wherein the accessory includes a ready configuration in which the elongated base is biased toward the second surface by the spring.

20. The accessory of claim 18, wherein the accessory is an accessory rail.

21. An accessory rail system comprising:
- the accessory of claim 19; and
- an object which comprises
  - a mounting surface,
  - a locking surface, and
  - a plurality of elongated slots which extend from the mounting surface to the locking surface, each of the plurality of elongated slots further comprising a slot proximal end, and a slot distal end, the slot proximal end being spaced from the slot distal end along a longitudinal axis of the object, the plurality of elongated slots defining a numbered count of the plurality of elongated slots, and a slot spacing span, wherein the accessory rail comprises a standardized length, the standardized length being approximately equal to the numbered count of the plurality of elongated slots multiplied by the slot spacing span.

22. A fastener apparatus for a weapon accessory comprising:

an interior fastener which comprises an elongated base having a first longitudinal axis, the elongated base including a lower surface, a first side proximate to the lower surface, a second side proximate to the first side, and a third side proximate to the first side and the lower surface, the third side including a notch which comprises a first interior sidewall, the first interior sidewall extending from the second side to the lower surface of the elongated base;

a shoulder next to the elongated base, the shoulder having a second longitudinal axis, the shoulder including a first sidewall-segment proximate to the first side of the elongated base; and an end surface spaced from the second side of the elongated base along the second longitudinal axis; and a first screw thread proximate to the end surface for receiving a mating fastener;

an exterior fastener which comprises a proximal end and a distal end, the exterior fastener comprising a head, and a second screw thread adjacent to the distal end, the second screw thread being configured and dimensioned to mate with the first screw thread; and a weapon accessory comprising a body interposed between the elongated base and the exterior fastener, the body comprising a guide raised from a bottom surfaces, and a crest proximate the guide, a spring interposed between the head and the body, the fastener apparatus comprising a first configuration and a second configuration such that in the first configuration the notch is engaged with the crest and the crest blocks rotational movement of the elongated base, and such that in the second configuration the notch is disengaged from the crest and the elongated base is rotatable about the second axis, the fastener apparatus being biased into the first configuration by the spring.

23. The fastener apparatus of claim 22, further comprising a fastening aid between the first screw thread and the second screw thread.

24. The fastener apparatus of claim 23, wherein the weapon accessory is selected from the group consisting of an accessory rail, a flip sight, an angled foregrip, a tactical flashlight, an optical sight, an electronic optical sight, a quick disconnect mount, a bipod, a vertical grip, and a grenade launcher.

25. The fastener apparatus of claim 22, further comprising:

a groove in the first screw thread, and an engineered plastic strip arranged in the groove.

26. The fastener apparatus of claim 25, wherein the weapon accessory is an accessory rail.

27. An accessory rail system comprising:

the fastener apparatus of claim 26; and an object which comprises a mounting surface, a locking surface, and a plurality of elongated slots which extend from the mounting surface to the locking surface, each of the plurality of elongated slots further comprising a slot proximal end, and a slot distal end, the slot proximal end being spaced from the slot distal end along a longitudinal axis of the object, the plurality of elongated slots defining a numbered count of the plurality of elongated slots, and a slot spacing span, wherein the accessory rail comprises a standardized length, the standardized length being approximately equal to the numbered count of the plurality of elongated slots multiplied by the slot spacing span.

* * * * *